United States Patent [19]

Sumida et al.

[11] Patent Number: 5,383,754
[45] Date of Patent: Jan. 24, 1995

[54] IMAGE FORMING APPARATUS HAVING AN IMAGE ORIENTATION IDENTIFYING DEVICE AND A BINDING DEVICE

[75] Inventors: Hiroyasu Sumida, Ichikawa; Akihisa Itabashi, Tokyo; Hiroshi Fukano, Matsudo; Hiroyasu Shijo, Kawasaki; Hiroshi Takashima, Yono; Takeshi Ogiwara, Ohmiya; Fumio Kishi, Yokohama, all of Japan

[73] Assignee: Ricoh Company, Ltd., Tokyo, Japan

[21] Appl. No.: 22,332

[22] Filed: Feb. 24, 1993

[30] Foreign Application Priority Data

Feb. 27, 1992 [JP] Japan ................. 4-041611
Feb. 28, 1992 [JP] Japan ................. 4-043120
Feb. 28, 1992 [JP] Japan ................. 4-043160

[51] Int. Cl.⁶ ............................................ B42C 13/00
[52] U.S. Cl. ................................. 412/11; 412/14; 412/1
[58] Field of Search ................. 412/1, 6, 9, 10, 11, 412/12, 14

[56] References Cited

U.S. PATENT DOCUMENTS 3,804,404  4/1974  Bosshard ................. 412/11
4,639,177  1/1987  Meratti ................... 412/11
4,767,250  8/1988  Garlichs ................ 412/11 X
5,031,116  7/1991  Shukunami et al. .
5,066,183  11/1991  Tholerus ............... 412/11 X
5,150,998  9/1992  Murakami et al. ...... 412/14

FOREIGN PATENT DOCUMENTS

3708317A1  6/1988  Germany .
3935549A1  4/1990  Germany .

Primary Examiner—Willmon Fridie
Attorney, Agent, or Firm—Oblon, Spivak, McClelland, Maier & Neustadt

[57] ABSTRACT

An image forming apparatus having a device capable of identifying an image orientation to allow adequate processing to be executed and a device capable of binding sheets by determining a binding position. When an image orientation cannot be identified on the basis of a predetermined reference object, it is identified on the basis of another object. When the image orientation of a reference image and the image orientations of the other images are not coincident, an adequate procedure is executed to avoid an undesirable result. An orientation of a document image matching a predetermined adequate binding position is surely and accurately determined.

18 Claims, 155 Drawing Sheets

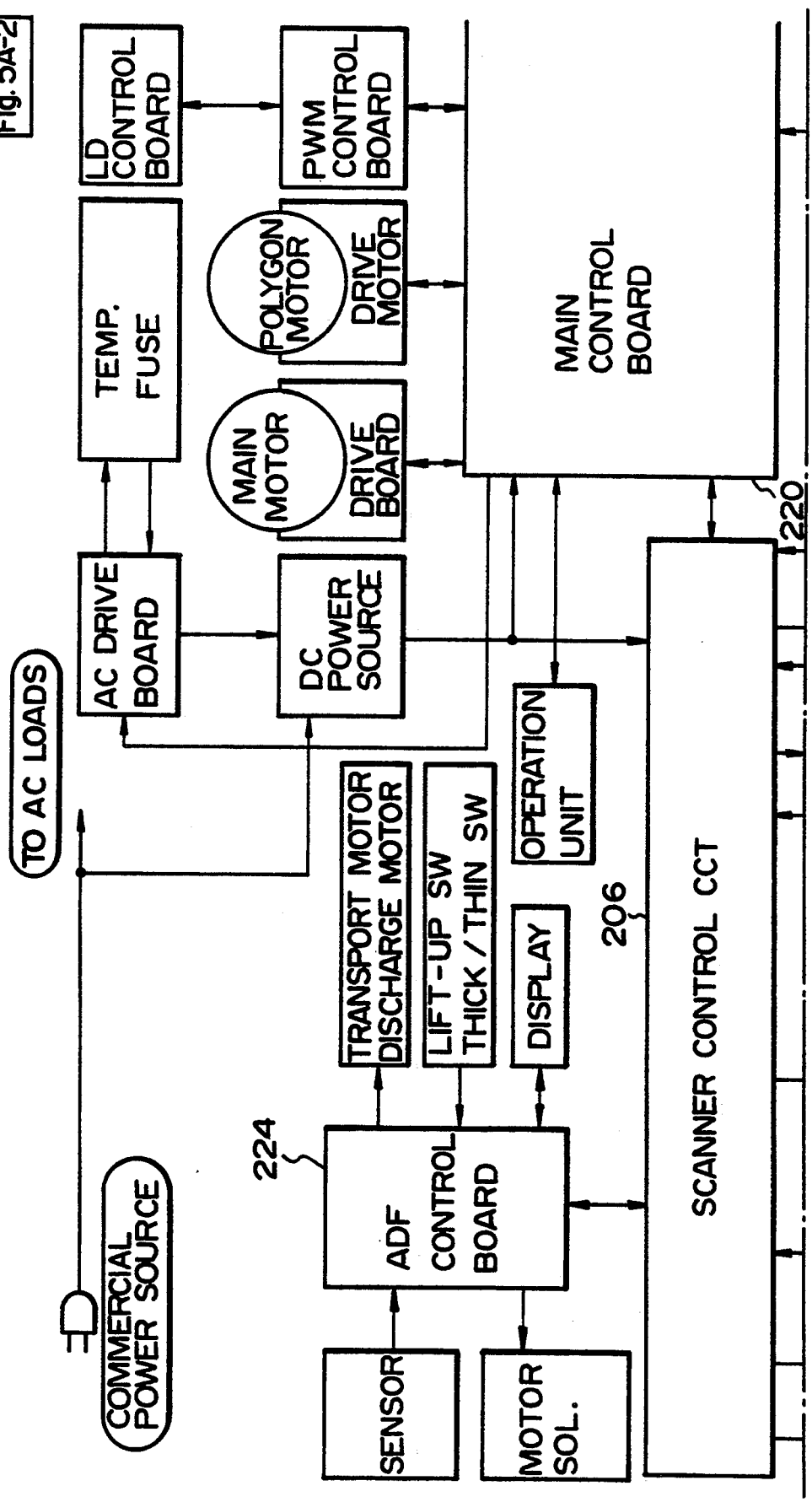

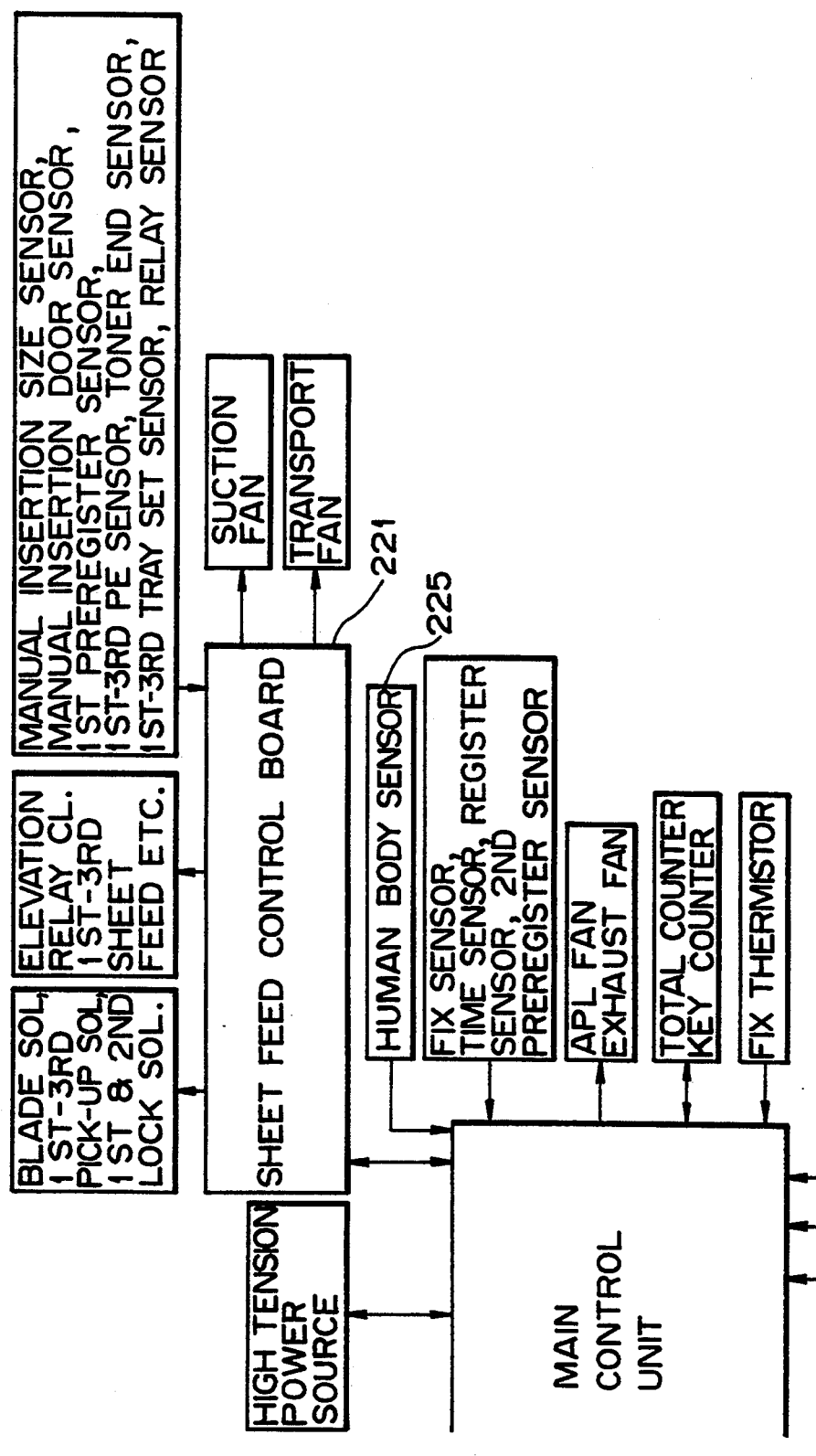

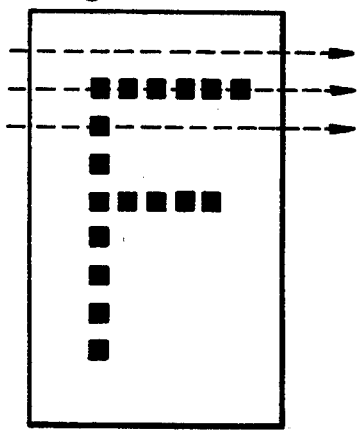
Fig. 25A    Fig. 25B
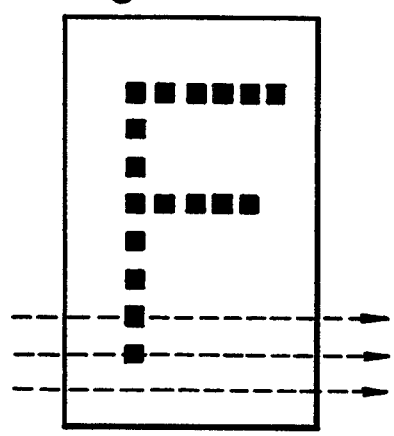
Fig. 26A    Fig. 26B    Fig. 26C
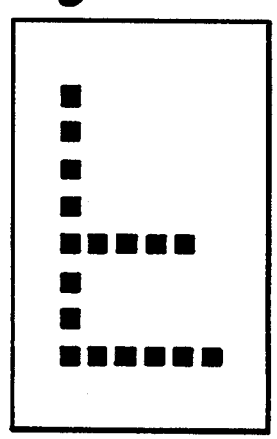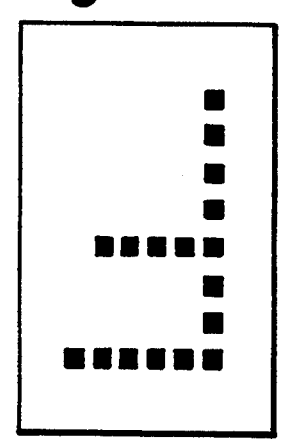
Fig. 27A    Fig. 27B    Fig. 27C
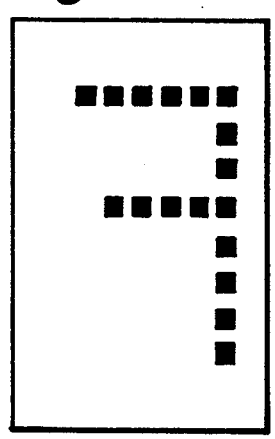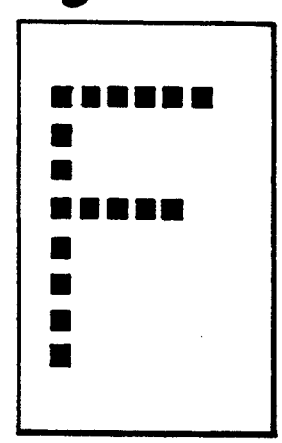

(DOTTED LINES INDICATING CHARAC LINES MATCHED TO REF DOC)

Fig. 92
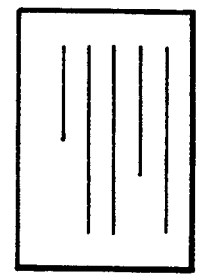
VERT LONG
VERT WRITING
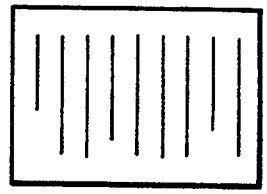
HORIZ LONG
VERT WRITING
MIXTURE
(1) REF: VERT DOC      (2) REF: HORIZ DOC
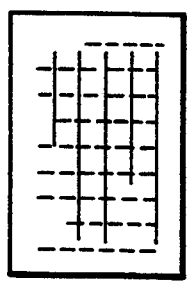
MATCH RIGHT EDGE
OF VERT DOC & TOP
EDGE OF HORIZ DOC
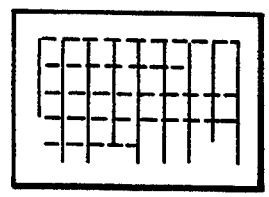
MATCH RIGHT EDGE
OF HORIZ DOC & TOP
EDGE OF VERT DOC REF DOC DATA
(VERT LONG HORIZ WRITING)
Fig. 93B 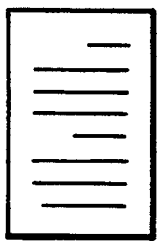 →180° ROTATION→ 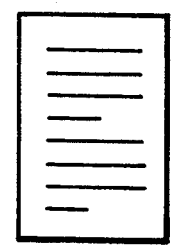
VERT LONG HORIZ WRITING
  → NO ROTATION
HORIZ LONG HORIZ WRITING
Fig. 93D  →180° ROTATION→ 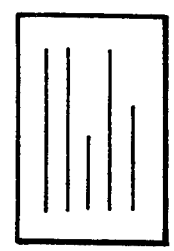
HORIZ LONG HORIZ WRITING

Fig. 94
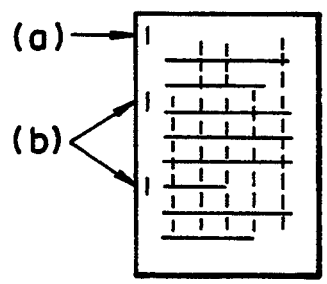
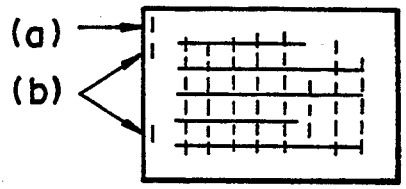
(1) — ⓘ
REF: VERT LONG HORIZ WRITING
(1) — ⓘⓘ
REF: HORIZ LONG HORIZ WRITING
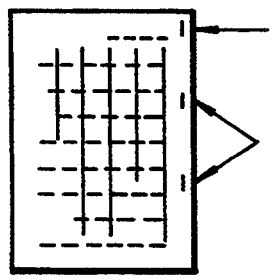
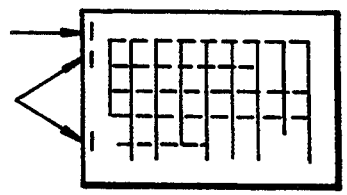
(2) — ⓘ
REF: VERT LONG VERT WRITING
(2) — ⓘⓘ
REF: HORIZ LONG VERT WRITING
(a) 1-POINT STAPLING POSITION
(b) 2-POINT STAPLING OR PUNCHING POSITION
PUNCHING POSITION INDICATING EDGE OF SHEET
& DIFFERENT FROM STAPLING POSITION

CHARACTERISTIC AMOUNT

| NUMBER OF CODES 1 | NUMBER OF CODES 2 | NUMBER OF CODES 3 | NUMBER OF CODES 4 | NUMBER OF CODES 5 | NUMBER OF CODES 6 | NUMBER OF CODES 7 | NUMBER OF CODES 8 |
|---|---|---|---|---|---|---|---|

Fig. 106A
0° ROTATION

Fig. 106B
90° ROTATION

Fig. 106C
180° ROTATION

Fig. 106D
270° ROTATION

Fig. 107

| INPUT | | | | OUTPUT | | | |
|---|---|---|---|---|---|---|---|
| DOC SIZE | LINE DIRECTION (DEGREES) | CHARACTER DIRECTION (DEGREES) | PHASE DIFFERENCE (DEGREES) | WRITING | VERT LONG HORIZ LONG | TOP-BOTTOM | SYMBOL |
| A4T | 90 TO 270 | 0 | 90 | Eng. | VERT LONG | CORREC | a |
| | | 180 | 90 | Eng. | VERT LONG | UPSIDE DOWN | b |
| | | 90 | 0 | Jap. | VERT LONG | CORREC | c |
| | | 270 | 0 | Jap. | VERT LONG | UPSIDE DOWN | d |
| | 0 TO 180 | 0 | 0 | Eng. | HORIZ LONG | CORRECT | e |
| | | 180 | 0 | Eng. | HORIZ LONG | UPSIDE DOWN | f |
| | | 90 | 90 | Jap. | HORIZ LONG | CORRECT | g |
| | | 270 | 90 | Jap. | HORIZ LONG | UPSIDE DOWN | h |
| A4Y | 90 TO 270 | 0 | 90 | Eng. | HORIZ LONG | CORRECT | i |
| | | 180 | 90 | Eng. | HORIZ LONG | UPSIDE DOWN | j |
| | | 90 | 0 | Jap. | HORIZ LONG | CORRECT | k |
| | | 270 | 0 | Jap. | HORIZ LONG | UPSIDE DOWN | l |
| | 0 TO 180 | 0 | 0 | Eng. | VERT LONG | CORRECT | m |
| | | 180 | 0 | Eng. | VERT LONG | UPSIDE DOWN | n |
| | | 90 | 90 | Jap. | VERT LONG | CORRECT | o |
| | | 270 | 90 | Jap. | VERT LONG | UPSIDE DOWN | p |

HORIZ LONG HORIZ WRITING

VERT LONG HORIZ WRITING

VERT LONG VERT WRITING

HORIZ LONG VERT WRITING

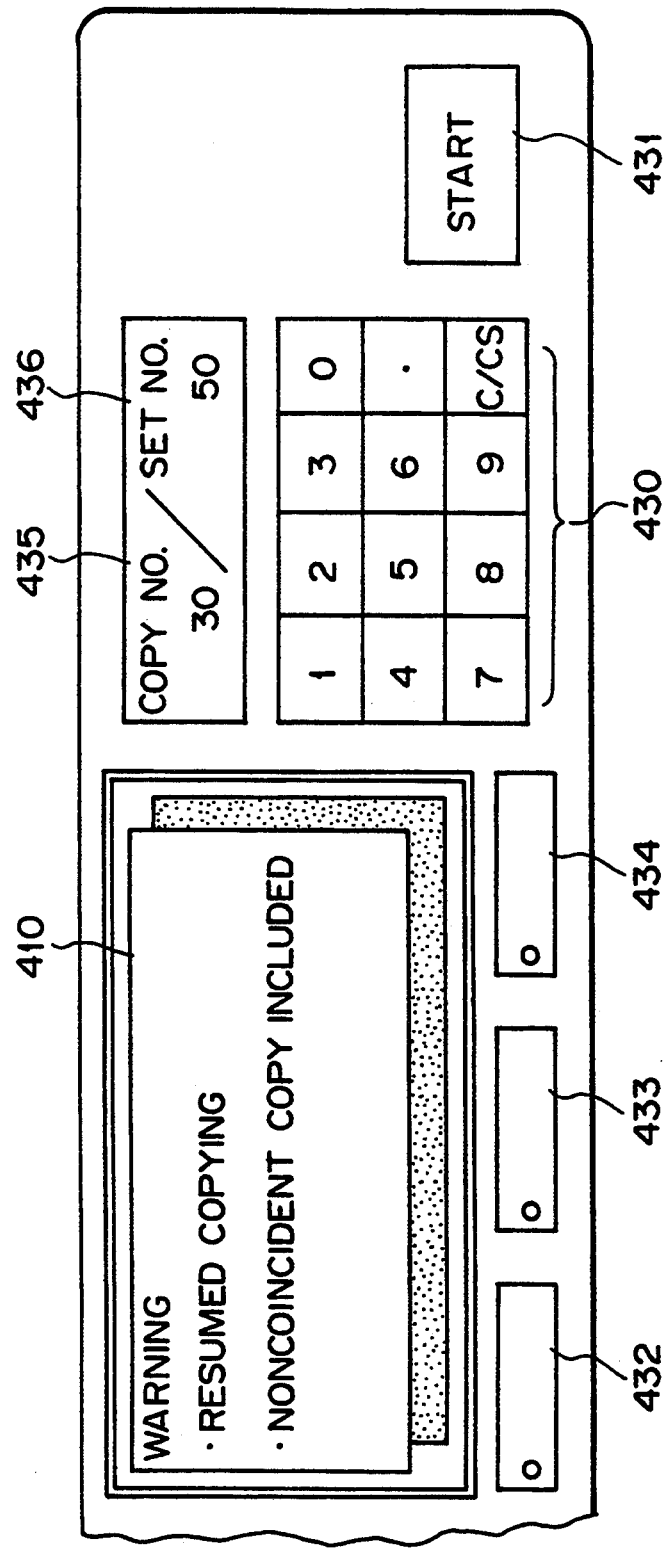

HORIZ LONG HORIZ WRITING

VERT LONG HORIZ WRITING

VERT LONG VERT WRITING

HORIZ LONG VERT WRITING

HORIZ LONG VERT WRITING

VERT LONG HORIZ WRITING

VERT LONG VERT WRITING

HORIZ LONG VERT WRITING

HORIZ LONG

DISCHARGE

VERT LONG

DISCHARGE

VERT LONG HORIZ WRITING

VERT LONG VERT WRITING

VERT LONG VERT WRITING

HORIZ LONG VERT WRITING

LEFT PUNCH REGULAR

LEFT PUNCH UPSIDE DOWN

TOP PUNCH REGULAR

TOP PUNCH UPSIDE DOWN

DETECTION AREAS

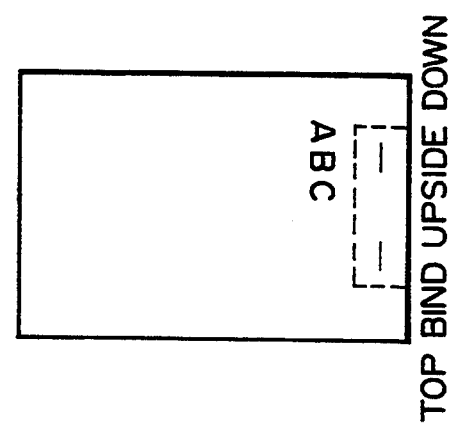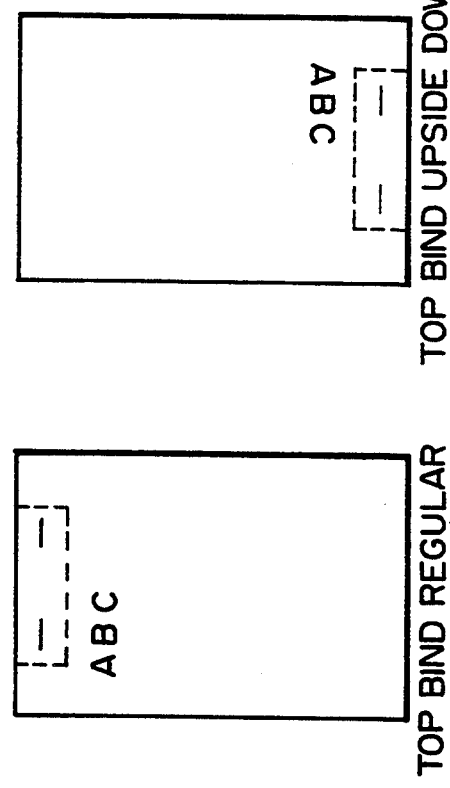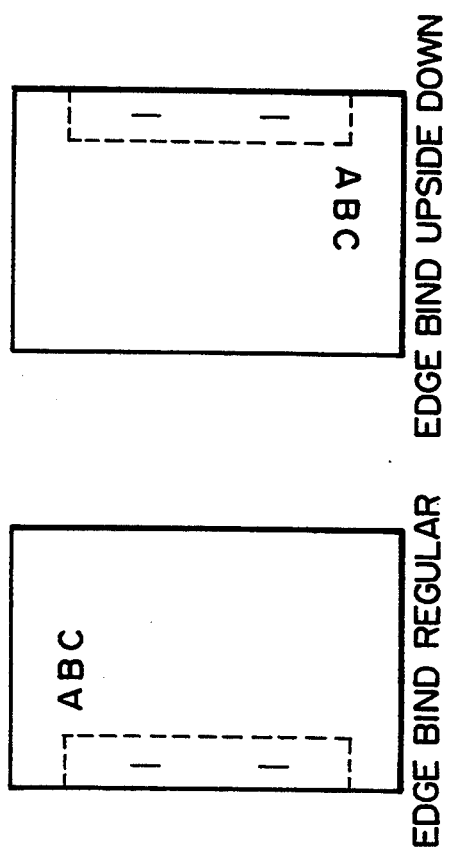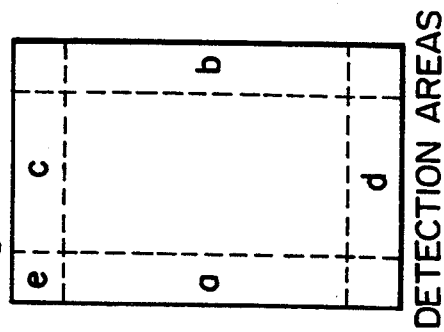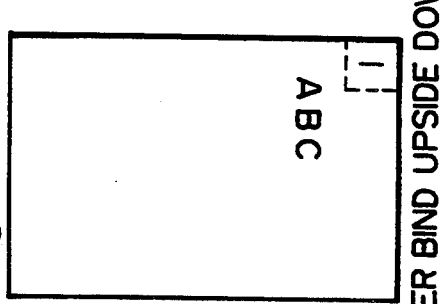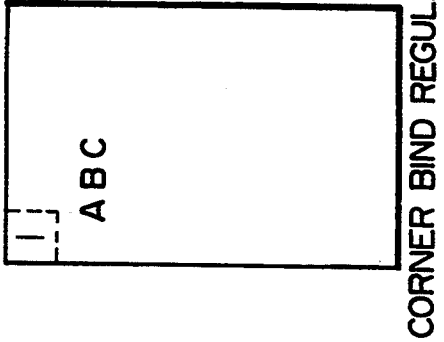

POSITION OF DETECTED PUNCH HOLES  STAPLING POSITION
(a)　　(a') 2 POINTS　　(d') 1 POINT
Fig. 154A 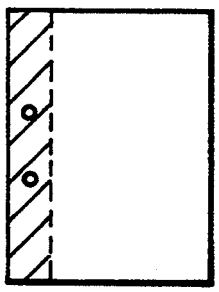 → 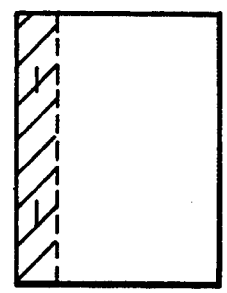 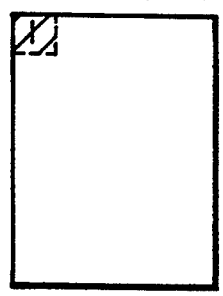
(b)　　(b')　　(b'')
Fig. 154B 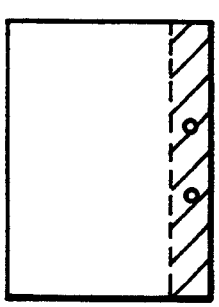 → 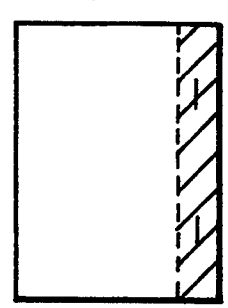
(c)　　(c')　　(c'')
Fig. 154C 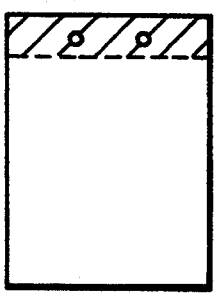 → 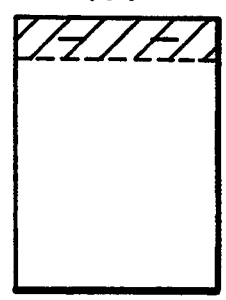
(d)　　(d')　　(d'')
Fig. 154D 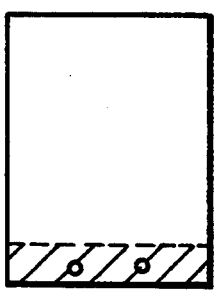 → 

POSITION OF DETECTED STAPLE HOLES     STAPLING POSITION

DISCHARGE

DISCHARGE

PUNCH HOLES ERASED

IMAGE FORMING APPARATUS HAVING AN IMAGE ORIENTATION IDENTIFYING DEVICE AND A BINDING DEVICE

BACKGROUND OF THE INVENTION

The present invention relates to a copier, facsimile transceiver, printer or similar image forming apparatus having a device capable of identifying an image orientation to allow adequate processing to be executed and a device for binding sheets carrying images thereon by determining a binding position.

A document image processing apparatus has been proposed in various forms in the past. Japanese Patent Laid-Open Publication No. 250184/1989, for example, discloses a document image processing apparatus which separates a character image from image data representative of a document and read by a scanner, extracts a characteristic amount of the character image, converts the characteristic amount in matching relation to the rotation angle of the character, compares the converted characteristic amount with a dictionary to thereby recognize the rotated image or, when the rotation angle of the character is not known beforehand, recognizes the separated character image as two or more rotated images of different angles and thereby determines the rotation angle of the character.

On the other hand, Japanese Patent Laid-Open Publication No. 105266/1989 teaches a document image processing apparatus which separates a suitable number of character images in the vertical direction from the image data of a document read by an image scanner (separates such that the width from the head portion toward the tail portion of a line and the width from the tail portion toward the head portion are equal to each other). Paying attention to the fact that a greater number of black pixels exist in the width from the head portion to the tail portion than in the width from the tail portion to the head portion, the apparatus determines the position of the image in the top-and-bottom direction and, if it is upside down, rotates it by image rotating means to a correct position.

Although the above-described conventional apparatuses identify a character orientation (document image orientation) by using a character recognition scheme, they lack a measure for coping with the occurrence that an image orientation cannot be identified on the basis of an object which is the reference for identification.

The identification of a character orientation has not been much applied to an image forming art, particularly a binding technology, although it would facilitate convenient image formation. Regarding image formation accompanied by a binding operation, the orientation of a document relative to an image reading section is an important consideration since it is apt to cause sheets to be bound at an inadequate position. Since an ordinary binding device binds sheets at only a particular position relative to the document set position for mechanical reasons, an erroneous orientation of documents disturbs the binding position. Specifically, if sheets can be bound at any desired position thereof, they will be bound at an adequate position when at least the orientation of the documents is accurately detected. However, an ordinary binding device has a stapler which is fixed in place or movable only along one end of sheets due to the mechanical limitations of the device body. It is, therefore, necessary to match the orientation of the documents to the reference binding position of the binding device. For example, should vertically long horizontally written documents be set upside down in the top-and-bottom direction and should the binding device be expected to bind the upper left corner of documents, sheets would be bound at the lower right corner.

Moreover, it often occurs that when a great number of document images are handled in a stack, image data exist in the binding range of some document images, causing sheets to be bound in image areas thereof. In addition, in the event of punching or sorting, the mixture of sheets of different orientations are also obstructive.

SUMMARY OF THE INVENTION

It is, therefore, an object of the present invention to provide a reliable image forming apparatus having a device capable of identifying, when failing to identify an image orientation on the basis of an object which is the reference for identification, an image orientation on the basis of another object.

It is another object of the present invention to provide an image forming apparatus having a device capable of identifying an image orientation and, in the event of noncoincidence, executing an adequate processing to avoid an undesirable result.

It is another object of the present invention to provide an image forming apparatus having a device capable of surely and accurately identifying an image orientation of document images matching a predetermined adequate binding portion so as to determine an adequate binding position and, in the event of noncoincidence, executing a recovery procedure to avoid an undesirable result.

In accordance with the present invention, a binding device identifies a binding position for binding sheets carrying images thereon, and performs a binding operation at the identified binding position.

Also, in accordance with the present invention, a device for determining coincidence of an image orientation comprises image orientation identifying means for selecting, among a plurality of image data, image data of a particular page as a reference image, identifying an image orientation of the reference image, and then identifying image orientations of the other image data, and decision means for determining whether or not the image orientations of the other image data match the image orientation of the reference image.

Also, in accordance with the present invention, in an image forming apparatus having a device for determining coincidence of an image orientation, the device comprises first identifying means for selecting, among a plurality of image data, image data of a particular page as a reference image, and identifying an image orientation of the reference image, second identifying means for identifying image orientations of the other image data, and decision means for determining whether or not the image orientation of the reference image identified by the first identifying means and the image orientations of the other image data identified by the second identifying means are coincident.

Also, in accordance with the present invention, a method of binding sheets carrying images thereon by determining a binding position comprises the steps of detecting predetermined image data existing in a page area, determining a binding position on the sheets in response to the predetermined image data, determining whether or not data representative of a predetermined reference binding position and data representative of the determined binding position are coincident, and avoiding, when the data representative of the predetermined reference binding position and the data representative of the determined binding position are not coincident, noncoincidence.

Further, in accordance with the present invention, a device for binding sheets carrying images thereon by determining a binding position comprises detecting means for detecting predetermined image data in an image data page area, determining means for determining a binding position in response to an output of the detecting means, decision means for determining whether or not data representative of a predetermined reference binding position and data representative of the determined binding position are coincident, and recovering means for avoiding, when the data representative of the predetermined reference binding position and the data representative of the determined binding position are not coincident, noncoincidence.

Moreover, in accordance with the present invention, a method of identifying an image orientation comprises the steps of detecting predetermined image data in an image data page area which is a reference for identification, identifying an image direction on the basis of data representative of the detected image data, and shifting, when an image orientation cannot be identified on the basis of the predetermined image data, the reference to another predetermined image data and determining an image orientation again.

Yet, in accordance with the present invention, a device for identifying an image orientation comprises a plurality of detecting means for detecting an image orientation of predetermined image data in an image data page area which is a reference for identification, identifying means for identifying an image orientation of the image data detected by the detecting means, and control means for shifting, when an image orientation cannot be identified on the basis of the predetermined image data, the reference to another predetermined image data and causing the detecting means and identifying means to identify an image.

Furthermore, in accordance with the present invention, an image forming apparatus comprises image forming means for forming an image on a sheet, detecting means for detecting predetermined image data in an image data page area, identifying means for identifying an image orientation on the basis of the predetermined image data detected by the detecting means, and control means for deactivating the identifying means in a usual image form mode which causes the image forming means to form an image on a sheet and discharges the sheet without finishing the sheet, or activating the identifying means in an image form mode which finishes the sheet in a predetermined manner.

In addition, in accordance with the present invention, a method of forming an image on a sheet comprises forming an image on a sheet, detecting predetermined image data in an image data page area, identifying an image orientation on the basis of the predetermined image data detected, and omitting identification of an image orientation in a usual image form mode which does not finish the sheet carrying an image or executes the identification in an image form mode which finishes the sheet in a predetermined manner.

BRIEF DESCRIPTION OF THE DRAWINGS

The above and other objects, features and advantages of the present invention will become more apparent from the following detailed description taken with the accompanying drawings in which:

FIGS. 25A and 25B show image data stored in a memory during usual scanning;

FIGS. 26A-26C show image data stored in the memory during reverse scanning;

FIGS. 27A-27C show image data resulting from mirroring;

FIG. 92 also shows the kinds of documents;

FIGS. 93A-93D show image orientation matching patterns;

FIG. 94 shows a relation between reference images and stapling and punching positions;

FIGS. 106A-106D show direction codes assigned to a specific Chinese character held in various angles;

FIG. 107 is a table listing various combinations of document size, writing direction and so forth;

FIGS. 118 and 119 are plan views each showing a specific condition of the operation and display section;

FIG. 134 shows a punch hole area;

FIG. 135 shows how to calculate the coordinates of punch holes;

FIGS. 136A and 136B show punch hole positions;

FIG. 137 shows a document image divided into areas;

FIGS. 138A-138C show fixed image data;

FIGS. 139-142 are flowcharts each showing a punch hole detection procedure;

FIG. 143 shows the coordinates of a punch hole;

FIGS. 144A-144E show punch hole patterns and areas for detection;

FIG. 145 is a flowchart showing a procedure based on the position of punch holes and an image condition;

FIGS. 146A-146G show staple position patterns;

FIG. 147 is a flowchart showing a procedure based on a staple mark and an image condition;

FIGS. 148 and 149 are flowcharts each showing a procedure for counting various document conditions;

Figure 150:
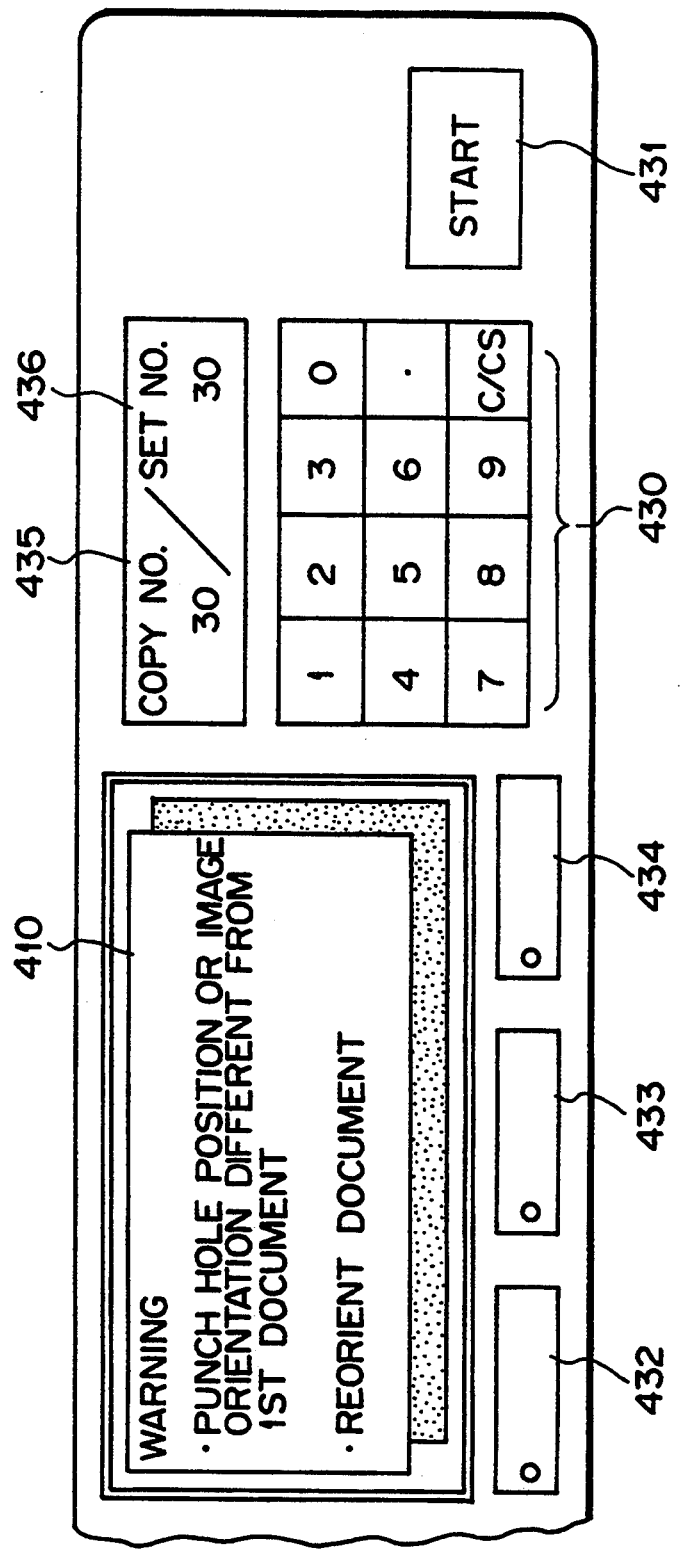
Figure 151:
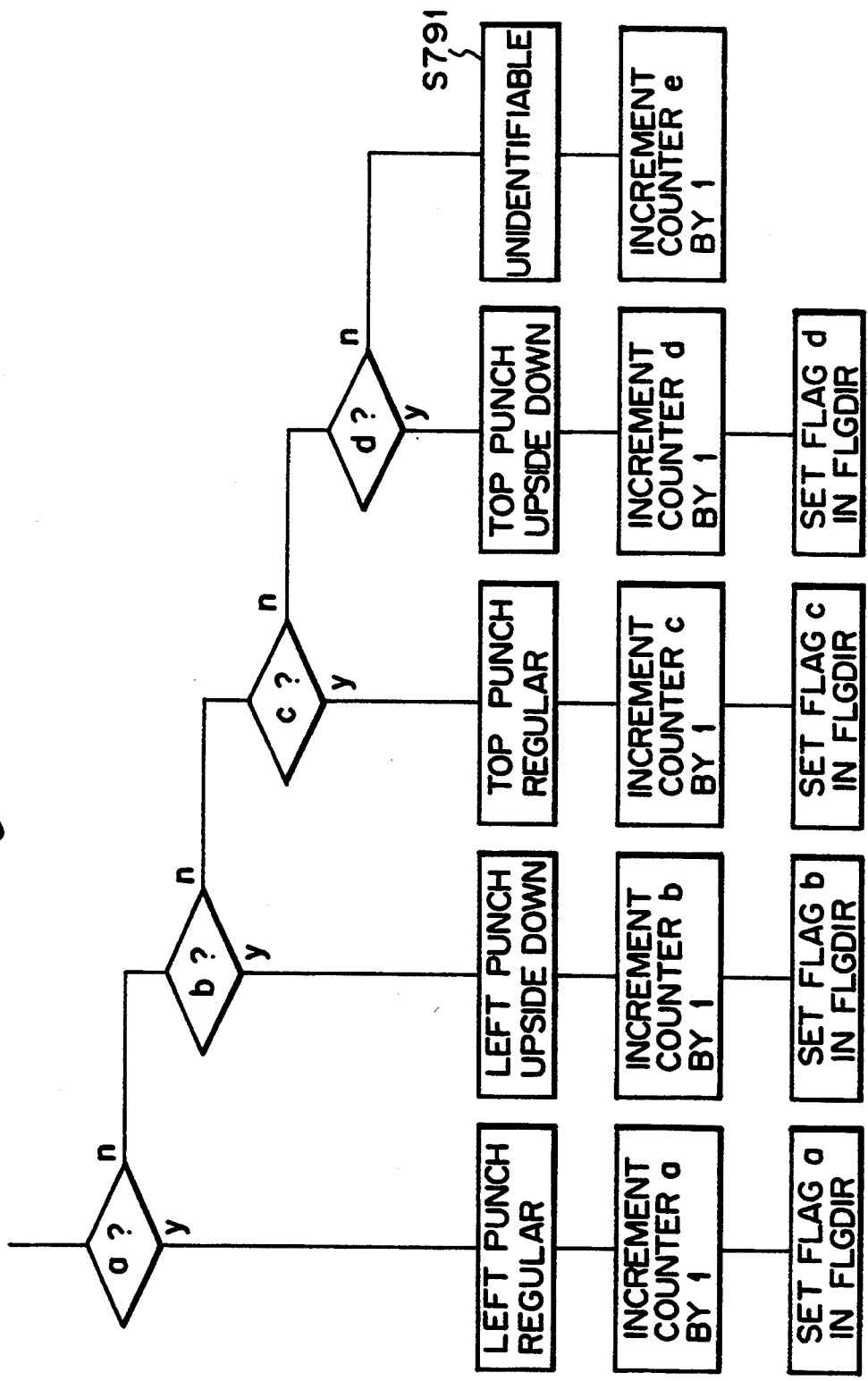
Figure 152:
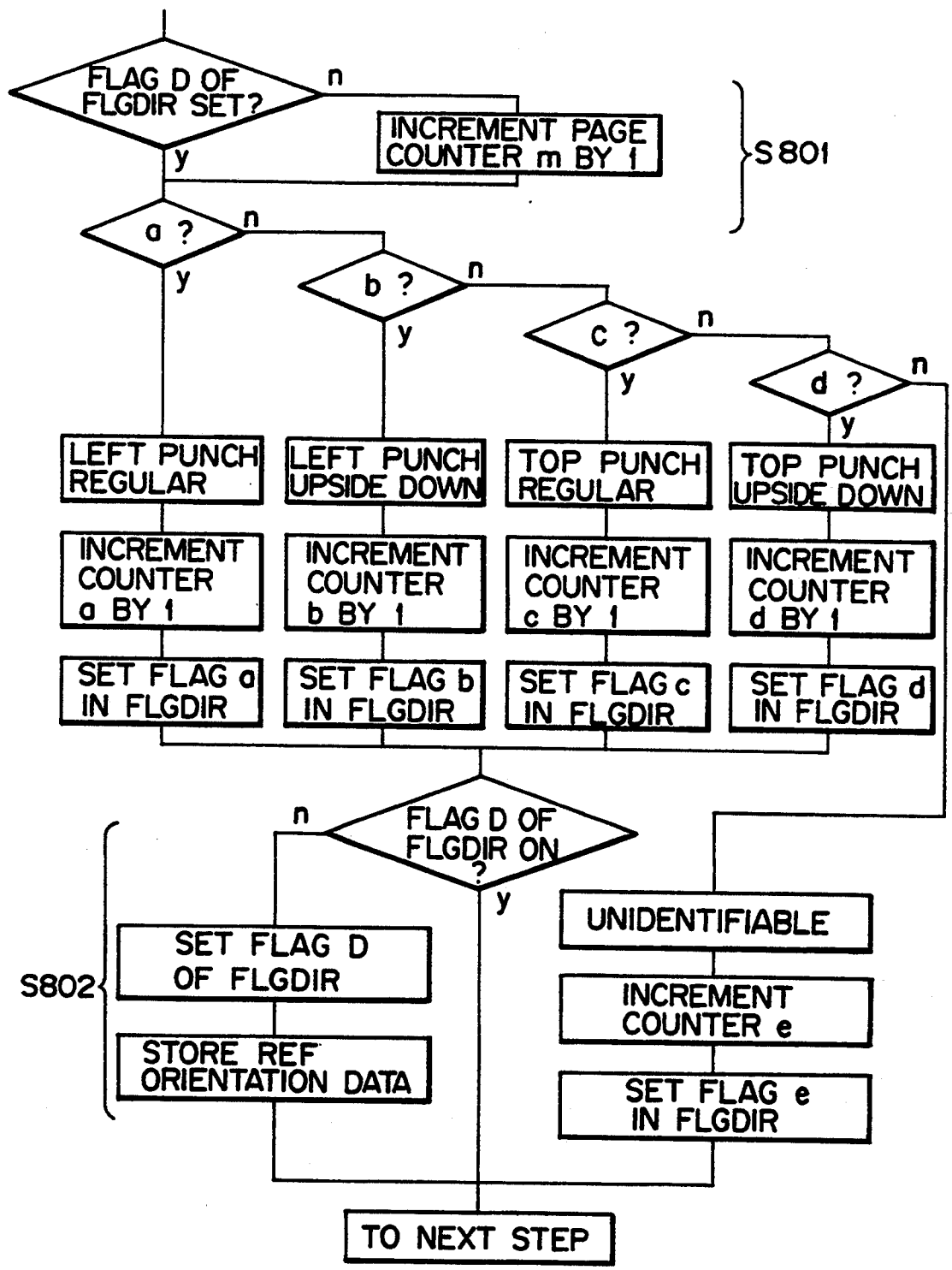
Figure 153:
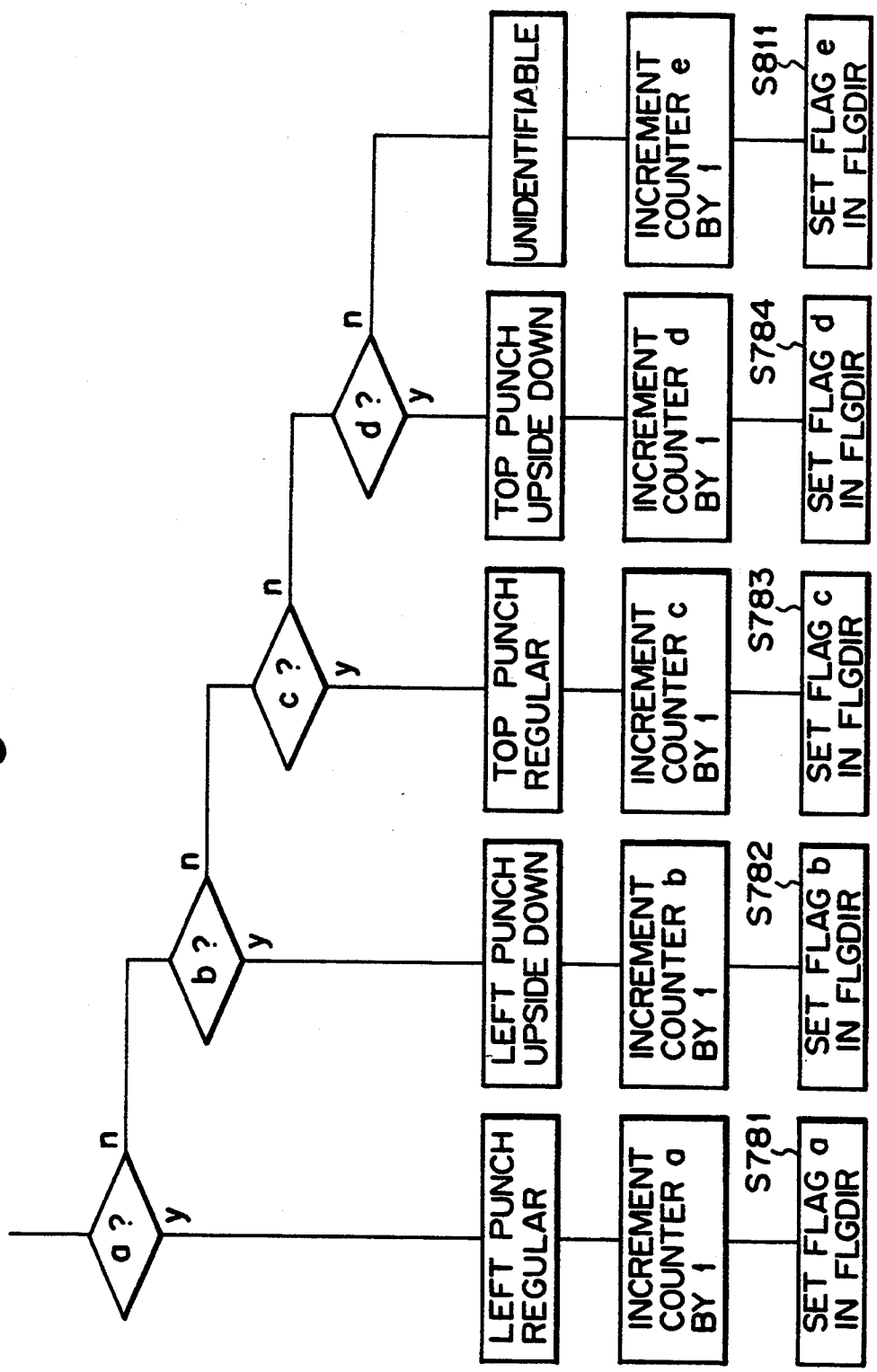
Figure 155:
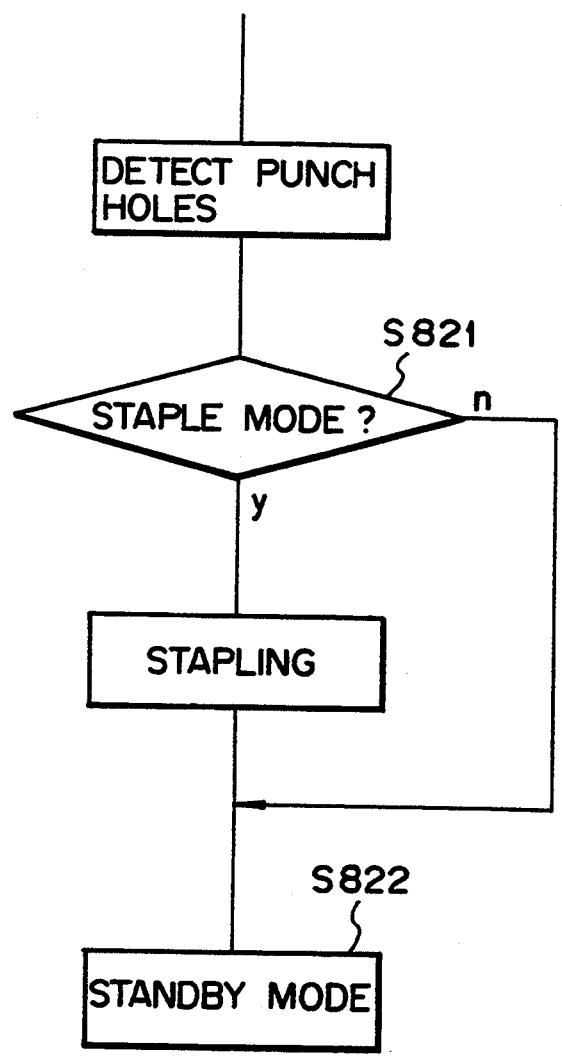
Figure 156A:
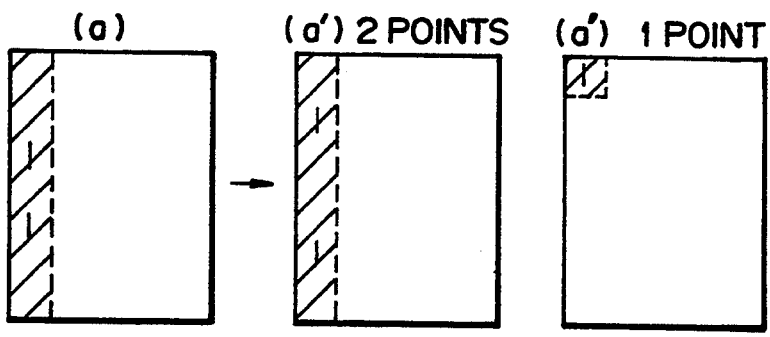
Figure 156B:
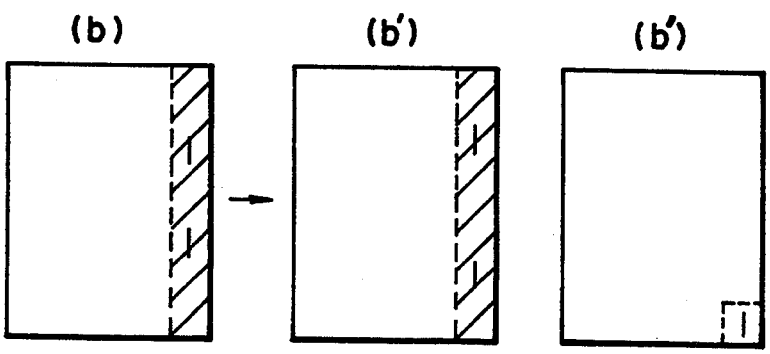
Figure 156C:
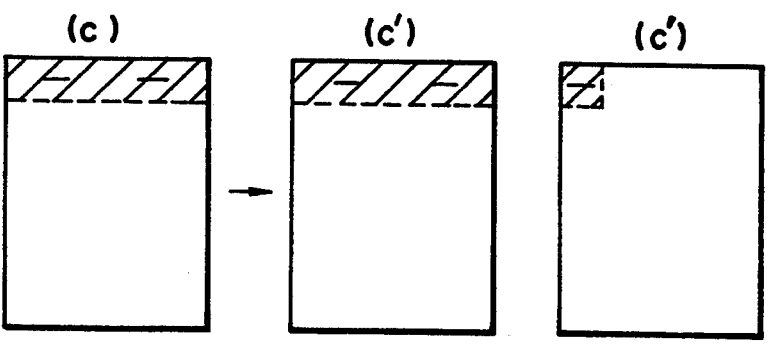
Figure 156D:
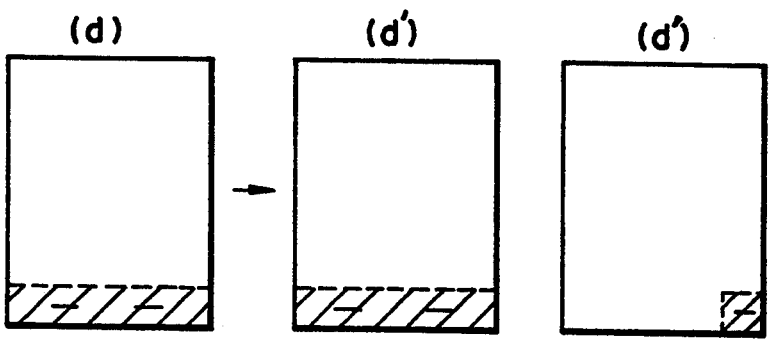
Figure 157:
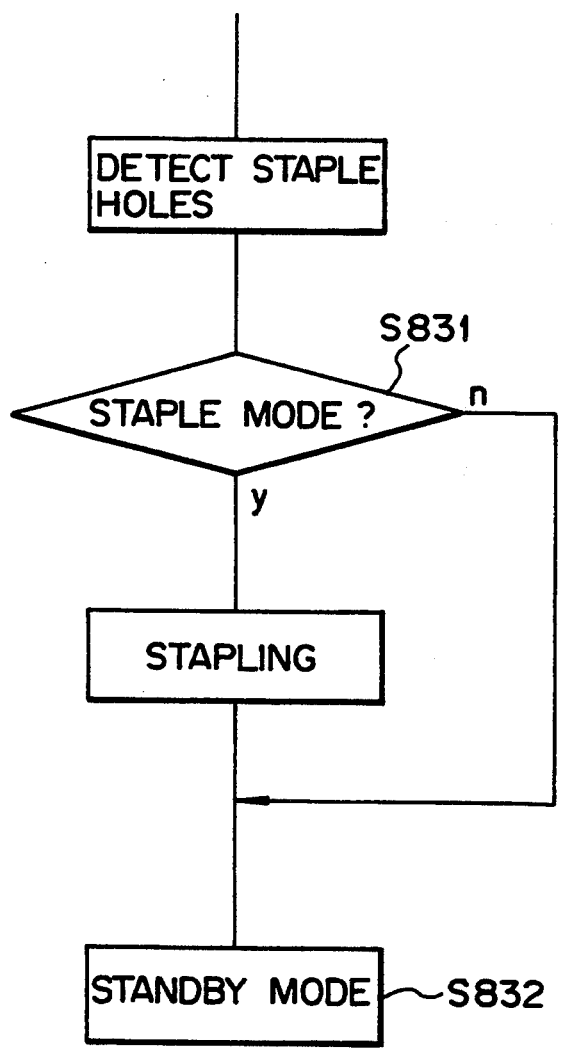
Figure 158:
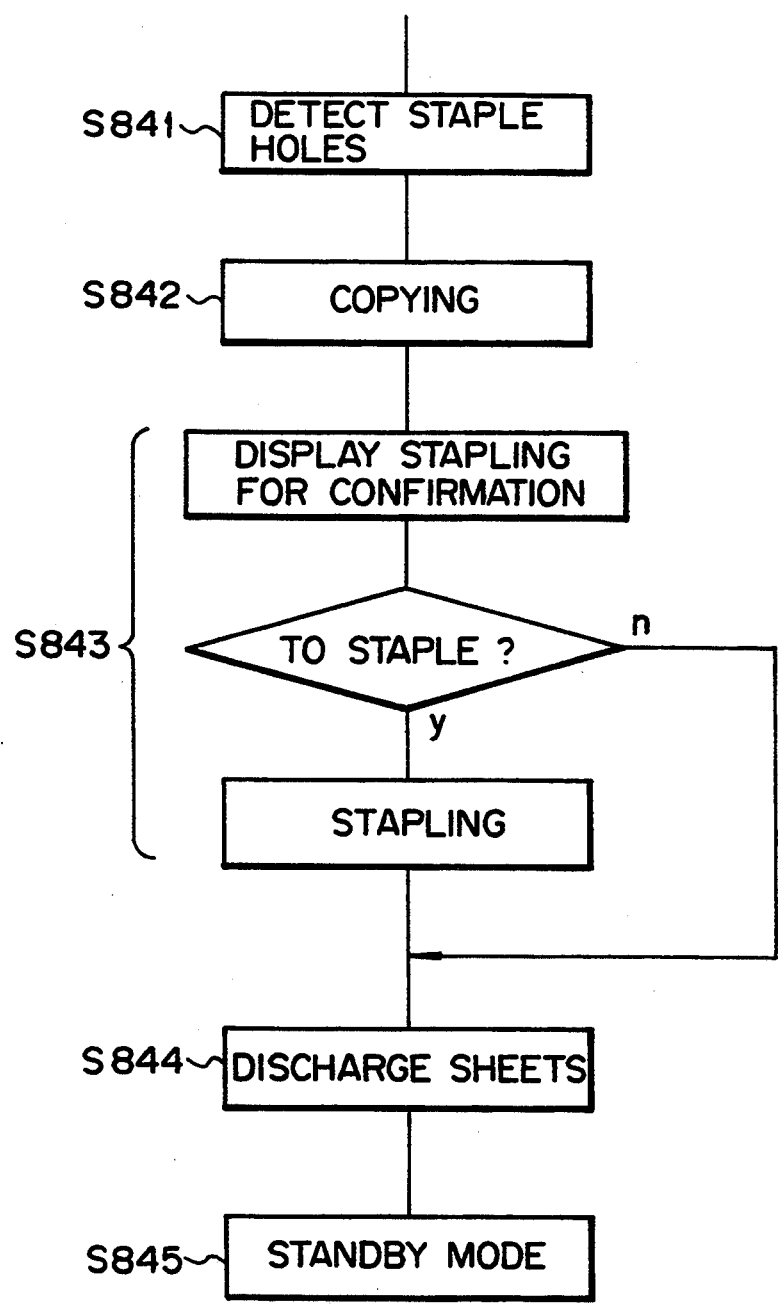
Figure 159A:
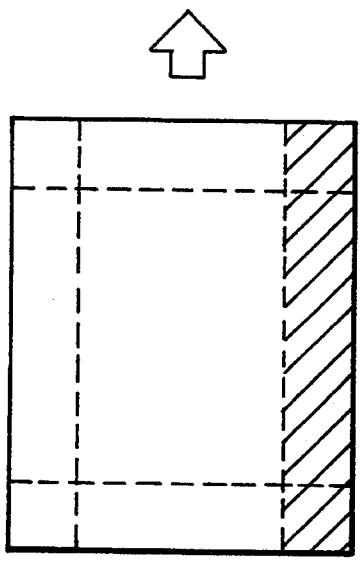
Figure 159B:
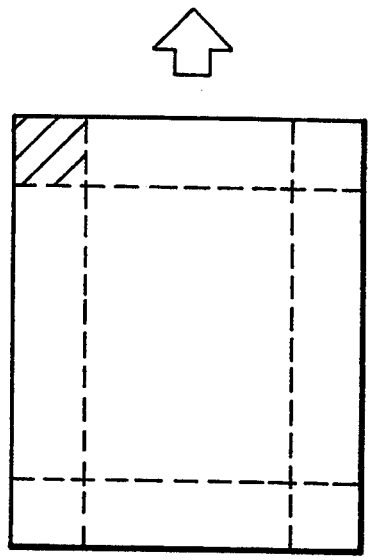
Figure 160:
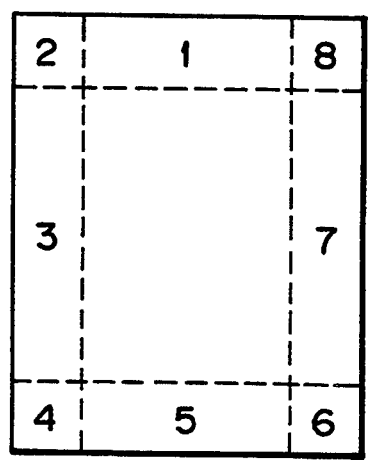
Figure 161:
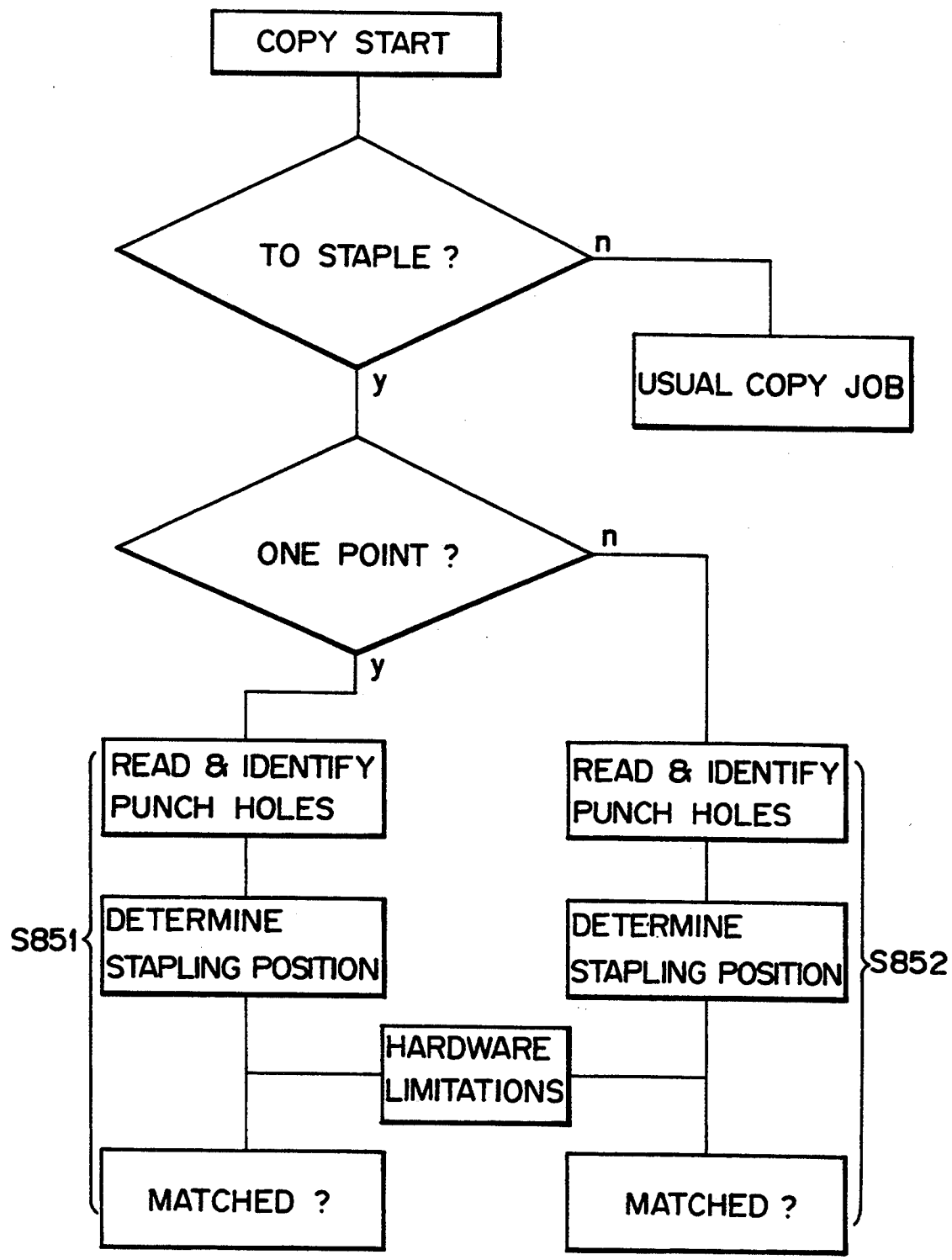
Figure 162A:
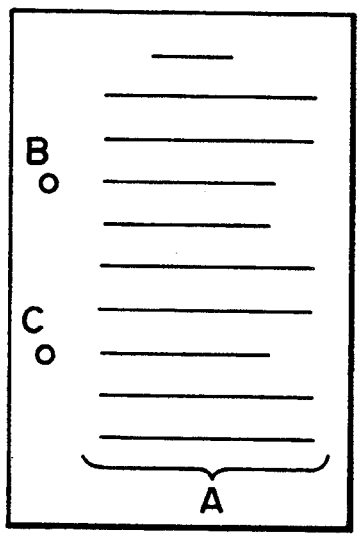
Figure 162B:
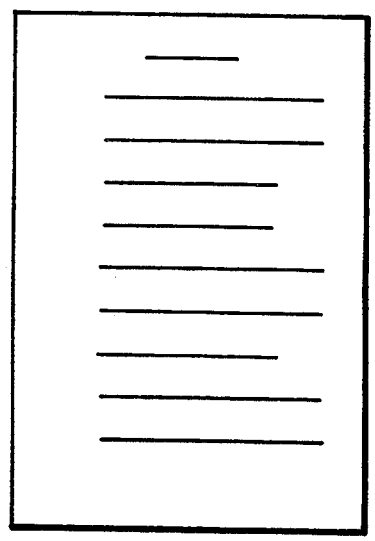
Figure 163A:
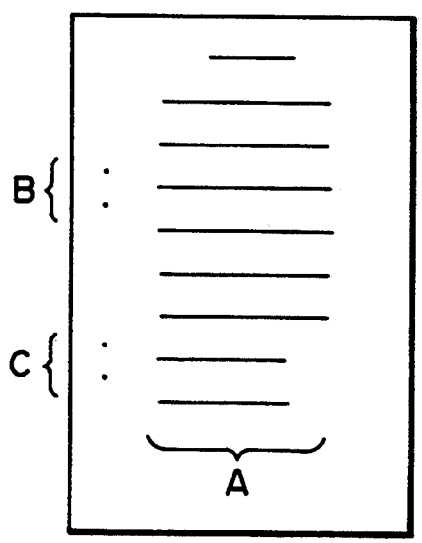
Figure 163B:
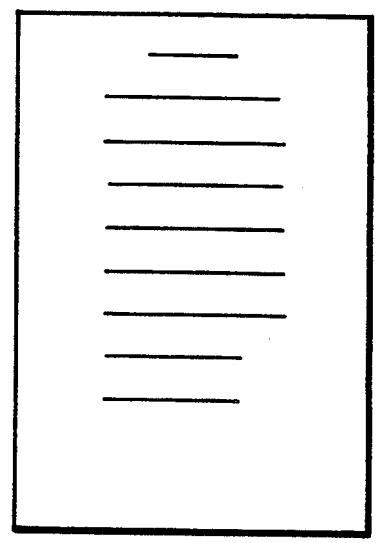

FIG. 150 is a plan view showing a specific condition of the operation and display section;

FIG. 151 is a flowchart showing a procedure for counting various document conditions and a processing associated with an unidentifiable state;

FIG. 152 is a flowchart showing a procedure for identifying an image orientation based on punch holes and staple holes;

FIG. 153 is a flowchart showing a procedure for counting various document conditions;

FIGS. 154A-154D show a relation between the punch hole position and the stapling position;

FIG. 155 is a flowchart showing a staple procedure using punch holes;

FIGS. 156A-156D show a relation between the staple hole position and the stapling position;

FIG. 157 is a flowchart showing staple processing using staple holes;

FIG. 158 is a flowchart showing a procedure for confirming a stapling operation;

FIGS. 159A and 159B show stapling positions on a document;

FIG. 160 shows stapling positions in symbols;

FIG. 161 is a flowchart showing a stapling position decision procedure using stapling positions and punch holes;

FIGS. 162A and 162B show how to erase punch holes;

FIGS. 163A and 163B show how to erase staple marks; and

Figure 164:
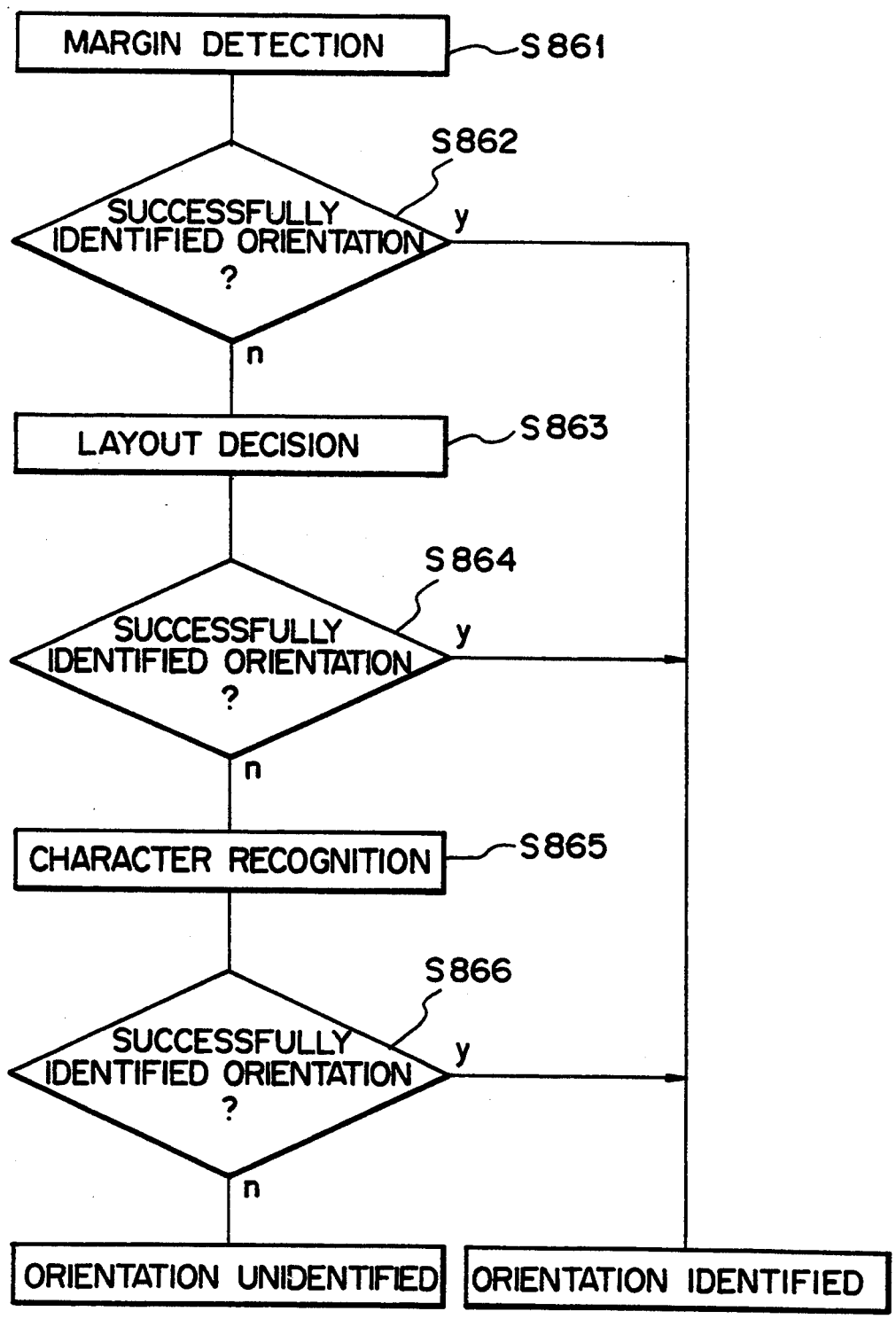

FIG. 164 is a flowchart showing an image orientation identification procedure.

DESCRIPTION OF THE PREFERRED EMBODIMENT

An embodiment of the present invention will be described hereinafter. To facilitate an understanding, the following description will be itemized, and the items will be shown as an index first.

1. Outline of Digital Copier Embodying the Invention
   1.1 General Construction
   1.2 Scanner Section
   1.3 Writing Section
   1.4 Photoconductive Element Section
   1.5 Developing Section
   1.6 Sheet Feed Section
   1.7 ADF
   1.8 Sorter/Stapler (III)
   1.9 Control Section
   1.9.1 Sequence Control
   1.9.2 Image Data Processing
   1.9.3 Application Units
   1.9.3.1 APL1
   1.9.3.2 APL2
   1.9.3.3 APL3
   1.9.3.4 APL4
   1.9.3.5 APL5
   1.9.3.6 Display
   1.9.4 Facsimile Transmission and Reception
   1.9.5 Image Processing Unit
   1.9.5.1 Shift, Magnification Change, Rotation, Reverse Scan and Mirroring
   1.9.5.2 Shift
   1.9.5.3 Magnification Change
   1.9.5.4 Image Rotation
   1.9.5.5 Reverse Scan and Mirroring
   1.10 Human Body Sensor
2. Identification of Image Orientation
3. identification of Image Orientation Based on Margins
   3.1.1 Detecting Greatest Margin in Page Area of Output Image Data
   3.1.2 Detecting Greater One of Two Reference Margins Derived from Size and Set Direction (Image Data Direction) of Document
   3.1.3 Matching 2nd Page and Successive Pages in Orientation to Start Page by Detecting Greatest Margin in Page Area
   3.1.4 Recovery in Orientation NG (No Good) Condition
   3.1.4.1 Only Display of Warning After Image Formation
   3.1.4.2 Interruption of Copying and Displaying Warning
   3.1.4.3 Disagreement of Margin
   3.1.5 Unidentifiable Orientation
   3.1.5.1 Forming Image in Predetermined Orientation and Displaying Warning
   3.1.5.2 Forming Image in Identified Reference Orientation and Displaying Warning
   3.1.5.3 Interrupting Image Formation and Displaying Warning
   3.1.6 Blank Document
   3.1.7 Orientation NG (Unable to Be Dealt with by Image Processing When Margin is Not Coincident)
   3.2.1 Determining Stapling Position Based on Greatest Margin in Page Area of Output Image Data
   3.2.2 Stapling at Greatest Margin
   3.2.3 Determining Stapling position Based on Greater One of Two Reference Margins Derived from Size and Set Direction (Image Data Direction) of Document
   3.2.4 Identifying Orientation Based on Greatest Margin Data and Confirming Coincidence by Comparing Image Data and Reference Stapling Position Data
   3.2.5 Identifying Orientation Based on Greatest Margin Data and Orientation NG Recovery by Comparing Image Data and Reference Stapling Position
   3.2.6 Image Existing in Stapling Position Derived from Greatest Margin Data
   3.3.1 Selectively Skipping Orientation Identification
   3.3.2 Stapling Position NG When Manual Staple Command Is Entered After Sorting
4. Identifying Image Orientation Based on Layout
   4.1.1 Identification Based on layout of Entire Image
   4.1.2 Detection on Blank Areas
   4.2.1 Orientation Based on layout (Image Direction Data (Document Set Direction) and Image Output Size Data (Document Size))
   4.2.2 Orientation Based on Corner Blank Data in Page Area of Output Image Data
   4.2.3 Orientation Matching Based on Layout Decision
   4.2.4 Orientation Matching Based on Corner Blank Data in Pate Area of Reference Output Image Data (Uniformization of Orientation)
   4.2.5 Matching Orientations of Vertical and Horizontal Documents Using Reference Image Data
   4.2.6 Recovery Orientation in NG Condition (Noncoincidence of Corner Blank Area)
   4.2.7 Unidentifiable Document
   4.2.8 Blank Document
   4.2.9 Orientation NG (Unable to Be Dealt with by Image Processing When Corner Blank is Noncoincident)
   4.3.1 Determining Stapling Position Based on Layout Decision (Set Position and Size of Document)
   4.3.2 Determining Stapling Position Based on Corner Blank Data Derived from Layout Decision (Stapling Adequate Corner)
   4.3.3 Stapling Detected Corner Blank Area
   4.3.4 Determining Stapling Position Based on Common Corner Blank Portion Derived from Layout Decision
   4.3.5 Orientation Matching by Comparing Corner Blank Area and Reference Stapling Position
   4.3.6 Recovery in Orientation NG Condition by Comparing Corner Blank Area and Reference Stapling Position
   4.3.7 Presence of Image in Stapling Position Determined by Corner Blank Data
   4.3.8 Uniformizing Mixture of Vertical and Horizontal Documents Based on Layout Decision and Determining Stapling Position
   4.4.1 Selectively Skipping Orientation Identification
   4.4.2 Stapling Position NG Based on Blank Data When Manual Staple Command is Entered
5. Identifying Image Orientation Based on Character Orientation
   5.1.1 Identifying Image Orientation in Output Image Data Page Based on Character Recognition
   5.1.2 Image Orientation Matching Based on Reference Output Image Data and Using Character Recognition
   5.1.3 Distinction between Vertical and Horizontal Documents (Based on Document Size, Orientation Data, Character Orientation Data and Line Direction Data (All Kinds)
5.1.4 Matching Mixed Vertical and Horizontal Documents to Reference Image Data by Character Orientation Recognition
5.1.5 Recovery in Image Orientation NG Condition (Noncoincident Character Orientation)
5.1.6 Orientation NG (Unable to Be Dealt With by Image Processing)
5.1.7 Blank Document
5.1.8 Unidentifiable Image Orientation
5.1.8.1 Forming Image in Predetermined Direction and Displaying Warning
5.1.8.2 Forming Image in Identified Reference Image Orientation and Displaying Warning
5.1.8.3 Interrupting Image Formation and Displaying Warning
5.2.1 Determining Stapling Position Based on Character Recognition
5.2.2 Comparison between Character Train Direction Data and Reference Stapling Position
5.2.3 Identifying Image Orientation of Mixed Vertical and Horizontal Documents Based on Character Recognition Data Relative to Reference Image Data, and Confirming match of Image Orientation by Comparing Image Orientations with Reference Stapler Position Data
5.2.4 Recovery in Character Train Direction Data and Reference Stapling Position NG Condition
5.3.1 Selectively Identifying Image Orientation Depending on Image Form Mode
5.3.2 After Sorting, Stapling Position NG on the Basis of Character Orientation Data when Manual Staple Command Is Inputted
5.3.2.1 Displaying Warning
5.3.2.2 Inhibiting Stapling
6. Identifying Image Orientation Based on Punch Holes or Staple Holes
6.1.1 Identifying Image Orientation Based on Punch Holes
6.1.2 Identifying Image Orientation Based on Staple Holes
6.1.3 Detecting Punch Holes or Staple Holes of Documents and Matching in Orientation to Reference Image Data
6.1.4 Recovery in Image Orientation NG Condition
6.1.4.1 Only Warning after Image Formation
6.1.4.2 If Different Orientation Is Detected by Scanning, Interrupting Copying and Displaying Warning
6.1.4.3 Image Rotation and Reverse Document Scanning
6.1.5 Unidentifiable Image Orientation
6.1.5.2 Matching to Identified Predetermined Reference Image Data Orientation, Forming Image and Displaying Warning
6.1.5.3 Interrupting image Formation and Displaying Warning
6.1.6 Blank Document
6.1.7 Image Orientation NG (Unable to Be Dealt with by Image Processing
6.2.1 Staple Control Based on Detected Punch Hole Data (Determining Stapling Position—Stapling)
6.2.2. Staple Control Based on Detected Staple Hole Data (Determining Stapling Position—Stapling)
6.2.3 Interrupting Stapling in Response to Inhibit Input
6.2.4 Comparison between Character Train Direction Data and Reference Stapling Position
6.2.5 Recovery in Image Orientation NG Condition by Comparing Image Orientation Derived from Punch Holes and Reference Stapling Position Data
6.2.6 Image Present at Punch Hole Position Determined by Punch Hole Detection
6.3.1 Selectively Detecting Punch Holes or Staple Holes Depending on Image Form Mode
6.3.2 Detecting Punch Holes of Document and Erasing Them on Sheet
6.3.3 Detecting Staple Holes of Document and Erasing Them on Sheet
6.3.4 Stapling Position NG Based on Various Data When Manual Staple Command is Inputted
7. Efficient Image Orientation Identification Using Margin, Layout and Character Recognition in Sequence 1. Outline of Digital Copier Embodying the Invention
1.1 General Construction Referring to FIG. 1, a digital copier which is a specific form of an image forming apparatus embodying the present invention is shown. As shown, the copier is generally made up of a copier body (I), an automatic document feeder (ADF) (II), a sorter/stapler, i.e., a sorter with a stapler (III), and a reversal unit (IV) for a two-sided copy mode. The copier body (I) includes a scanner section, an optical writing section, a photoconductive element section, a developing section, and a sheet feed section. These sections are constructed and operated as follows.

1.2 Scanner Section

The scanner section has a first scanner loaded with a reflector 1, a light source 3 and a first mirror 2 and movable at a constant speed, and a second scanner loaded with a second mirror 4 and a third mirror 5 and movable along with and at half the speed of the first scanner. The first and second scanners optically scan a document, not shown, laid on a glass platen 9. The resulting reflection from the document is focused onto a monodimensional solid state imaging device 8 via a color filter 6 and a lens 7. The light source 3 is implemented as, for example, a fluorescent lamp or a halogen lamp, usually a fluorescent lamp due to the inherently long life thereof. While in the embodiment a single light source 3 is used and provided with the reflector 1, two or more light sources 3 are often used. Since the imaging device 8 has a predetermined sampling clock, the fluorescent lamp has to be turned on at a higher frequency than the sampling clock, otherwise adversely affecting an image.

The imaging device 8 is usually constituted by a CCD (Charge Coupled Device) array and produces an analog video signal. An analog-to-digital converter (ADC) digitizes the analog video signal. An image processing board 10 subjects the resulting digital video signal to various kinds of image processing, e.g., conversion to two levels or multiple levels, tone processing, magnification change and editing, thereby transforming it to a digital signal in the form a group of spots. To produce color image data, the color filter 6 is movable into an optical path extending from the document to the imaging device 8 and capable of transmitting only the data of desired color. At the same time, a multiple image transferring function or a two-sided copying function is executed to produce any desired kind of copy. Three CCD arrays may be used to read a color document so as to produce red (R), green (G) and blue (B) data at the same time.

1.3 Writing Section

Figure 2:
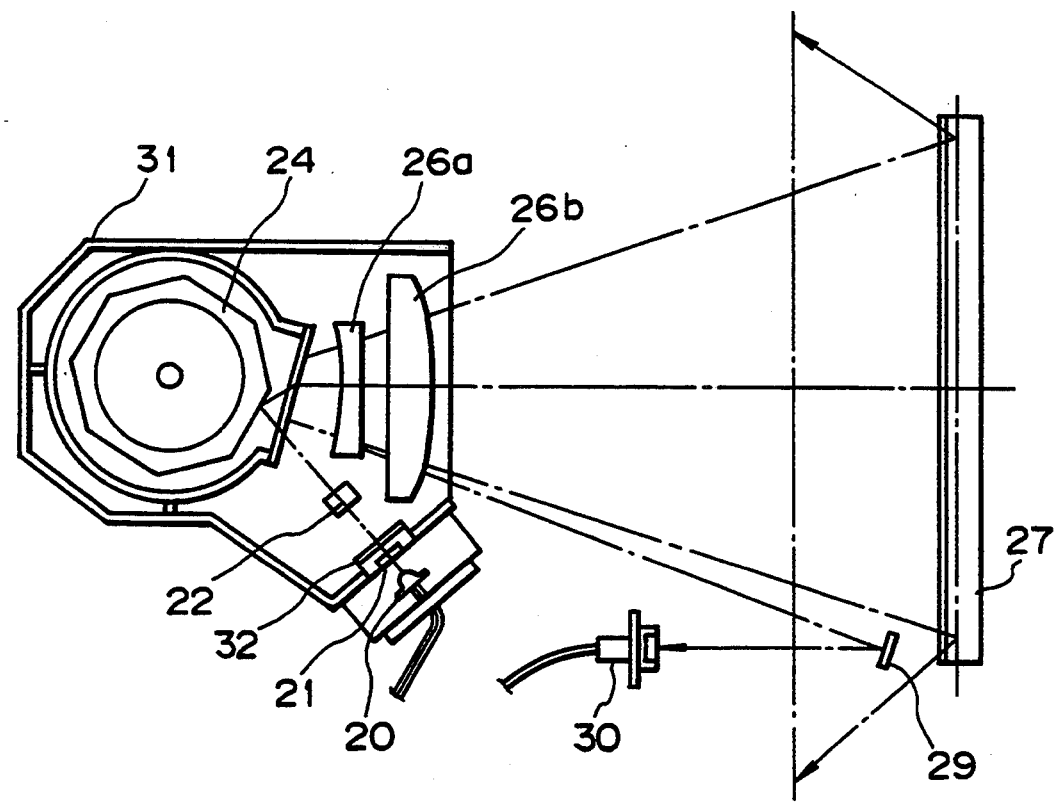
FIG. 2 is a plan view of an optical writing section included in a digital copier.
Figure 3:
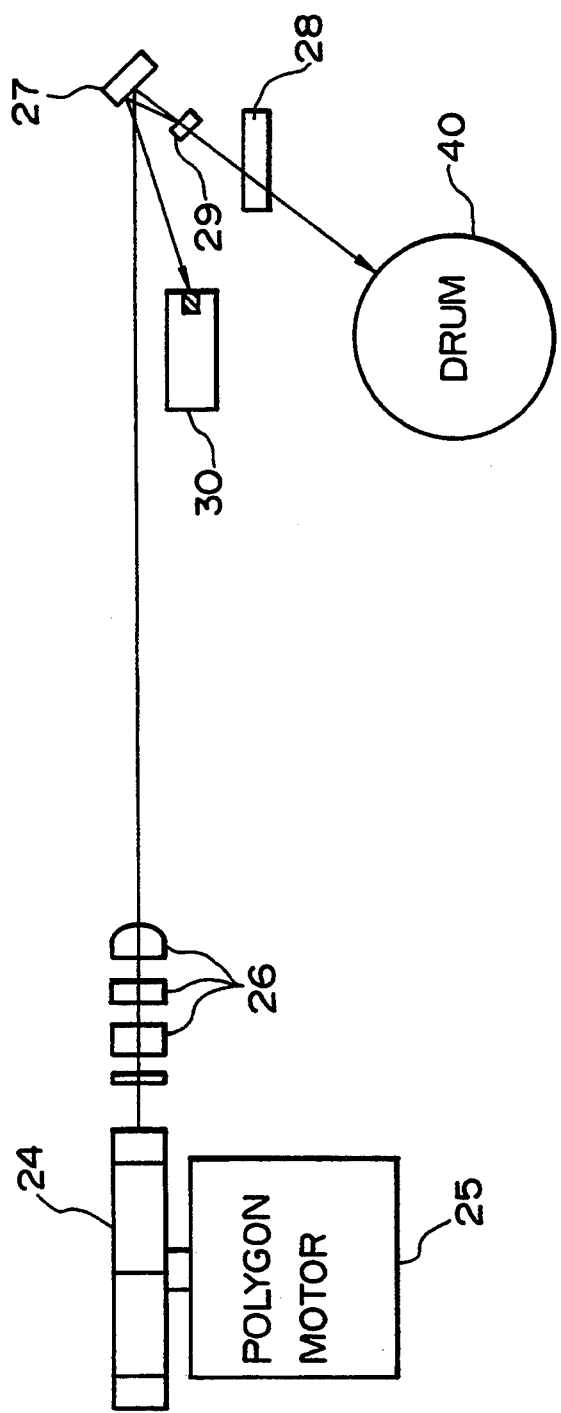
FIG. 3 is a side elevation of the writing section.

The video data undergone the various kinds of image processing is written on a photoconductive drum 40 in the form of a group of beam spots by the raster scanning of a laser beam. Specifically, as shown in FIGS. 2 and 3, a laser beam issuing from a semiconductor laser 20 is collimated by a collimator lens 21, shaped by an aperture 32 to have a predetermined shape, compressed in the subscanning direction by a first cylindrical lens 22, and then incident on a polygonal mirror 24. The polygonal mirror 24 is configured in an accurate polygon and rotated by a motor 25 at a constant speed in a predetermined direction. The rotation speed of the mirror 24 is dependent on the rotation speed and writing density of the drum 40 and the number of sides of the mirror 24. The laser beam is steered by the mirror 24 and sequentially transmitted through f-theta lenses 26a and 26b. The f-theta lenses 26a and 26b cause the laser beam having a predetermined angle to scan the drum 40 at a constant speed while focusing it in a minimum spot on the drum 40. At the same time, the lenses 26a and 26b compensate for irregularities in the physical configuration of the individual sides of the polygonal mirror 24. The laser beam coming out of the lens 26b is reflected by a mirror 29 toward a synchronization (abbreviated as "sync" hereinafter) beam input section and then propagated through an optical fiber to a sensor section. In response, the sensor section produces a sync signal indicative of the beginning of a horizontal line. On the elapse of a predetermined period of time after the sync signal, one line of image data is outputted. Such a procedure is repeated to form a single image. In FIG. 2, the reference numerals 27 and 31 designate a mirror and lens holder, respectively.

1.4 Photoconductive Element Section

Referring again to FIG. 1, the drum 40 is provided with a photoconductive layer on the periphery thereof. While the photoconductive layer may be made of any conventional substance sensitive to a semiconductor laser beam (wavelength of 780 nm), e.g., organic photoconductor (OPC), a-Si or Se-Te, the illustrative embodiment uses OPC. Regarding laser writing, two different processes are available, i.e., a negative-to-positive (N/P) process which illuminates an image portion, and a positive-to-positive (P/P) process which illuminates a background portion. The embodiment uses the N/P process by way of example. A main charger 41 uniformly charges the surface of the drum 40 to negative polarity and is implemented by a scrotron having a grid at the drum side. As the laser beams scans the charged surface of the drum 4, the potential decreases in the scanned part of the drum surface. Then, the background portion and the image portion of the drum 40 are respectively provided with a potential ranging from −750 V to −800 V and a potential of about −500 V, forming an electrostatic latent image on the drum 40 Developing units 42a and 42 each includes a developing roller to which a bias voltage of −500 V to −600 V is applied. The developing unit 42a or 42b develops the latent image by a negatively charged toner to produce a corresponding toner image.

1.5 Developing Section

The embodiment has the above-mentioned two developing units, i.e., a main developing unit 42a and an auxiliary developing unit 42b. When only black-and-white copies are desired, the auxiliary unit 42b and a toner supply unit 43b associated therewith will be removed. A toner supply unit 43a is associated with the main unit 42a and stores a black toner while the toner supply unit 43b associated with the auxiliary unit 42b stores a color toner. While a latent image is developed in one color, the developing unit assigned to the other color is deactivated by, for example, having the main pole thereof shifted. When such developing units 42a and 42b are used, the color data reading, the multiple image transfer by a sheet transport system, the two-sided copy mode and other functions may be combined to produce various kinds of color copies and effect various kinds of color editing. To develop latent images in three or more colors, three or more developing units may be arranged around the drum 40, or use may be made of a revolver accommodating three or more developing units therein and selectively bringing one of them to a developing position. As a sheet is fed in synchronism with the rotation of the drum 40, a transfer charger 44 applies a positive charge from the rear of the sheet to transfer the toner image from the drum 40 to the sheet. A separation charger 45 is supported integrally with the transfer charger 44 and separates the sheet carrying the toner image from the drum 40 by AC discharge. The toner remaining on the drum 40 after the image transfer is removed by a cleaning blade 47 and then collected in a tank 48. Further, the charge pattern remaining on the drum 40 is erased by a discharge lamp.

A photosensor 50 is located immediately after the position where development occurs. Implemented as a light emitting element and a light sensitive element, the photosensor 50 senses the reflection density from the surface of the drum 40. Specifically, the writing section writes a particular pattern, e.g., a black or mesh pattern in a position of the drum 40 which the photosensor 50 can read. After this pattern has been developed, an image density is determined on the basis of a ratio between the reflectance of the developed pattern and the reflectance from the other part of the drum 4. If the image density is short, a toner supply signal is generated. When the toner concentration does not increase even after the supply of a toner, it may be determined that the amount of remaining toner is short.

1.6 Sheet Feed Section

The embodiment has three sheet cassettes 60a, 60b and 60c and allows a sheet carrying a toner image on one side thereof to be transported through a refeed loop 72 for two-sided copying or for refeeding. Assume that one, represented by 60, of the cassettes 60a–60c is selected and then a start button is pressed. Then, a pick-up roller 61 (i.e. 61a, 61b or 61c) associated with the cassette 60 is rotated to drive a sheet until it abuts against a register roller 62 which is in a halt then. The register roller 62 begins to rotate in synchronism with the image formed on the drum 40 to thereby drive the sheet to the drum 40. After the image has been transferred to the sheet by the above-described procedure, a separation and transport section 63 transports the sheet to a fixing unit while positively retaining it thereon. The fixing unit has a heat roller 64 and a pressure roller 65 and fixes the image on the sheet. In an ordinary copy mode, the sheet coming out of the fixing unit is steered by a path selector or pawl 67 to an outlet contiguous with the sorter (III). On the other hand, in a multiple copy mode, the sheet is steered by path selectors or pawls 68 and 69 to the refeed loop 72 without being driven out to the sorter (III). As a result, the sheet is again brought to the register roller 62. Specifically, in a two-sided copy mode, the sheet is guided downward by the path selector 67 and then steered by the path selector 69 to a tray 70 located below the refeed loop 72. As a roller 71 is reversed, the sheet is fed in the opposite direction. At this time, the path selector 69 is switched in position to guide the sheet to the refeed loop 72 which leads to the register roller 62.

1.7 ADF

The ADF has a table on which documents are stacked, and a pick-up roller 104 for picking up the documents one by one. Pull-out rollers 105 and 106 are pressed against each other while a separation belt 107 is passed over the rollers 105 and 106. A single document is fed along a guide 108 while being surely separated from the others by the pull-out rollers 105 and 106 and belt 107. A transport device 125 transports the document coming out of the guide 108 to a predetermined illuminating position on and along the glass platen 9. The transport device 125 has a belt 102 passed over a drive roller 109 and a driven roller 110. A stationary roller 111 defines a position for the entry of a document. A pressure roller urges the document against the glass platen. The operation of the ADF is well known in the art and will not be described herein.

1.8 Sorter/Stapler (III)

The sorter/stapler has an inlet for receiving copies sequentially coming out of the copier. Inlet guides 1101 and 1102 are located at the inlet A and followed by a path selector or pawl 1103. An upper transport section 1100 extends upward from the path selector 1103 and includes the inlet guide 1101, guides 1110 and 1114, transport rollers 1108, driven rollers 1109, a discharge roller 1111, a driven roller 1115, and a proof tray 1116. An inclined section 1200 extends downward from the path selector 1103 and includes guides 1205, 1217, 1308, 1309 and 1310, rollers 1201, 1202, 1203, 1214, and 1216, balls 1215, and rollers 1301, 1302, 1305 and 1306. The inclined portion 1200 merges into a steering section B. Bins 1350 are arranged along the steering section B. A pawl 1312 and a discharge roller 1304 are associated with each of the bins 1350. A driven roller 1307 is pressed against each of the discharge rollers 1304 with the intermediary of the vertically extending copy transport path. The transport rollers 1108 and discharger roller 1111 are driven by a proof motor 1117. The rollers 1201, 1202, 1203, 1301, 1302 and 1304 are driven by a drive motor 1313. Although the sorter/stapler includes a stapler mechanism, finisher, and two-side turning unit, they are conventional and will not be described specifically. Further designated by the reference numerals 46, 80 and 81 are a separator pawl, a main motor, and a fan motor, respectively.

1.9 Control System

Figure 4A:
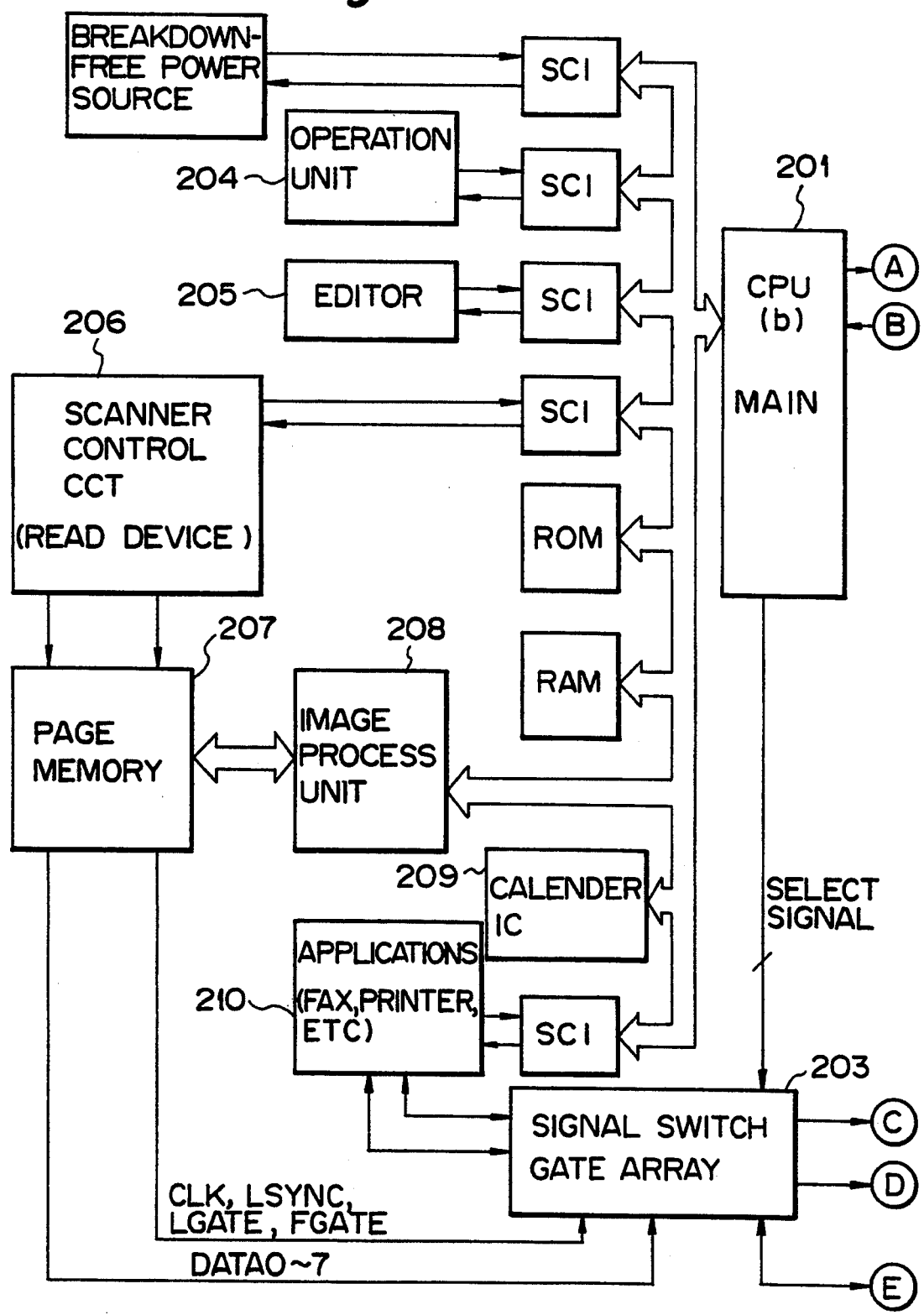
FIGS. 4A and 4B are block diagrams schematically showing a control unit incorporated in the digital copier.
Figure 4B:
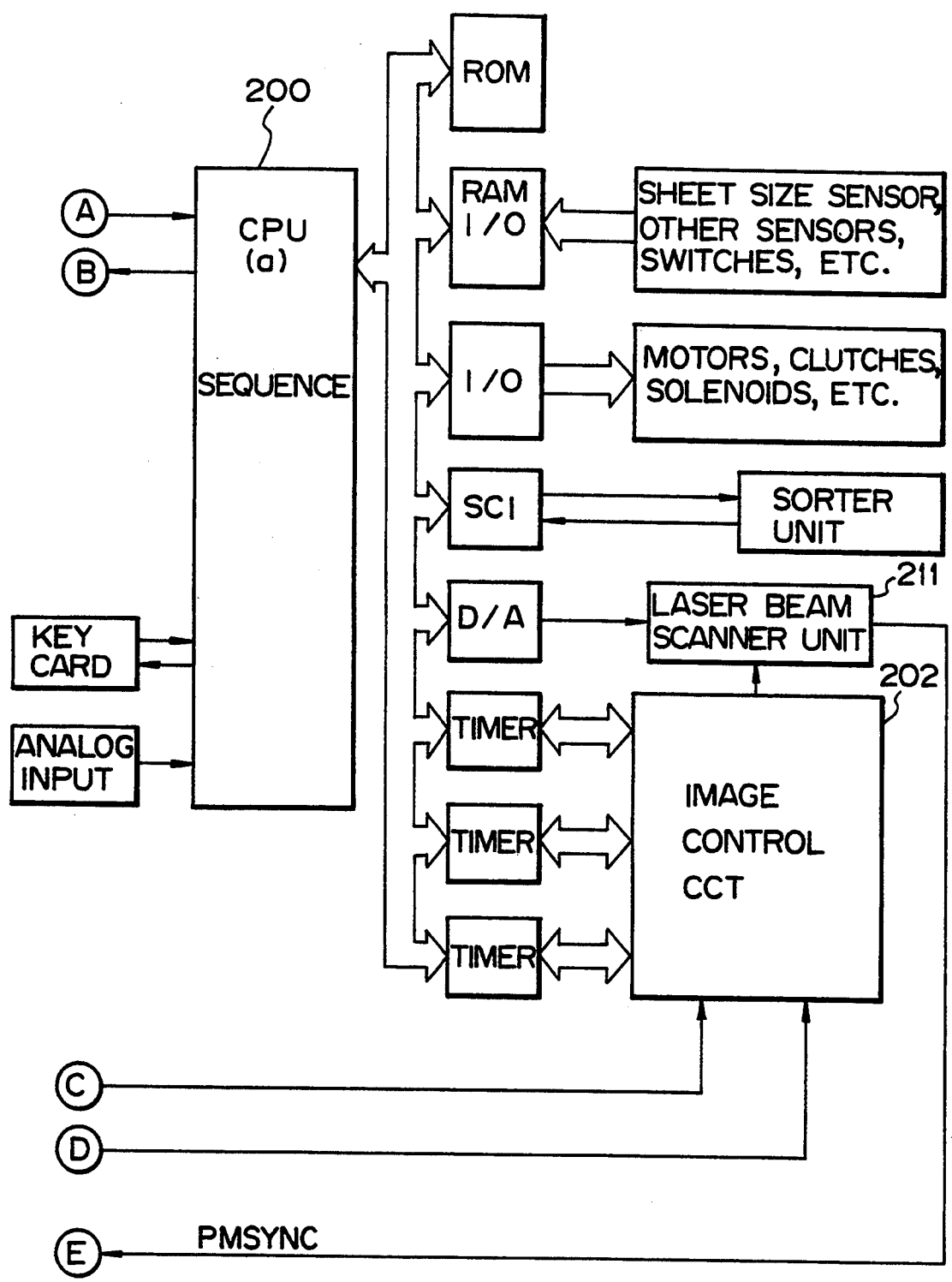
Figures 2, 5A:
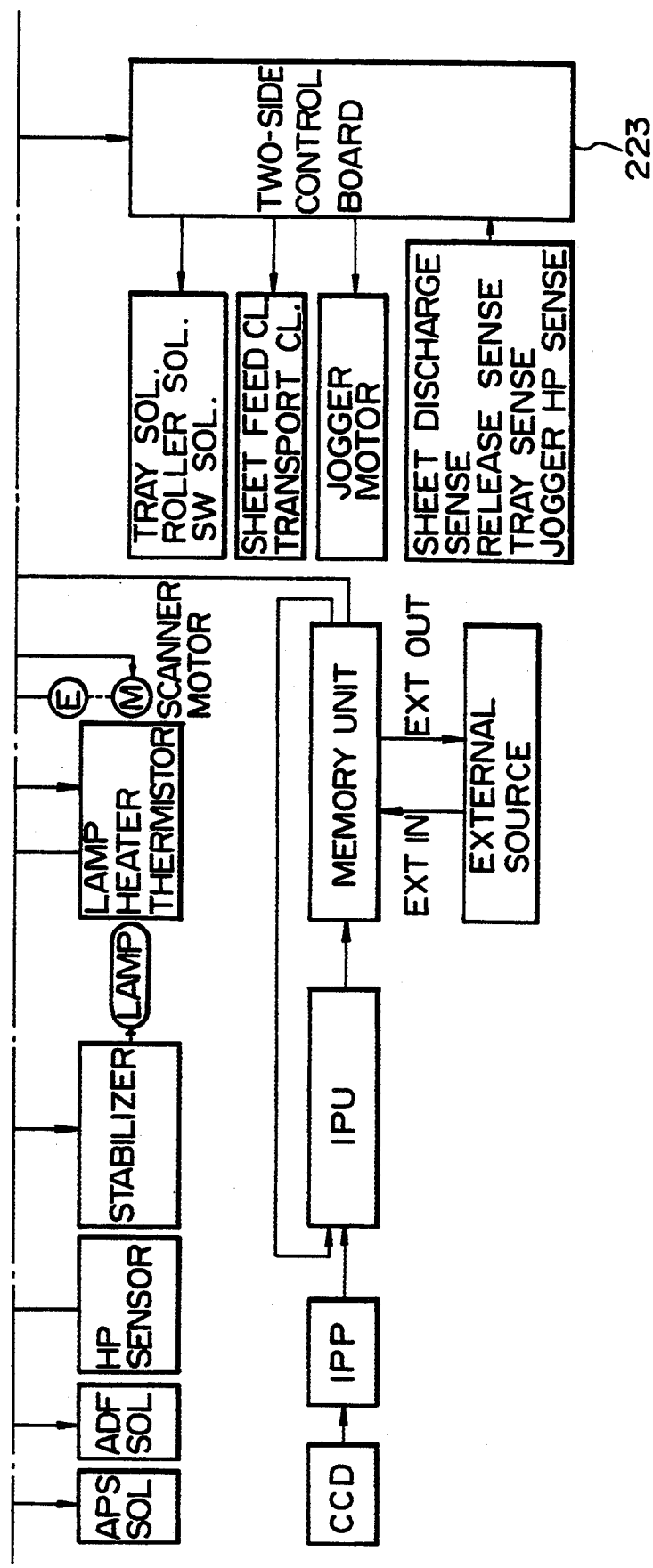
FIGS. 5A and 5B are block diagrams schematically showing an electric control system incorporated in the digital copier.
Figures 2, 5B:
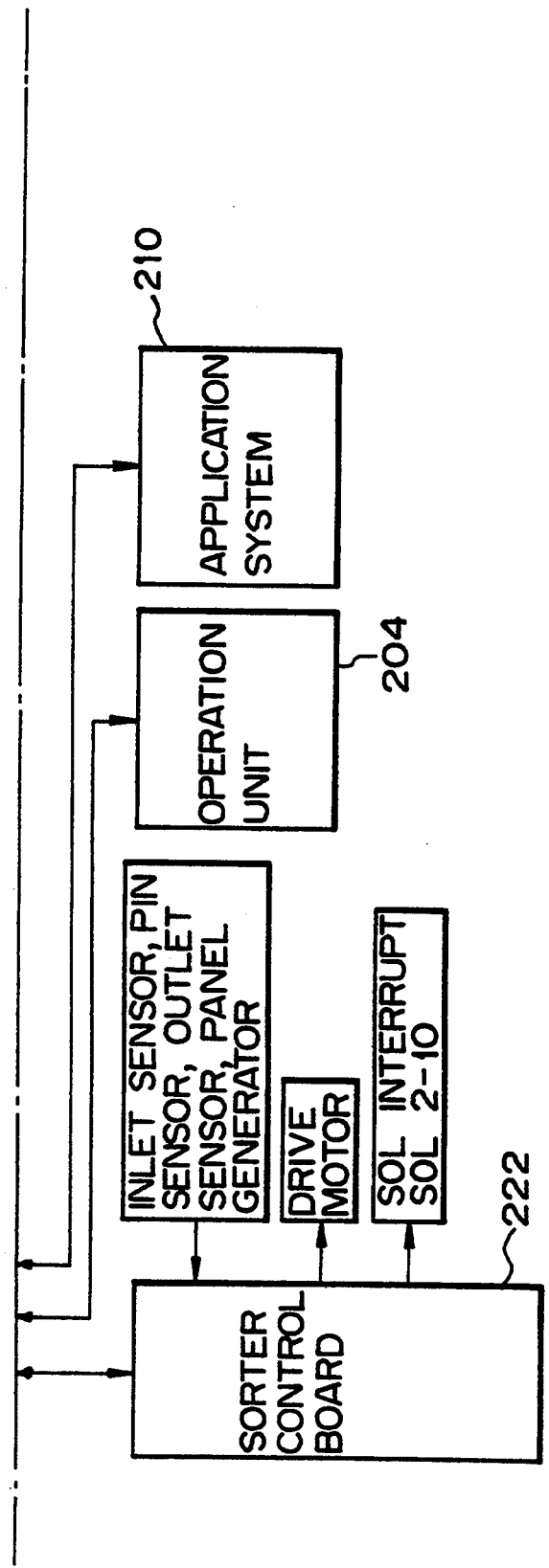

FIGS. 4A and 4B show a control unit incorporated in the copier while FIGS. 5A and 5B show the control over the entire copying system. As shown in FIGS. 4A and 4B, the control unit has two CPUs (Central Processing Units), i.e., a CPU (a) 200 for sequence control and a CPU (b) 201 for operation control. The CPUs (a) 200 and (b) 201 are connected to each other by a serial interface (RS232C). There are also shown in FIGS. 4A and 4B an image control circuit 202, a signal switching gate array 203, an operation unit 204, an editor 205, a scanner control circuit 206, a page memory 207, an image processing unit 208, a calendar IC (Integrated Circuit) 209, an application system 210, and a laser beam scanner unit 211. In FIGS. 5A and 5B, the same members or parts as those shown in FIGS. 4A and 4B are designated by the same reference numerals. In FIGS. 5A and 5B, there are shown a main control board 220, a sheet feed control board 221, a sorter control board 222, a two-sided copy control board, and an ADF control board 224.

1.9.1 Sequence Control

The sequence control sets and outputs conditions relating to the sheet feed and image formation and involves sheet size sensors, sensors responsive to sheet discharge, sheet registration and so forth, the two-side copy unit, a high-tension power source unit, relays, solenoids, motors and other drivers, the sorter unit, the laser unit, and the scanner unit. The sheet size sensors are each associated with one of the cassettes for outputting an electric signal representative of the size and orientation of sheets. The sequence control also involves sensors responsive to the presence/absence of supplies including oil and toner, and sensors responsive to a door open condition and mechanical errors including the blow of a fuse. The two-sided copy unit includes a motor for positioning sheets in the widthwise direction, a sheet feed clutch, a solenoid for switching over the path, a sensor responsive to the presence/absence of a sheet, a side fence home position sensor for positioning sheets in the widthwise direction, and sensors responsive to the transport of sheets. The high-tension power source unit applies a particular high voltage to each of the main charger, transfer charger, separation charger and bias electrode for development by a duty ratio resulted from PWM (Pulse Width Modulation) control. Specifically, the PWM control is such that the high voltage is fed back, digitized, and then controlled to become equal to a target value. The drivers include a sheet feed clutch, a registration clutch, a counter, a motor, a toner supply solenoid, a power relay, and a fixing unit. The drivers are connected by the sorter unit by a serial interface and transports sheets to the bins in response to signals from the sequence. Applied to the analog inputs are a fixing temperature, a photosensor output, a laser diode monitor output, a laser diode reference voltage, and the outputs fed back from various high-tension power sources. In response to the output of a thermistor located at the fixing station, heater ON/OFF control or phase control is executed to maintain the fixing temperature constant. The output of the photosensor is representative of the photopattern formed at a predetermined time and applied to a phototransistor. On the basis of the density of the pattern, the toner supply clutch is ON/OFF controlled to control the toner concentration. At the same time, whether or not the toner ended is determined on the basis of the toner concentration.

To maintain the power of the laser diode constant, the analog inputs to the ADC and CPU are used. For this purpose, use is made of a predetermined reference voltage which is, in the illustrative embodiment, a voltage monitored on the turn-on of the laser diode.

Regarding the operation, the main CPU (b) 201 controls a plurality of serial ports and the calendar IC 209. Connected to the serial ports are the operation unit 204, scanner control circuit 206, application system 210 and editor 205 as well as the sequence control CPU (a). The operation unit 204 includes a display for displaying key inputs entered by the operator and the current states of the copier and informs the main CPU (b) 201 of the key inputs by serial communication. In response, the main CPU (b)201 determines whether to turn on or turn off the display or cause it to blink and then sends the result of decision to the operation unit 204 by serial communication. Further, the operation unit 204 determines the operating conditions of the machine on the basis of the information from the main CPU (b) and, at the time for starting a copying operation, sends them to the CPU (a) 200 which is executing sequence control. The scanner section or scanner control circuit 206 sends information relating to scanner servo motor drive control, image processing and image reading to the main CPU (b) 201 by serial communication. Also, the scanner section interfaces the ADF or ADF control board 224 to the main CPU (b) 201. The applications or application system 210 interfaces the main CPU (b) 201 to external equipment, e.g., facsimile transceiver or printer and interchanges predetermined information. Editor 205 is used to enter an editing function, i.e., serially sends image editing data (masking, trimming, image shift, etc.) entered by the operator to the main CPU (b) 201. The calendar IC 209 stores date and time and can be called any time by the main CPU (b) 201. Hence, the calender IC 209 may be used to display the current time on the display of the operation unit 204 and/or to set the times for turning on and turning off the power of the machine.

1.9.2 Image Data Processing

The gate array 203 sends video data (DATA0–DATA7) and sync signals in any one of the following three directions in response to a select signal from the CPU (b) 201:

(1) Scanner control circuit 206 to image control circuit 202: An 8-bit (or 4-bit or even 1-bit, if desired) image signal from the scanner is synchronized to a sync signal PMSYNC from the laser beam scanner unit 211 and then sent to the image control circuit 202;

(2) Scanner control circuit 206 to application 210: The 8-bit image signal from the scanner is fed to the application 210 in parallel while the application 210 delivers the input image data to a printer or similar external output unit; and (3) Application 210 to image control circuit 202: The application 210 synchronizes an 8-bit image signal or image data (or 4-bit or even 1-bit, if desired) from a facsimile or similar external input unit to the sync signal PMSYNC from the laser beam scanner unit 211 and then applies them to the image control circuit 202. If the image signal from the outside has one bit or four bits, it is necessary to transform it to 8-bit data.

Figure 6:
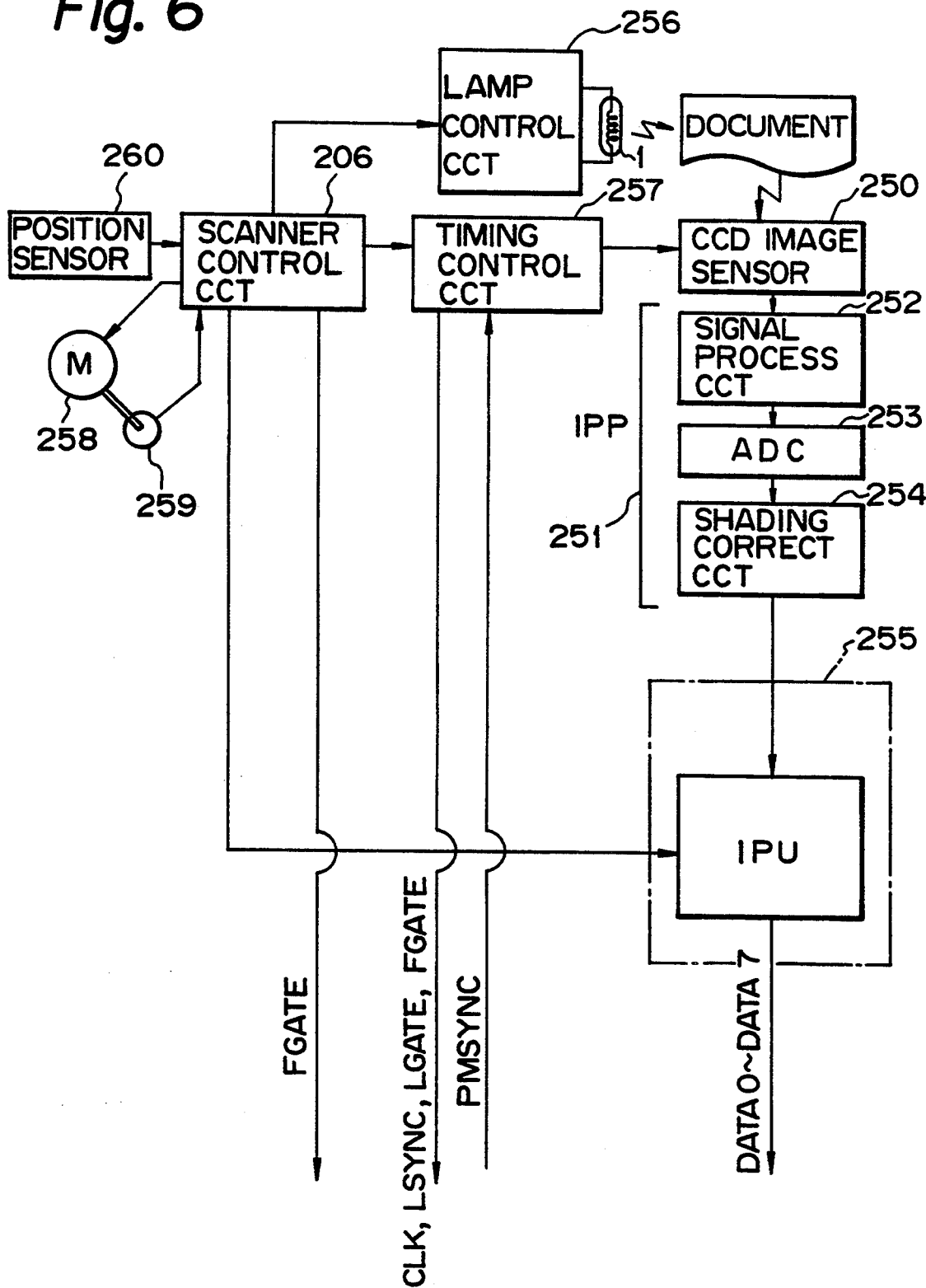
FIG. 6 is a block diagram schematically showing an image scanner section.

FIG. 6 shows the image scanner section in a schematic block diagram. As shown, a CCD image sensor 250 produces an analog image signal and applies it to a signal processing circuit 252 included in image preprocessor (IPP) 251. The signal processing circuit 252 amplifies the analog image signal while correcting it with respect to the quantity of light. An ADC 253 converts the resulting output of the circuit 252 to a digital multilevel signal. A shading correction circuit 254 subjects the digital multilevel signal to shading correction and then delivers the corrected signal to an image processing unit (IPU) 255.

Figure 7:
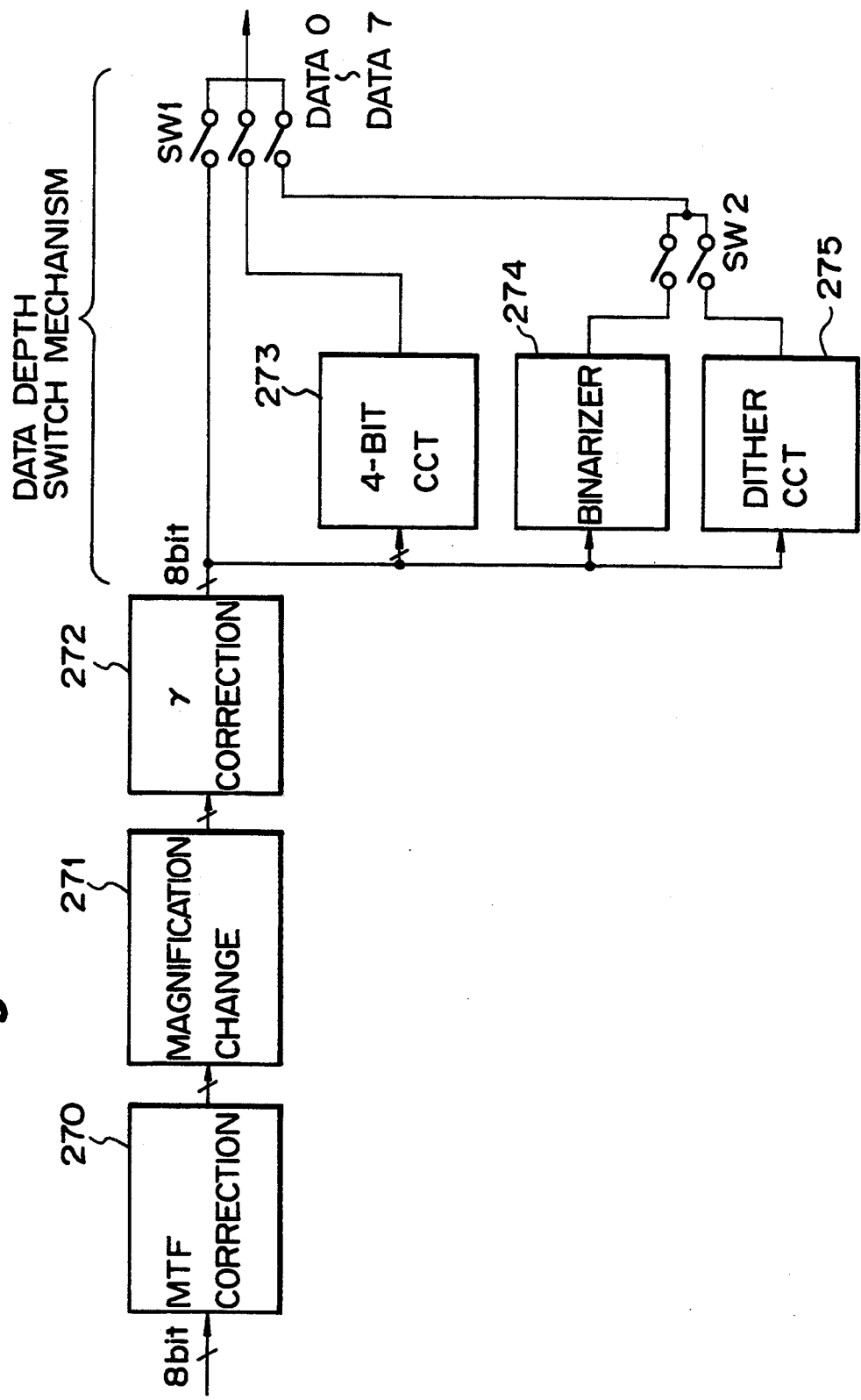
FIG. 7 is a block diagram schematically showing an image processing unit.
Figure 8:
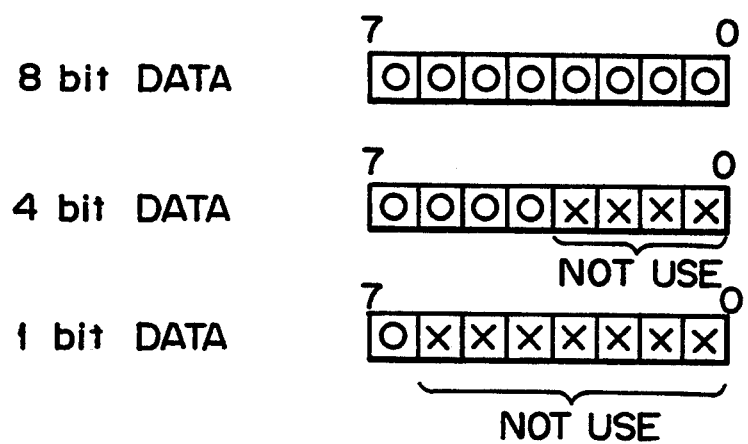
FIG. 8 shows data to be switched over by a data switching mechanism.

FIG. 7 shows the IPU 255 specifically. As shown, the image signal has the high frequency range thereof enhanced by an MTF correction circuit 270, electrically changed in magnitude by a magnification change circuit 271, and then applied to a gamma correction circuit 272. The gamma correction circuit 272 optimizes the input characteristic in matching relation to the characteristic of the machine. The image signal from this circuit 272 is converted to a predetermined quantizing level by a switch SW1 included in a data depth switching mechanism. As shown in FIG. 8, the data depth switching mechanism selects one of three different data types. A 4-bit conversion circuit 273 outputs 4-bit data. A binarizing circuit 274 converts the input 8-bit data to bilevel data on the basis of a predetermined threshold value to thereby produce 1-bit data. A dither circuit 275 generates area tonality by 1-bit data. The switch SW1 selects one of such three different data types and outputs it as DATA0–DATA7.

Referring again to FIG. 6, the scanner control circuit 206 controls a lamp stabilizer or lamp control circuit 256, a timing control circuit 257, an electric magnification change circuit included in the IPU 255, and a scanner drive motor 258 in response to commands from the main CPU (b) 201. The lamp stabilizer 256 selectively turns on or turns off the lamp 1 in response to a command from the scanner control circuit 206 while controlling the quantity of light thereof. A rotary encoder 259 is connected to the output shaft of the scanner drive motor 258. A position sensor 260 is responsive to the reference position of a subscan drive mechanism. The electric magnification change circuit executes electric magnification change processing according to a magnification in the main scanning direction set by the scanner control circuit 206. The timing control circuit 257 outputs various signals in response to commands from the scanner control circuit 206. Specifically, on the start of image reading, the timing control circuit 257 sends a transfer signal to the CCD image sensor 250 for causing it to transfer one line of data to a shift register, and shift clock pulses for shifting the data in the shift register one bit at a time. Also, the timing control circuit 257 sends pixel synchronous clock pulses CKL, main scan sync pulses LSYN, and main scan valid period signal LGATE. The pixel synchronous clock pulses CLK are substantially the same as the shift clock pulses fed to the CCD image sensor 250. While the main scan sync pulses LSYNC are substantially the same as the main scan sync signal PMSYNC generated by the beam sensor of the writing unit, they appear in synchronism with the clock pulses CLK. The main scan valid period signal LGATE remains in a high level during the period in which the output data DATA0–DATA7 are regarded valid.

In the illustrative embodiment, the CCD image sensor 250 outputs 4,800 bits of valid data per line. On receiving a read start command from the main CPU (b) 201, the scanner control circuit 206 turns on the lamp 1, drives the scanner drive motor 258, and controls the timing control circuit 257 to cause the CCD image sensor 250 to start reading a document. At the same time, the timing control circuit 257 causes a subscan valid period signal FGATE to go high. This signal FGATE goes low on the elapse of a period of time necessary for the maximum reading length (longitudinal length of an A4 size in the embodiment) to be scanned.

Figure 9:
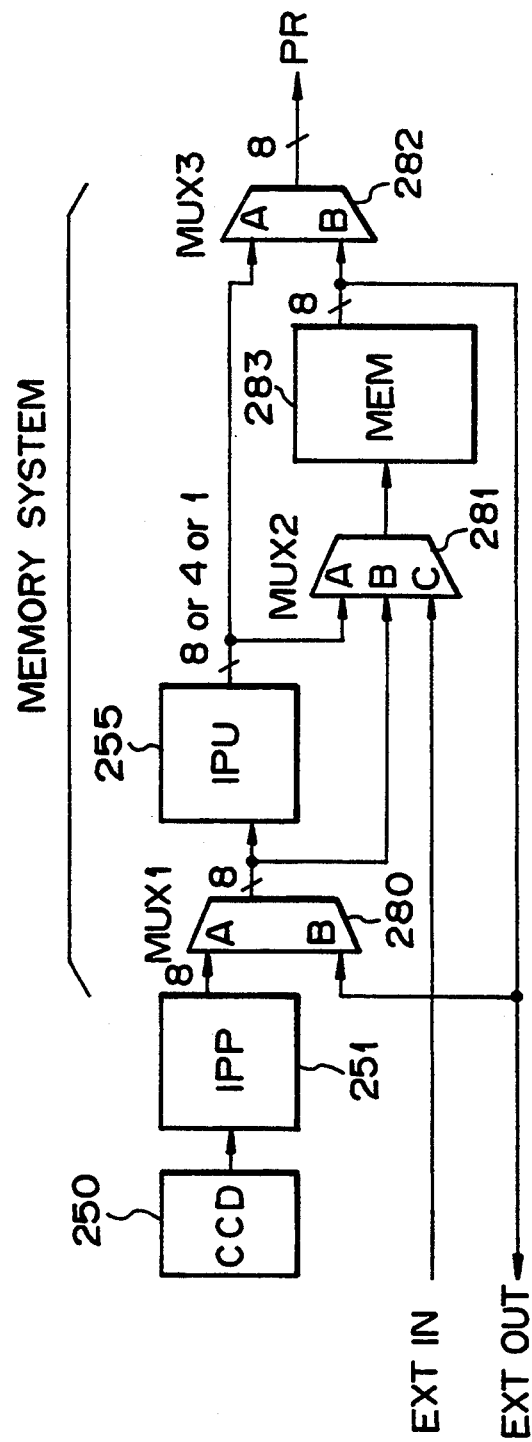
FIGS. 9, 10 and 11 are block diagrams each schematically showing a particular memory system.

FIG. 9 is a schematic block diagram showing a memory system. As shown, the image signal from the CCD image sensor 250 is routed through the IPP 251 having a shading correcting function, black level correcting function and light quantity correcting function to be outputted as 8-bit data. The 8-bit data is selected by a multiplexer (1) (MUX1), processed by the IPU 255 having a spatial high frequency enhancing (MTF correction) function, rate converting (magnification change) function, gamma correcting function and data depth converting function (8 bits/4 bits/1 bit conversion), and then fed out to a printer PR via an MUX3 282. The reference numerals 281 and 283 designate an MUX2 and a memory (MEM), respectively.

Figure 10:
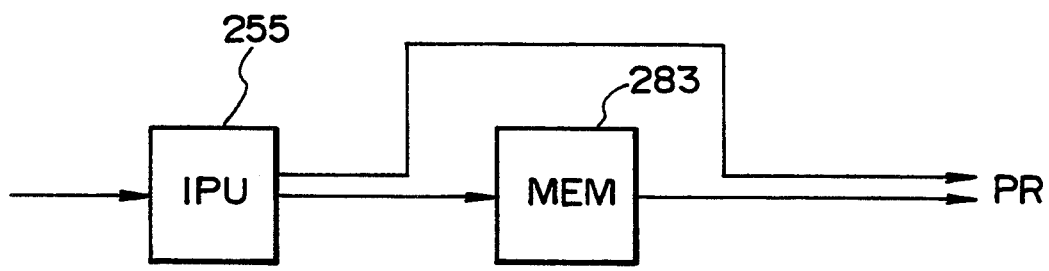
Figure 11:
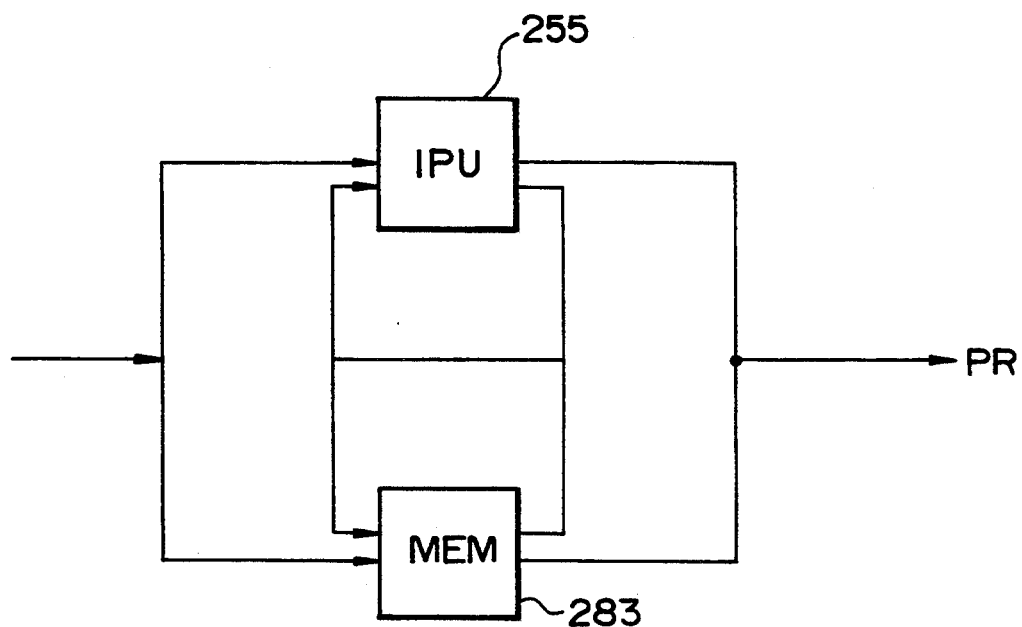

As shown in FIG. 10, in a system having a frame memory for image data, it is a common practice to store image data from the IPU 255 in the memory (MEM 283) and feed them to the printer (PR), as needed. Also, it has been customary to deliver image data from the IPU 255 to the printer (PR) while writing them in the memory (MEM) 283 so as to produce the second and successive copies on the basis of the image data stored in the memory 283. In the illustrative embodiment, a data flow shown in FIG. 11 is implemented to allow both the processed data from the IPU 255 and raw data to be applied to the memory 283. Specifically, the three multiplexers (MUX1, MUX2 and MUX3) 280, 281 and 282 shown in FIG. 9 are operated to select a particular data flow. For example, to produce a plurality of copies by a single scanning by changing the parameter of the IPU 255, the following procedure is executed:

(1) In the event of scanning, the MUX1 selects an input A, the MUX2 selects an input B, and the MUX3 selects an input A. In this condition, the first copy is produced. At this instant, raw data is written to the memory 283 via the MUX2; and (2) For the second and successive copies, the MUX1 selects an input B with the result that the data from the memory 283 is routed through the IPU 255 and MUX3 to the printer (PR). At this time, the IPU parameter can be changed copy by copy.

When 1-bit data or similar compact data is used, the MUX2 selects the input A to write the output of the IPU 255 in the memory 283. In this case, the printer (PR) is switched to a bilevel data (one bit) mode. In FIG. 9, EXTIN and EXTOUT indicate respectively an input image data signal from the outside and an output signal to the outside.

Figure 12:
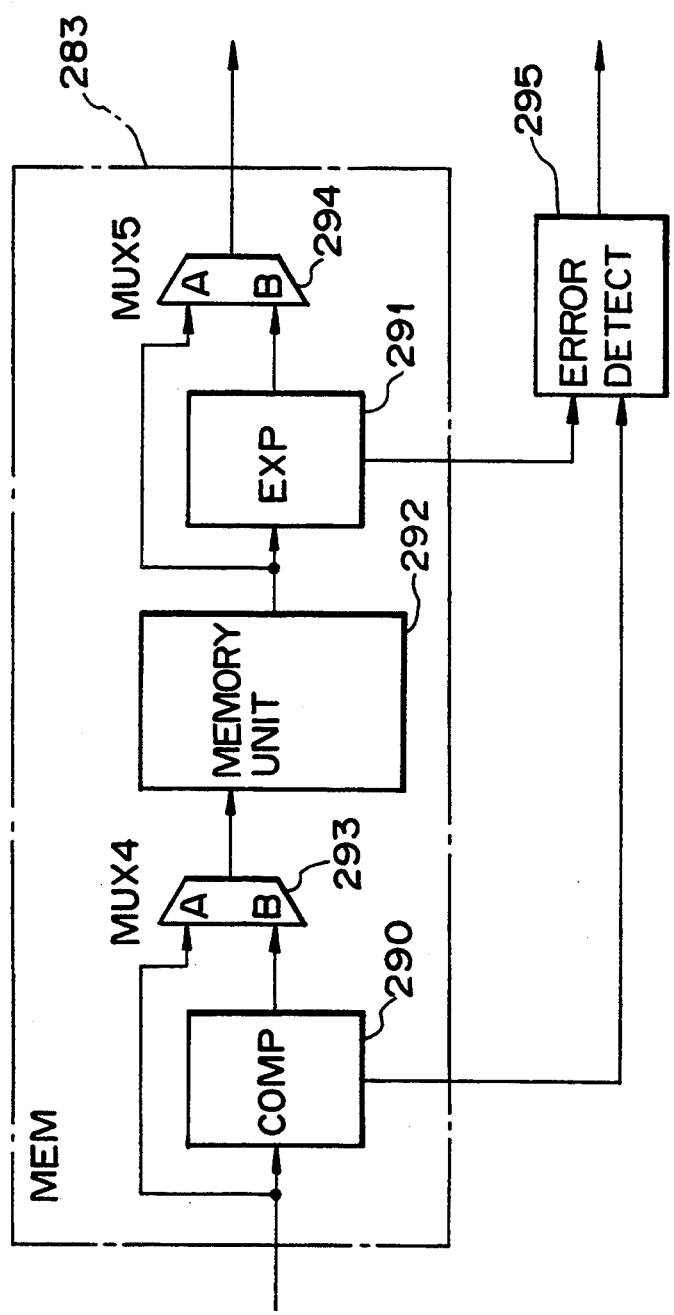
FIG. 12 is a block diagram schematically showing a memory device.

FIG. 12 shows an alternative arrangement wherein a compressor (COMP) 290 and an expander (EXP) 291 precedes and succeeds a memory unit 292, respectively, so that not only actual data but also compressed data may be written to the memory unit 292. The prerequisite with this arrangement is that the COMP 290 and the EXP 291 have to operate at rates matching the rates of the scanner and printer, respectively. To store actual data, multiplexers MUX4 and MUX5 each selects an input A; to use the compressed data they each select an input B. The reference numeral 295 designates an error detector.

Figure 13:
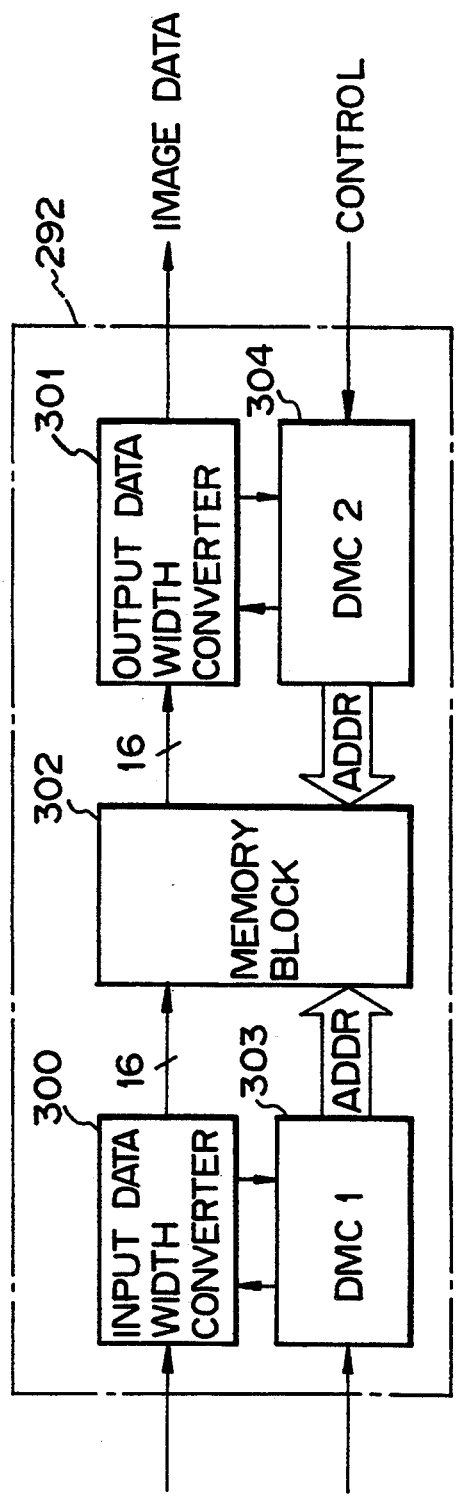
FIG. 13 is a block diagram schematically showing the internal arrangement of a memory unit included in the memory device.
Figure 14:
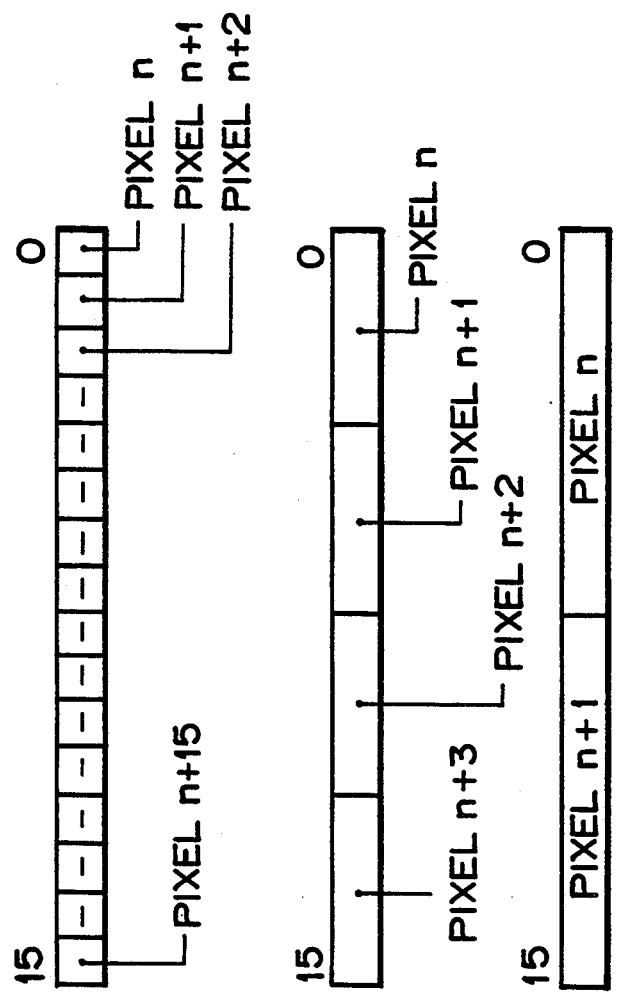
FIG. 14 shows three different image data types.

FIG. 13 shows a specific construction of the memory unit 292, FIG. 12. As shown, the memory unit 292 has a memory block 302, and data width converters 300 and 301 connected to, respectively, the input and the output of the memory block 302 so as to selectively handle three different image types shown in FIG. 14 and the compressed data, i.e., code data. Direct memory controllers (DMC1 and DMC2) 303 and 304 write data in particular addresses matching the number of packed data and the memory data width and read them out. Regarding the image data types shown in FIG. 14, image data from the scanner or the image data to the printer usually has a constant rate with no regard to the number of bits, i.e., eight bits, four bits, or one bit, i.e., the pixel period is fixed in the apparatus. In the illustrative embodiment, 1-bit data, 4-bit data and 8-bit data are each counted from the most significant bit (MSB) of the eight data lines. The input data width converter 300 and output data width converter 301 cooperate as a block for packing and unpacking the data from the data width (sixteen bits) of the memory block 302. By so packing the data, it is possible to use the memory block 302 in matching relation to the data depth and, therefor, to enhance the efficient use of the same.

Figure 15:
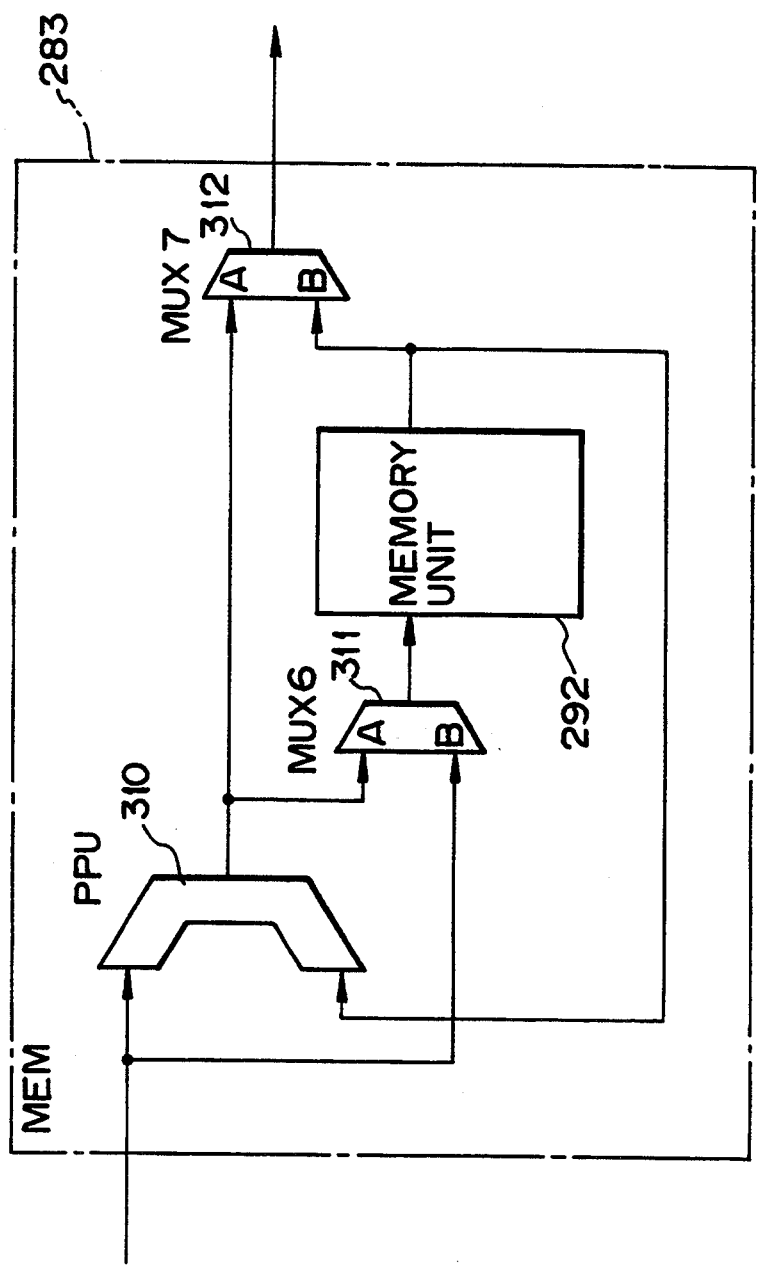
FIG. 15 is a block diagram schematically showing another internal arrangement of the memory device.

FIG. 15 shows another specific construction wherein the COMP290 and EXP 219 are replaced with a pixel processing unit (PPU) 310 located at the outside of the memory unit 292. Executing logical operations (e.g. AND, OR, EXOR or NOR) with image data, the PPU 310 logically processes memory output data and input data to deliver the resulting data to the printer or logically process memory output data and input data (e.g. scan data) and write the result in the memory unit 292 again. The PPU 310 selects either of the printer and memory unit 292 via an MUX6 311 and an MUX7 312. Such functions of the PPU 310 are generally used to combine images, e.g., to store overlay data in the memory unit 292 and then lay them over scanned data.

Figure 16:
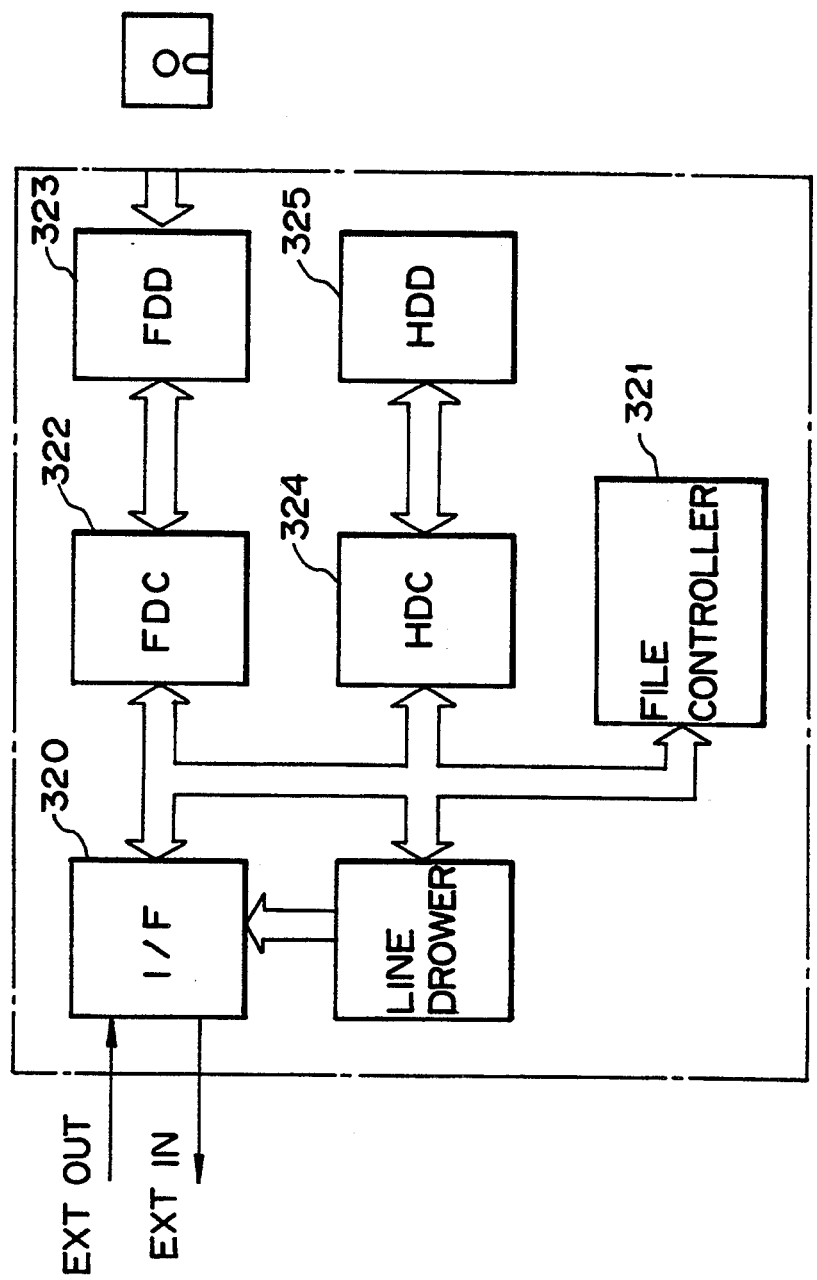
FIG. 16 is a block diagram schematically showing a memory system using an external storage unit.

FIG. 16 shows an arrangement for allowing image data to be stored in an external storage medium. As shown, to store image data in a floppy disk or diskette, image data from the EXTOUT, FIG. 9, is routed through an interface (I/F) 320 to a floppy disk controller (FDC) controlled by a file controller 321. Then, the image data is written to a floppy disk loaded on a floppy disk drive (FDD) 323. Also controlled by the file controller 321 are a hard disk controller (HDC) 324 and a hard disk drive (HDD) 325 which allow the image data to be written and read out of a hard disk as well. The HDD 325 may store format and overlay data to be used often.

Figure 17:
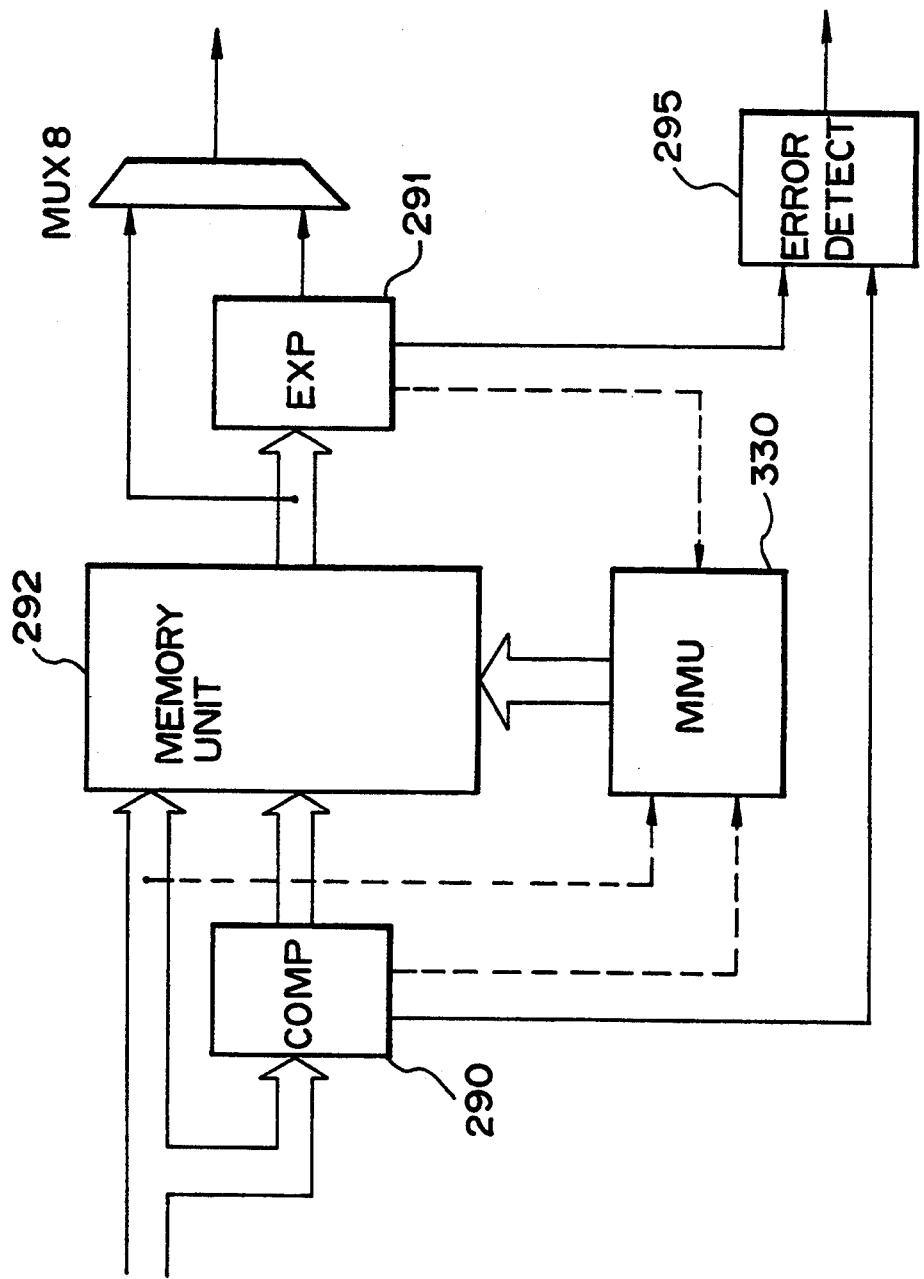
FIG. 17 is a block diagram showing another internal arrangement of the memory device.

FIG. 17 shows a specific arrangement which insures a 100% recovery when the compression rate and expansion rate are short. As shown, compressed data and image data generated by scanning are each written to a particular area of the memory unit 292. At the same time, the compressed data is directly applied to and expanded by the EXP 291. If the processing times of the COMP 290 and EXP 291 were sufficient for the operation to complete before one page of data was fully stored in the memory unit 292, then only the area storing the compressed data is left with the area storing the raw data cancelled. When the error detector 295 detects an error in the COMP 290 or the EXP 291, the compressed data area is immediately cancelled while the raw data is selected. A memory managing unit (MMU) 330 controls the memory unit 292 such that the latter inputs two input data and outputs single output data at the same time. Such real-time compression and expansion detection promotes rapid and sure processing and insures efficient use of the limited memory area. While the arrangement of FIG. 17 allows the MMU 330 to allocate the memory area dynamically, use may be made of two independent memory units, one for raw data and the other for compressed data. It will be seen that the arrangement of FIG. 17 is optimal when a plurality of pages have to be stored and sent to a printer by real-time processing as in electronic sorting.

1.9.3 Application Units

Figure 18A:
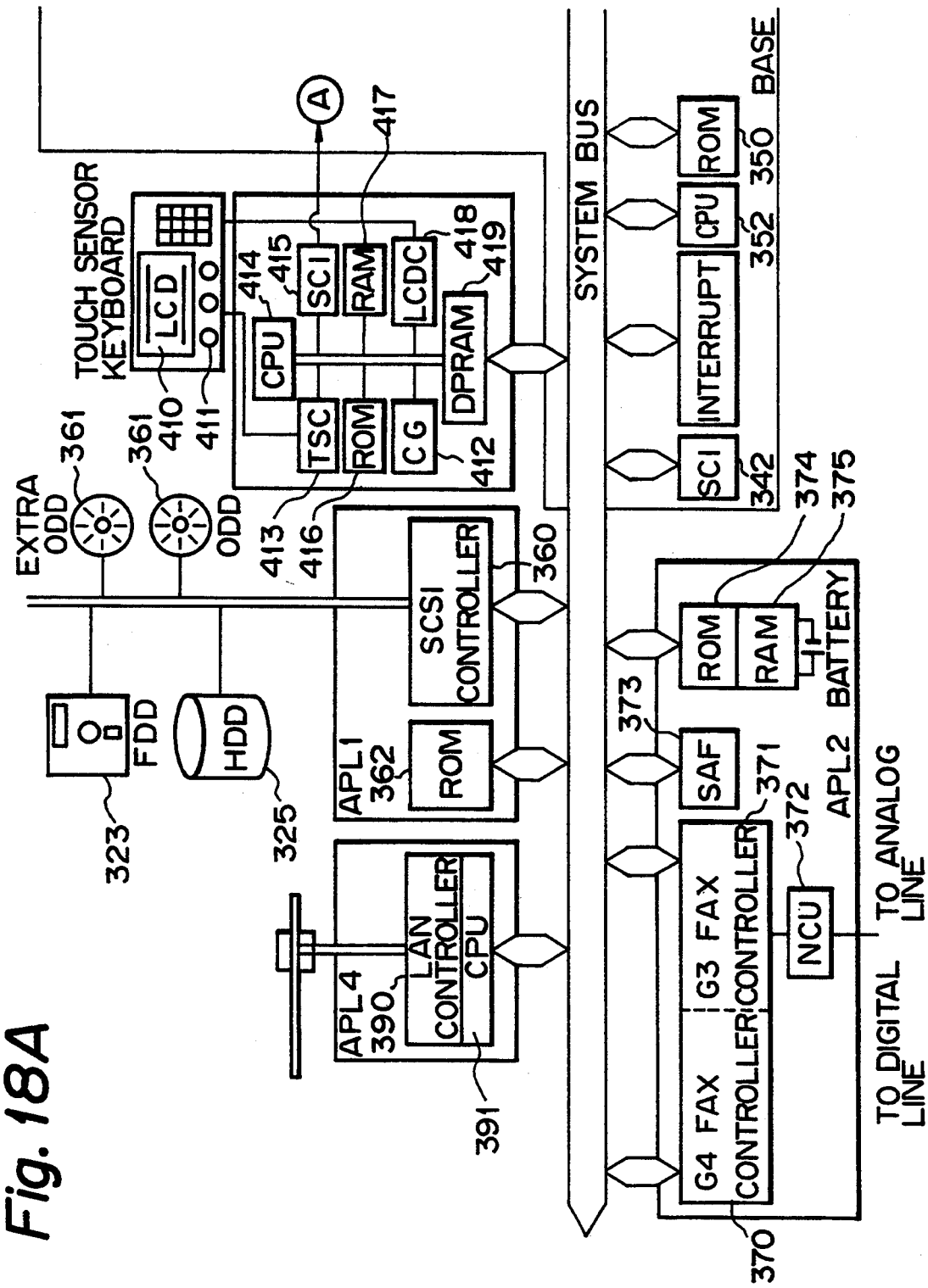
FIGS. 18A and 18B are block diagrams schematically showing application units.
Figure 18B:
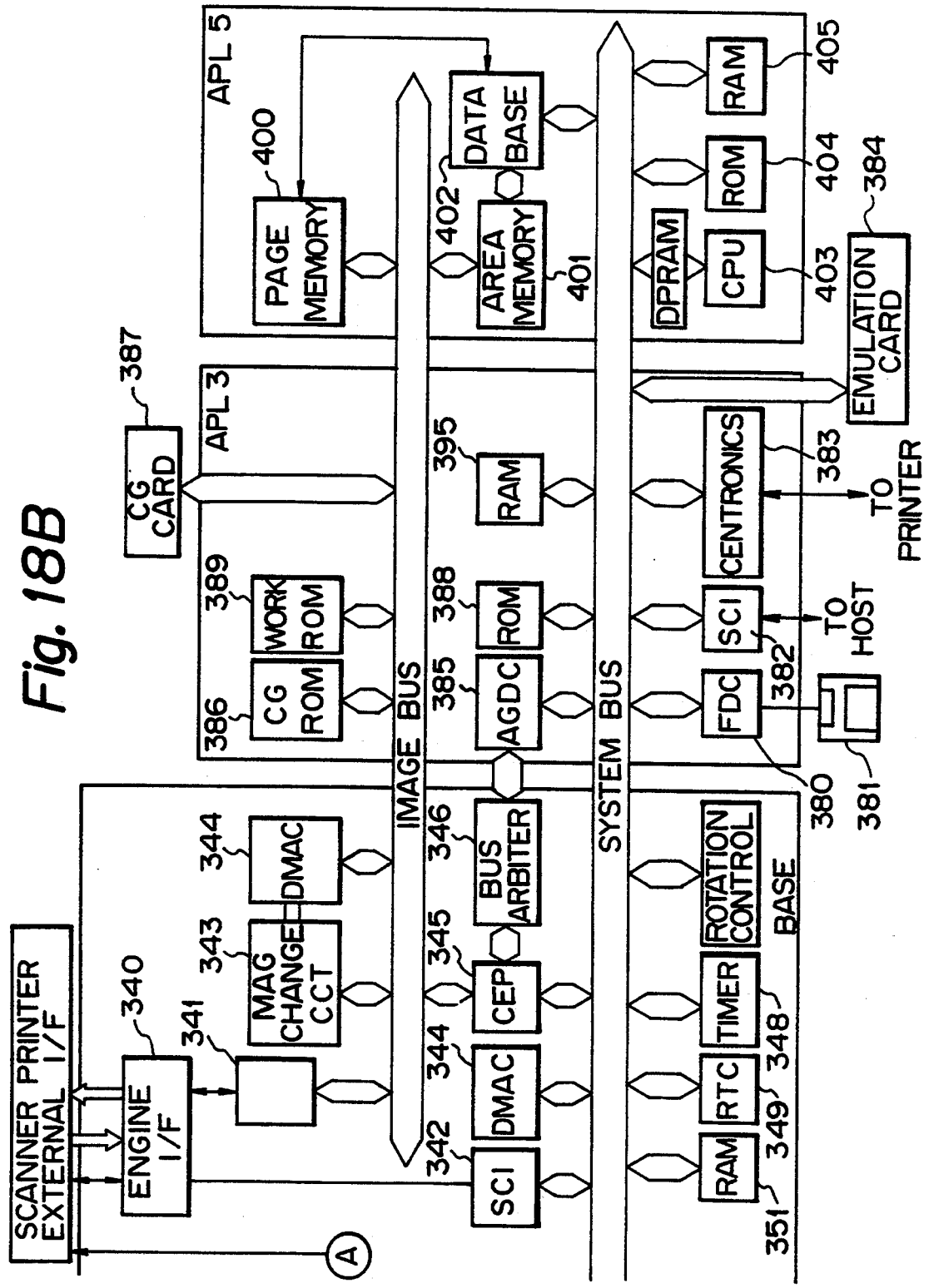

FIGS. 18A and 18B show specific application units in a schematic block diagram. As shown, the system is shown as including an APL1 (file unit) an APL2 (facsimile unit), an APL3 (ON/OFF line printer unit), an APL4 (LAN), an APL5 (image orientation identification unit), and a display (touch switches and LCD).

To begin with, fundamental part (base) of the application system will be described. An engine I/F 340 receives image data in series and converts them to parallel image data. Also, the engine I/F 340 converts parallel data from a page memory 341 and then sends them to the EXTIN. A serial control signal is routed through the engine I/F 340 and SCI (Serial Communication Interface) 342 to a system bus. Capable of accommodating a single A3 page, the page memory 341 converts the image to a bit image and, at the same time, mediates between the data rate of EXTIN and EXTOUT and the processing speed of the CPU. A magnification change circuit 343 enlarges or reduces data stored in the page memory 341 and, for rapid processing, uses a DMAC 344 which does not need the intermediary of a CPU 352. Assume that document of A4 size is sent by a facsimile unit in a vertically long position to a remote unit which is designed to receive an A4 document in a horizontally long position. Then, it has been customary for the transmitting station to automatically reduce the size to 71%, making it difficult to see the document at the receiving station. In the light of this, a block labeled "rotation control" in FIG. 18B rotates, when the above-mentioned size of document is to be sent, the document by 90 degrees to the A4 horizontal position. Then, this document will be sent in a ×1 magnification. Also, assume that the received document size is horizontally long A4 while the cassette has a size of vertically long A4. Then, the rotation control block rotates the received image 90 degrees to the vertically long A4 position. This makes it needless to distinguish the cassettes with respect to vertical/horizontal.

A circuit CEP 345 has an image data compression, expansion and through function. A bus arbiter 346 transfers data from an AGDC 385 to an image bus or to a system bus. A timer 348 generates a predetermined clock. An RTC 349 is a timepiece for generating current time. A console is a control terminal which may be used to read data out of the system and rewrite them or even to develop software by using a debug tool included in an operating system (OS). A ROM 350 stores the OS and other fundamental functions. A RAM 351 is mainly used as a work area. The fundamental part described above executes the basic control over the entire system.

1.9.3.1 APL1

An SCSI 360 is an I/F for the HDD 325, an optical disk drive (ODD) 361, and the FDD (323). A ROM 362 stores software which is a filing system for controlling the HDD 325, ODD 361 and FDD 323 via the SCSI 360.

1.9.3.2 APL2

This is a facsimile control unit and includes a G4FAX controller 370 for controlling the protocol meant for G4 machines, i.e., supporting classes 1, 2 and 3 of G4. Of course, the G4FAX controller 370 also supports an ISDN. Hence, in NET64 accommodating 2B+1D (64 kB×2+16 kB), the G4FAC controller 370 is capable of selecting one of G4/G4. G4/G3, G3/G3, G4 and G3. A G3FAC controller 371 controls the protocol means for G3 machines and includes a MODEM for converting the G3 FAX protocol come in over an analog channel and converting digital signal to an analog signal. An NCU (Network Control Unit) 372 includes a dialing function when the facsimile unit is connected to a remote station via an exchange or when it receives data from a remote station via an exchange. An SAF (Store And Forward) 373 stores image data (including code data) in the event of facsimile transmission or reception. The APL2 is implemented with a semiconductor memory or the ADD 326, ODD 361, etc. A ROM 374 stores a program for controlling the APL2. A RAM 375 serves as a work area. In addition, the RAM 375 is backed up by a battery and stores the names and telephone numbers of remote stations as well as data for controlling the facsimile function. These can be readily set if use is made of the touch switches and LCD on the display unit.

1.9.3.3 APL3

The APL3 is a control unit for an on-line printer or an off-line printer. An FDC (Floppy Disk Controller) 380 controls a floppy disk 381. While latest floppy disks support SCSI, the floppy disk 381 support SCSI and ST506 interface. An SCI (Serial Communication Interface) 382 is used to connected the APL3 to a host computer. A centronics I/F 383 functions in the same manner as the SCI 382. An emulation card 384 has the following function. Generally, printers are available from various manufacturers and slightly different in specifications from each other, as seen from the host. Therefore, the software used by the host will fail to run if the printers share identical functions, as seen from the host. The emulation card 384 is attached to the APL3 to regularize the functions of the printer on the basis of the software stored therein. An AGDC (Advanced Graphics Display Controller) 385 receives code data from the host and rapidly writes corresponding font images stored in a CGROM (Character Generator ROM) 386 and a CG card 387 in the page memory 341. A ROM 388 stores software for controlling this operation. The CGROM 386 stores font data associated with code data. The fonts include outline fonts. The CG card 387 is similar in content to the CGROM 386. The reference numeral 395 designates a RAM.

1.9.3.4 APL4

This is a unit for controlling the LAN and includes a LAN controller 390. The LAN controller 390 controls, for example. Inthernet, Omni or Starrun which is now under operation. Of course, the APL2 (facsimile) and APL4 (LAN) operate at the background even when the other PALs are in operation. The reference numeral 391 designates a CPU.

1.9.3.5 APL5

This unit identifies the orientation of an image read by the scanner and consists of an area memory 401, a data base 402, a CPU 403, a ROM 404, and a RAM 405.

1.9.3.6 Display

Figure 19:
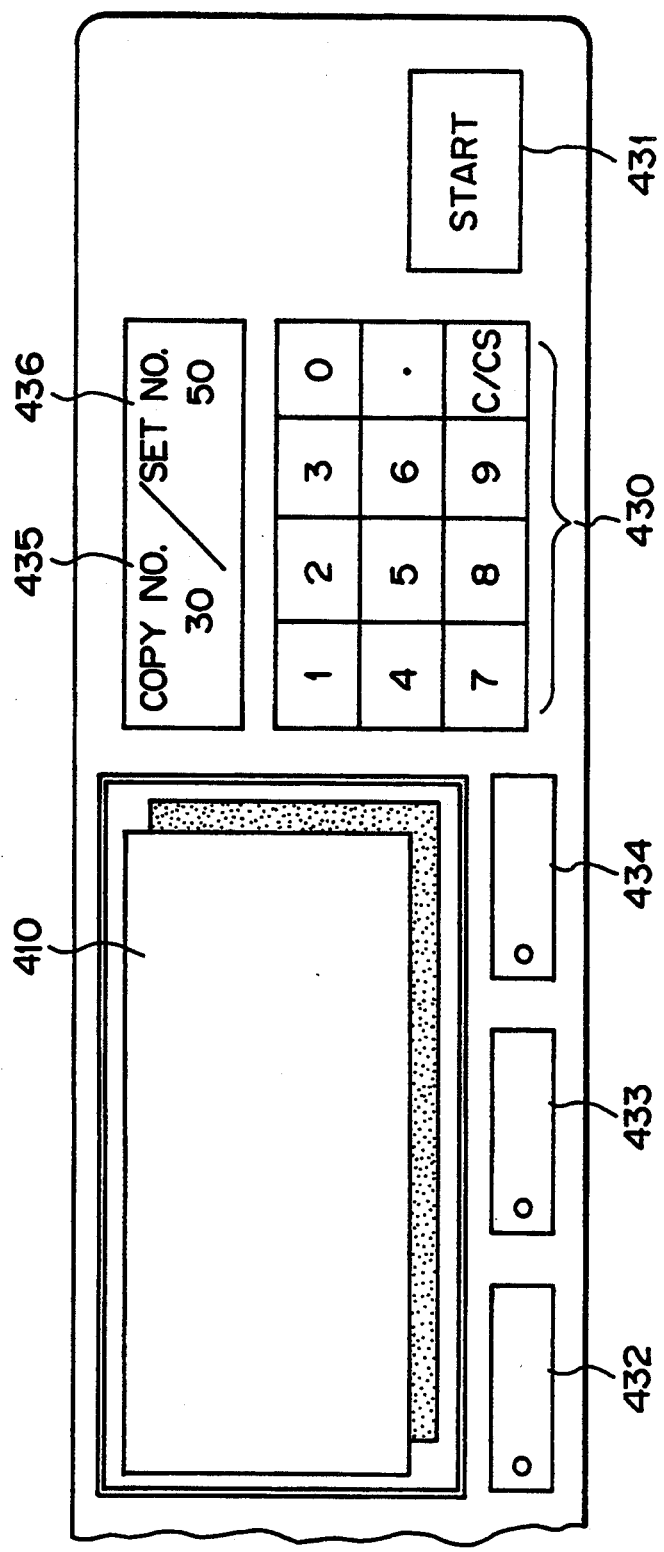
FIG. 19 is a plan view showing a specific arrangement of an operation and display section.

This unit controls an LCD 410 and touch switches (T/S). The LCD 410 is capable of displaying graphic images and character images. A CG 412 is included in the LCD 410 and stores ANK codes and the second level codes of *kanji* (Chinese characters) A TSC (Touch Switch Controller) 413 can assign any desired number of lattices to a single key to thereby determine the size of a switch to be operated. The LCD 410 and T/S have a double layer structure, i.e., the size of a key and the frame of a key on the LCD 410 can correspond to each other. There are also shown in the figure a CPU 414, an SCI 415, a ROM 416, a RAM 417, an LCDC 418, and a DPRAM 419. FIG. 19 shows a specific display arrangement. As shown, numeral keys 430 for setting, for example, a desired number of copies, a start key 431 for starting a copying operation, and user oriented function keys 432, 433 and 434 are fixed keys. By operating the function keys 432, 433 and 434, the user can freely set up desired modes. For example, a sort mode, a staple mode and a two-sided copy mode may be assigned to the keys 432, 433 and 434, respectively. While the copy number 435 and the set number 436 are fixed, the other information appears on the LCD 410. The LCD 410 is implemented as touch switches to allow the user to select a desired mode by pressing a corresponding object on the LCD 410.

The operations of the APLs are as follows.

1.9.4 Facsimile Transmission and Reception

The facsimile unit has MF, G2, G3 and G4 functions and has transmission densities of 3.85 lines/mm, 7.7 lines/mm, and 15.4 lines/mm. Further, the facsimile unit supports 200 dpi, 240 dpi, 300 dpi and 400 dpi for G4. By using a magnification changing function, the facsimile unit is capable of changing the density, as needed. Also, by using an SAF memory, the facsimile unit can execute memory transmission and reception, repeating, confidential reception, polling, etc. In addition, while storing a document to be transmitted in a memory, the facsimile unit can effect memory transmission, memory reception, reception output and so forth at the same time.

To begin with, at the time of transmission, the operator sets a document and then presses the start key 431. Then, the facsimile unit dials the desired remote station stored in the RAM 375 of the APL2 and, on confirming that the remote station is a facsimile unit, starts reading the document. When the operator accidentally presses the key 431 before setting the document, a message for urging the operator to set it is displayed. As the scanner reads the document, the resulting image data appears on the terminal EXTOUT via circuitry shown in FIG. 20. At this instant, whether or not to use the IPU 255 can be determined by selecting particular conditions of the MUX1 and MUX3. Further, the internal functions of the IPU 255 can be freely selected on the basis of a program. The image data on the AEXTOUT is applied to the engine I/F 340, FIG. 18B, and sequentially written to the page memory 341 in conformity to the bit size of the page memory 341. Specifically, while the data from the EXTOUT has eight bits per pixel, the page memory 341 accommodates sixteen bits. The data entered the page memory 341 is sequentially written to the SAF memory of the APL2 while being compressed.

When the data from the scanner is transmitted while being stored in the SAF 373 as stated above, various advantages are achieved, as follows. While the scanner can fully read a single document of A4 size in about 2 seconds, about 9 seconds are necessary for such a document to be sent by a G3 facsimile machine. Hence, the transmission time is about 4.5 times as long as the scanning time. With a multiplex machine including a copier, facsimile transceiver and printer as in the embodiment, a person may want to copy documents while another person is transmitting documents. In such a case, the facsimile transmission job should be completed as soon as possible. In practice, however, facsimile transmission depends on the ability of the remote station. The illustrative embodiment increases the transmission rate in an apparent sense by transmitting data while storing it in the SAF 373. In addition, even when an error occurs during transmission or when the line is cut off, an image can be accurately sent by retransmission and recall since the document is stored in the SAF memory. In this manner, the data stored in the SAF 373 can be accessed by a G3 or a G4 facsimile unit over the system bus.

Figure 20:
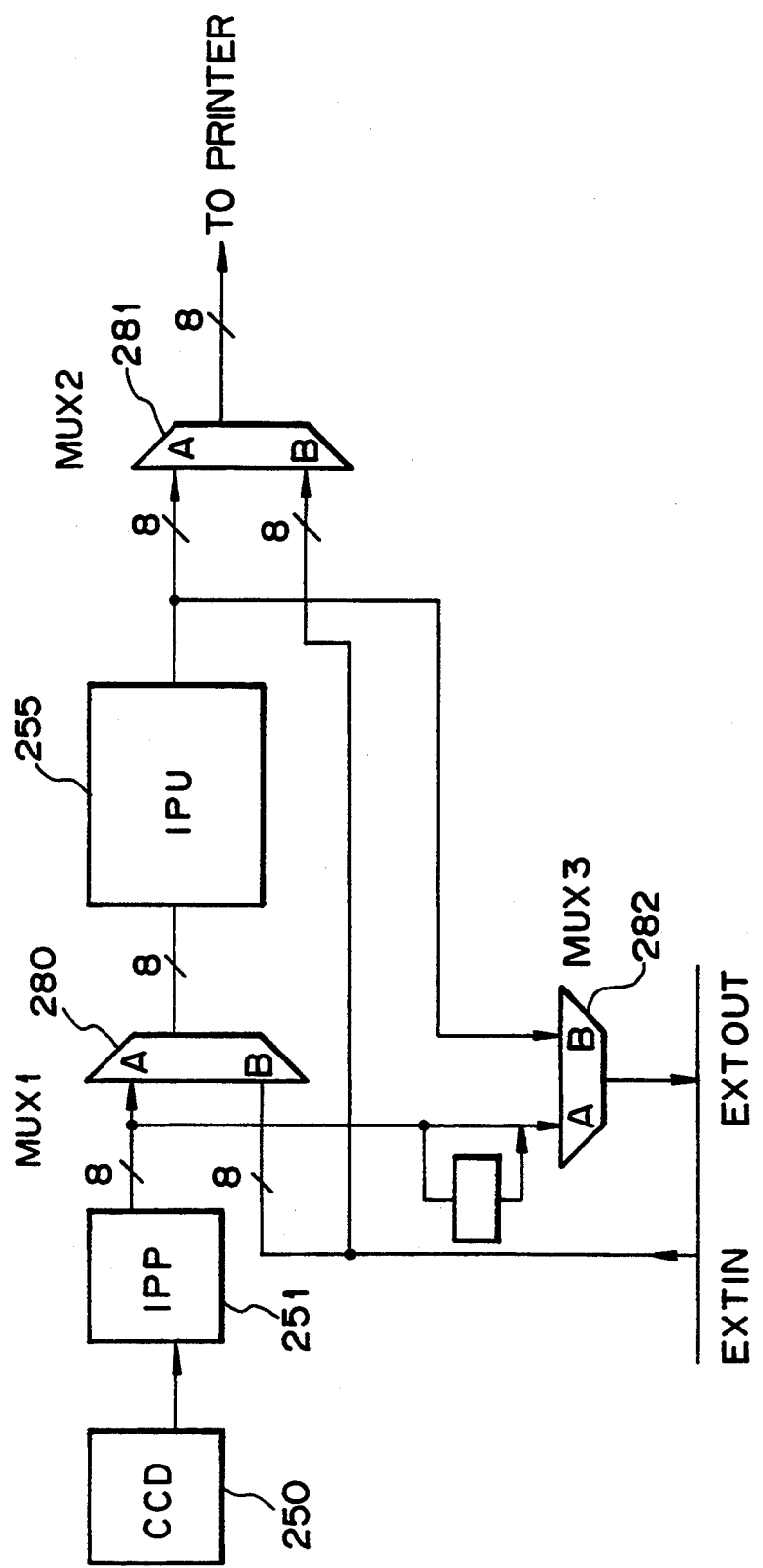
FIG. 20 is a block diagram of a memory system.
Figure 21:
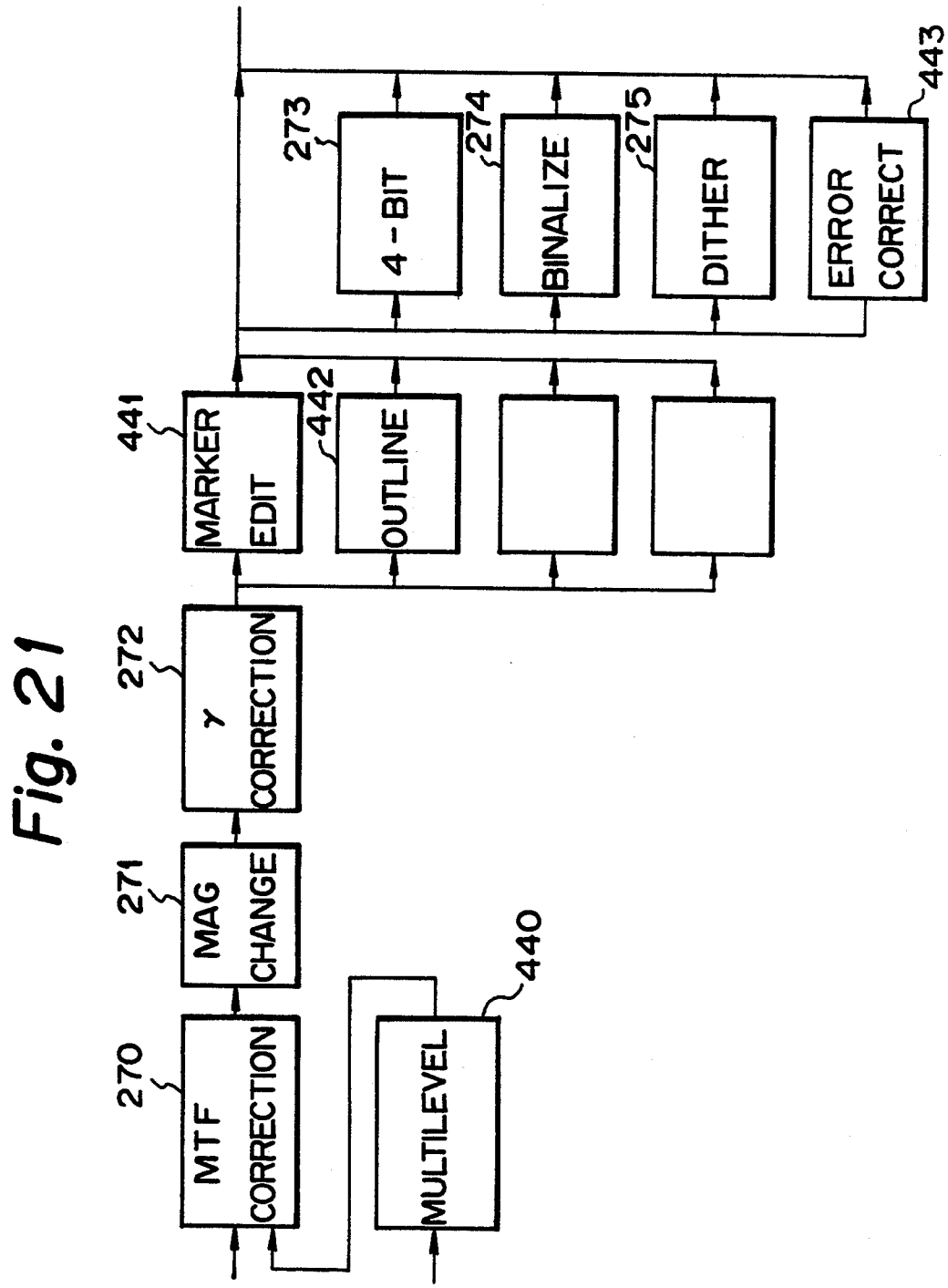
FIG. 21 is a block diagram schematically showing an image processing unit.

FIG. 21 shows the IPU 255, FIG. 20, schematically. As shown, the IPU 255 has a multilevel circuit 440, a marker editor circuit 441, an outline circuit 442, and an error correction circuit 443 in addition to the blocks shown in FIG. 7.

Figure 22A:
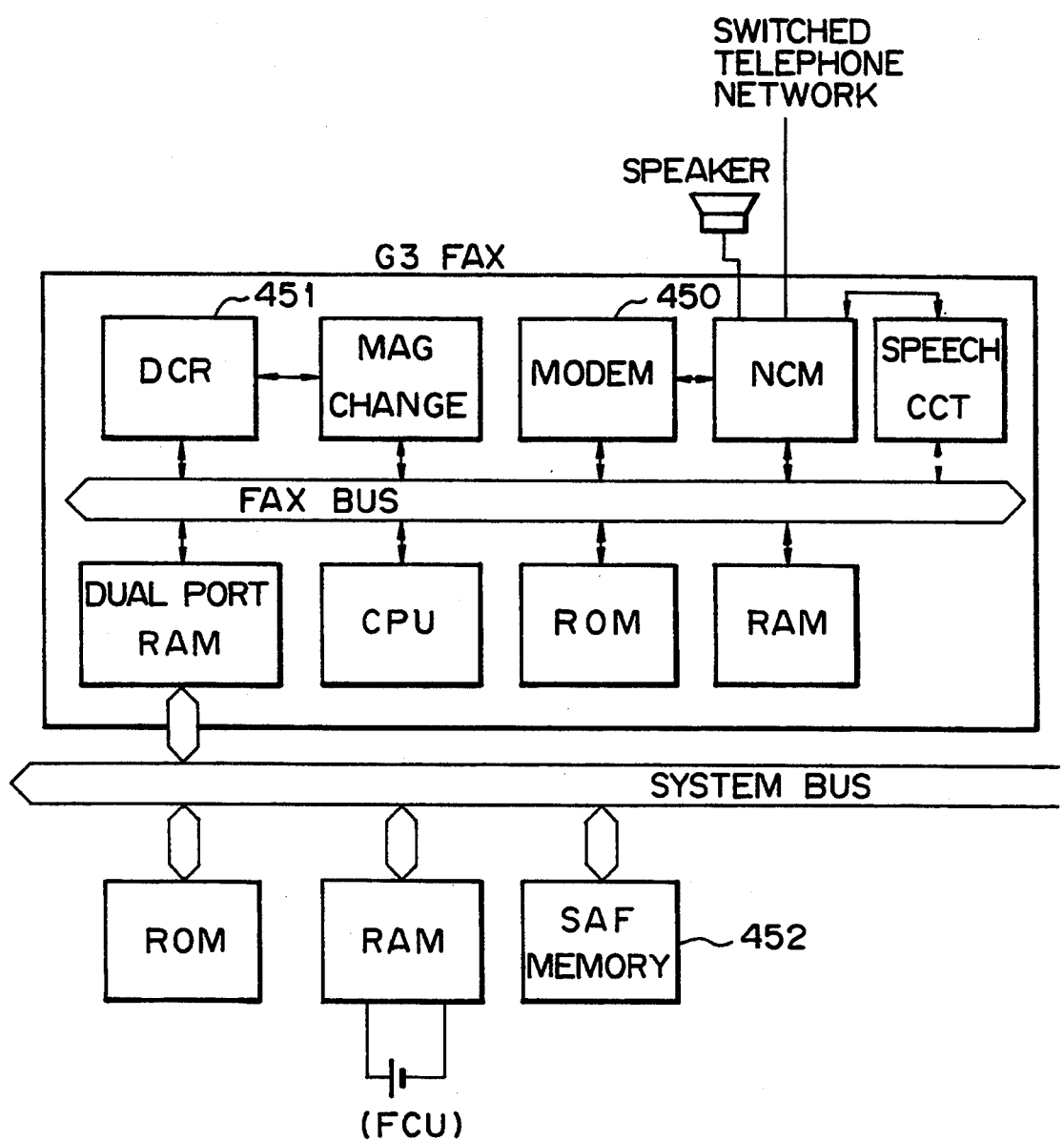
FIGS. 22A and 22B are block diagrams schematically showing an image data receiving arrangement.
Figure 22B:
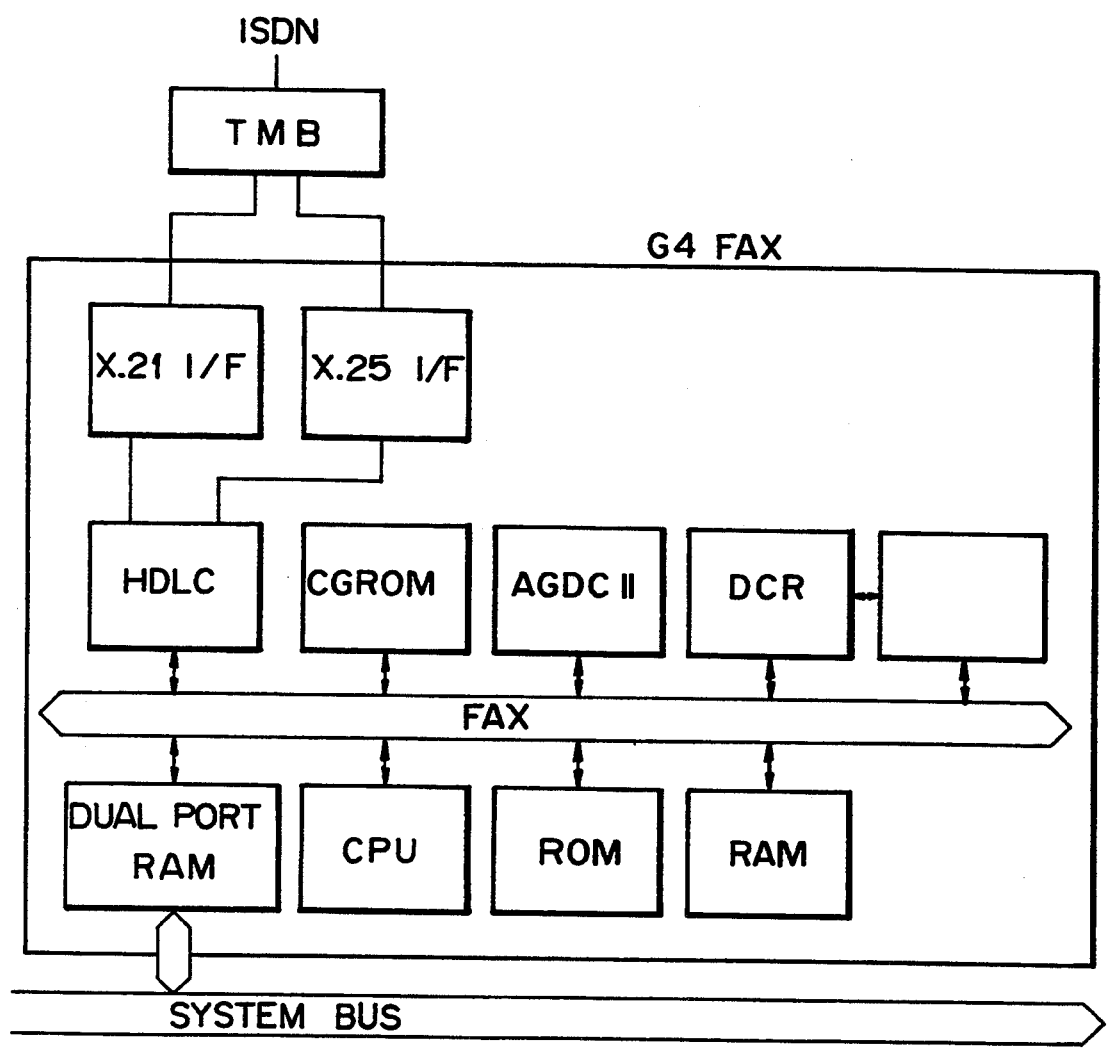

The reception of image data will be described with reference to FIGS. 22A and 22B. As shown, a MODEM 450 converts received image data to a digital signal. The digital signal is retransformed to raw data by a DCR 451, compressed again, and then written to an SAF memory 452. Retransforming the digital signal to raw data and then compressing it is significant since the received data usually involve errors ascribable to the communication channel. Specifically, if the received data is directly written to the SAF 452, whether the error is ascribable to hardware or to software cannot be determined. For the recompression, a system having a high memory efficiency will be used. The data stored in the SAF memory 452 is printed out page by page (if desired, one whole file of data may be stored and then outputted by setting up a corresponding mode).

The data of the SAF memory 452 can be outputted only if the page memory 341, FIGS. 18A and 18B, is not used by any other APL and if the copier is idle. If these conditions are satisfied, the data from the SAF memory 452 is written to the page memory via the CEP 345 while retransforming it to raw data. Thereafter, an optimal sheet size is selected. Assume that the data stored in the page memory 341 is in a vertically long A4 format, and a sheet format optimal therefor is horizontally long A4. Then, the data in the page memory 341 is rotated 90 degrees by the rotation control and then printed on sheet of optimal format. This is successful in eliminating the conventional occurrence that an A4 vertically long image is printed on an A4 horizontally lone, sheet, leaving substantial part of the sheet blank. This is also true with a transmission mode, i.e., image data to be transmitted can be rotated 90 degrees in matching relation to a remote station. Hence, assuming that an A4 horizontally long document is to be sent to a remote machine capable of receiving it only in an A4 vertically long format, the document data can be transmitted in a ×1 magnification due to the 90 degrees rotation. In such a case, it has been customary to reduce the document to 71%. The document without such reduction will be easy to see at the receiving station. When the HDD 325 is used in place of the SAF memory 452, the HDD 325 will be driven via the SCSI interface of the APL1 with the SAF memory 452 serving as a buffer.

1.9.5 Image Processing Unit

1.9.5.1 Shift, Magnification Change, Rotation, Reverse Scan and Mirroring

Figure 23:
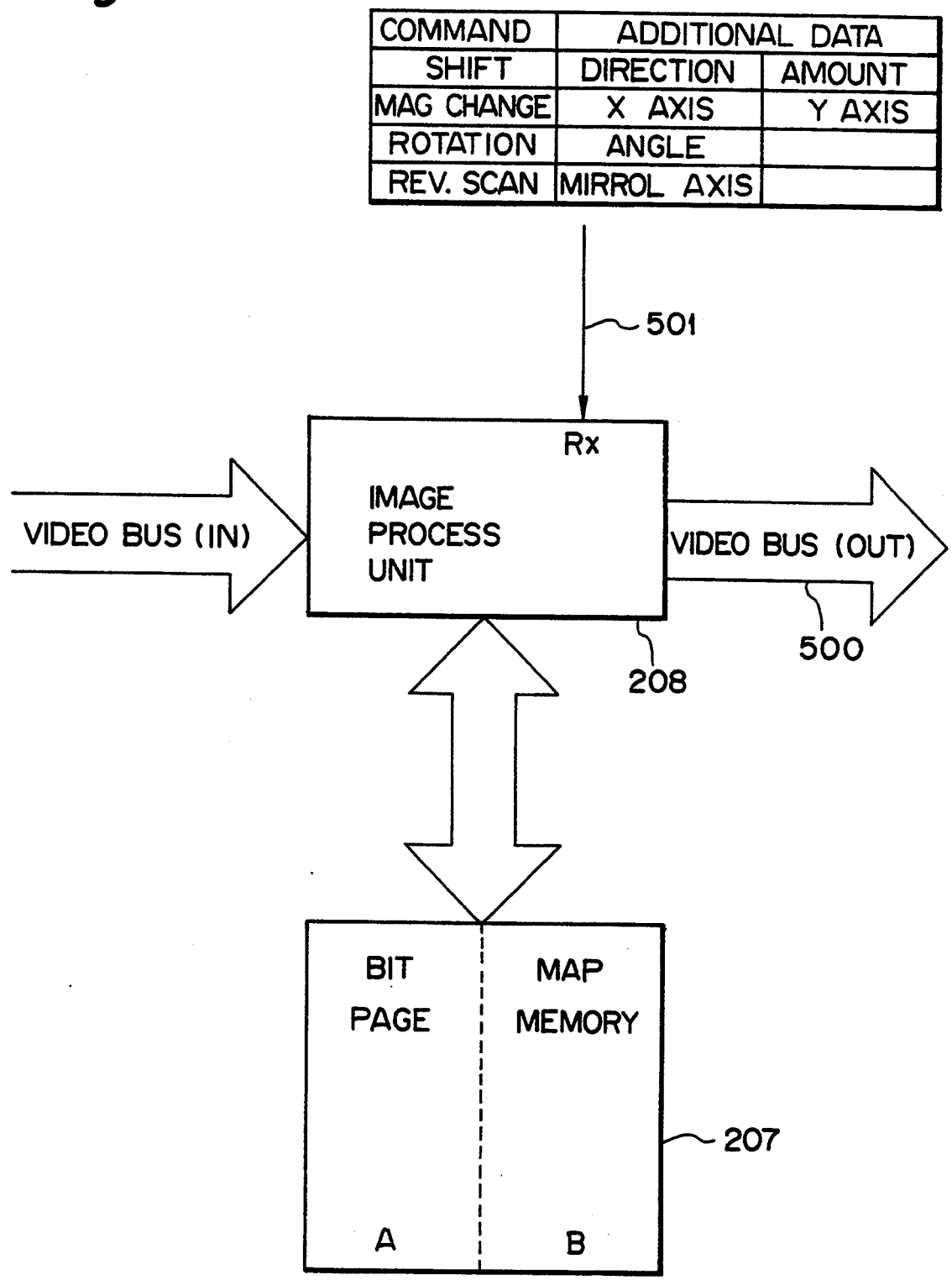
FIG. 23 is a block diagram schematically showing an image processing function.

FIG. 23 shows the various image processing functions included in the base portion of FIGS. 18A and 18B in a schematic block diagram. As shown, the image processing unit 208 is capable of accessing the bit map page memory 207. To save the original document image, the bit map page memory 207 should preferably have a capacity great enough to accommodate two documents of maximum allowable size. Specifically, the memory 207 has an area A for storing original image data of a document and an area B for storing the manipulated image data of the document. An image data (video) bus 500 and an image process command 501 are the inputs to the image processing unit 208. The video bus 500 is an 8-bit data bus and has eight bits, i.e., 256 density levels or tones on a pixel basis. A system controller for controlling the system (CPU (b) 201, FIG. 4A) sends an image process command to the image processing unit 208 over the system bus. A particular code is assigned to each of the image processing functions. Regarding image shift, for example, the system controller sends a shift code, shift direction and shift dimension to the processing unit 208. In the case of magnification change, a magnification change command, X axis magnification range ratio, and a Y axis magnification change ratio are sent in sequence. Of course, the X and Y magnification change ratio codes will be identical regarding ordinary magnification change. A rotation command is accompanied by an angle code. When the scanner scans a document in the reverse direction, it is necessary to mirror the image. Then, a mirror command or a reverse scan command accompanied by reference axis information will be sent to the processing unit 208.

Figure 24:
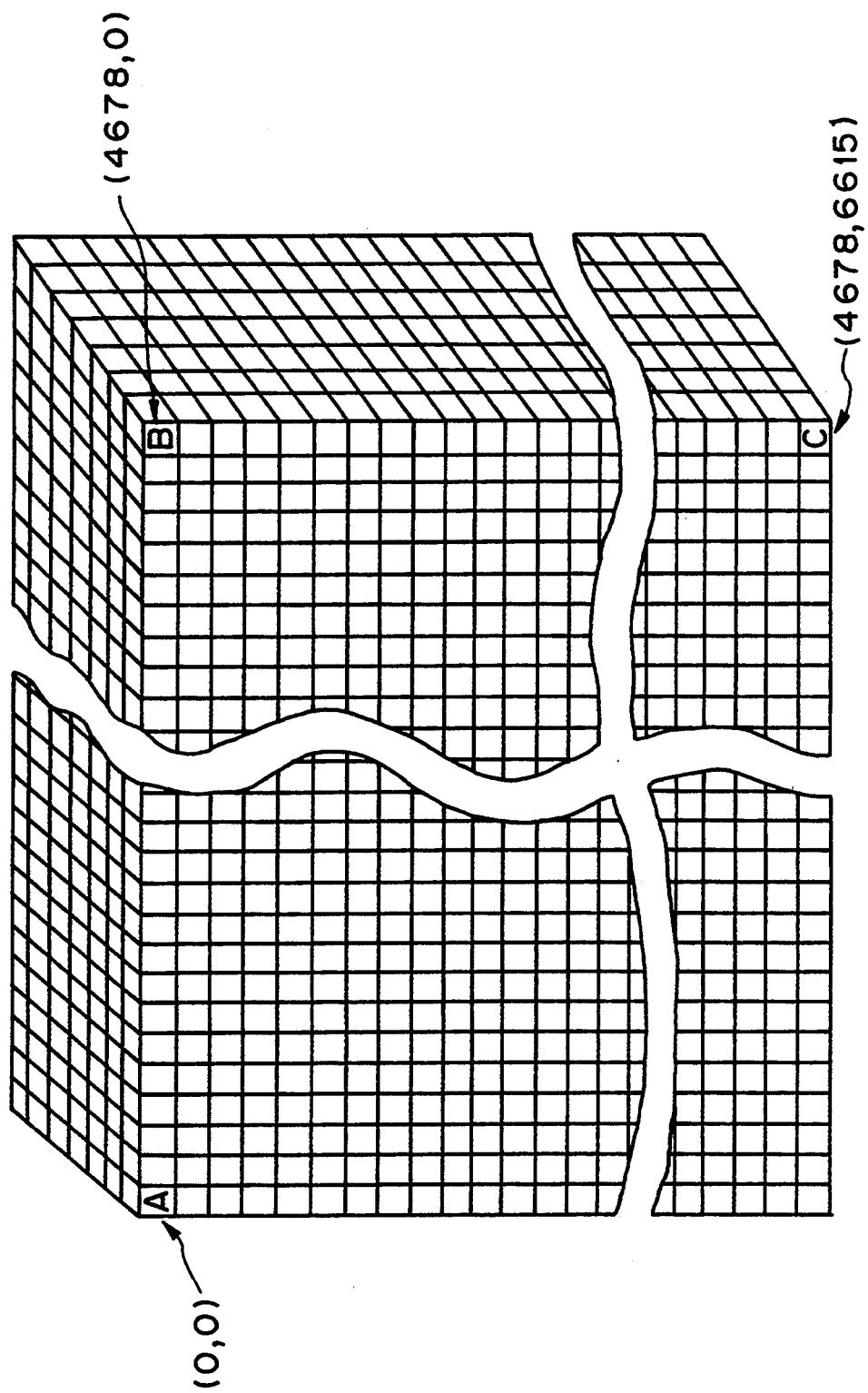
FIG. 24 shows a specific arrangement of a bit map page memory.

FIG. 24 shows the bit map memory 207 schematically. One byte is assigned to one pixel of image data read out of a document as an address. One byte of data is the previously mentioned image density data. Assume that the maximum allowable document size is A3, i.e., 297 mm in the main scanning direction and 420 mm in the subscanning direction, and that the resolution is 400 dpi. Then, the byte size is $(297 \div 25.4) \times 400 = 4678$ bytes in the main scanning direction and $(420 \div 25.4) \times 400 = 6615$ bytes in the subscanning direction. Therefore, to store the bit map image of a single A3 document, $4678 \times 6615 =$ about 30 megabytes are needed. For easy understanding, let the main scanning direction, subscanning direction and density level of each bit map be X, Y and Z, respectively, and let each bit be represented by DIM (X,Y,Z). Then, in FIG. 24, points A, B and C are respectively represented by (0,0,0), (4678, 0, 0) and (6615, 4678, 0).

Hereinafter will be described a procedure which the image processing unit 208 executes on receiving a command from the system controller.

1.9.5.2 Shift

On receiving a shift command, the processing unit 208 receives a shift direction and a shift dimension in mm simultaneously. The processing unit 208 determines a number of dots to shift on the basis of the received dimension (mm). Further, the processing unit 208 determines whether the shift direction is the forward (incrementing direction of X) or reverse direction of the main scanning direction X or the forward or reverse direction of the subscanning direction Y on the basis of the received shift direction. Thereafter, the processing unit 208 starts on an image processing operation. Assuming that a shift command indicative of a shift of 25.4 mm in the forward direction of the main scanning direction X is received, then the number of dots to shift is 400 dots. The bit map data of the image is transferred from the area A to the area B of the bit map page memory 207 by DMA control incorporated in the processing unit 208. At the time of transfer, the following processing is executed:

$$A(X,Y,Z) = B(X+400,Y,Z)$$

X is processed up to 4678−400 while Y is processed from 0 to 6615. Z does not have to be taken into account since, in the case of DMA, the zeroth to seventh bits are transferred at the same time.

Figure 28A:
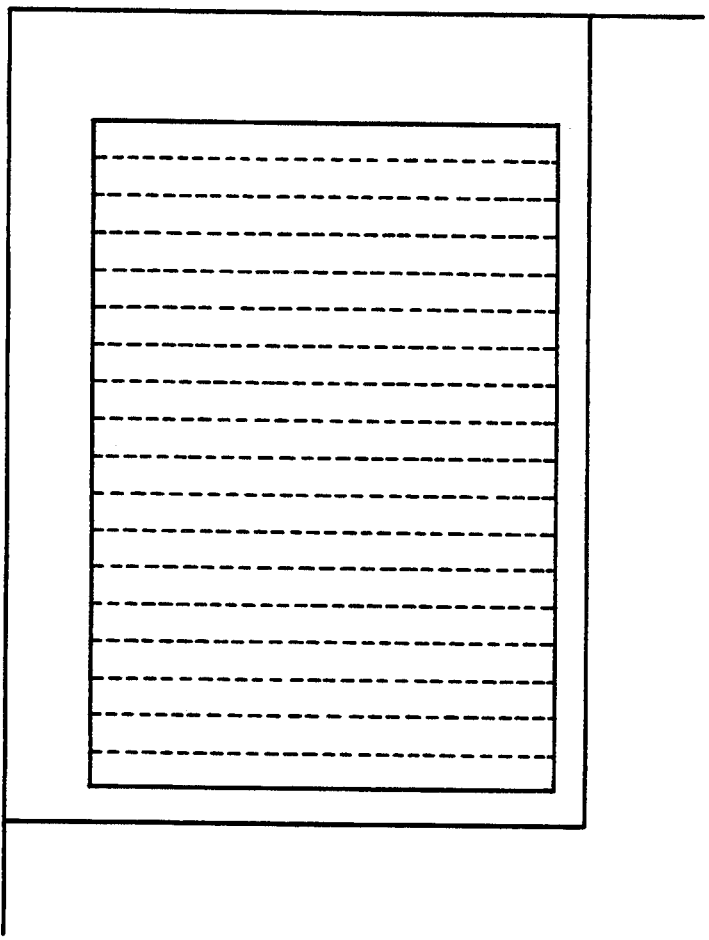
FIGS. 28A-28C show blank areas or margins of a document in the X and Y directions.
Figure 28C:
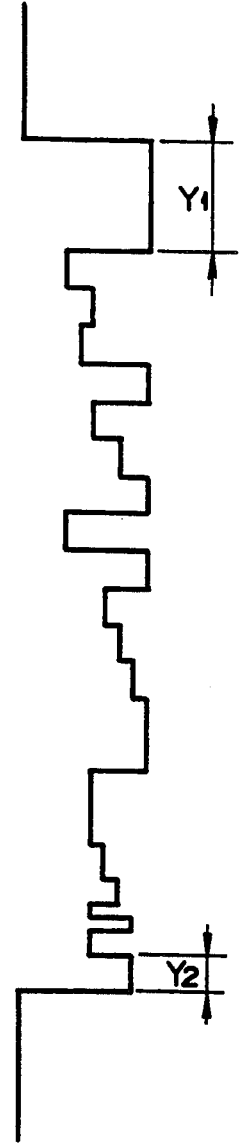
Figure 28B:
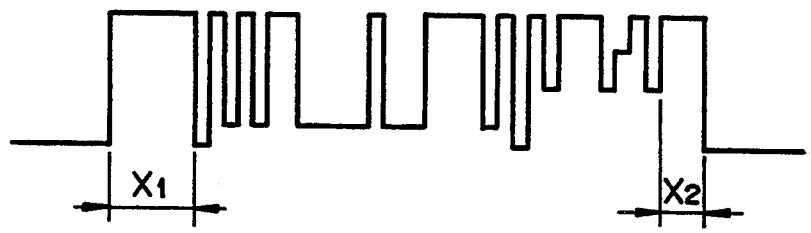

The processing unit 208 determines the amount of shift from the system controller, as follows. As shown in FIGS. 28A-28C, assume that an image begins at a position X1, that the X coordinate of a punching or stapling position is 20 mm, and that the diameter of a punch holes is 6 mm. Then, the image does not have to be shifted if the following relation holds:

$$X1 > (20 + 6/2) \text{ mm}$$

meaning that the punch holes and image do not overlap each other.

However, the punch holes and image overlap if:

$$X1 < (20 + 6/2) \text{ mm}$$

Then, the image should be shifted by SFx expressed as:

$$SFx = (20 + 6/2) - X1$$

This value is received immediately after the shift direction. This is also true with stapling.

On the other hand, it may occur that the shift SFx causes the image to be partly lost, i.e., the value X2 shown in FIG. 28B is smaller than SFx. Should such a shifted image be formed on a sheet, it would be partly lost. In this case, the document image has to be reduced.

1.9.5.3 Magnification Change

On receiving a magnification change command, e.g., a 50% reduction command, the processing unit 208 transfers the bit map data of the image from the area A to the area B after removing the even bytes of X and Y. In the case of 99% reduction, the processing unit 208 transfers 0 to 98 of X and Y in the area A to the area B, and then transfers 100 to 198 of X and Y in the area A to the area B. As a result, one out of 100 pixels is omitted to implement 99% reduction. Likewise, for 98% reduction, one out of fifty pixels will be omitted.

In the event of enlargement, directly increasing the bits would render the pixels rough and mosaic. It is a common practice to smooth the pixels by interpolation or by use of a spatial low pass filter (after bidimensional Fourier transform, high frequency range is attenuated for inverse Fourier transform). Assume that an image is present at the previously mentioned punching position and, in addition, it is partly lost when shifted and, therefore, has to be reduced. Then, a magnification is determined by the following procedure. Assuming that the document has a length Lx in the X direction, then the magnification M is produced by:

$$M = \{Lx - (20 + 6/2)\}/Lx$$

While reduction only in the X direction will suffice in insuring an image, both of the X and Y axes are usually changed in magnification to maintain the ratio of the horizontal to the vertical of an image constant.

1.9.5.4 Image Rotation

The processing unit 208 receives a rotation angle on a 90 degrees basis. When an image is rotated 90 degrees, the pixel data may be transferred from the memory A to the memory B such that the pixel data of the point A turns out the pixel data of the point B, and the pixel data of the point B turns out the pixel data of a point (4678,4678). In this condition, however, the 90 degrees rotation would cause the pixels in the longitudinal direction (subscanning direction) to overflow the memory since the number of pixels differs from the main scanning direction to the subscanning direction. So long as reduction or similar processing is not executed, the overflow will not matter at all since it also occurs on a sheet. However, in the case of reduction, the memory B has to be implemented with a capacity equal to the square of the dimension in the subscanning direction.

When the rotation angle is 180 degrees, the pixel A will correspond to the pixel C. Therefore, the following conversion will be effected:

$$A(X,Y,Z)=B(6615-X, 4678-Y, Z)$$

1.9.5.5 Reverse Scan and Mirroring

Usually, mirroring allows a mirror image to be reproduced on a sheet and is advantageously applicable to the design field as one of image manipulating applications. In addition, mirroring has the following application. Generally, a scanner starts reading document data at a reference position while writing it in a memory, but it starts reading a document at the end opposite to the reference position if the size of the document is known. FIGS. 25A and 25B show specific image data written in a memory by the above-mentioned usual scanning; in the figures, dotted arrows indicate the main scanning direction. FIGS. 26A–26C show similar image data scanned in the reverse direction and stored in a memory. In any case, the pixel scanned first is written to (0,0,0) of the page memory 207, FIG. 24. When the image data of FIG. 26B stored in the memory is mirrored by a mirror M, the image data shown in FIG. 26C is obtained. Specifically, assuming that the mirror axis data received together with the mirror command or the reverse scan command is the Y axis data, then the memory transfer shown in FIG. 24 is effected according to the following equation:

$$A(X,Y,Z)=B(4678-X,Y,Z)$$

Mirroring using the X axis is as follows:

$$A(X,Y,Z)=B(X, 6615-Y, Z)$$

FIGS. 27A–27C demonstrate a procedure wherein a document originally positioned upside down with respect to the top and bottom is reversely scanned and then mirrored.

While the embodiment once stores image data in a memory and then mirrors it, the image data may be read on a real time basis and, at the same time, outputted by use of the line M as a mirror axis. With the illustrative embodiment, it is possible to rotate an image 180 degrees by a simple procedure even in an inexpensive apparatus lacking a page memory.

1.10 Human Body Sensor

As shown in FIGS. 5A and 5B, a human body sensor 225 is connected to the main control board 220 for determining whether or not a person to operate the copier is present in front of the copier. The sensor 225 is mounted on the operating section, display section, document table or in the vicinity of the front end of the copier. The sensor 225 is a reflection type sensor constituted by an infrared ray emitting diode and a phototransistor. The output of the sensor 225 may be used to execute ON/OFF control of preheating (i.e. saving power when the machine is not used by lowering the fixing temperature), to control guidances, to turn on and turn off audio guidances, and to make decisions as to the control over the machine operation. Whether or not an operator exists in front of the copier is determined, as follows. The sensor 225 is so designed as to turn on when a reflecting object enters a range of about 1 m as measured from the sensor 225. When the sensor 225 remains in an ON state over a predetermined period of time, it is determined that an operator exists in front of the copier. The predetermined period of time is usually 500 msec to 800 msec and may be implemented by software using the timer of the CPU or by a delay effected by the hardware of the sensor 225. In any case, such a predetermined period of time is successful in distinguishing the operator from persons just passing by.

2. Identification of Image Orientation

The orientation of an image may be identified by any of the following specific methods:

(a) detecting margins;
(b) determining a layout;
(c) using character orientation and character recognizing means; and
(d) detecting punch holes or staple holes.

These orientation identification schemes are effected by the combination of the APL5 and various kinds of function hardware of the base section shown in FIGS. 18A and 18B. Such schemes will be described specifically hereinafter.

3. Identification of Image Orientation Based on Margins

Figure 29:
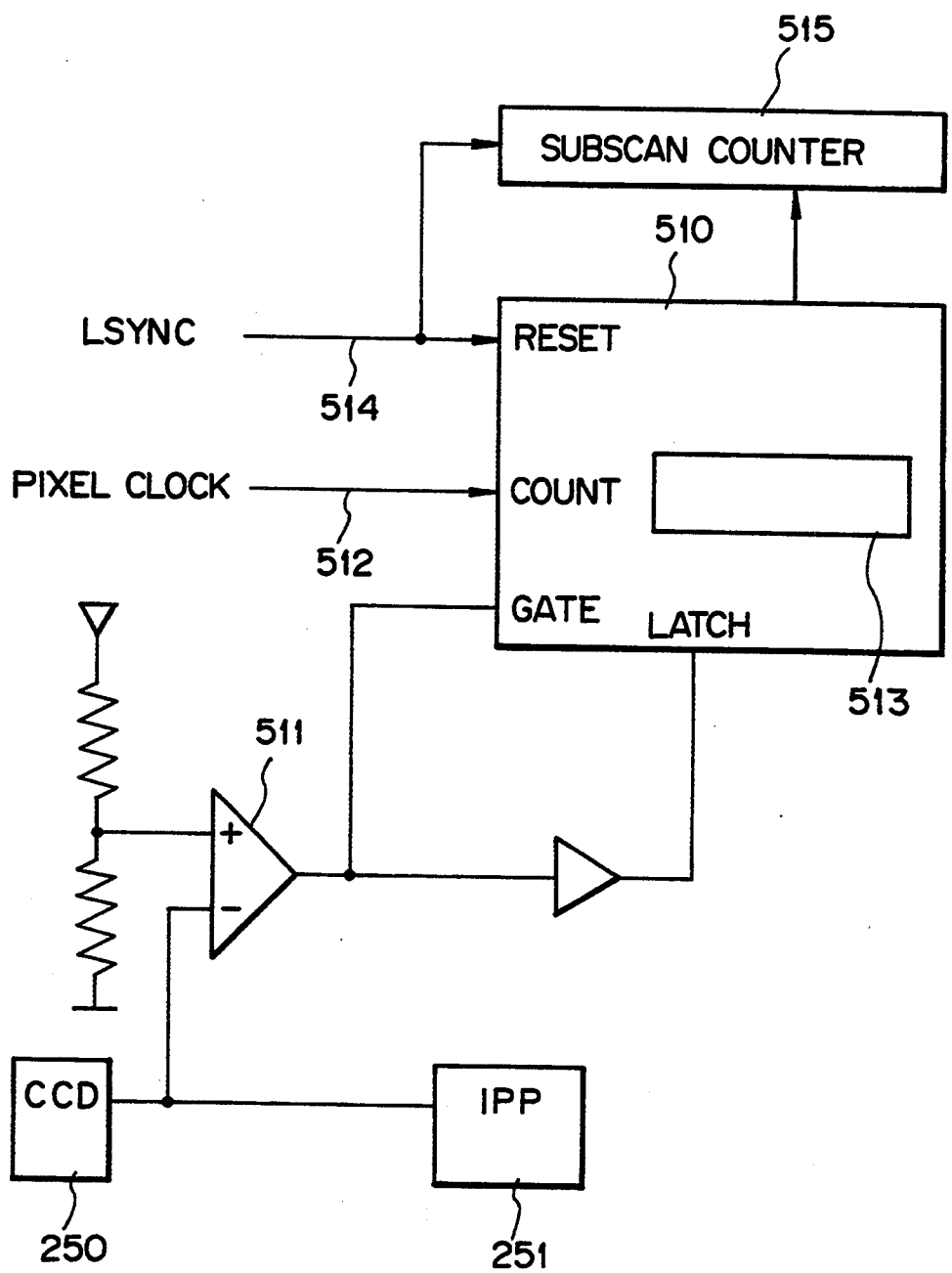
FIG. 29 is a block diagram schematically showing a device for counting pixels from the edge of a document to a position where an image begins.

Usually, written reports used in offices, official applications and other regular formats have certain blank areas, i.e., margins at the edges thereof. Also, a document produced by printing out a document generated by a word processor has a binding margin (e.g. left margin). With these documents, it is possible to identify the orientation of an image by determining greatest one of the margins. FIG. 29 shows specific circuitry for counting the pixels from the edge of a document to a position of the document where an image begins in order to detect a margin. To begin with, how to detect the position where an image begins in the main scanning direction will be described.

In FIG. 29, a comparator 511 selects the levels of the pixels of the CCD image sensor 250 which are regarded "white". A counter 510 counts a pixel clock 512 while the output of the comparator 511 is representative of the white level. The output of the comparator 511 is also applied to the latch input of the counter 510. Every time the pixel signal changes from white to black, the pixel clock 512 latches the count of the counter with the result that the count is latched in a counter latch 513. At this time, the count of the pixel clock 512 is reset. The count is also reset by a line sync signal (LSYNC) 514. By such circuitry, the position where an image begins is detected, and the position data is stored in the counter latch 513 on a pixel clock basis. To count the white pixels at the margin of the trailing edge of a document, the content of the counter latch 513 may be read at the time when a document trail edge signal appears. For the detection in the subscanning direction, a subscan counter 515 will count the number of times that the main scanning is continuously repeated when the counter latch 513 stores the number of pixels corresponding to the document size. Such counting is effected at the leading edge and trailing edge of the document determined by the document size, and the resulting values of the subscan counters 515 are stored.

At the same time, the circuitry of FIG. 29 is usable to determine whether or not an image is present on a document. Specifically, when no black pixels are detected in the area corresponding to the document size (no latch outputs appear), the document is determined to be a blank sheet.

Figure 30:
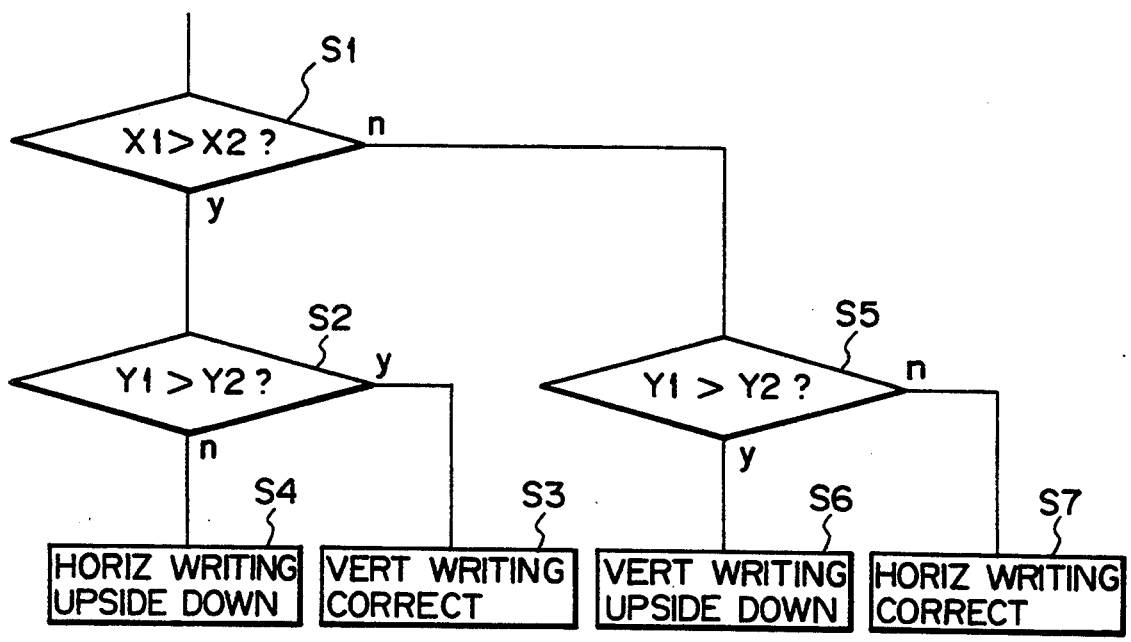
FIG. 30 is a flowchart demonstrating a procedure for detecting a document orientation.
Figure 31A:
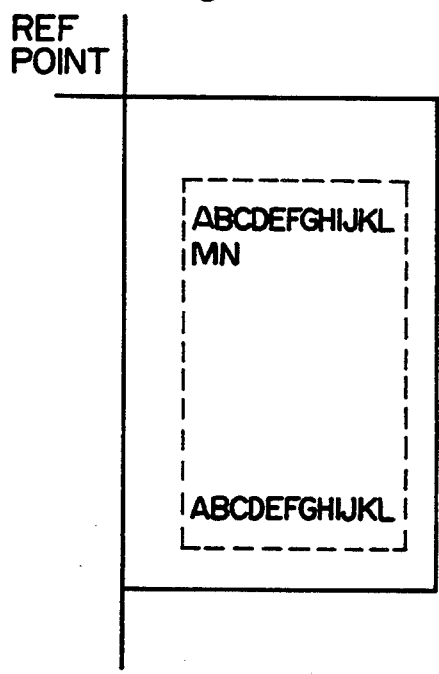
FIGS. 31A-31D show images determined by the procedure of FIG. 30.
Figure 31B:
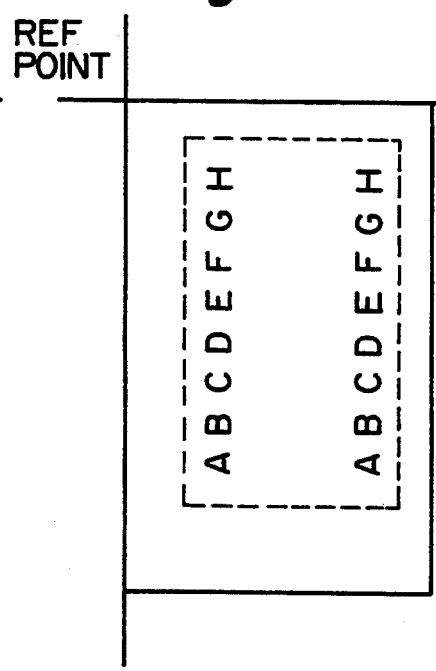
Figure 31C:
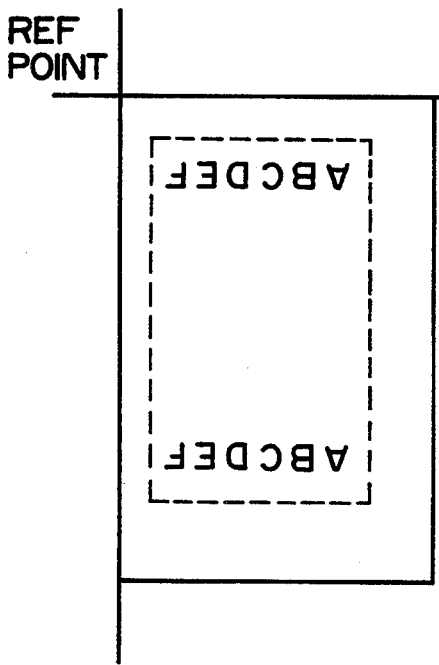
Figure 31D:
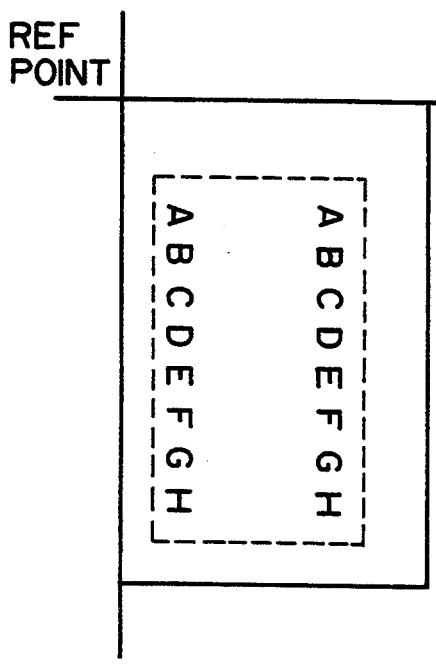

The margins X1, X2, Y1 and Y2 shown in FIGS. 28A–28C are detected by the above circuitry, as follows. When the document shown in FIG. 28A is scanned in the main scanning direction at a subscanning timing L, the specific waveform shown in FIG. 28B appears. If X1 is greater than X2, a blank area can be determined to exist at the reference point side and extend in the subscanning direction. This allows the orientation of the document to be determined. In addition, to detect margins at the top and bottom of the document, changes in signal on the time axis in the subscanning direction are memorized paying attention to a plurality of or a single pixel in the main scanning direction, thereby producing Y1 and Y2. If Y1 is greater than Y2, the document can be determined to be correctly positioned in the top-and-bottom direction. Specifically, as shown in FIG. 30, if X1 is greater than X2 (y, step S1), whether or not Y1 is greater than Y2 is determined (S2). If the answer of the step S2 is positive, y, it is determined that the document is a vertically written document and held in a correct position in the top-and-bottom direction (S3). If the answer of the step S1 is negative, n, Y1 and Y2 are compared (S5). If Y1 is greater than Y2 as determined in the step S5, the document is determined to be a vertically written document and positioned upside down (S6); if otherwise, the document is determined to be a horizontally written document held in a correct position in the top-and-bottom direction (S7). FIGS. 31A, 31B, 31C and 31D show specific images determined in the steps S3, S4, S6 and S7, respectively.

By the above procedure, it is possible to distinguish a vertically written document and a horizontally written document while determining the orientation of the document in the top-and-bottom direction. This scheme is advantageously applicable to means which, when documents irregular the top-and-bottom orientation are stacked together, produces a warning or automatically matches their orientations. Moreover, copies can be surely stapled, punched or otherwise finished at the outside of the images since the top-and-bottom orientation, margins and width are accurately determined by the above-described means If the punching or stapling position does not agree with the margin, a warning may be produced. These are done by punch/staple decision means.

3.1.1 Detecting Greatest Margin in Page Area of Output Image Data

The orientation of an image can be determined on the basis of the greatest margin of a document carrying the image, as stated earlier. This allows the orientation of a formatted document image to be determined with a simple construction. Whether the document is vertically written or horizontally written and whether its top-and-bottom orientation is correct or not are determined on the basis of the image data.

3.1.2 Detecting Greater One of Two Reference Margins Derived from Size and Set Direction (Image Data Direction) of Document Any two of the four sides of a document are assumed to be binding margins on the basis of the size of the document. The margins at the two sides of interest are detected to determine the orientation of an image. Specifically, documents daily used in offices are bound at a predetermined position. For example, assuming a document of A4 size, i.e., dimensioned 210 mm×297 mm, it is usually bound at one of the 297 mm sides extending in the longitudinal direction. Hence, if the document is positioned as shown in FIGS. 28A–28C, the top and bottom of the document can be determined only if X1 and X2 are compared. When the document is determined to be vertically long by conventional document size detection, the binding position is determined on the basis of X1 and X2 stored in the counter latch 513. If the document is determined to be horizontally long, the binding position is determined on the basis of Y1 and Y2 stored in the subscan counter 517.

Figure 32:
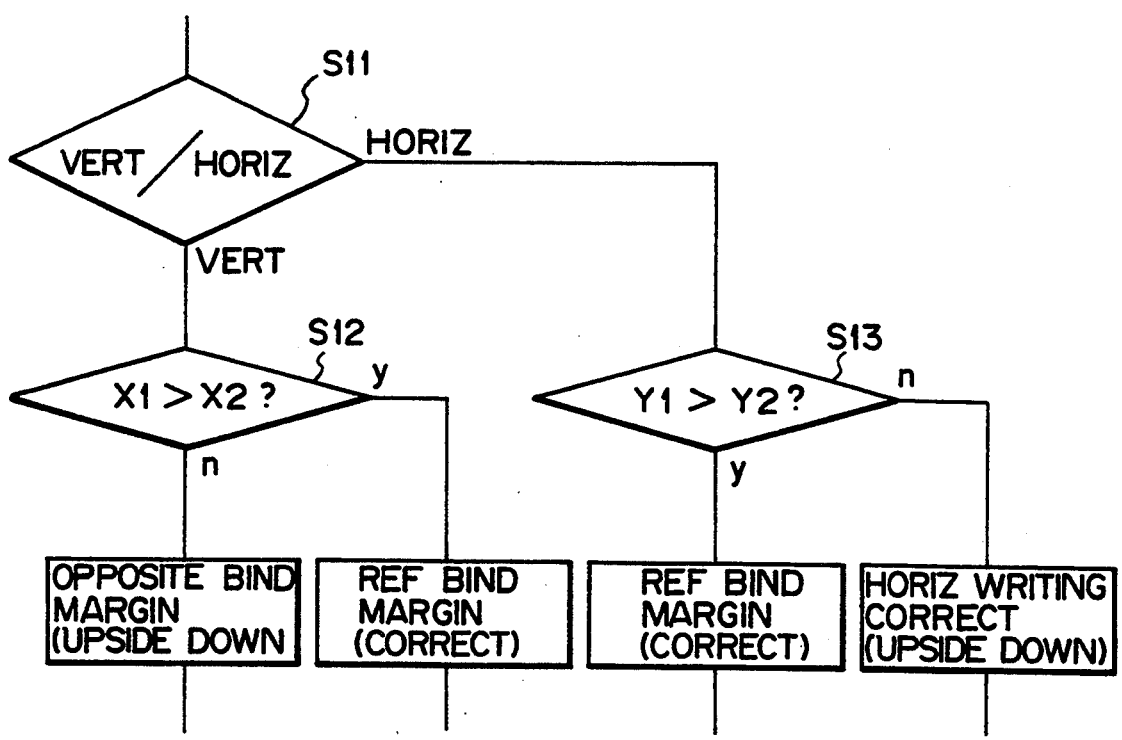
FIG. 32 is a flowchart showing a procedure for detecting the binding margin of a document.

FIG. 32 shows a procedure for detecting the binding position of a document on the basis of X1 and X2, FIG. 28B, detected by the previously stated circuitry. As shown, whether the document is vertically long or horizontally long is determined (S11). If the document is vertically long, whether X1 is greater than X2 is determined (S12). If the document is horizontally long, the program advances to a step S13. If X1 is greater than X2 as determined in the step S12, it is determined that the binding position is located at the reference position side (i.e., the document is set in a correct orientation); if otherwise, it is determined that the binding margin is located at the other side (i.e. the document is set upside down in the top-and-bottom direction). In the step S13, Y1 and Y2 are compared. If Y1 is greater than Y2, it is determined that the binding margin is located at the reference position side (i.e. the document is correctly positioned); if otherwise, it is determined that the binding margin is located at the other side (i.e. the document is upside down). With this procedure, it is possible to detect the binding position of formatted document images as well as the orientation of their images.

Figure 33:
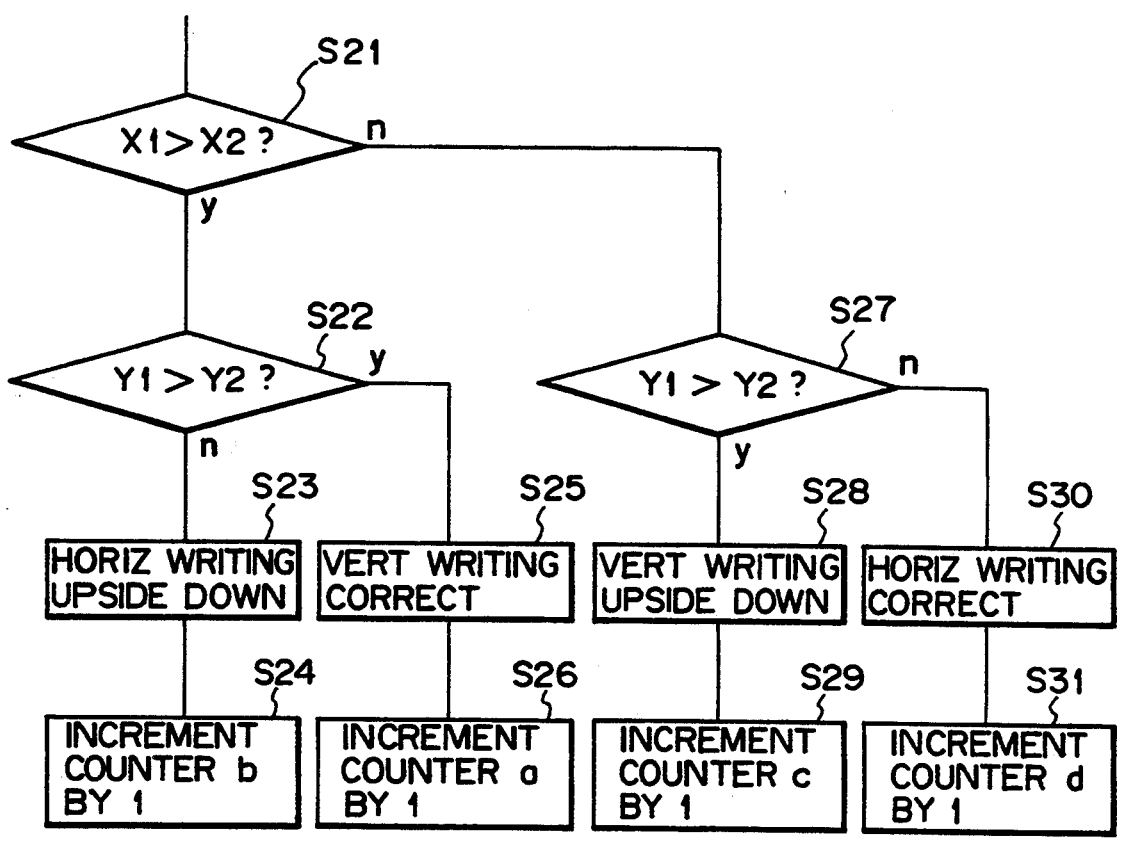
FIG. 33 is a flowchart showing a procedure for matching in orientation the maximum margin and start page image data.

3.1.3 Matching 2nd Page and Successive Pages in Orientation to Start Page by Detecting Greatest Margin in Page Area When multiple documents are to be copied, margins of each document are detected to determine the orientation of an image. Then, whether or not any of the documents copied is different in orientation from the first document determined. This has been described in the initial part of 3. Identification of Image Orientation Based on Margins. Specifically, as shown in FIG. 33, whether or not X1 is greater than X2 is determined (S21). If the answer is positive, whether or not Y1 is greater than Y2 is determined (S22). If the answer of the step S22 is negative, it is determined that the document is horizontally written and upside down in the top-and-bottom direction (S23), and then a counter b is incremented (S24). If the answer of the step S22 is positive, the document is determined to be vertically written and correctly positioned (S25), and then a counter a is incremented (S26). If the answer of the step S21 is negative, whether or not Y1 is greater than Y2 is determined (S27). If Y1 is greater than Y2, it is determined that the document is vertically written and upside down (S28), and then a counter c is incremented (S29). Further, if the answer of the step S27 is negative, the document is determined to be horizontally written and correctly positioned (S30), and then a counter d is incremented (S31).

Figure 34:
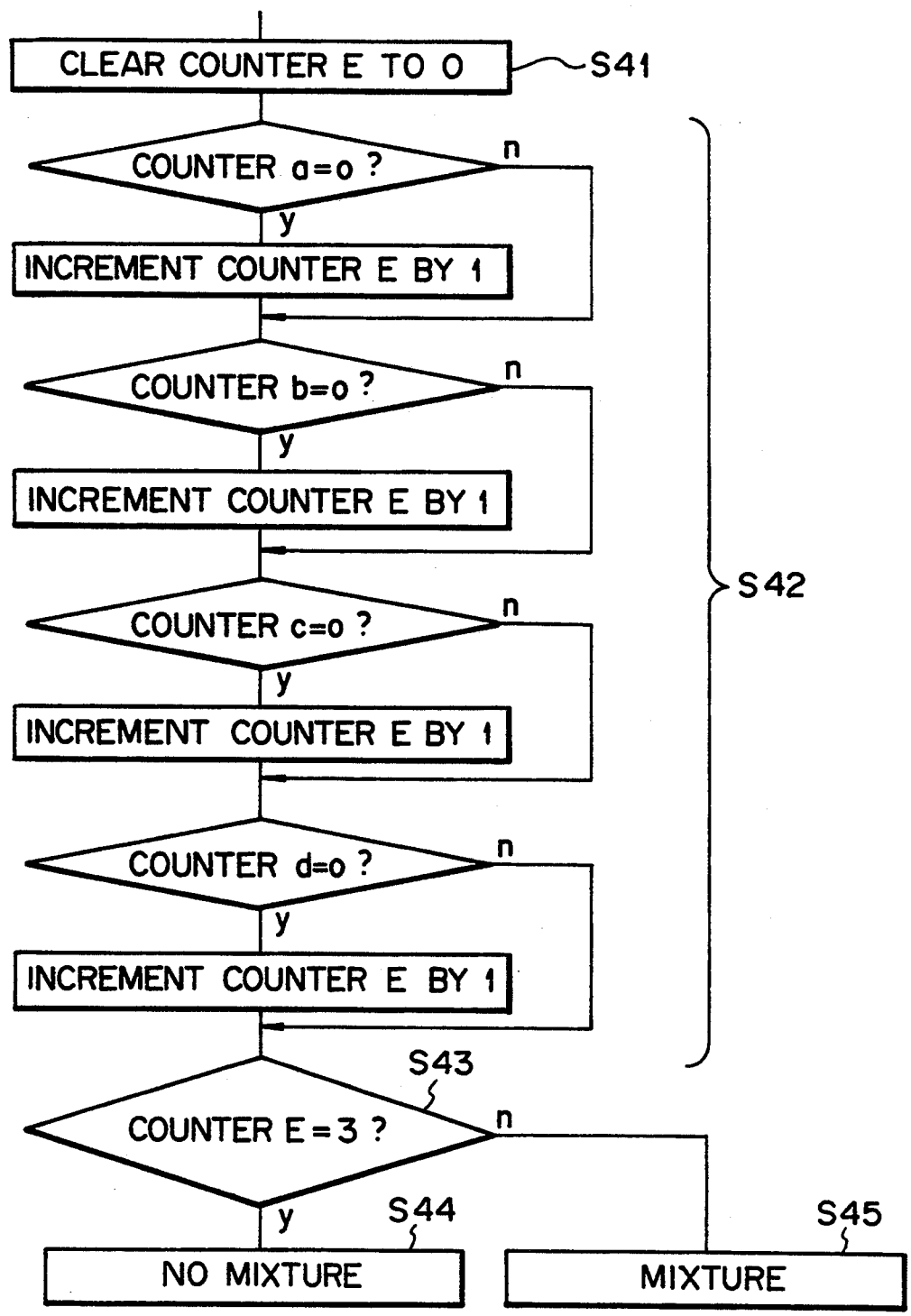
FIG. 34 is a flowchart showing a procedure for determining whether or not a document of different orientation exists in a stack of documents to be handled by a single job.

FIG. 34 shows a procedure for determining whether or not any of the multiple documents to be copied in a single job is different in orientation from the first document by using the contents of the counters a–d. To begin with, the kind of orientations of the documents are counted. Specifically, an orientation counter E is cleared (S41). Then, whether or not the counters a–d are zero is sequentially determined (S42). If any one of the counters a–d is zero, the counter E is incremented by 1. Subsequently, whether or not the counter E is 3 is determined (S43). If the answer of the step S43 is positive, it is determined that all the documents or images are oriented in the same direction (S44) as the first document; if otherwise, it is determined that some of the documents are different in orientation from the others (S45). In this manner, by determining the orientation of each multiple documents, it is possible to determine whether or not any or them is different in orientation from the first document by simple circuitry and simple procedure.

3.1.4 Recovery in Orientation NG (No Good) Condition

3.1.4.1 Only Display of Warning After Image Formation

After the image orientations of multiple documents have been determined on the basis of the margins, whether or not any of the copied documents differs in image orientation from the first document is determined. If the answer of the decision is positive, a warning is displayed on the operating section to alert the operator to the fact that a document of noncoincident orientation and a copy thereof exist in the stack of copies and the stack of copies, respectively.

Figure 35:
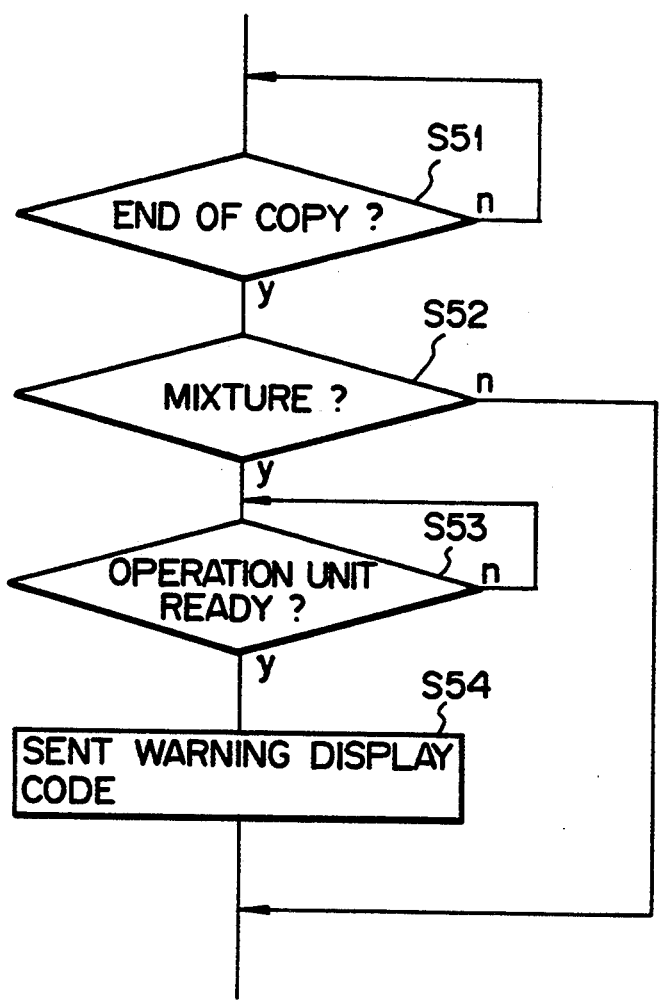
FIG. 35 is a flowchart showing a procedure for displaying a warning indicative of the document of different orientation.
Figure 36:
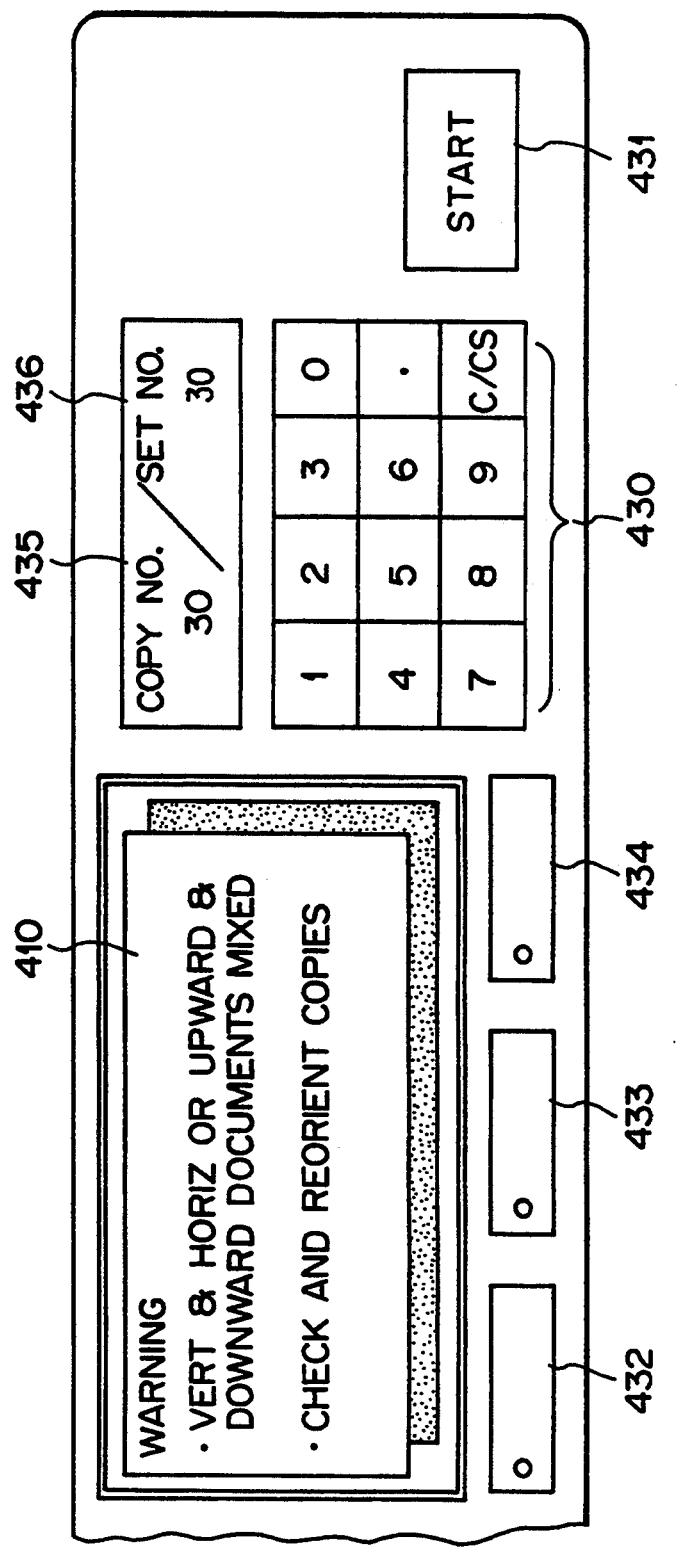
FIG. 36 is a plan view showing a specific condition of the operation and display section.

Specifically, as shown in FIG. 35, when the copying operation ends by way of the procedure of FIG. 34 (S51), whether or not documents of different orientations exist together is determined (S52). If the answer of the step S52 is positive, whether or not the CPU of the operation unit 204 is ready to receive a code is determined after all the documents have been copied (S53). If the CPU is ready, a warning display code is sent thereto to display an alert message, e.g., "VERT AND HORIZ WRITINGS OR UPWARD AND DOWNWARD DOCUMENTS MIXED CHECK AND REARRANGE COPIES" (S54). A specific alert message appearing on the operation unit is shown in FIG. 36. Assume that the operator punches, staples or otherwise binds a stack of copies by checking only the cover sheet and without noticing that some of the copies are different in orientation. Then, such copies will be missing in the resulting bound set. To eliminate this occurrence, the embodiment automatically informs the operator of the mixture of copies of different orientations and urges him to rearrange them in the same orientation.

3.1.4.2 Interruption of Copying and Displaying Warning

Figure 37:
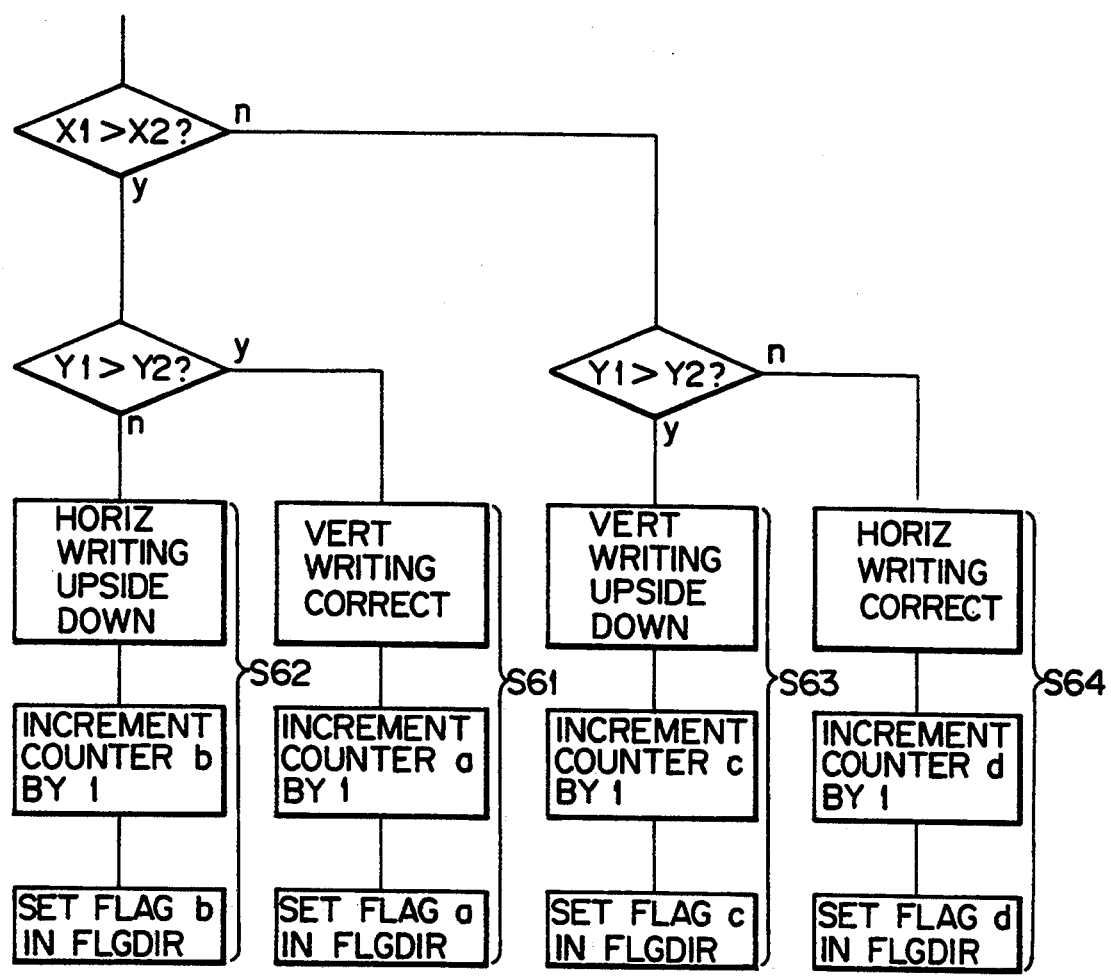
FIG. 37 is a flowchart showing a procedure for determining whether or not a document of different orientation exists in a stack of copied documents.
Figure 38:
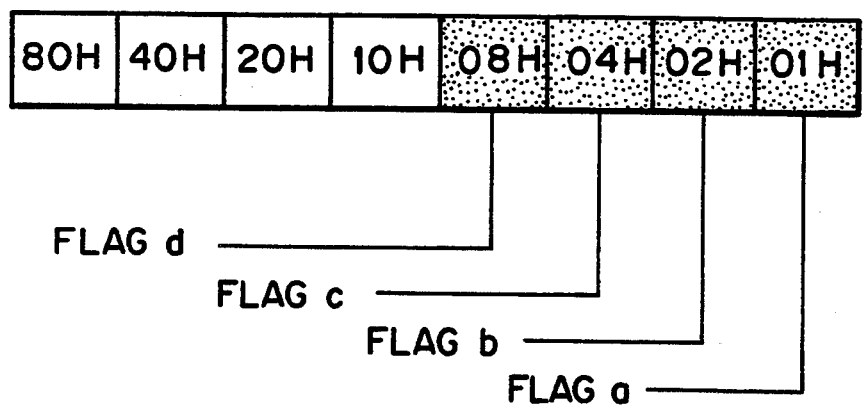
FIG. 38 shows a specific bit arrangement of a memory assigned to a flag used in the flowchart of FIG. 37.

When a document different in orientation from the first document as determined in the same manner as in the above case 3.1.4.1 is to be copied, the copying operation is interrupted, and a warning is displayed on the operation unit. This urges the operator to reorient the document of interest. Specifically, as shown in FIG. 37, for a vertically written document put in a correct top-and-bottom position ($X1 > X2$ and $Y1 > Y2$), a flag a is set in a byte-by-byte memory FLGDIR as an orientation flag (S61); for a horizontally written document put in an inverted top-and-bottom position ($X1 > X2$ and $Y1 \leq Y2$), a flag b is set (S62); for a vertically written document put in an inverted position ($X1 \leq X2$ and $Y1 > Y2$), a flag c is set (S63); for a horizontally written document put in a correct position ($X1 \leq X2$ and $Y1 \leq Y2$), a flag d is set (S64). FIG. 38 shows the bit arrangement of the memory FLGDIR in which a, b, c and d are 01H, 02H, 04H and 08H, respectively.

Figure 39:
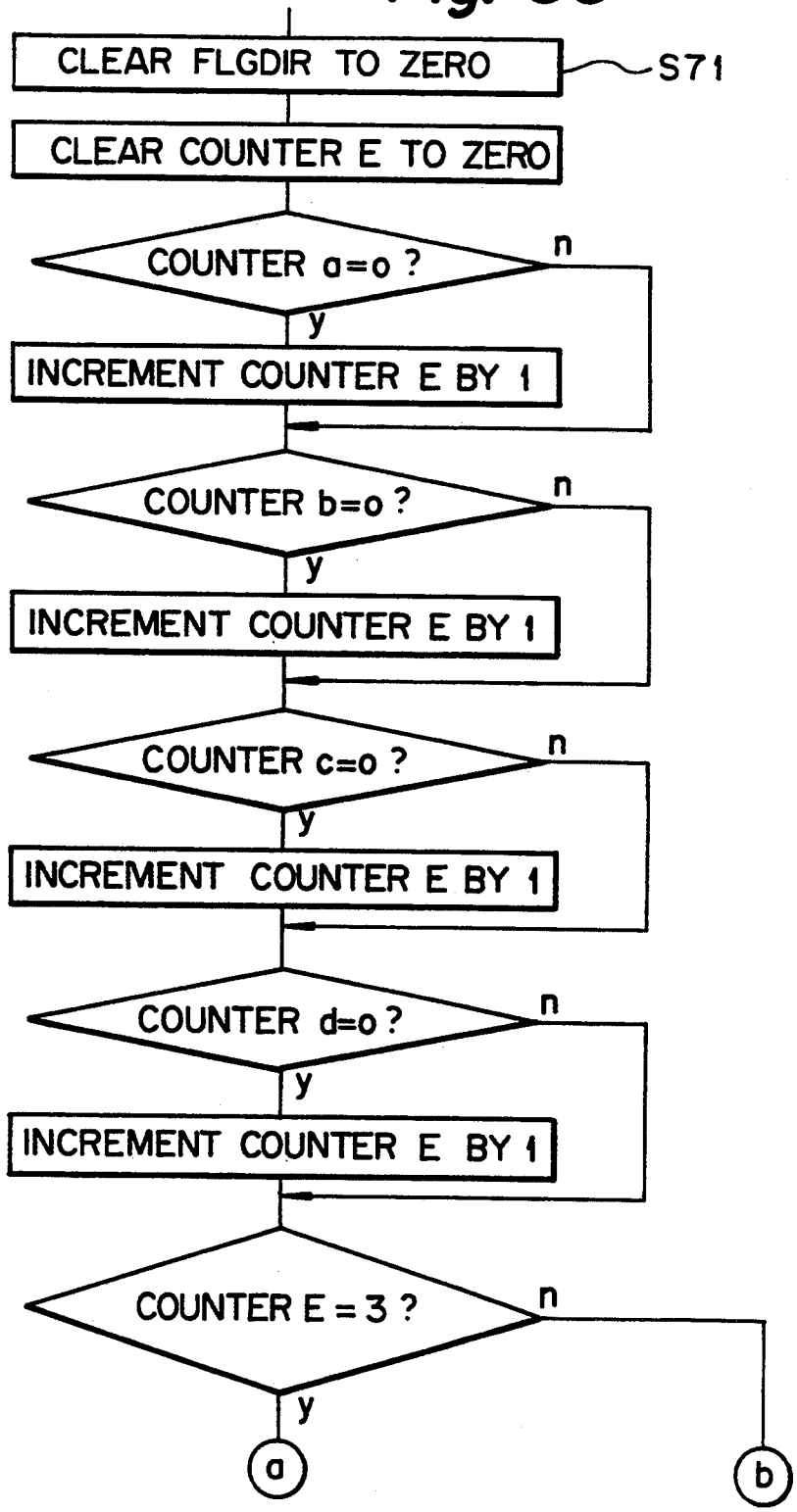
FIG. 39 is a flowchart showing a copy interruption and warning display procedure.
Figure 40:
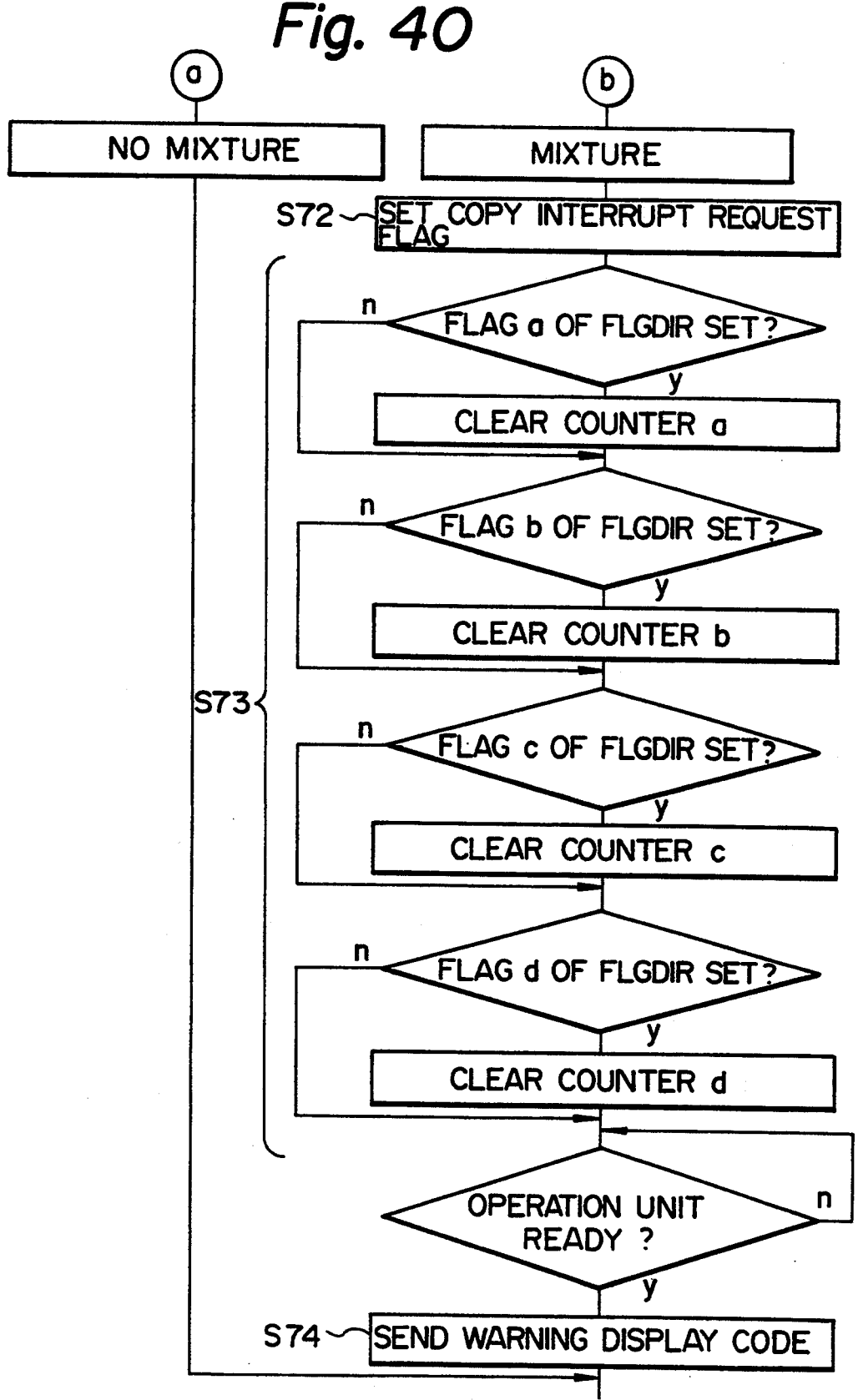
FIG. 40 is a flowchart showing another copy interruption and warning display procedure.
Figure 41:
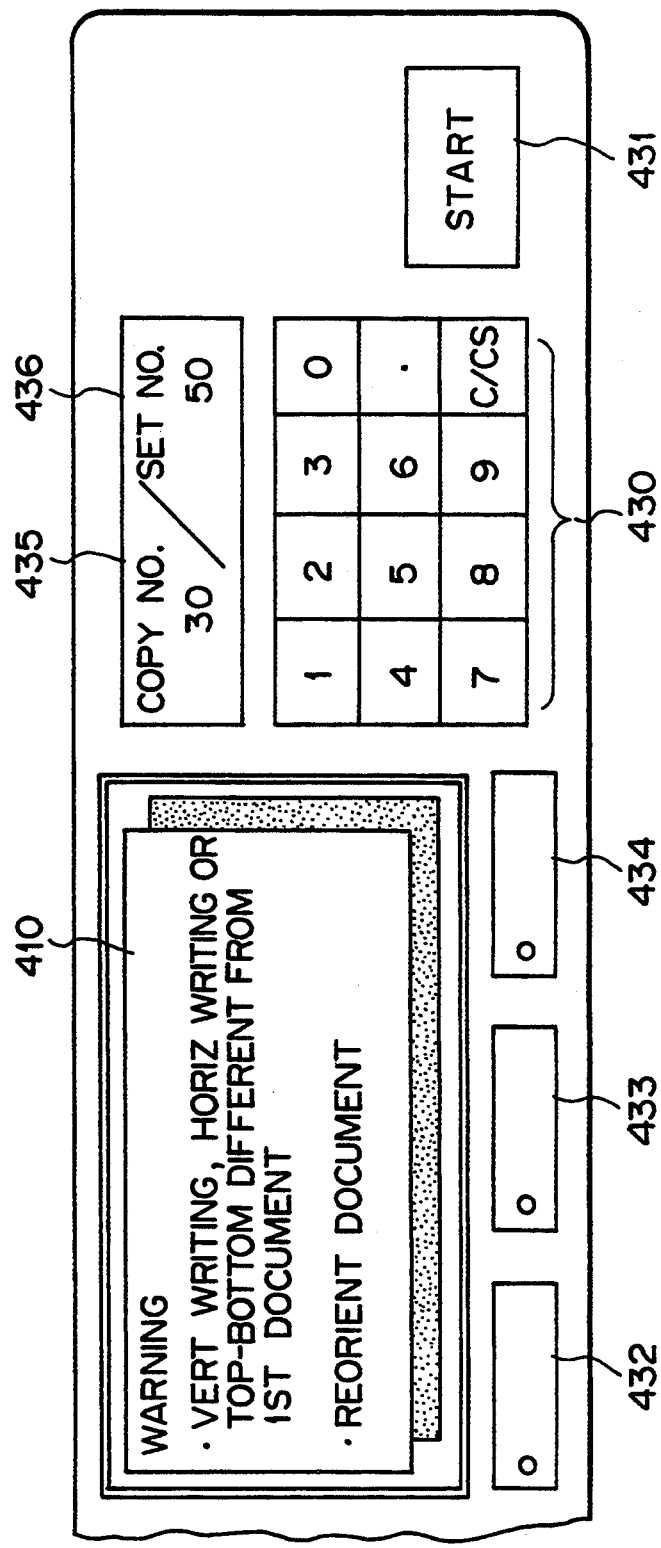
FIG. 41 is a plan view showing a specific condition of the operation and display section.

A copy interruption and warning display procedure will be described with reference to FIGS. 39 and 40. The routine shown in these figures is executed when each document is scanned for the first time. As shown, the flag FLGDIR is cleared (S71). This is followed by the same sequence of steps as in FIG. 34 except for the following. When a document of different orientation is found, a copy interrupt request flag is set (S72). Then, the copy sequence control interrupts the storage of a new document image in the memory, sheet feed and so forth and starts on a copy interrupt sequence. In a step S73, a particular image orientation counter matching the flag set in the direction flag FLGDIR is cleared. For example, when the flag c is set, an image direction counter c is cleared. This is to validate this flow for the next document also. In a step S74, if the operation unit is ready to receive a code, a warning display code is sent thereto for displaying a warning. A specific alert message to appear in this condition is shown in FIG. 41.

As stated above, on detecting a document different in orientation from the first document, the program interrupts the copying operation and alerts the operator to such a document, thereby positioning all the copies in the same orientation. Assume that the operator punches, staples or otherwise binds a stack of copies without noticing that some of the copies are different in orientation from the first one. Then, such copies will be missing in the resulting bound set. To eliminate this occurrence, the embodiment automatically informs the operator of the mixture of copies of different orientations and urges him to rearrange them in the same orientation.

3.1.4.3 Disagreement of Margin

Assume an image forming apparatus of the type determining the orientation of an image of each of multiple documents by detecting margins and determining, based on the detected orientations, whether or not any of the documents is different in orientation from the first document. When a document different in orientation from the first document is detected, a message alerting the operator to such a document is displayed and/or a recovery procedure in the orientation NG condition is executed to uniformize the orientations, e.g., the image is rotated (inverted in the memory) or the document is reversely scanned.

Figure 42:
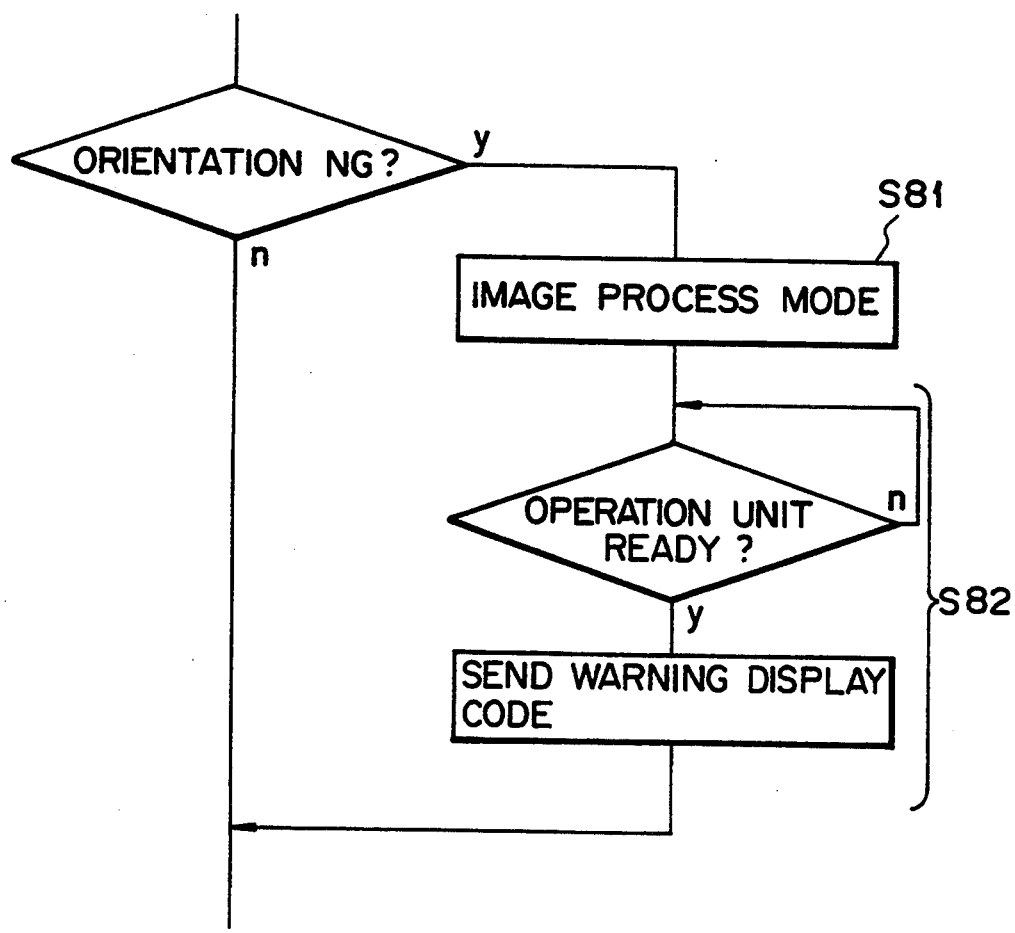
FIG. 42 is a flowchart showing a procedure for rotating an image by image processing.
Figure 43:
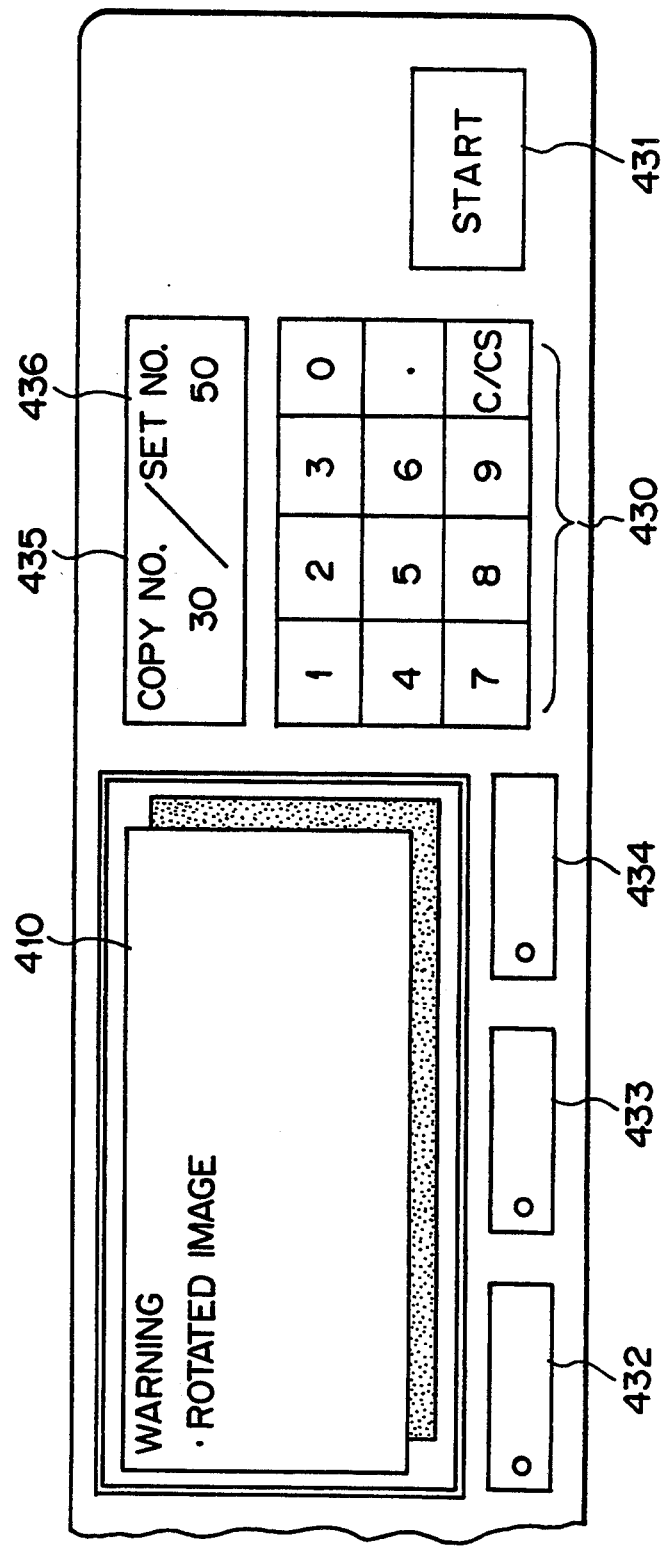
FIG. 43 is a plan view of a specific condition of the operation and display section.

Specifically, FIG. 42 shows a procedure in which image rotation is executed by image processing. As shown, when a document of different orientation is detected on the basis of the greatest margin, an image process mode is executed (S81). This is followed by a step S82 in which, if the operation unit is ready to receive a code, a warning display code is sent thereto to urge the operator to acknowledge the image processing. A specific message is shown in FIG. 43.

Figure 44:
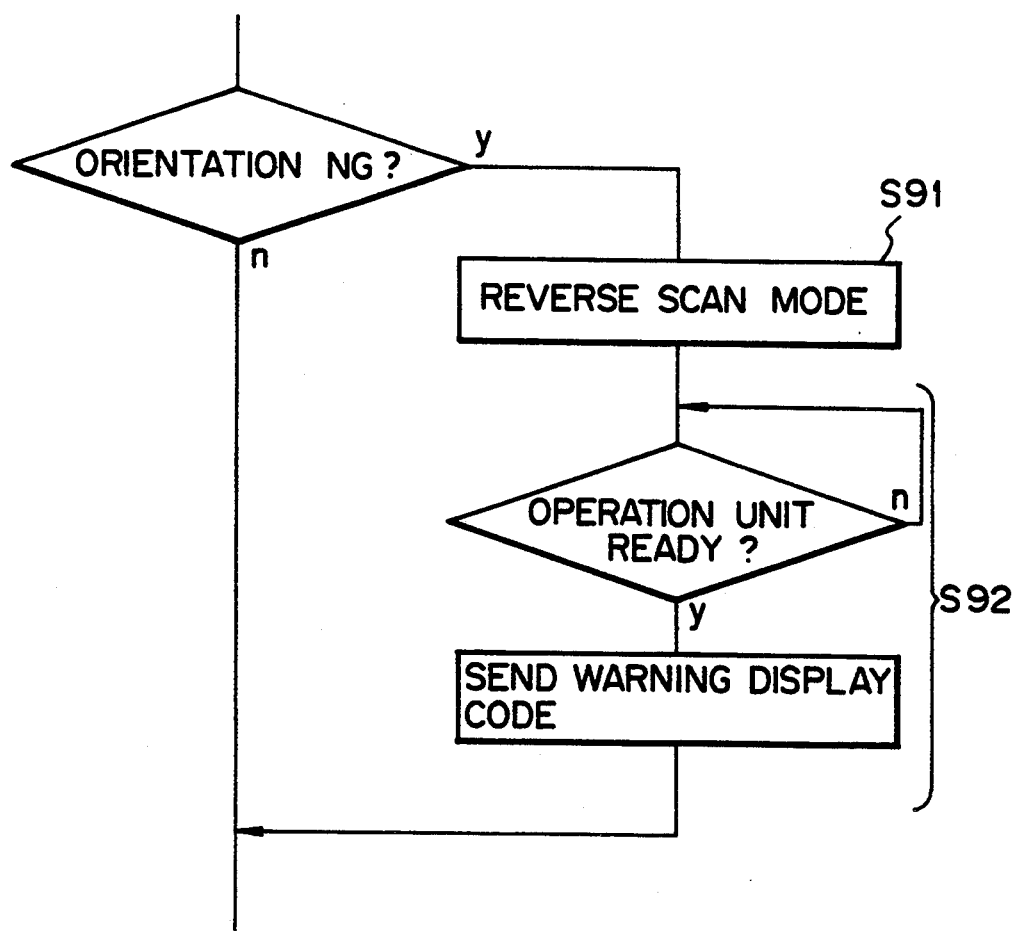
FIG. 44 is a flowchart showing a reverse scanning procedure.
Figure 45:
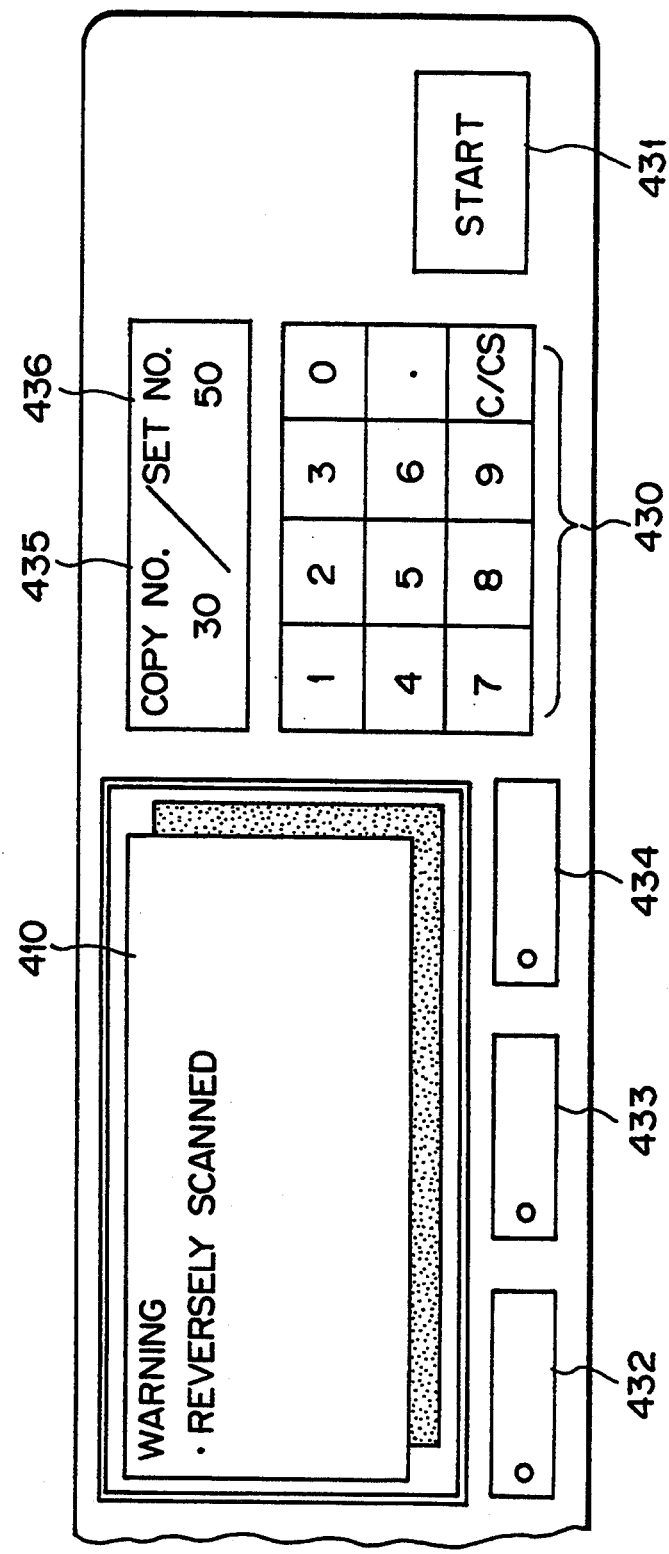
FIG. 45 shows a specific condition of the operation and display section.

FIG. 44 shows an alternative procedure in which the document is reversely scanned. As shown, when a document of different orientation is detected on the basis of the margins, a reverse scan mode is executed for correcting the orientation of the image of the document (S91). Then, in a step S92, if the operation unit is ready to receive a code, a warning display code is sent thereto to urge the operator to acknowledge the image processing. A specific message is shown in FIG. 45. Of course, the procedures shown in FIGS. 42 and 44 are applicable to two-sided image formation (two-sided copy).

3.1.5 Unidentifiable Orientation

3.1.5.1 Forming Image in Predetermined Orientation and Displaying Warning

Assume an image forming apparatus of the type determining the orientation of an image of each of multiple documents by detecting margins and determining, based on the detected orientations, whether or not any of the documents is different in orientation from the first document. When the orientation of any of the documents cannot be identified, an image is formed in a predetermined direction. At the same time, a warning is displayed on the operation unit to show the operator that an unidentifiable document and a copy thereof exist in the stack of documents and the stack of copies, respectively. How to determine a document orientation on the basis of the margins X1, X2, Y1 and Y2, FIGS. 28A-28C, will be described first.

Figure 46:
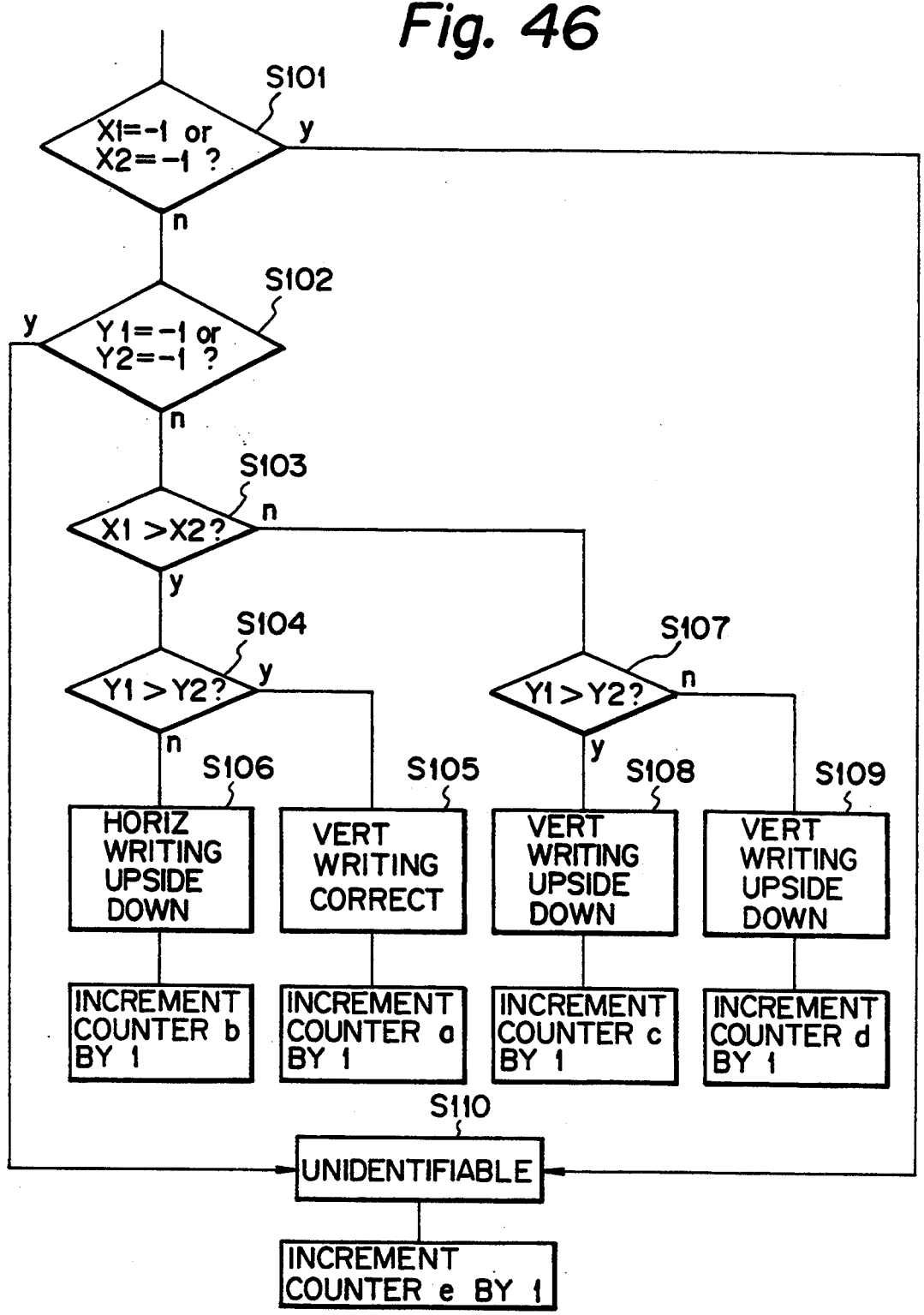
FIG. 46 is a flowchart showing a procedure for determining a document orientation on the basis of the marks of a document.

Referring to FIG. 46, when any one of X1, X2, Y1 and Y2 cannot be identified, a counter is set to "−1". In steps S101 and S102, whether or not X1, X2, Y1 and Y2 have been identified is determined. If the answer of the step S101 or S102 is positive, it is determined that the image orientation is not identifiable (S110); if otherwise, the program advances to a step S103 for comparing X1 and X2. If X1 is greater than X2, Y1 and Y2 are compared (S104). If Y1 is greater than Y2, the document is determined to be vertically written and correctly positioned in the top-and-bottom direction. If the answer of the step S104 is negative, the document is determined to be horizontally written and positioned upside down (S106). If the answer of the step S103 is negative, Y1 and Y2 are compared (S107). If Y1 is greater than Y2, the document is determined to be vertically written and positioned upside down (S108); if otherwise, it is determined to be horizontally written and correctly positioned in the top-and-bottom position (S109). The so identified images are shown in FIGS. 31A-31D. Specifically, FIGS. 31A-31D correspond to the steps S109, S108, S106, and S105, respectively. Each of such image conditions is counted up document by document. For this purpose, use is made of document counters a, b, c, d and e responsive to, respectively, vertically written correctly positioned documents, horizontally written upside-down documents, horizontally written upside-down documents, horizontally written correctly positioned documents, and unidentifiable documents. The contents of the counters a–e are used to determine whether or not the multiple documents include ones of different orientations and whether or not any of the documents is unidentifiable in orientation, as will be described with reference to FIGS. 48 and 49.

Figure 48:
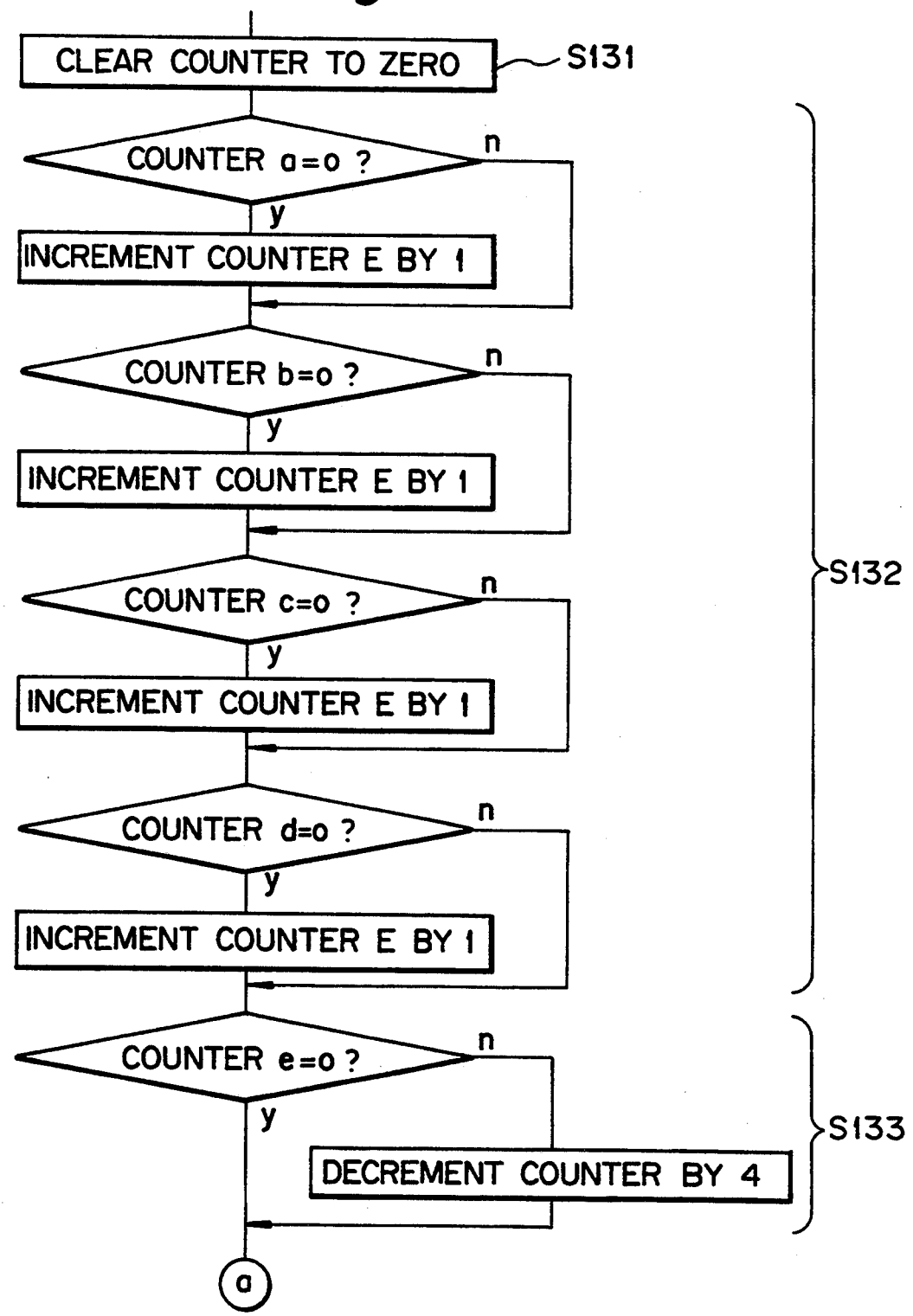
FIG. 48 is a flowchart showing a procedure for determining whether or not a document of different orientation exists in a stack of documents to be handled by a single job and whether or not a document whose image orientation is unidentifiable exists.
Figure 49:
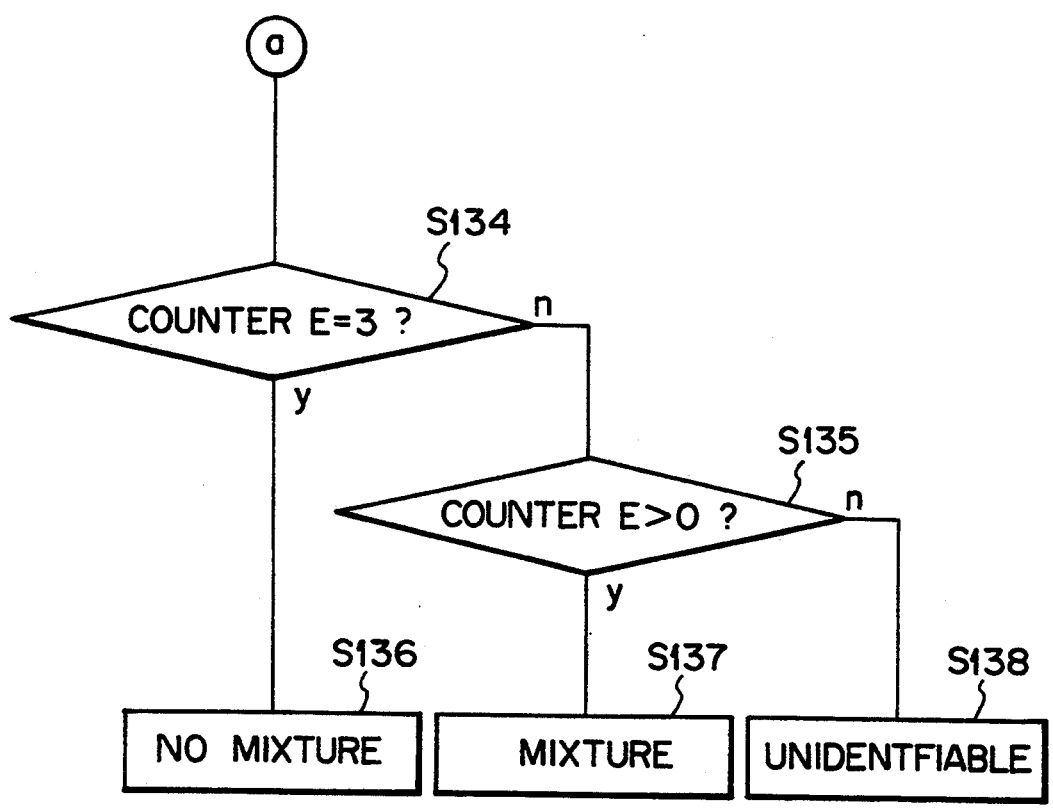
FIG. 49 is a flowchart similar to the flowchart of FIG. 48.

As shown in FIG. 48, the procedure begins with clearing an orientation counter E for counting the orientations of documents (S131). In the following step S132, whether or not the counters a–d are zero is determined one by one. If any one of the counter is zero, the orientation counter E is incremented by 1. In a step S133, whether or not the counter e responsive to unidentifiable documents is zero is determined; if it is not zero, the orientation counter E is decremented by 4. As shown in FIG. 49, in a step S134, whether or not the orientation counter E is 3 is determined. If the answer of the step S134 is positive, it is determined that all the documents are identical in orientation, i.e., documents of different orientations do not exist in the multiple documents to be handled in a single job (S136). If the orientation counter E is not 3, it is determined that the multiple documents include one or ones of different orientation or include unidentifiable one or ones. This is followed by a step S135 for determining whether or not the orientation counter E is greater than zero. If the counter E is greater than zero, it is determined that the documents include one or ones of different orientation (S137); if otherwise, it is determined that they include one or ones whose orientation cannot be identified (S138).

Figure 47:
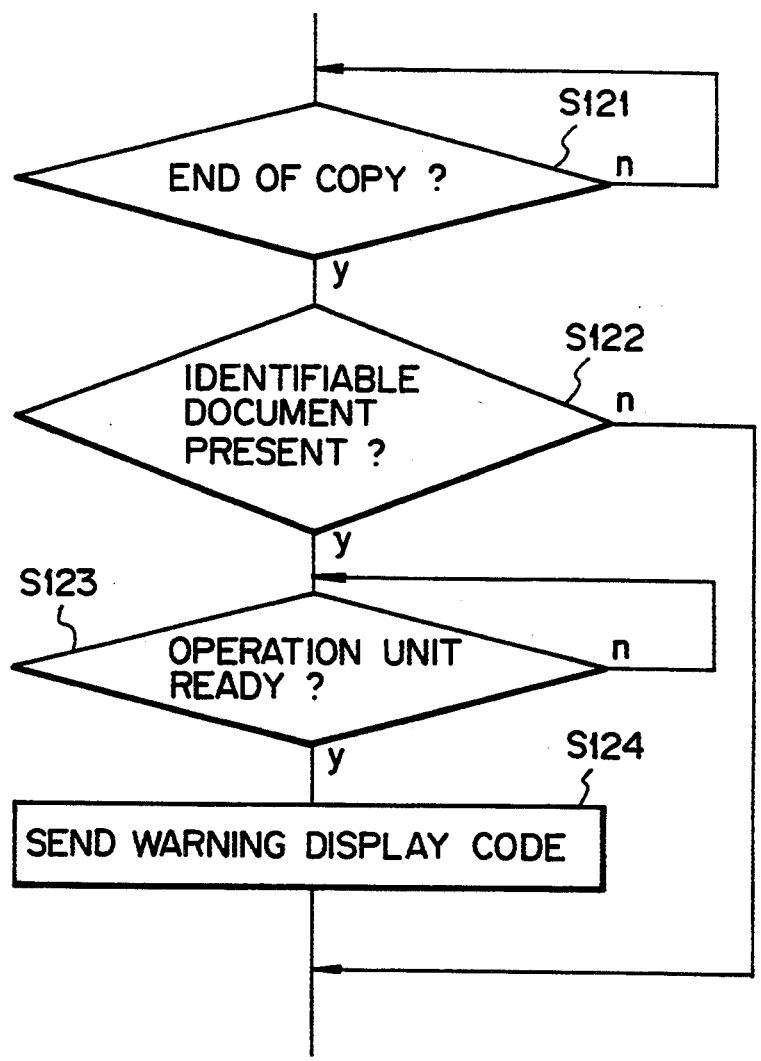
FIG. 47 is a flowchart showing a warning display procedure to be executed when an image orientation is unidentifiable.
Figure 50:
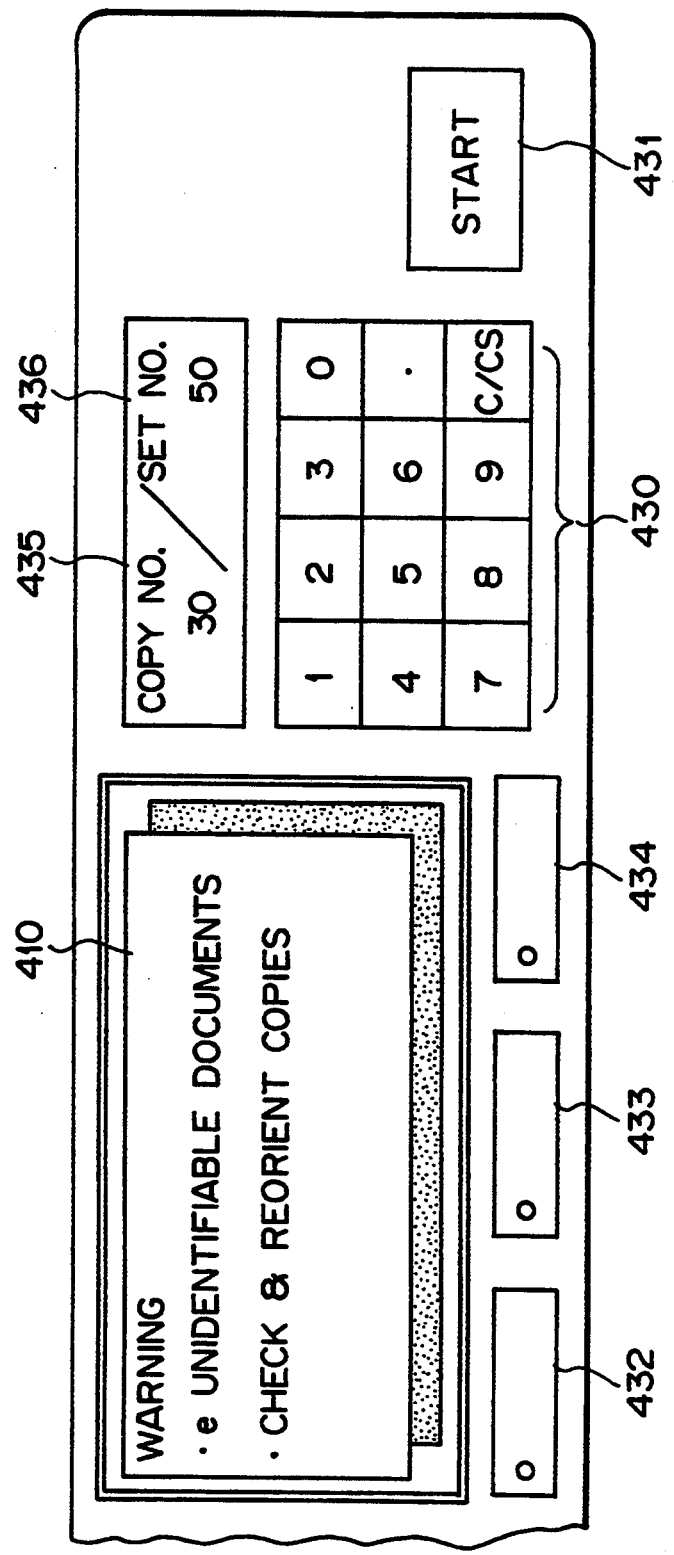
FIG. 50 is a plan view of a specific condition of the operation and display section.

As shown in FIG. 47, when any one of the documents is unidentifiable in orientation as determined in the step S121 or S122 of FIG. 46, an image is formed in a predetermined direction. After all the documents have been copied and only if the CPU of the operation unit is ready to receive a code (y, S123), a display request code is sent to the CPU for displaying a warning (S124). The number of unidentifiable documents is known by the counter e. FIG. 50 shows an example of the warning. This is also successful in alerting the operator to the presence of unidentifiable documents and, therefore, in eliminating missing pages.

3.1.5.2 Forming Image in Identified Reference Orientation and Displaying Warning Assume an image forming apparatus of the type determining the orientation of an image by detecting margins thereof, using the resulting data as data representative of a reference image orientation. determining whether or not each document image orientation differs from the reference orientation, and thereby uniformizing the orientations. When the orientation of an image printed on a reference page cannot be identified, the next page is determined to be a reference page and used to uniformize the orientations. A warning is displayed on the operation unit to alert the operator to the presence of the unidentifiable document and a copy thereof.

Figure 51:
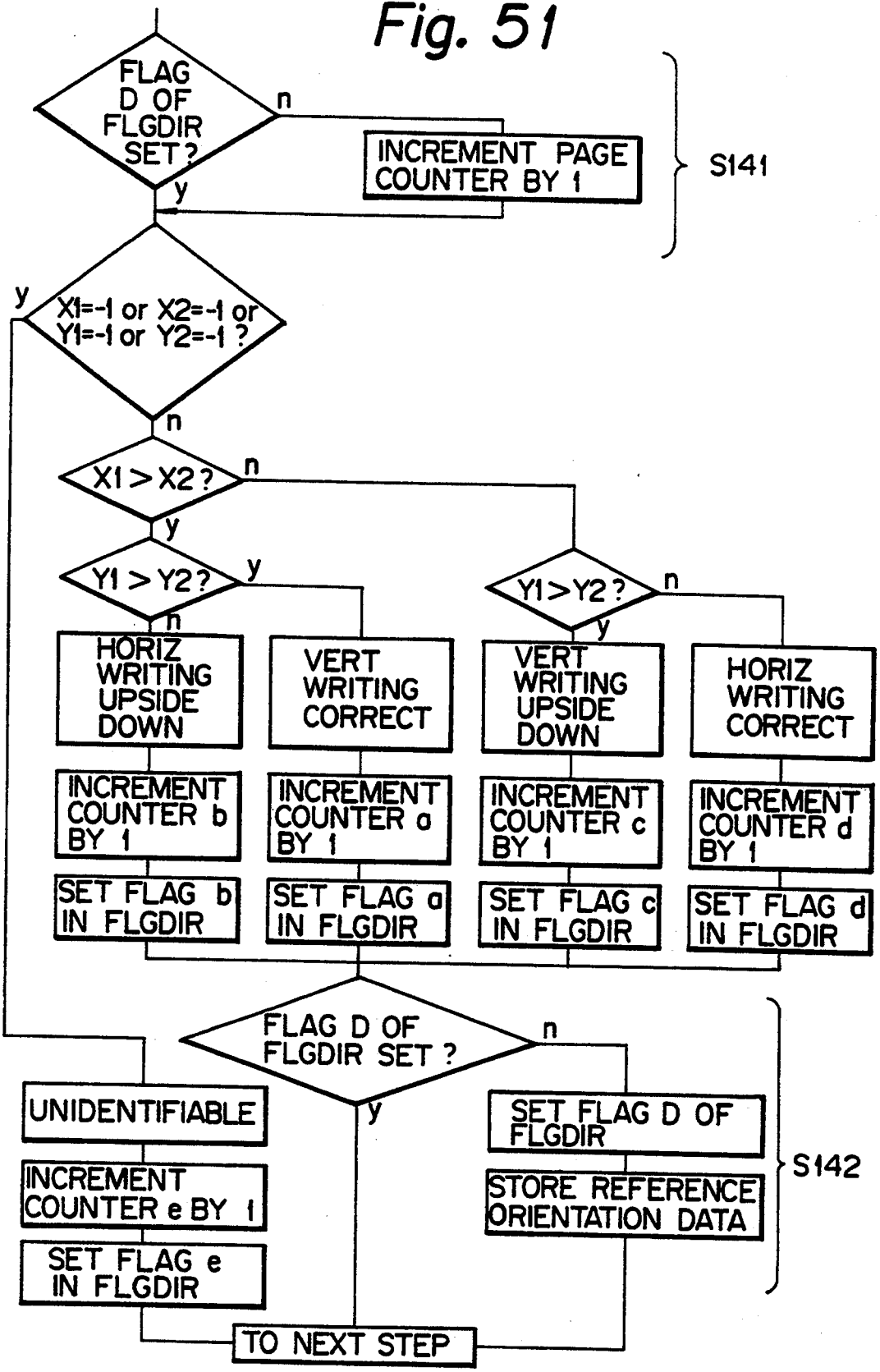
FIG. 51 is a flowchart showing a control procedure for matching an image orientation to an identified reference image orientation.
Figure 52:
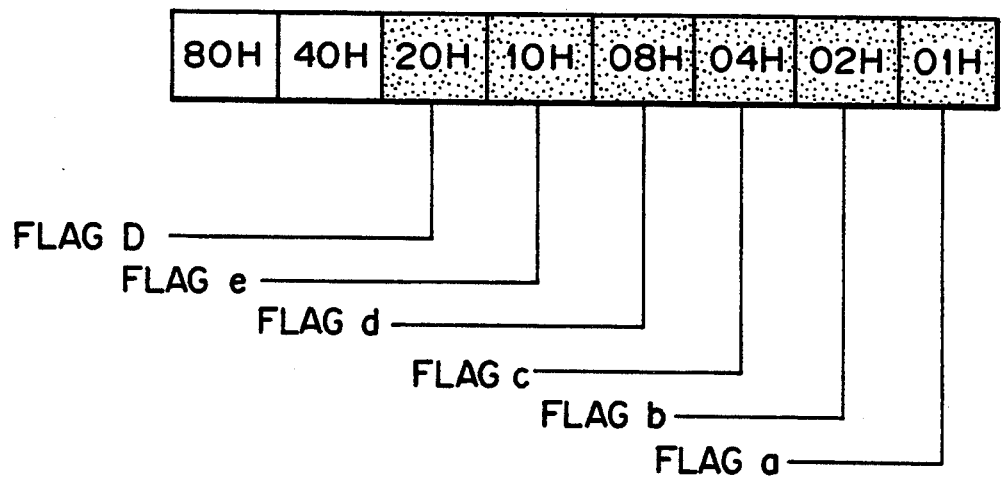
FIG. 52 shows a specific bit configuration of a memory for a flag to be used in the processing of FIG. 51.
Figure 53:
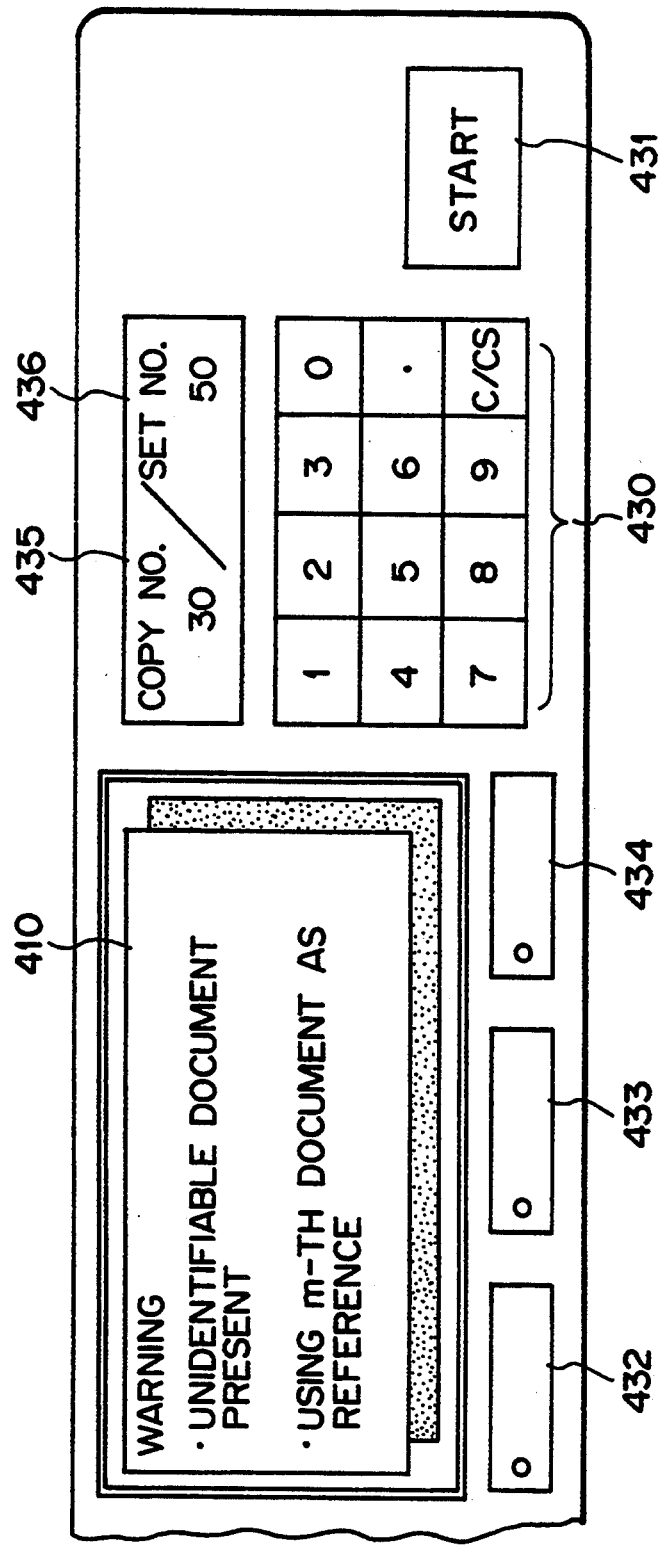
FIG. 53 is a plan view showing a specific condition of the operation and display section.

Specifically, as shown in FIG. 51, the page number of a reference document is determined in a step S141. A flag D of the FLGDIR and a page counter m are cleared before the first document is scanned. When the first document is read, the flag D is reset and, therefore, the page counter m is incremented by 1. The next step to a step immediately preceding a step S142 are the same as the steps shown in FIG. 54. For a vertically written and correctly positioned document, the flag a is set in the byte-by-byte memory FLGDIR as an orientation flag. Likewise, for a horizontally written upside down document, a vertically written upside down document, and a horizontally written correctly positioned document, the flags b, c and d are set, respectively. When the orientation of a document is identified, the program advances to a step S142. In the step S142, if the flag D of the FLGDIR is reset, it is set in the memory FLGDIR as data flag so as to store the reference orientation data. If the flag D is set (meaning that reference orientation data has been stored), the program advances to the next step. FIG. 52 shows the bit arrangement of the byte-by-byte memory FLGDIR in which a, b, c, d, e and D are respectively 01H, 02H, 04H, 08H, 10H, and 20H. After all the documents have been copied and only if the CPU of the operation unit is ready to receive a code, a warning display code is sent thereto. At the same time, since the page counter m shows which page is the reference document, the page number of the reference document is displayed. FIG. 53 shows a specific alert message appearing on the operation unit. This allows the operator to notice the presence of an unidentifiable document and thereby eliminates missing pages.

3.1.5.3 Interrupting Image Formation and Displaying Warning

Figure 54:
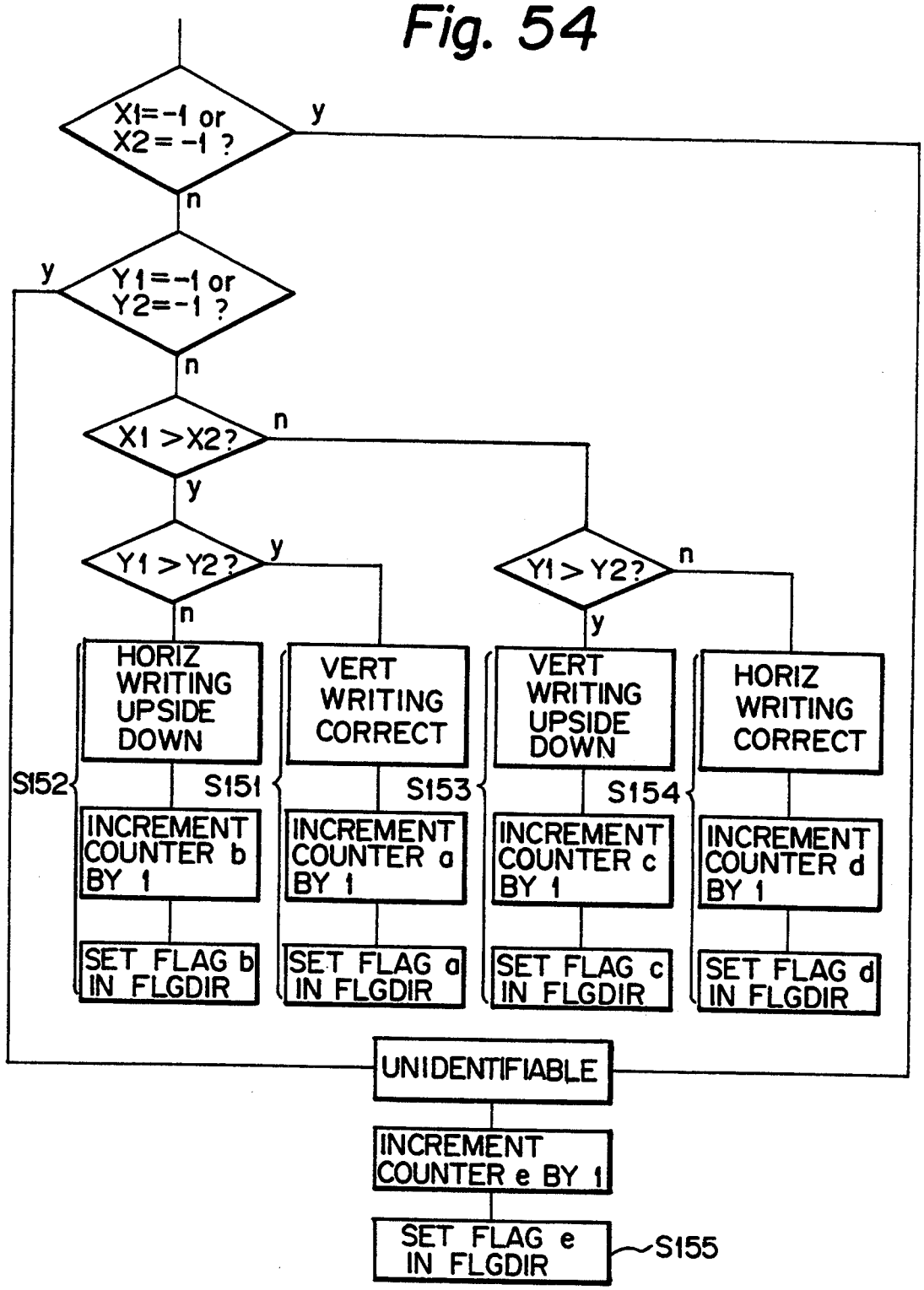
FIG. 54 is a flowchart showing a procedure for determining whether or not an image orientation is unidentifiable.
Figure 55:
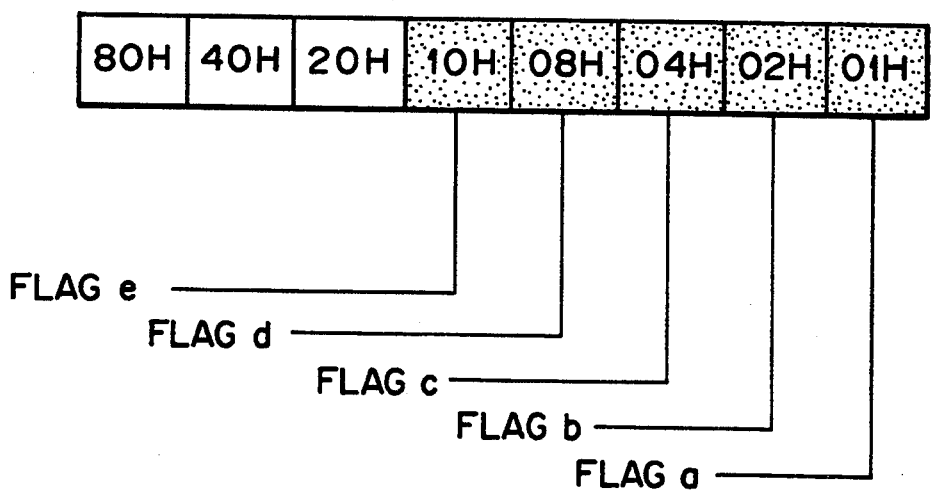
FIG. 55 shows a specific bit arrangement of a memory for a flag to be used in the flowchart of FIG. 54.

Assume an image forming apparatus of the type determining the orientation of an image of each of multiple documents by detecting margins and determining, based on the detected orientations, whether or not any of the copied documents is different in orientation from the first document. When the orientation of any of the documents cannot be identified, the copying operation is interrupted and a warning is displayed on the operation unit. The warning shows the operator that a document whose orientation cannot be identified and a copy thereof exist in the stack of documents and the corresponding stack of copies, respectively, and urges him to reorient the document in question. Specifically, as shown in FIG. 54, for a vertically written correctly positioned document, the flag a is set in the memory FLGDIR (S151); for a horizontally written upside down document, the flag b is set (S152); for a vertically written upside down document, the flag c is set (S153); for a horizontally written correctly positioned document, the flag d is set (S154); and for an unidentifiable document, the flag e is set (S155). FIG. 55 shows the bit arrangement of the memory FLGDIR in which a, b, c, d and e are respectively 01H. 02H, 04H, 08H, and 10H.

Figure 56:
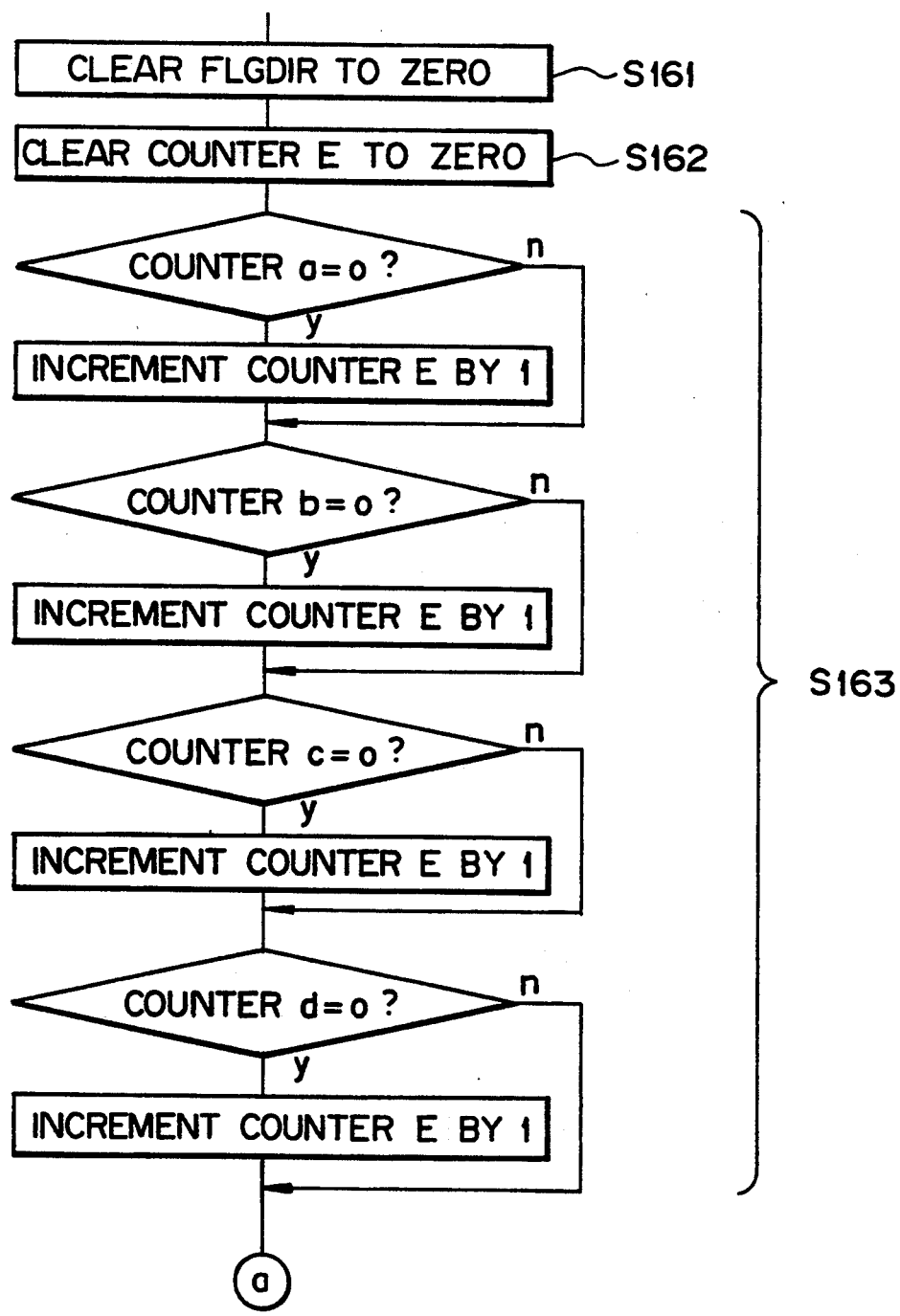
FIGS. 56, 57 and 58 are flowcharts each showing a copy interruption and warning display procedure to be executed when an image orientation is unidentifiable.
Figure 57:
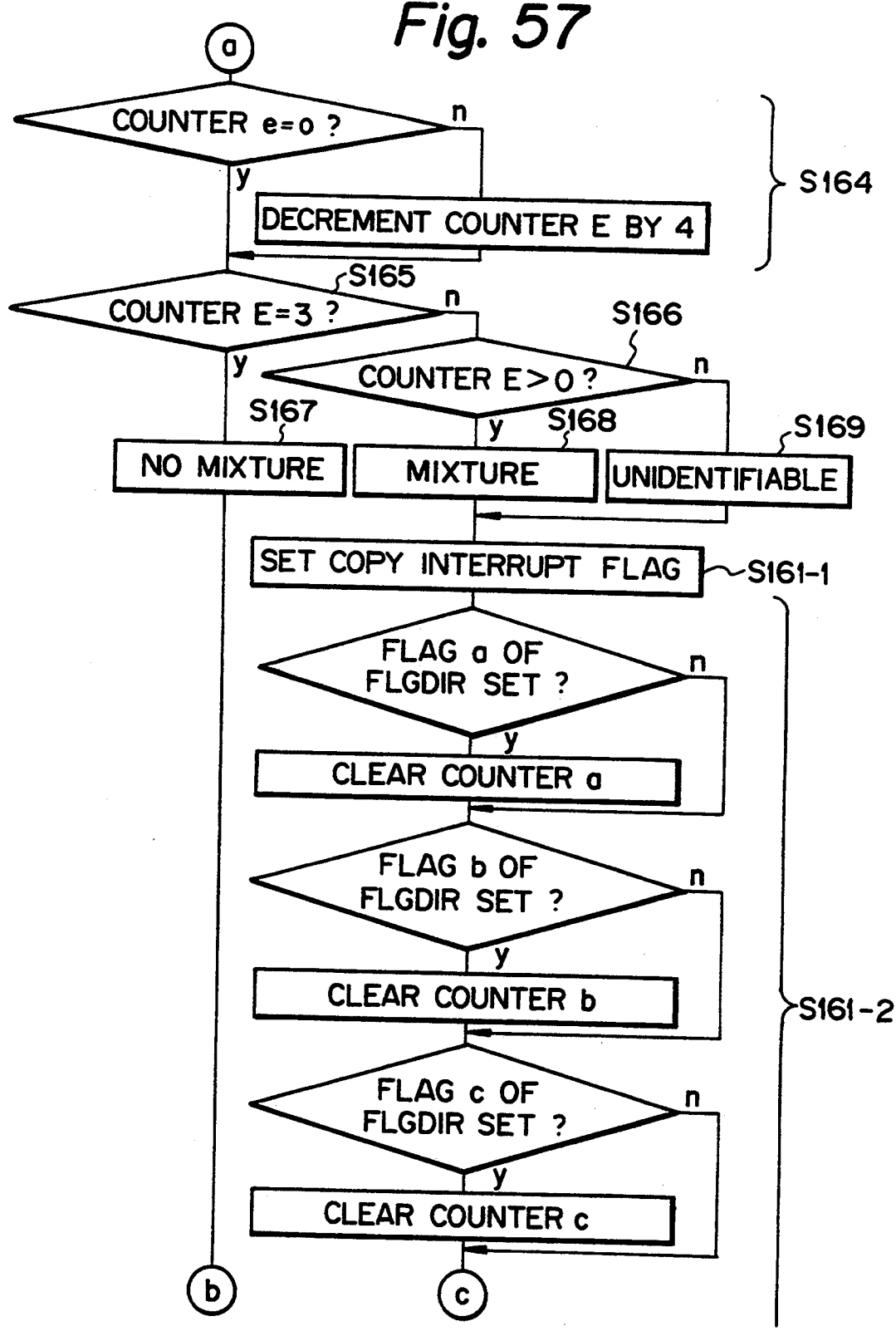
Figure 58:
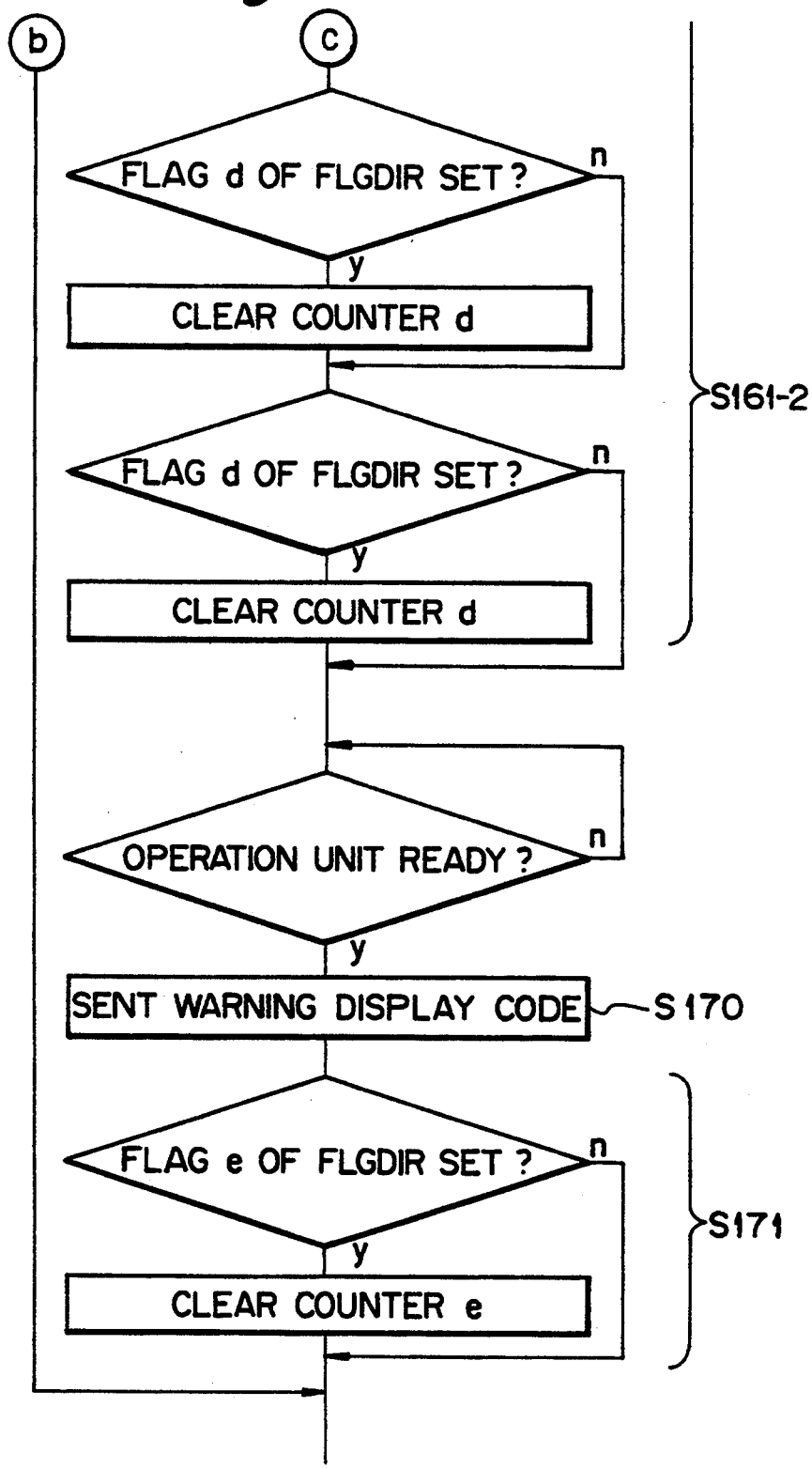
Figure 59:
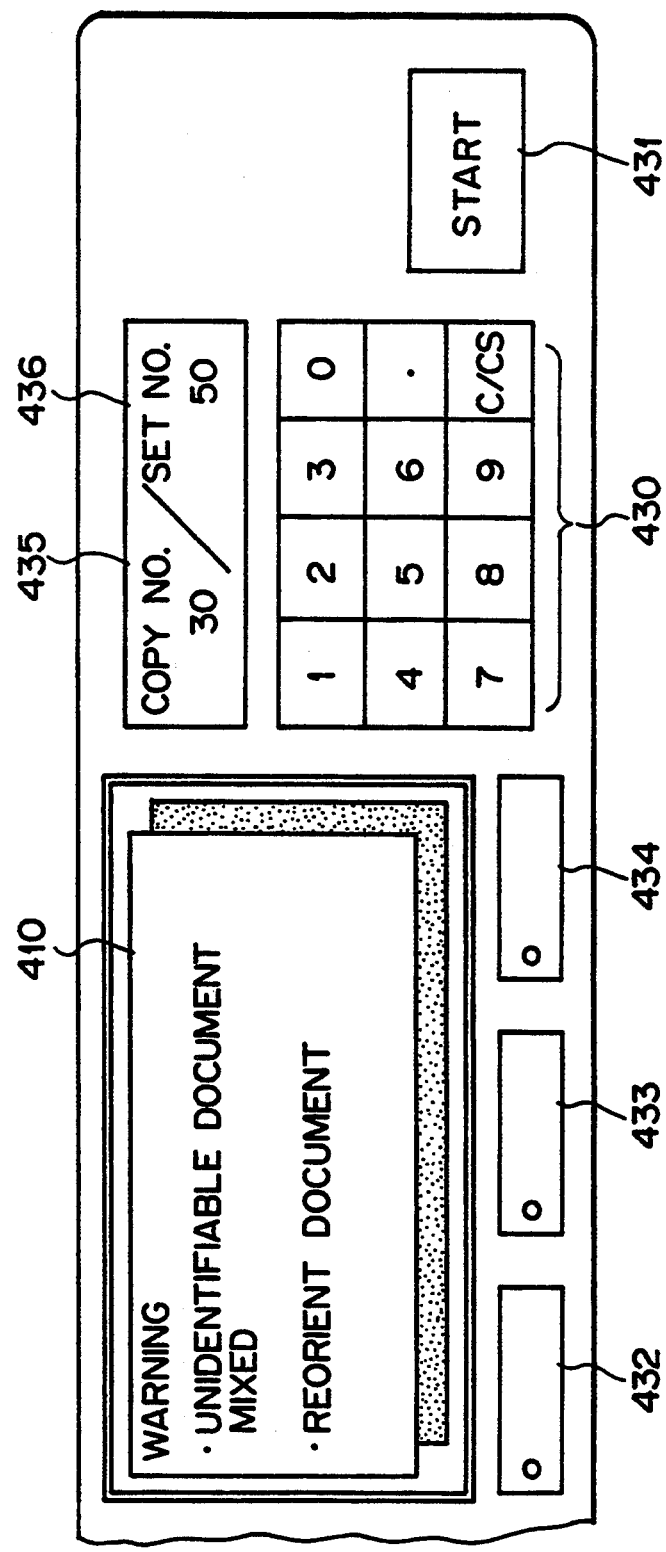
FIG. 59 is a plan view of a specific condition of the operation and display section.

A procedure for interrupting the copying operation and displaying a warning will be described with reference to FIGS. 56–58. The procedure shown in these figures is executed when each document is scanned for the first time. In a step S161, the memory FLGDIR is cleared. This is followed by the same sequence of steps as in FIGS. 48 and 49 except for the following. When a document different in orientation from the first document is detected, a copy interrupt request flag is set (S161-1, FIG. 57). In response, the sequence control stops writing a new document image in the memory and feeding new sheets and starts on a copy interruption sequence. In a step S161-2, FIG. 57, a particular image orientation counter matching the flag set in the FLGDIR is cleared. For example, when the flag c is set in the FLGDIR, the counter c is cleared. This is to validate this procedure for the next document also. Regarding the flag e, the associated counter e is cleared only after the delivery of a warning display code since it is used to display a warning. If the operation unit is ready to receive a code, the warning display code is sent thereto. A specific alert message to appear in this condition is shown in FIG. 59.

3.1.6 Blank Document

Assume an image forming apparatus of the type determining the orientation of an image of each of multiple documents by detecting margins and determining, based on the detected orientations, whether or not any of the documents is different in orientation from the first document. When a document is determined blank, document turning means turns over the document. Then, the document is read again to determine the orientation thereof, as will be described hereinafter specifically.

Figure 1:
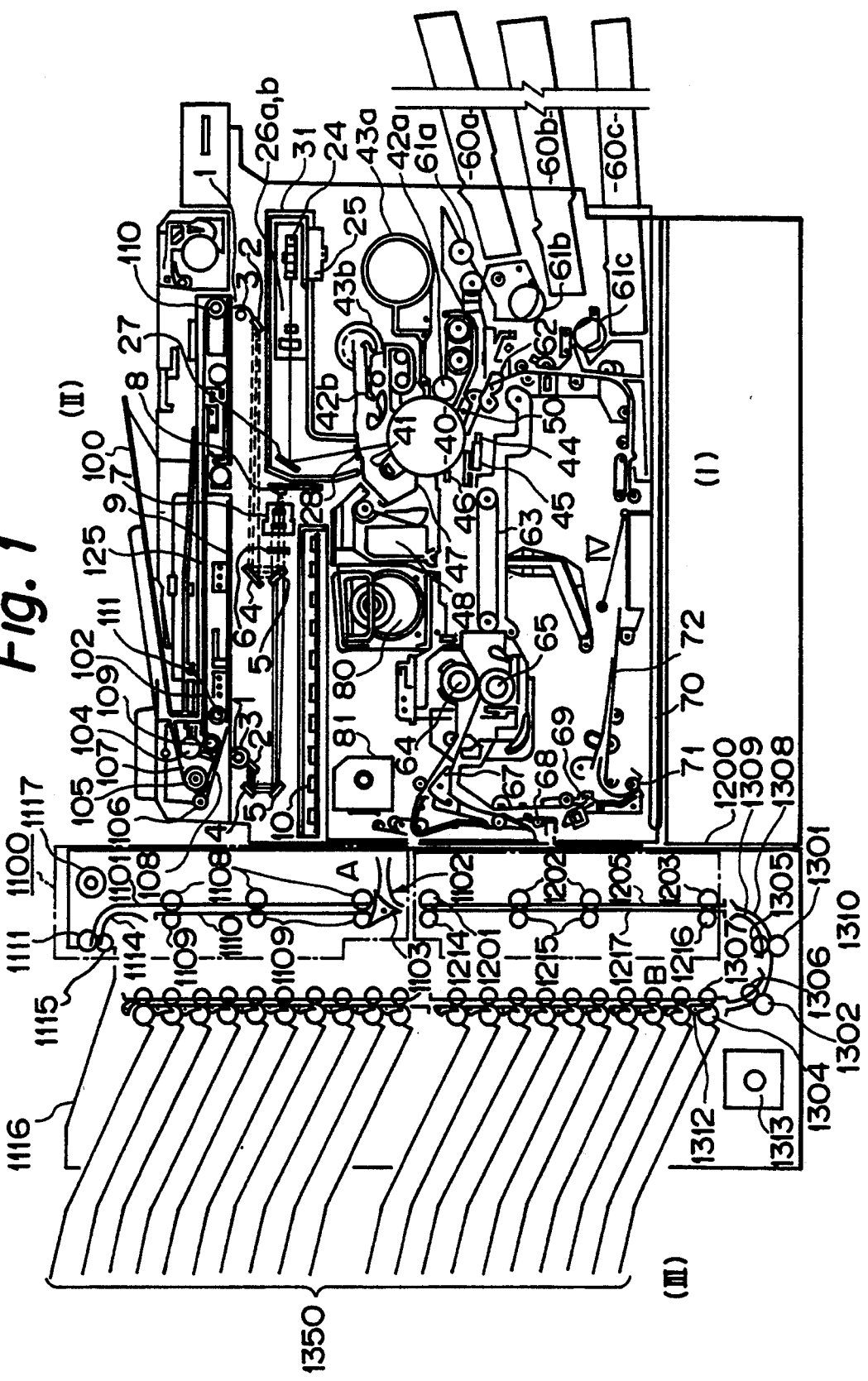
FIG. 1 is a section showing the general construction of a digital copier embodying the present invention.

In the ADF (II) shown in FIG. 1, assume that a signal representative of one whole document does not include image data at all. Then, it is determined that the document is upside down with respect to the front and rear thereof. The ADF does not discharge such a document and, instead, turns it over within the ADF to allow it to be read again by the scanner. If the resulting document data is also blank data, the document of interest is determined blank on both sides thereof and then discharged. At the same time, the image data associated with this document is discarded to prepare for the next document. If the image carried on the other side of the document turned over as mentioned above is of the same orientation as the first document, an ordinary image forming operation is effected on the basis of that image. If otherwise, the image formation is interrupted to urge the operator to check the document or to display a warning. Such an image will be rotated in the memory to uniformize the orientations.

Figure 60:
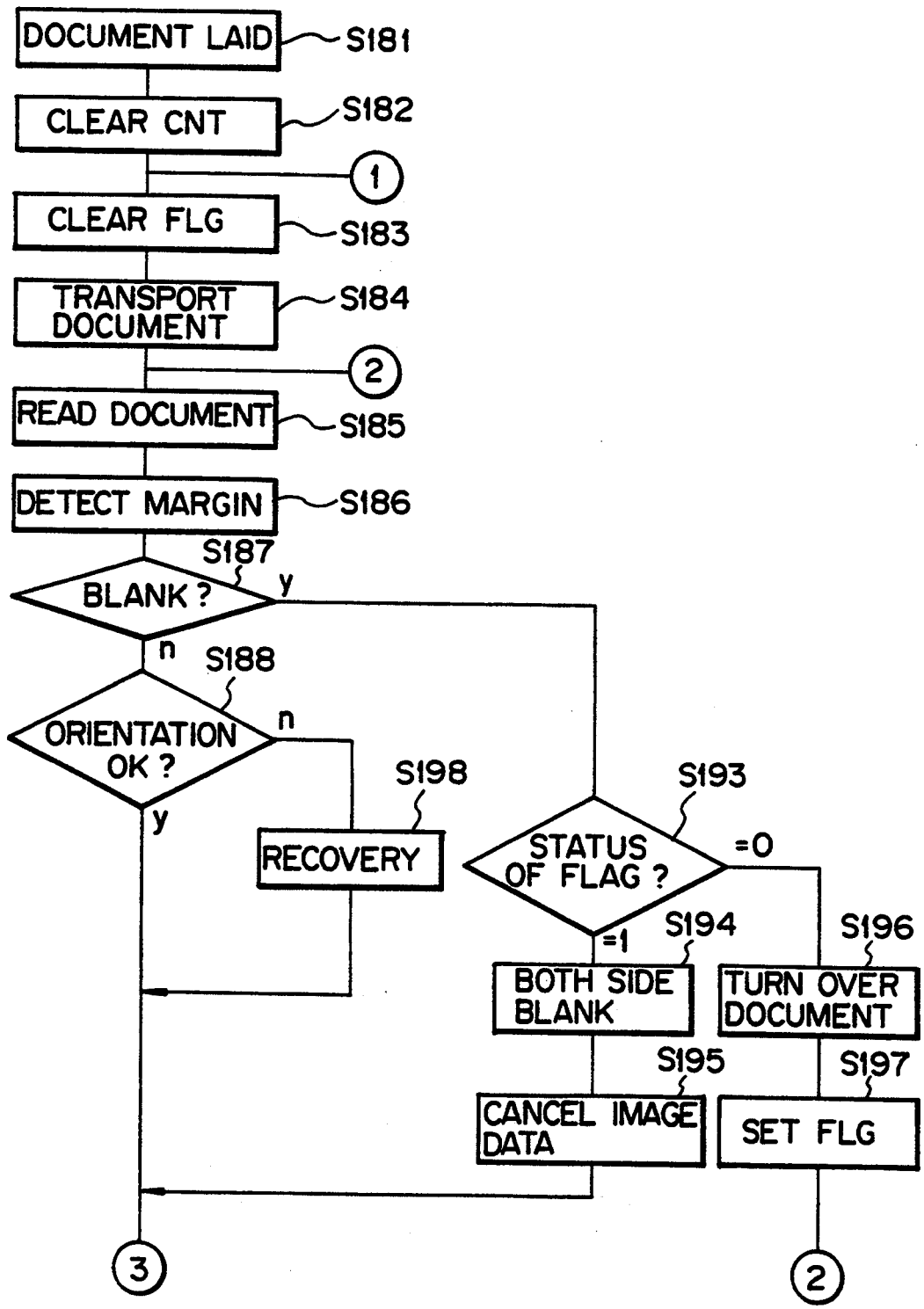
FIGS. 60 and 61 are flowcharts each showing a blank document decision procedure.
Figure 61:
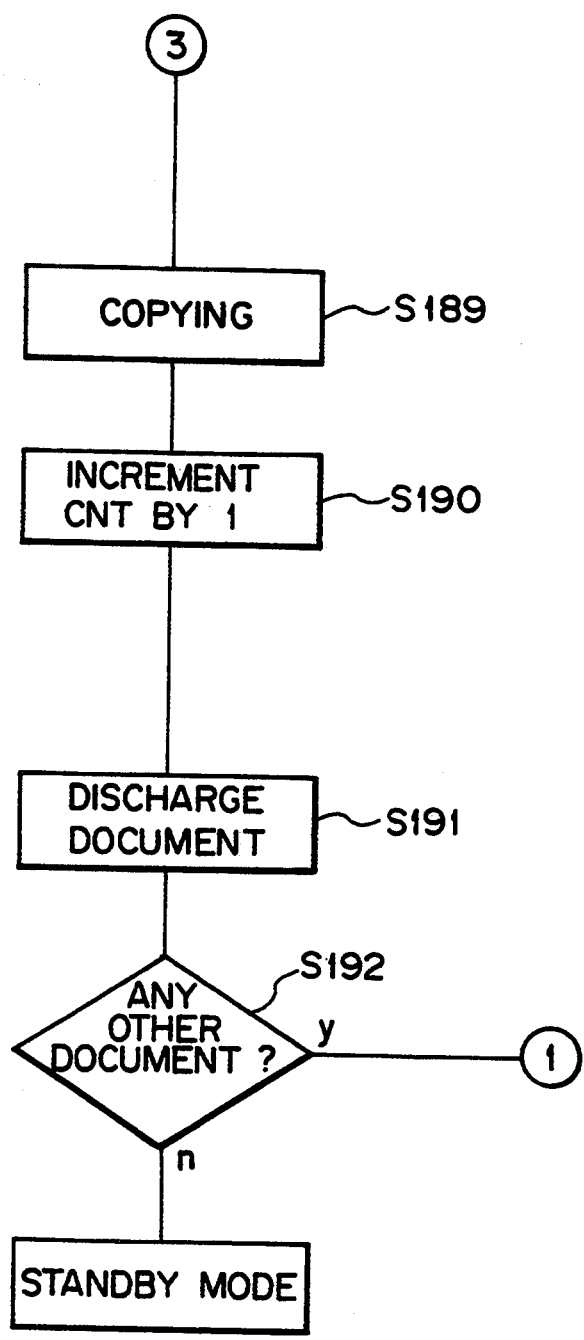

Specifically, as shown in FIGS. 60 and 61, after documents have been set on the table 100 (S181), a document counter CNT is initialized to zero (S182) while a blank document flag is reset (S183). After a single document has been transported to a predetermined position on the glass platen 9 (S183), it is read (S185). Then, the margins of the document are detected on the basis of the resulting image data (S186). Whether or not the document read is blank is determined in a step S187. If the document is not blank, the orientation thereof is determined (S188). If the orientation is correct, the document is copied by the usual operation (S189). Subsequently, the document counter CNT is incremented by 1, and then the document is driven out of the ADF (S191). If any other documents are left on the table 100 as determined in a step S192, the program returns to the step S183; if otherwise, it ends the program and enters into a standby mode.

If the document is blank as determined in the step S187, the status of a document blank flag is determined (S193). If the document blank flag is reset, the program advances to a step S196 for turning over the document and then to a step S197 for setting the flag. Thereafter, the program returns to the step S185 for reading the document again. If the document blank flag FLG is set as determined in the step S193, meaning that both sides of the document are blank, the document is determined to be a demarcation sheet (S194). Then, the image data associated with this document is cancelled (S194). This is followed by the step S189 for copying the document by the usual operation and then by the step S191 for driving it out of the ADF. If any other documents are found in the step S192, the program returns to the step S183. If the document is not correctly oriented as determined in the step S188, a recovery routine (S198) which will be described is executed and followed by the step S189.

The above-mentioned recovery routine (S198) includes the following implementations:
(a) interrupting copying operation and displaying warning on operation unit;
(b) rotating image in memory; and
(c) scanning document in reverse direction.

These implementations will be sequentially described hereinafter.

Figure 62:
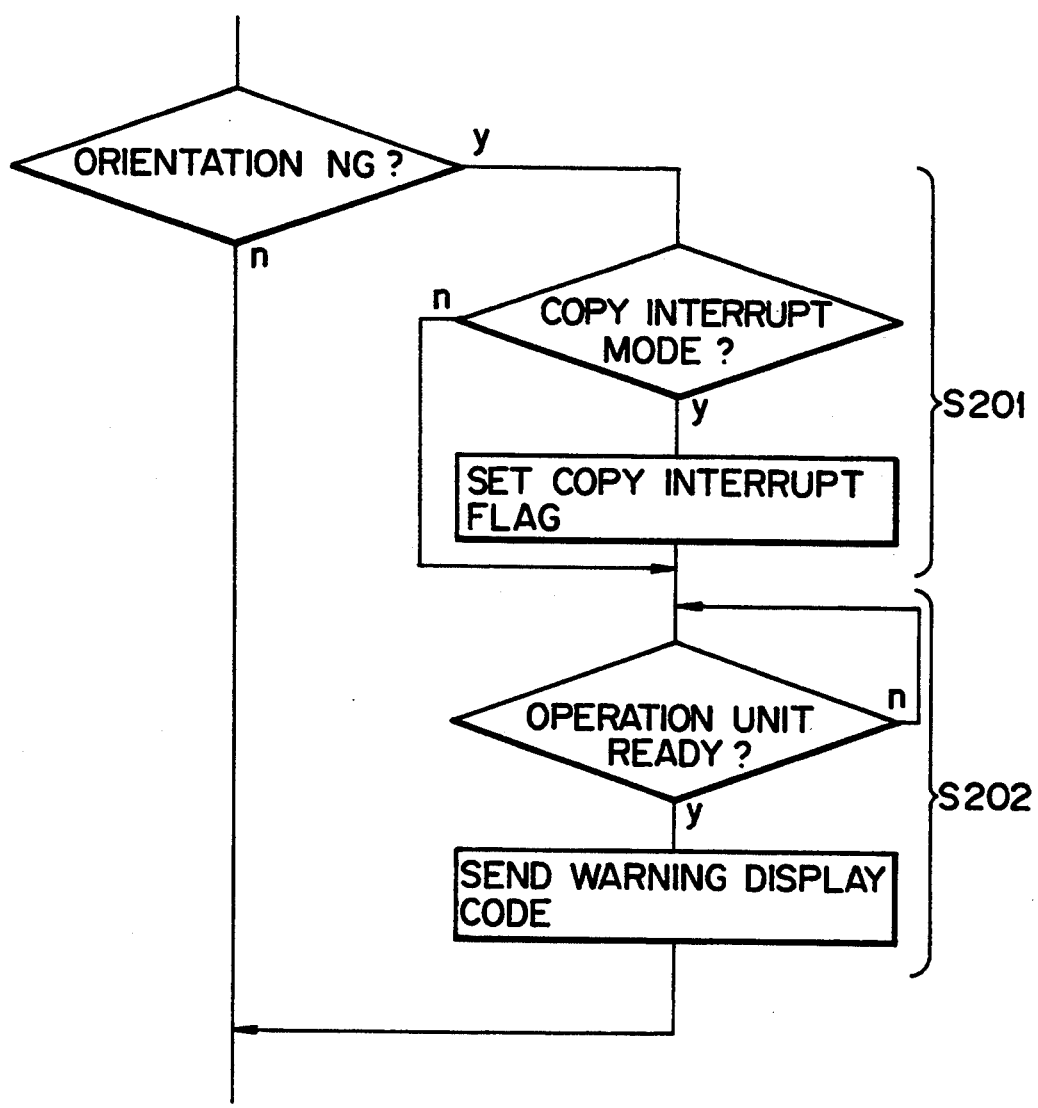
FIG. 62 is a flowchart showing a copy interruption and warning display procedure to be executed when a document is blank.
Figure 63:
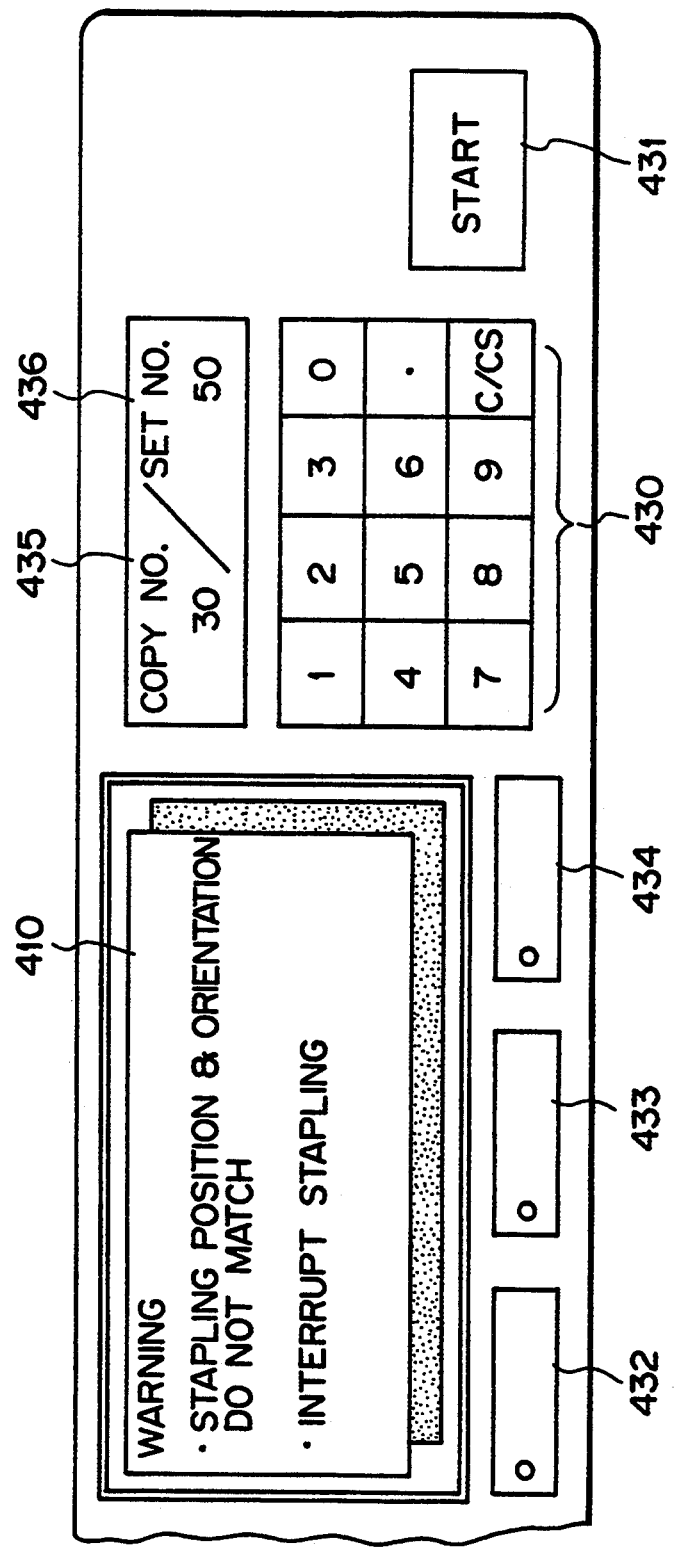
FIG. 63 is a plan view showing a specific condition of the operation and display section.

FIG. 62 shows a procedure for interrupting the copying operation and displaying a warning and which is executed when each document is scanned for the first time. Assume that a ROM built in the copier body stores a command which causes the copying operation to be interrupted when the orientation of the document is not coincident with the reference staple position in a staple mode (copy interrupt mode). Then, a copy interrupt request flag is set (S201). In response, the copy sequence control stops writing a new document image in the memory and feeding new sheets and starts up a copy interruption sequence. If the above-mentioned copy interrupt command is not available, the program executes a step S202, skipping the step S201. In the step S202, if the operation unit is ready to receive a code, a warning display code is sent thereto to display a warning on the LCD 410. A specific message matching this condition is shown in FIG. 63.

How to rotate an image by image processing is exactly the same as in FIG. 42, and the associated warning is identical with the warning shown in FIG. 43. Regarding the reverse scanning of a document, the procedure shown in FIG. 44 and the warning shown in FIG. 45 are effected.

As stated above, whether or not a document is blank is determined and, if it is blank, turned over within the ADF. If the other side of the document is also blank, the document is determined blank on both sides thereof and is not copied. A document positioned face up on the glass platen would lead to missing pages. Moreover, whether or not a document matches the first document in orientation is determined. If the former does not match the latter, it is, for example, scanned in the reverse direction while a message indicative of such a document is displayed. This surely uniformizes the resulting copies in orientation.

3.1.7 Orientation NG (Unable to Be Dealt with by Image Processing When Margin Is Not Coincident)

Assume an image forming apparatus of the type determining the orientation of an image of each of multiple documents by detecting margins and determining, based on the detected orientations, whether or not any of the copied documents is different in orientation from the first document. Further, assume that this type of apparatus lacks a recovery function against a document different in orientation from the first document, i.e., it cannot deal with such a document without the operator's action. Then, the presence of a document in question is reported to the operator by any one of the following specific procedures:

(A-a) When the desired number of sets to be sorted is greater than predetermined one (open to choice), the copying operation is interrupted while a warning is displayed to alert the operator. When a predetermined period of time expires without any operator's action, the copying operation is resumed;

(A-b) When the desired number of sets to be sorted is smaller than the predetermined one, a warning is displayed, but the copying operation is continued;

(B-a) When the human body sensor is in an ON state, the copying operation is interrupted while a warning is displayed to alert the operator. When a predetermined period of time expires without any operator's action, the copying operation is resumed; and (B-b) When the sensor is in an OFF state, a warning is displayed, but the copying operation is continued.

In this manner, when the operator does not take any action despite the warning, the operation is automatically resumed to reduce the dead time of the machine.

Figure 64:
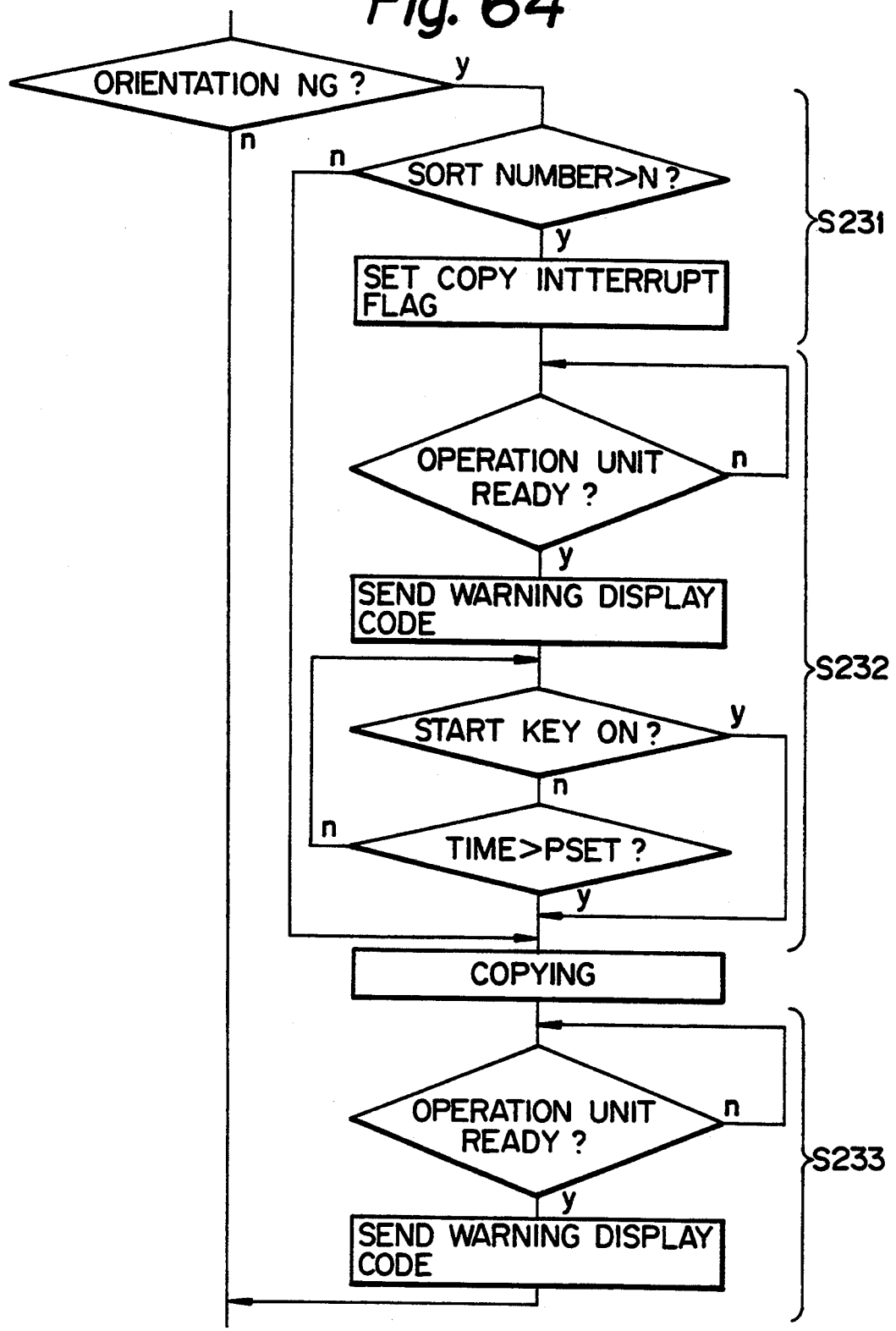
FIG. 64 is a flowchart showing a copying procedure to be executed on the basis of the number of sets of sheets to be sorted.
Figure 65:
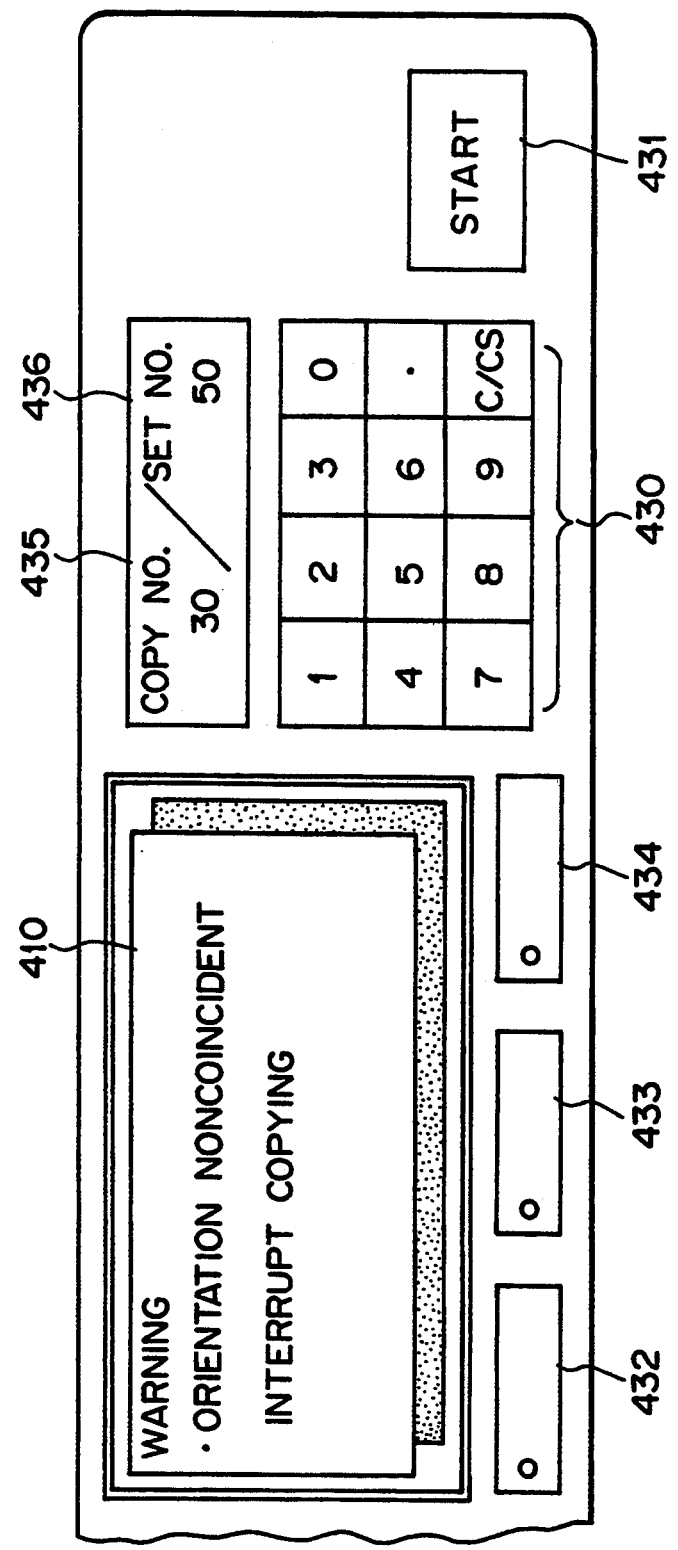
FIGS. 65 and 66 are plan views each showing a specific condition of the operation and display section.
Figure 66:
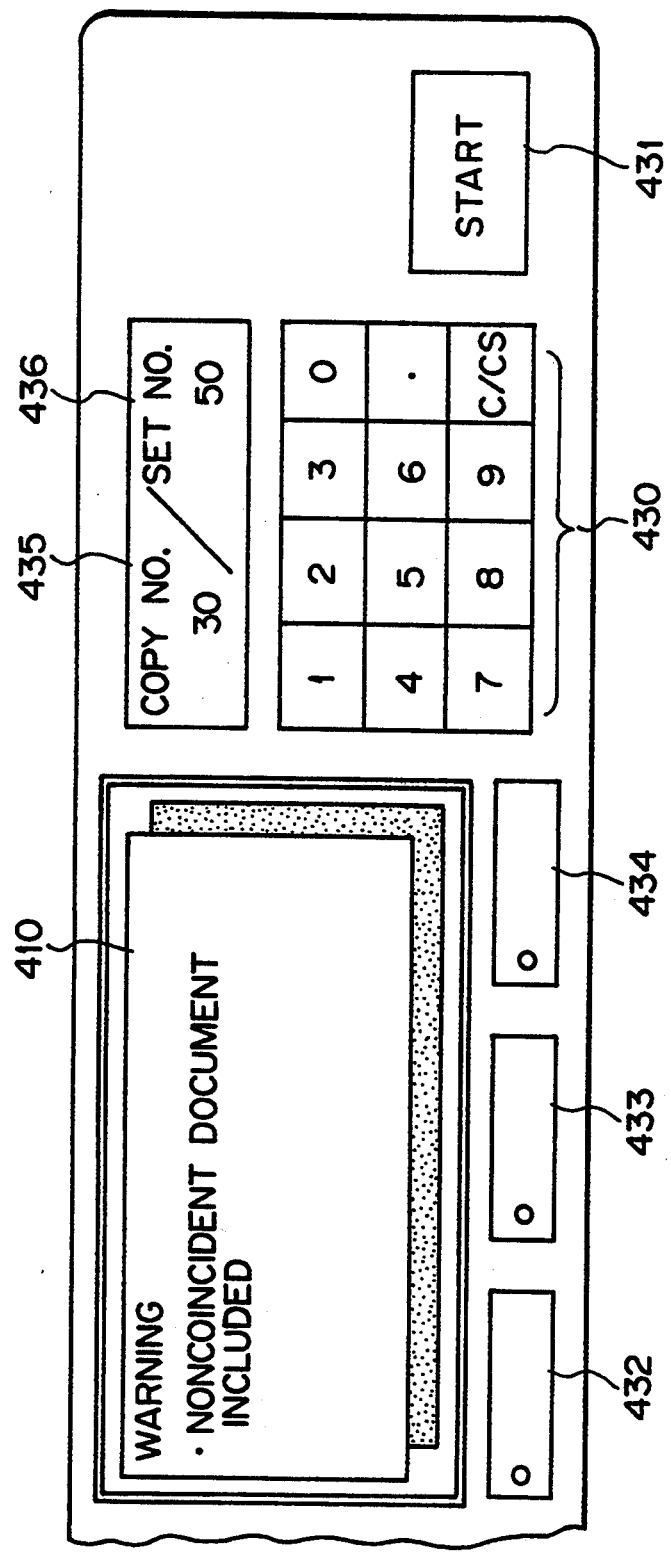

To begin with, a reference will be made to FIG. 64 for describing a procedure which depends on the number of sets to be sorted and is executed when each document is scanned for the first time. As shown, when any one of the multiple documents is determined to differ in orientation (NG) from the reference document, the number of sets set by the operator is compared with a predetermined number of sets N (open to choice) by comparing means (S231). If the set number is greater than the predetermined one N, a copy interrupt request flag is set on the basis of a command stored in the ROM of the copier body beforehand for interrupting a copying operation (copy interrupt mode). In response, the copy sequence control stops writing a new document image in the memory and feeding new sheets and enters into a copy interrupt sequence. Subsequently, in a step S232, a warning, e.g., one shown in FIG. 65 is displayed to request the operator to acknowledge the situation. When the operator watching the warning takes some measure and then presses the start key 431 again, the copying operation is resumed. On the other hand, assume that the operator does not take any action despite the warning, e.g., the operator is away from the copier. Then, on the elapse of a predetermined period of time (PSET) as determined by a timer monitoring the time (TIME) after the interruption of the copying operation, the copying operation is resumed. If the number of sets set by the operator is smaller than the predetermined one N, the copying operation is continued, neglecting the step S232. In a step S233 occurring after the end of copying operation, if the operation unit is ready to receive a code, a warning display code is sent thereto to display a message requesting the operator to acknowledge the situation. A specific message to appear in this condition is shown in FIG. 66.

Figure 67:
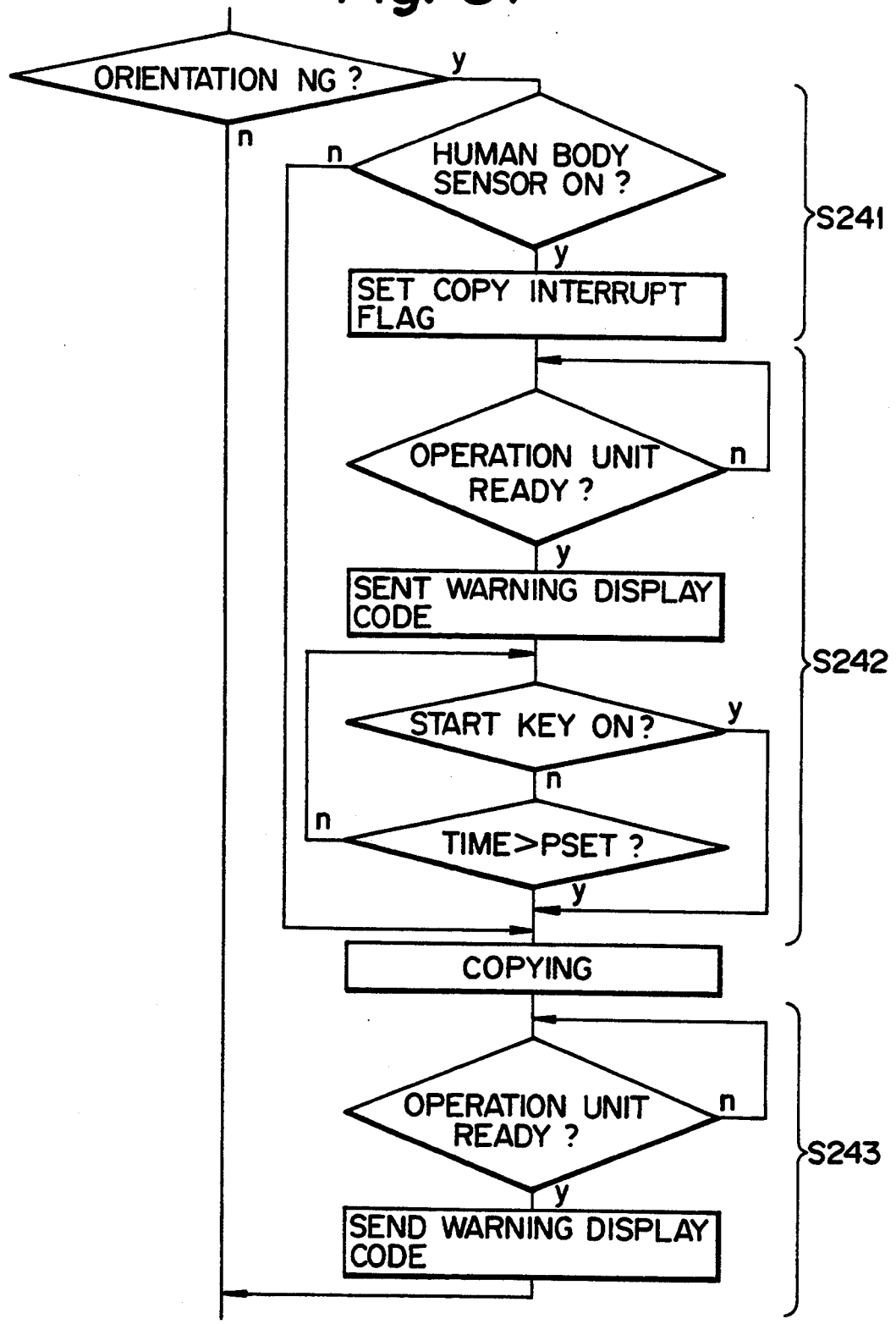
FIG. 67 is a flowchart showing a copying procedure which a copier with a human body sensor executes when the image orientations are not coincident.

FIG. 67 shows a procedure associated with a copier having the human body sensor 225 and which is also executed when each document is scanned for the first time. Assume that any of the multiple documents is determined to differ in orientation from the reference document. Then, if the human body sensor 225 is in an ON state, a copy interrupt request flag is set on the basis of a command stored in the ROM of the copier body beforehand for interrupting a copying operation (copy interrupt mode). In response, the copy sequence control stops writing a new document image in the memory and feeding new sheets and enters into a copy interrupt sequence (S241). Then, a warning (identical with the warning of FIG. 65) is displayed to urge the operator to acknowledge the situation (S242). As the operator takes some measure and then presses the start key 431 again, the copying operation is resumed. On the other hand, assume that the operator does not take any action despite the warning, e.g., the sensor 2225 is turned on by an object other than the operator. Then, on the elapse of a predetermined period of time (PSET) as determined by a timer monitoring the time (TIME) after the interruption of the copying operation, the copying operation is resumed. Further, in the step S241, when the operator is away from the copier (when the sensor is in an OFF state), the copying operation is continued, neglecting the step S242. In a step S243 occurring after the end of the copying operation, if the operation unit is ready to receive a code, a warning display code is set thereto to display a message requesting the operator to acknowledge the situation. Then, the same warning as shown in FIG. 66 appears on the operation unit.

The procedures described above have the following advantages.

Assume that when a document different in orientation from the reference document is detected while a copying operation using a sorter is under way. Then, if the desired number of sets to be sorted is small enough to rearrange after the copying operation, the copying operation is continued without interruption. After the copying operation, a warning informing the operator of such a situation is displayed to eliminate missing pages. When the desired number of sets to be sorted is too great to rearrange after the copying operation, the copying operation is interrupted and a warning is displayed. Even in this case, if a predetermined period of time expires without any operator's action, the operation is resumed to eliminate the wasteful dead time of the machine and the time wastefully occupied by the current job. The warning appearing after the copying operation automatically informs the operator of the presence of the orientation NG document (and a copy thereof) and urges him to see the orientations of the copies at the time of stapling, punching or similar binding.

In the case of the copier with the human body sensor 225, when the sensor 225 is in an OFF state (the operator is away from the copier), the copying operation is continued without interruption. After the copying operation, a warning appears on the operating section to automatically urge the operator to see the orientations of the copies before binding them. When the sensor 225 is in an ON state, the copying operation is interrupted while a warning is displayed. Further, assume a predetermined period of time expires without any operator's action despite the interruption of operation and the warning. Then, the copying operation is automatically resumed to save time. At this instant, the warning appearing after the copying operation automatically informs the operator of the presence of the orientation NG document (and a copy thereof) and urges him to see the orientations of the copies at the time of binding.

3.2.1 Determining Stapling Position Based on Greatest Margin in Page Area of Output Image Data
3.2.2 Stapling at Greatest Margin When multiple documents are copied, the orientation of each document is determined by detecting the margins thereof, and then a staple position is determined on the basis of the detected image data. This processing has already been described and is also true with two-sided image formation (two-sided copy). This successfully eliminates defective stapling.

3.2.3 Determining Stapling Position Based on Greater one of Two Reference Margins Derived from Size and Set Direction (Image data Direction) of Document Any two of the four sides of a document are assumed to be the binding margins, depending on the document size. Any two margins of each document are detected to determine the orientation of the document, i.e., image to thereby determine a stapling position, as will be described specifically hereinafter.

Usually, documents dealt with in offices have their binding positions fixed on the basis of their sizes. For example, regarding an A4 document which is dimensioned 210 mm×297 mm, one of opposite sides which are 297 mm long is usually used as a binding margin. Then, assuming the document shown in FIGS. 28A–28C, it is possible to determine the orientation of the document in the top-and-bottom direction simply by comparing X1 and X2. In the case of a vertically long document, a binding margin is determined by use of X1 and X2 stored in the counter latch 513. FIG. 29. In the case of a horizontally long document, a binding margin is determined by use of Y1 and Y2 stored in the subscan counter 515. To determine a binding margin on the basis of X1 and X2 of FIG. 28B, the procedure previously stated with reference to FIG. 32 is used.

Figure 68:
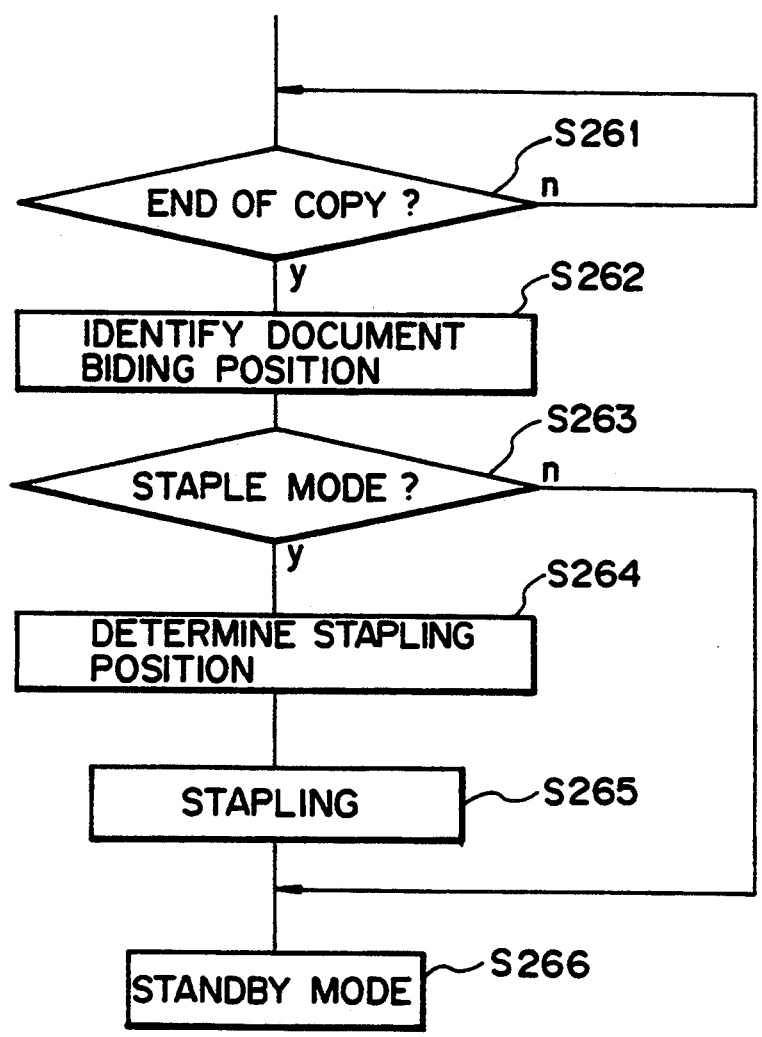
FIG. 68 is a flowchart showing a procedure for stapling sheets by determining a stapling position.

FIG. 68 shows a procedure to be executed after the binding margin of the documents has been determined by the above method. As shown, on the completion of a copying operation (y, S261), a binding position of the copies is determined on the basis of the binding margin data of the documents (S262). In a staple mode operation (y, S263), a stapling position is determined on the basis of the binding position of the copies (S264), and then a stapler is driven to staple the copies (S265). After the stapling operation, a standby mode is set up (S266).

In a mode other than the staple mode, the standby mode is directly set up. The procedure shown in FIG. 68 is effective even when two-sided image formation (two-sided copy) is desired. Since the binding position and orientation of formatted document images are detected by a simple construction, a stapling position can be surely and easily determined to promote efficient finishing.

3.2.4 Identifying Orientation Based on Greatest Margin Data and Confirming Coincidence by Comparing Image Data and Reference Stapling Position Data When multiple documents are copied, the margins of each document are detected to determine the orientation of the image, and then the detected image data and a reference stapling position are compared to see whether or not they are coincident. This decision is made by the previously described procedure. This is also true with two-sided image formation (two-sided copy). By matching the image orientation derived from the greatest margin data to the reference stapling position as mentioned above, it is possible to eliminate defective stapling.

3.2.5 Identifying Orientation Based on Greatest Margin Data and Orientation NG Recovery by Comparing Image Data and Reference Stapling Position Data Assume an image forming apparatus of the type detecting the margins of each document to determine the orientation of the image and then determining a stapling position on the basis of the resulting image data. When the image orientation does not match the reference staple position data, defective stapling is prevented by any one of the following schemes:

(a) interrupting copying operation and displaying warning on operation unit;
(b) inhibiting stapling while continuing copying operation;
(c) rotating image (in memory); and
(d) scanning document in reverse direction These schemes will be described in sequence hereinafter.

The interruption of the copying operation and display of a warning are executed in the same manner as in FIG. 62. The content of the warning is the same as in FIG. 63.

Figure 69:
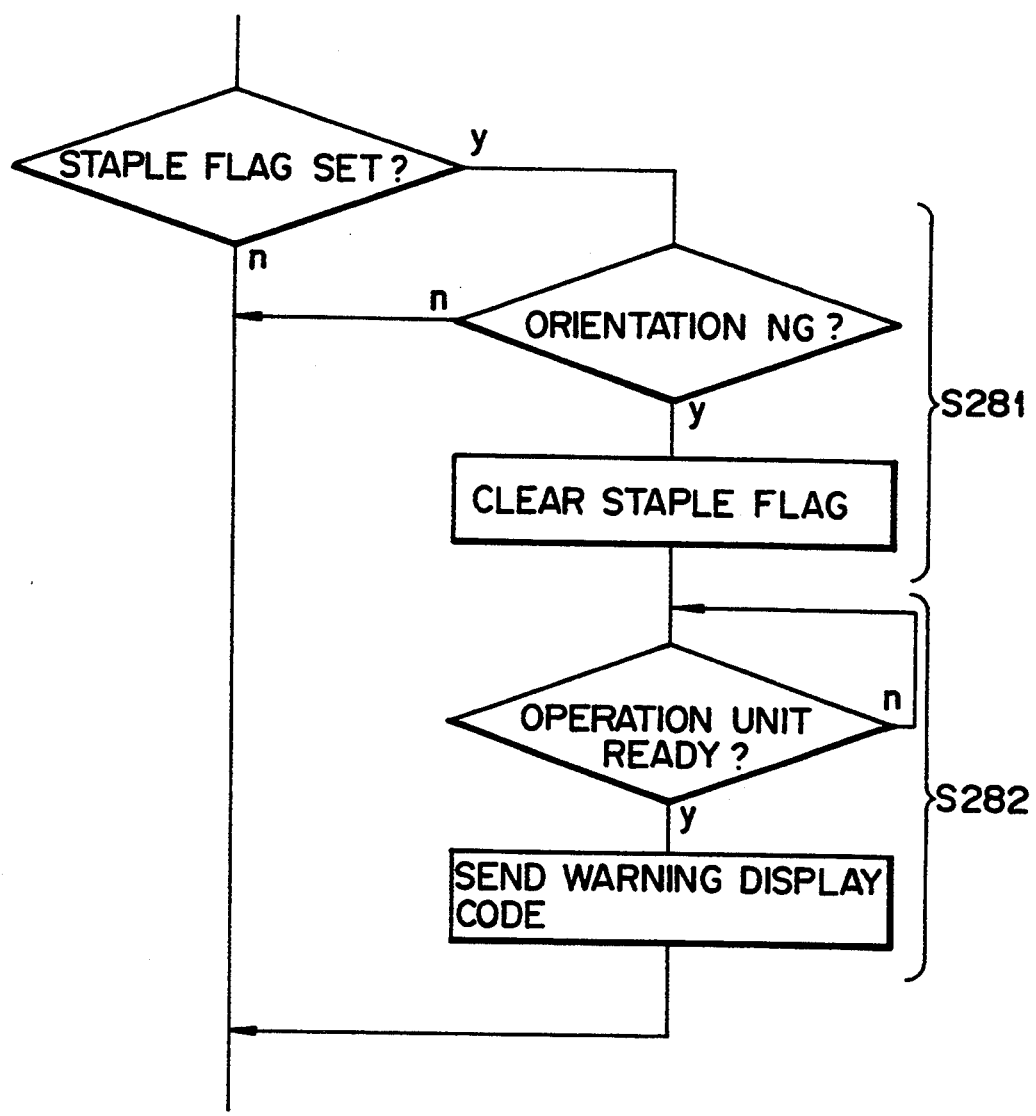
FIG. 69 is a flowchart showing an image forming continuing and staple inhibiting procedure to be executed when reference stapling position data and image orientation do not coincide.

Inhibiting stapling while continuing the copying operation will be described with reference to FIG. 69 specifically. The procedure of FIG. 69 is executed when each document is scanned for the first time. When a staple mode is selected on the operation unit, a staple request flag is set. If the image direction detected by the greatest margin data does not match the reference stapling position, the staple request flag is reset (S281). As a result, the copy sequence control advances to the normal copy sequence from the staple mode. After the ON/OFF of the staple mode has been confirmed once, the routine of FIG. 69 will start at the step S281 for the second and successive documents. In a step S282, if the operation unit is ready to receive a code, a warning display code is sent thereto to request the operator to acknowledge the condition.

To rotate the image (in the memory), the procedure described with reference to FIG. 42 is executed.

The schemes (a)–(d) are also effectively applicable to two-sided image formation (two-sided copy).

3.2.6 Image Existing in Stapling Position Derived from Greatest Margin Data

Assume an image forming apparatus of the type detecting the margins of each document to determine the orientation of the image and then determining a stapling position on the basis of the resulting image data. When an image exists in the determined stapling position, any one of the following measures is taken for preventing staples from overlapping the image:

(a) interrupting copying operation and displaying warning;
(b) inhibiting stapling while continuing copying operation;
(c) shifting or reducing image by image processing;
(d) changing stapling position; and
(e) automatically cancelling staple mode (at the time of default)

To begin with, a reference will be made to FIG. 70 for describing how to interrupt copying operation and display a warning. This procedure is executed when each document is scanned for the first time. Assume that a ROM built in the copier body stores a command for interrupting a copying operation when an image exists in a stapling position in a staple mode. Then, a copy interrupt request flag is set (S311). In response, the copy sequence control stops writing a new image in the memory and feeding new sheets and starts on a copy interrupt sequence. When such a command is not stored in the ROM, the program executes a step S312, neglecting the step S311. In the step S312, if the operation unit is ready to receive a code, a warning display code is sent thereto to display a warning which will request the operator to acknowledge the condition.

Figure 71:
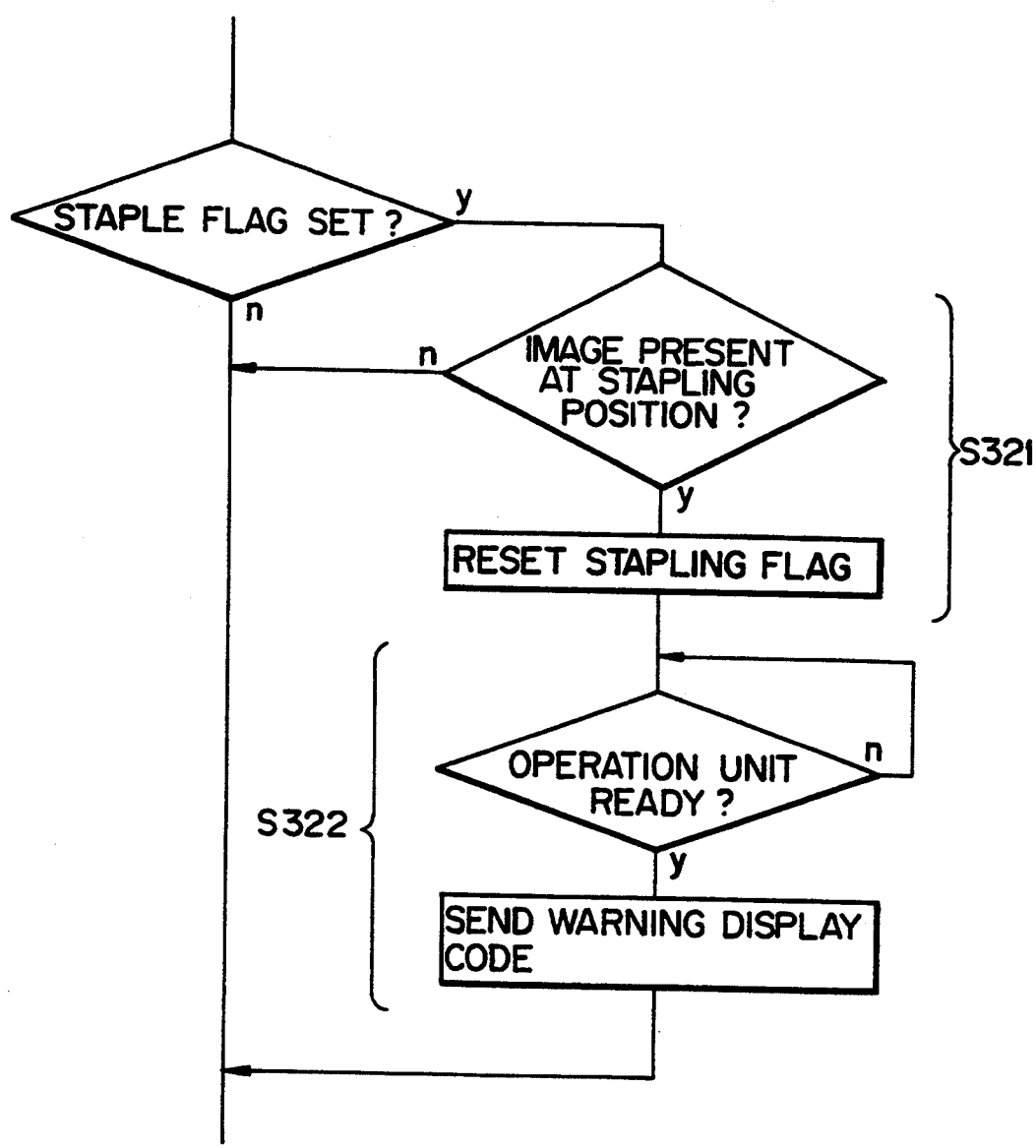
FIG. 71 is a flowchart showing an image formation continuing and staple inhibiting procedure to be executed when an image is present at a determined stapling position.

FIG. 71 shows a procedure for inhibiting a stapling operation while continuing copying operation and which is also executed when each document is scanned for the first time. When a staple mode is selected on the operation unit, a staple request flag is set. If an image exists in the stapling position as determined on the basis of the greatest margin data, the staple request flag is reset (S321). Then, the copy sequence control advances to the normal copy sequence from the staple mode. After the ON/OFF of the staple mode has been confirmed once, the procedure of FIG. 71 will start at the step S321 for the second and successive documents. In a step S322, if the operation unit is ready to receive a code, a warning display code is sent thereto to request the operator to acknowledge the condition.

Figure 72:
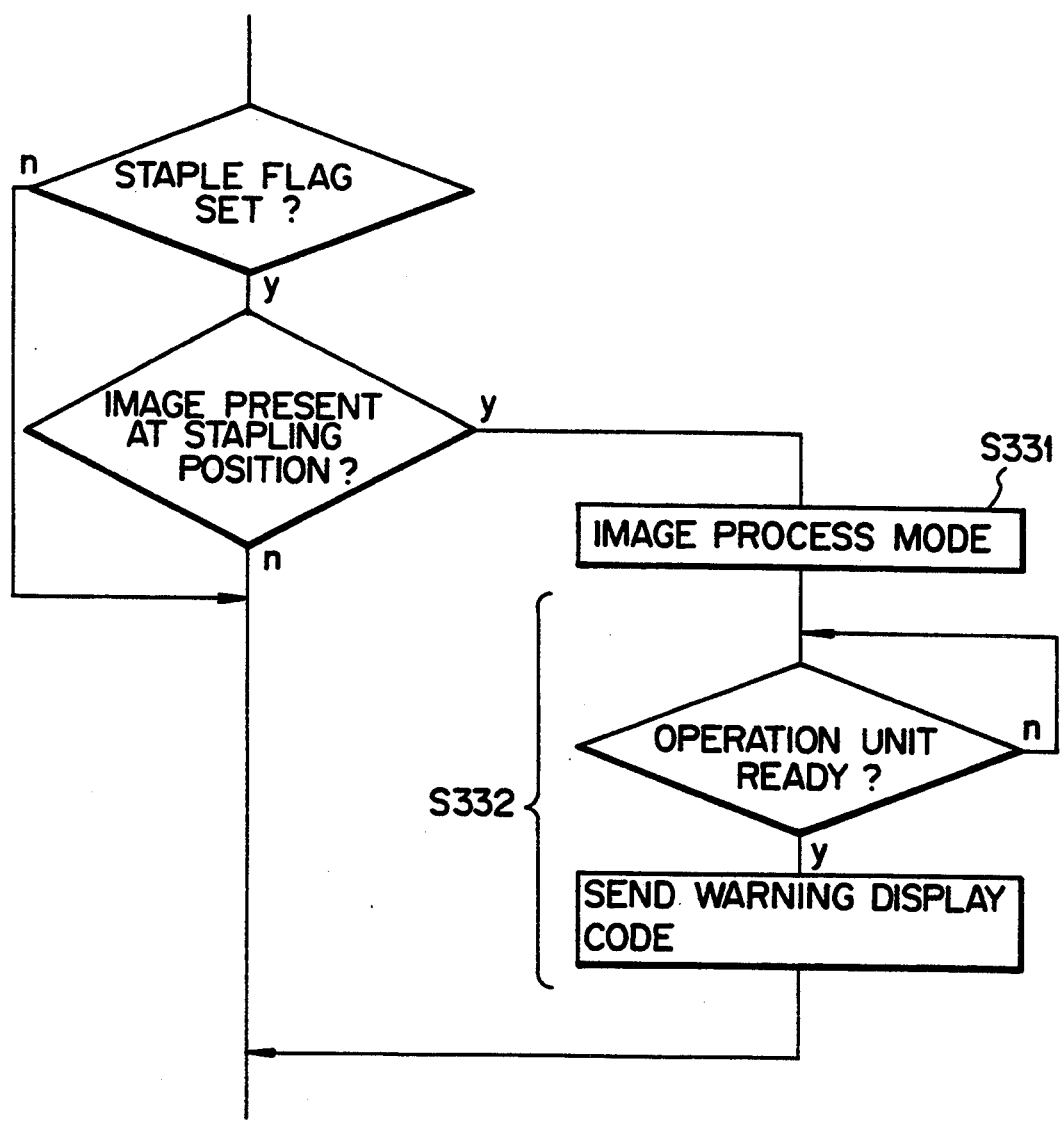
FIG. 72 is a flowchart showing a sequence, magnification change processing and so forth to be executed when an image is present at a determined stapling position.

FIG. 72 shows a procedure for shifting, magnification changing (reducing) or otherwise manipulating an image by image processing. When a staple mode is selected, a staple request flag is set. If an image exists in the stapling position as determined on the basis of the greatest margin data, the program starts on an image process mode (S331). In a step S332, if the operation unit is ready to receive a code, a warning display code is sent thereto to request the operator to acknowledge the condition.

Figure 73:
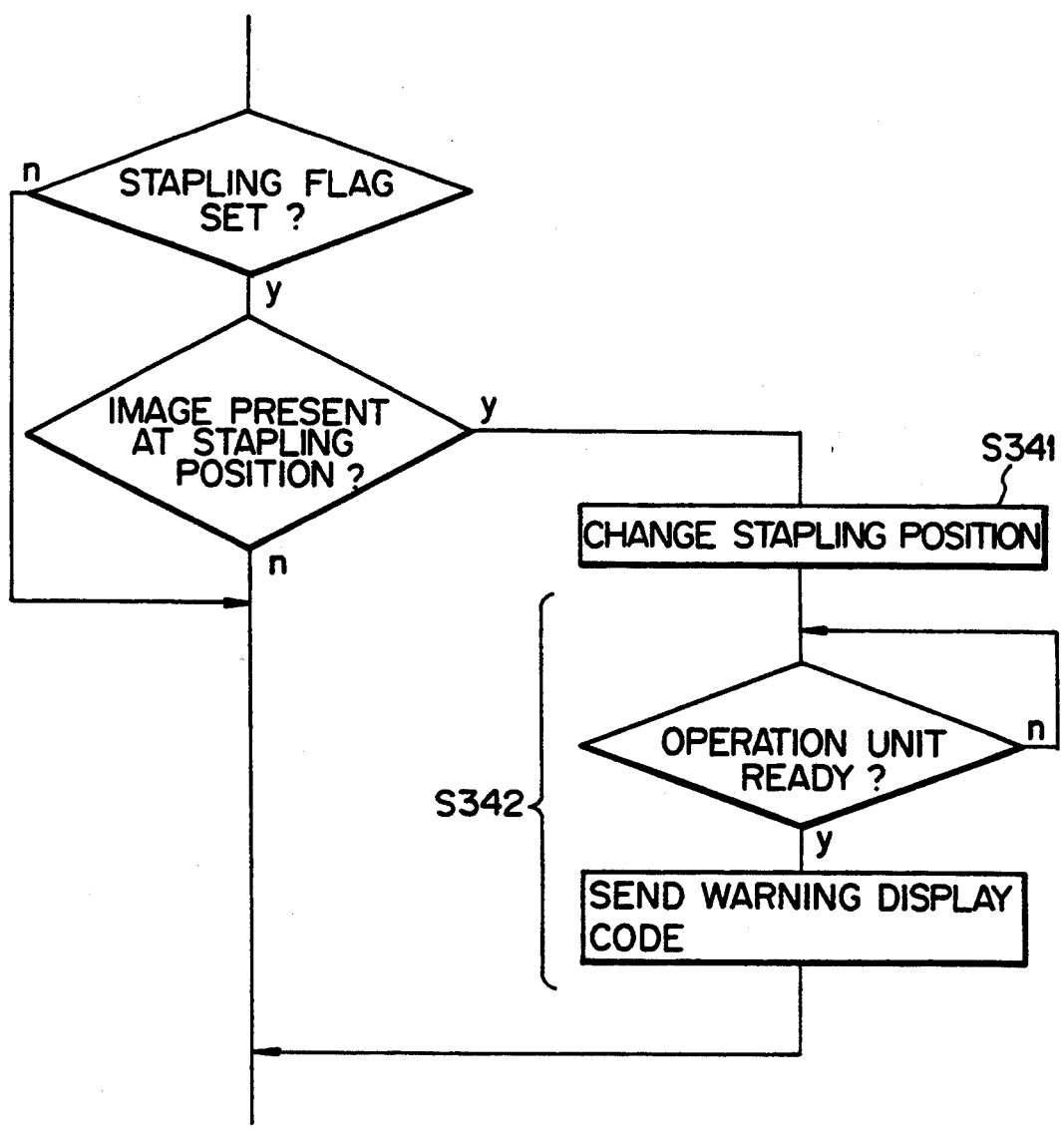
FIG. 73 is a flowchart showing a stapling position change procedure to be executed when an image is present at a determined stapling position.

To change the stapling position, a procedure shown in FIG. 73 is executed. As shown, when a staple mode is selected, a staple request flag is set. If an image exists in the stapling position as determined on the basis of the greatest margin data, the program starts on a stapling position change mode to shift the stapling position to the outside of the image area (S341). In a step S342, if the operation unit is ready to receive a code, a warning display code is sent to the operation unit to request the operator to acknowledge the condition.

Figure 74:
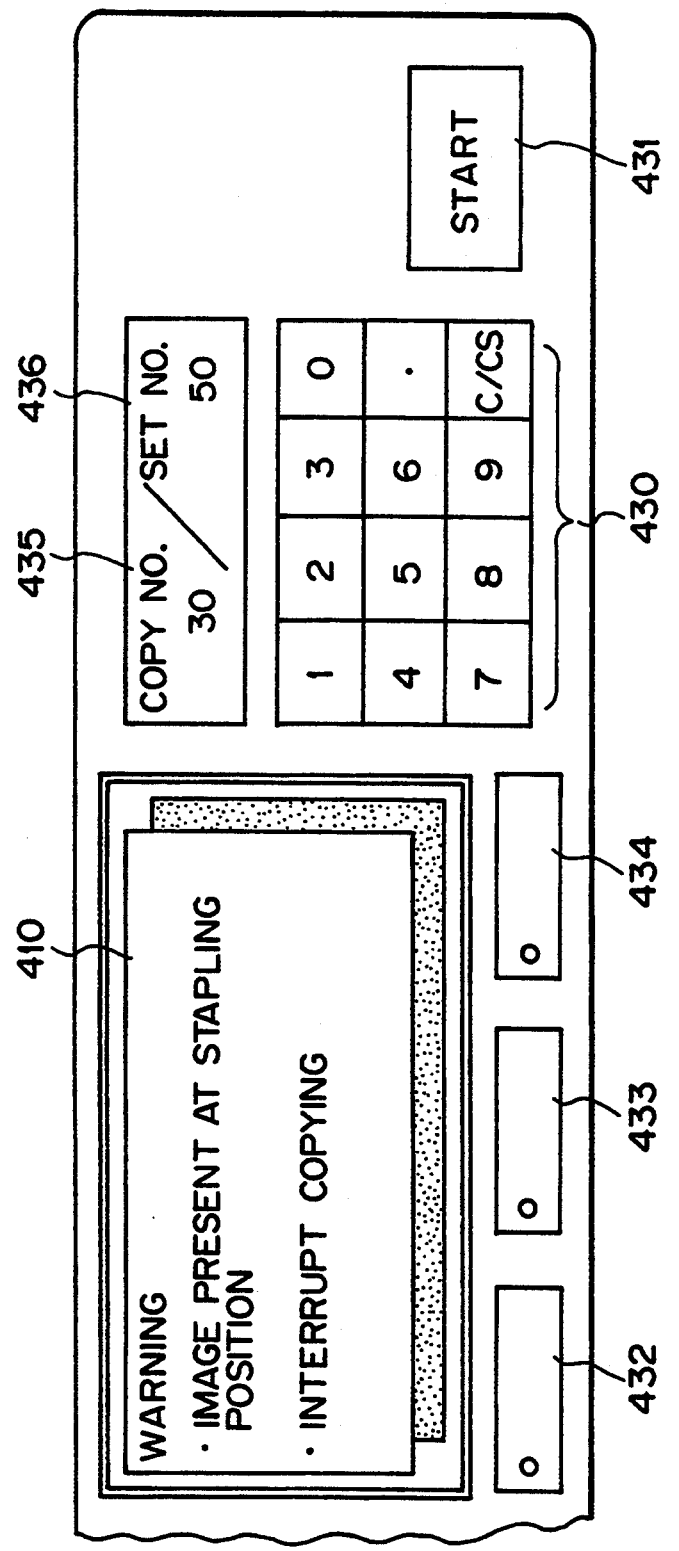
FIG. 74 is a plan view showing a specific condition of the operation and display section.

To automatically cancel a staple mode (default), a procedure shown in FIG. 71 is executed. As shown, when a staple mode is selected by default, a staple request flag is set. If an image exists in the stapling position as determined on the basis of the greatest margin data, the staple request flag is reset (S321). In response, the copy sequence control advances to the normal copy sequence from the staple mode. After the ON/OFF of the staple mode has been confirmed once, the procedure of FIG. 73 will start at the step S321 for the second and successive documents. In a step S322, if the operation unit is ready to receive a code, a warning display code is sent thereto to request the operator to acknowledge the condition. Such a procedure is also effective in the case of two-sided image formation (two-sided copy). As specific message to appear due to the step S322 is shown in FIG. 74.

As stated above, when an image exists in the stapling position, any one of the above procedures is executed to protect the image from damage otherwise caused by staples.

3.3.1 Selectively Skipping Orientation Identification

Assume an image forming apparatus of the type determining an image orientation by detecting the margins of a document. In a usual image form mode (not including finishing), the apparatus skips the identification of an image orientation in order to prevent the copying efficiency from lowering, as will be described specifically hereinafter.

Figure 75:
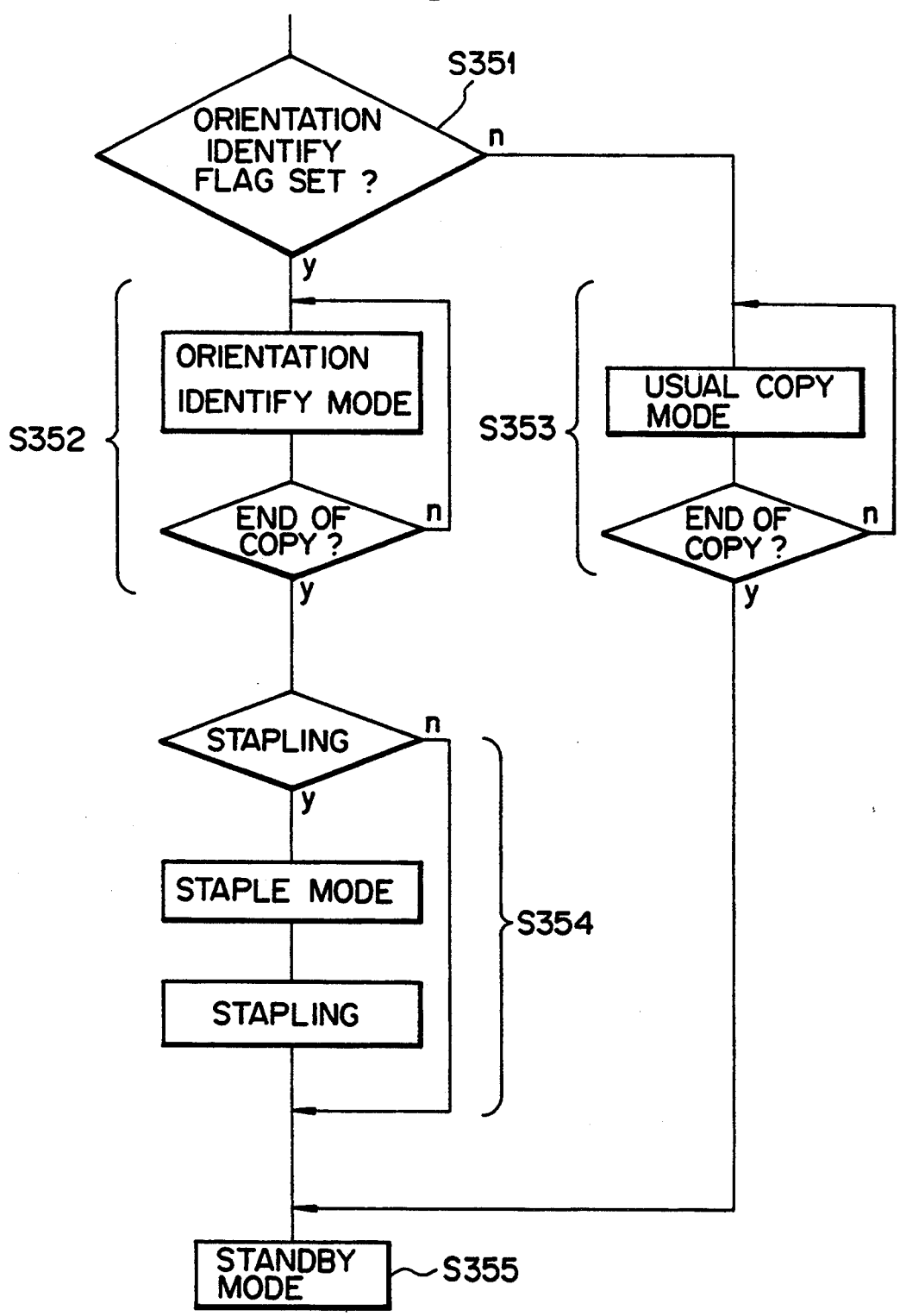
FIG. 75 is a flowchart showing a procedure for selectively effecting image orientation identification depending on the image form mode.

For the identification of an image orientation, image processing and other extra processing are needed and have to be executed every time a document is scanned. This is extremely time-consuming and undesirable from the efficiency standpoint when it comes to usual copying. In light of this, in a usual copy mode, the orientation identification is skipped. As shown in FIG. 75, whether or not to identify an image orientation is determined (S351). It is assumed that in a copy mode including stapling, punching or similar finishing, the identification of an image orientation is unconditionally executed. In such a copy mode, an orientation identify flag is set. Then, the orientation of the image is identified (S352). After the copying operation, a staple mode (finish mode) is executed (S354) and followed by a standby mode (S355) in which the program awaits a key input. When the orientation identify flag is reset, the program advances to the usual copy mode (S353) and then to the step S355.

3.3.2 Stapling Position NG When Manual Staple Command Is Entered After Sorting

Assume an image forming apparatus of the type determining an image orientation by detecting the margins and then determining a stapling position on the basis of the detected image data. Further, assume that a manual staple command is entered after all the copies have been sorted. If any of the document images does not match in orientation as indicated by the detected image data or if an image exists in the stapling position, defective stapling is eliminated, i.e., staples are prevented from damaging the image by any one of the following implementations:

(a) displaying a warning on operation unit; and
(b) inhibiting stapling

Figure 76:
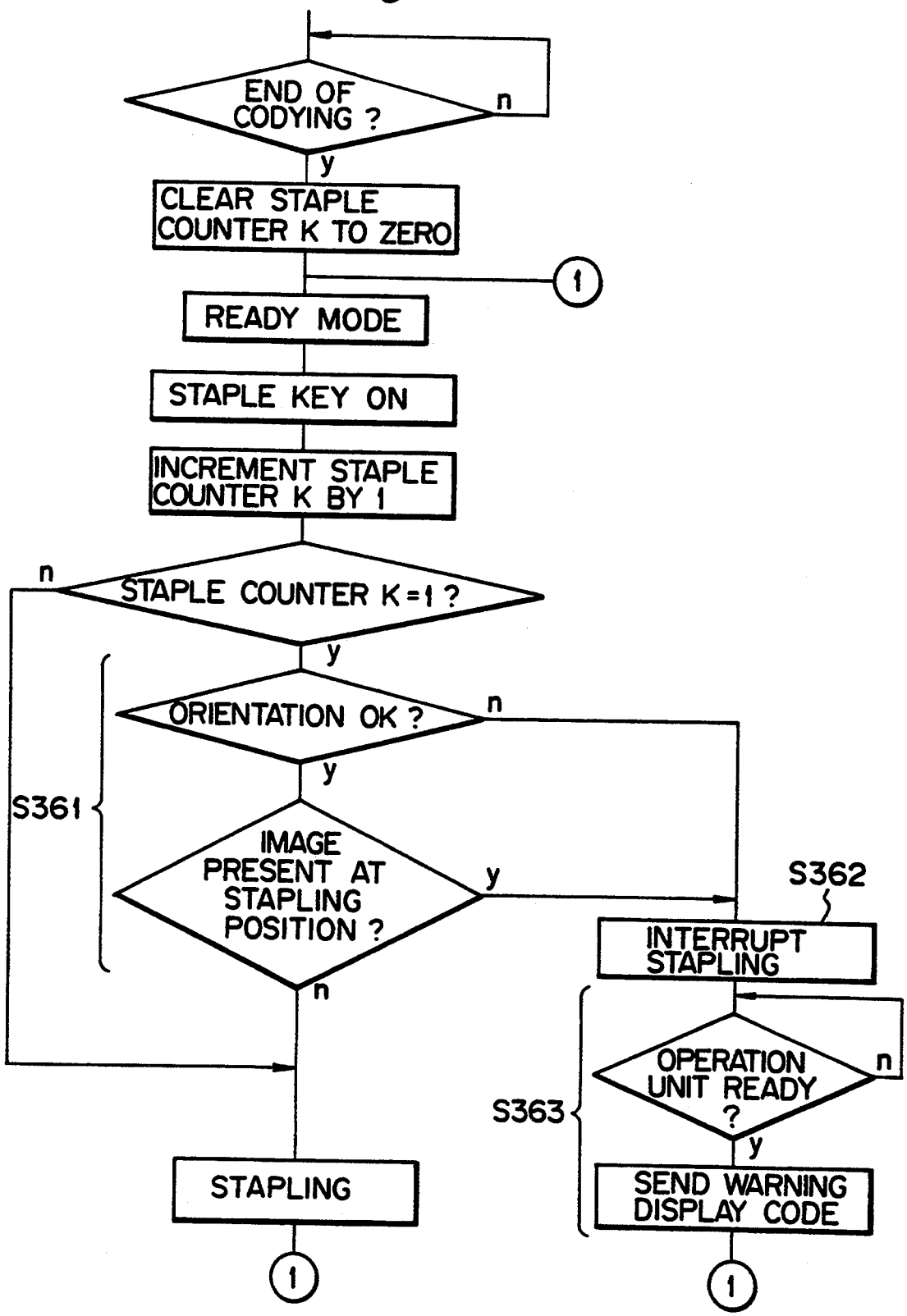
FIG. 76 is a flowchart showing a warning display procedure to be executed when a stapling position is inadequate.
Figure 77:
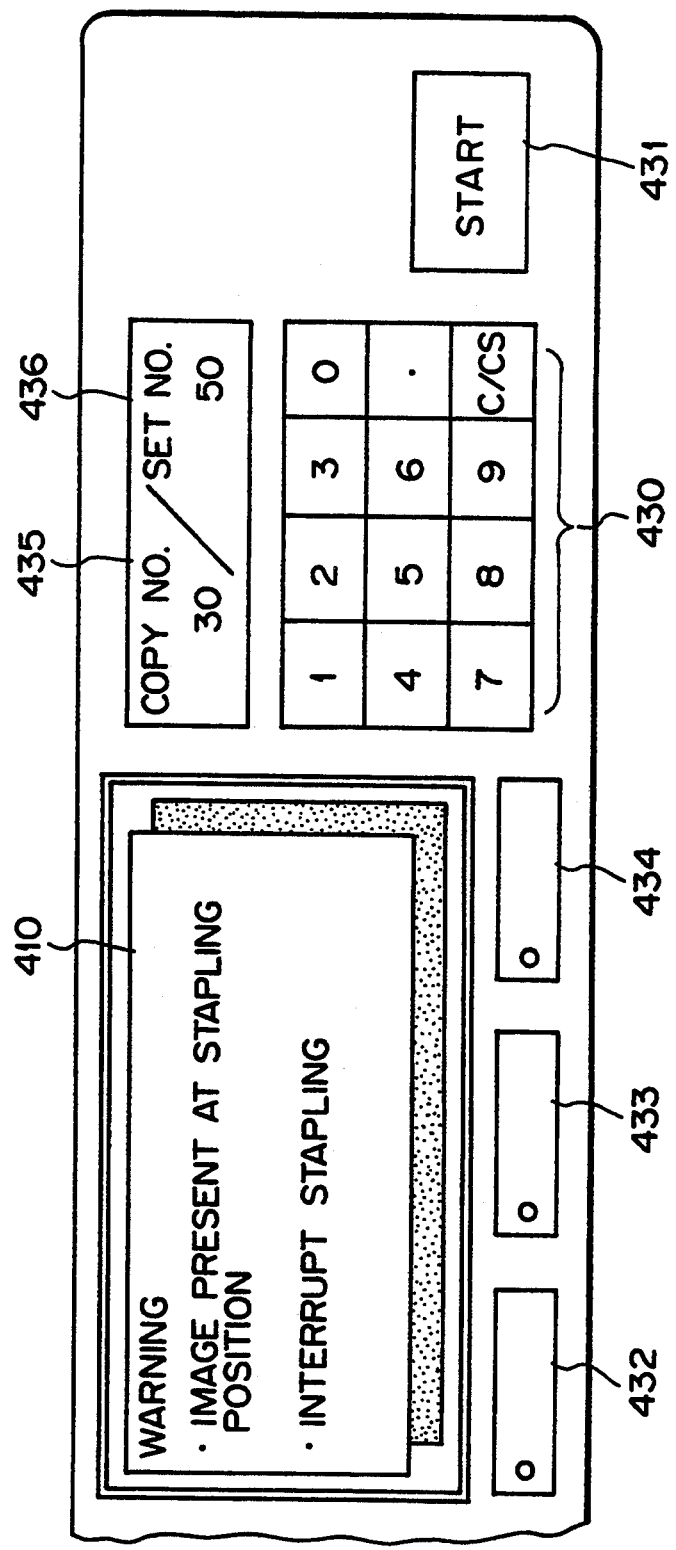
FIG. 77 is a plan view showing a specific condition of the operation and display section.

A procedure for displaying a warning as mentioned above is demonstrated in FIG. 76. After the copying and sorting operations, a staple counter K is cleared, and then the program sets up a ready mode. When a staple mode command has been entered by the operator during or before the copying and sorting operations, a staple flag S is set. On completing the copying and sorting operations, the machine once enters into the ready mode for awaiting the next command. If the staple flag S is set, the program directly enters into the staple mode. In response to the operator's key operation, the program also enters into the staple mode and increments the staple counter K by 1. If the document orientation does not match or if an image exists at the stapling position, the program advances from a step S361 to a step S362 for generating a staple interrupt code. In the subsequent step S363, if the operation unit is ready to receive a code, a warning display code is sent thereto to request the operator to acknowledge the condition. Then, the program again enters the ready mode for awaiting the next command. As the staple key is again turned on, the staple counter K is again incremented by 1. As a result, the program sets up the staple mode. A specific alert message to appear in this condition is shown in FIG. 77.

Figure 78:
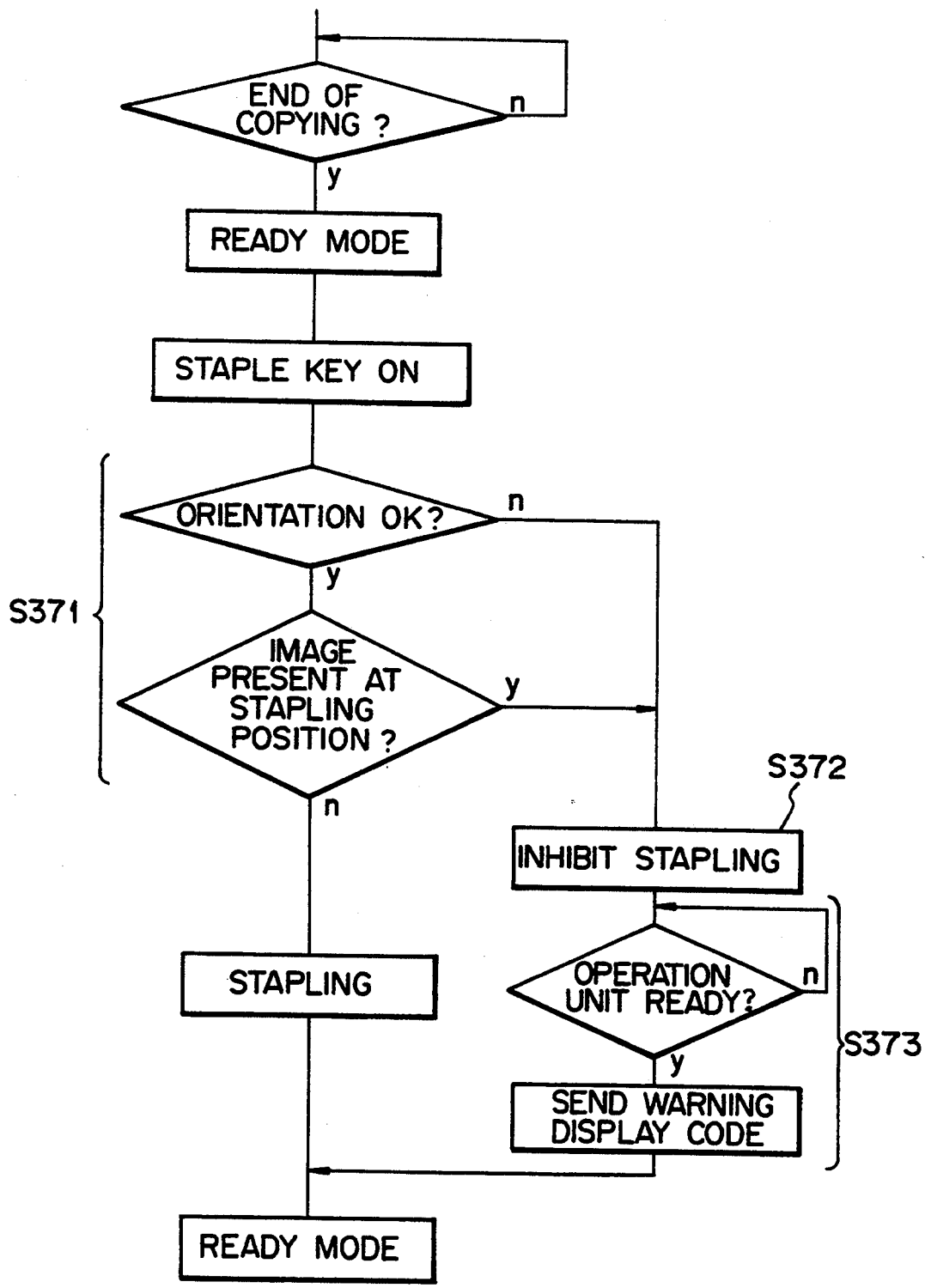
FIG. 78 is a flowchart showing a staple inhibition procedure to be executed when a stapling position is inadequate.
Figure 79:
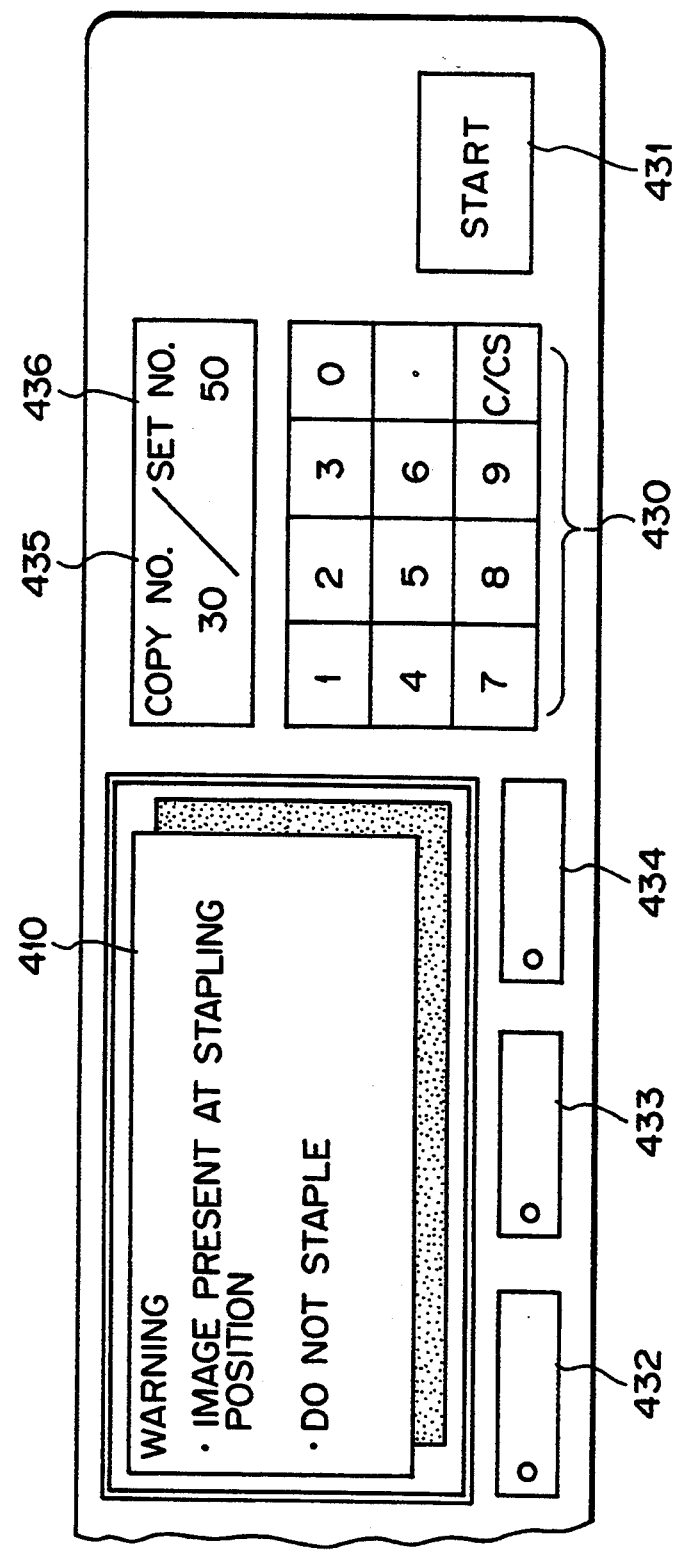
FIG. 79 is a plan view showing a specific condition of the operation and display section.

To inhibit stapling, a procedure shown in FIG. 78 is executed. As shown, a staple flag S is set when the machine enters into a ready mode after the copying and sorting operations or when the operator has entered a staple mode command during the copying and sorting operations. On completing the copying and sorting operations, the machine once enters into the ready mode for awaiting the next command. If the staple flag S has been set or in response to the operator's key input, the program enters into the staple mode. If the image orientation does not match or if an image exists in the stapling position, the program advances from a step S371 to a step S372 for generating a staple inhibit code. In a step S373, if the operation unit is ready to receive a code, a warning display code is sent thereto to request the operator to acknowledge the condition. Then, the program again enters into the ready mode for awaiting the next command. A specific alert message to appear in this condition is shown in FIG. 79.

4. Identifying Image Orientation Based on Layout

An apparatus of the type determining the top-and-bottom orientation of a document on a character basis needs time-consuming decision and cannot perform real time control without disproportionate cost. Hence, such an apparatus is not practical unless an image processor having large-scale software is used. A more simple and convenient way to identify the orientation an image is to determine the layout of character lines on a page. Specifically, this method assumes that characters are horizontally written from the left to the right, and determines the top-and-bottom orientation of a document on the basis of the end of a sentence.

4.1.1 Identification Based on Layout of Entire Image

For the simple identification of an orientation, the following method is available which identifies the layout of character lines in place of characters. i.e., identifies a blank area heading a sentence and a blank area following it. A character line can be identified if use is made of a black-and-white pattern in the main scanning direction as often referred to in relation to a scanner. If one line undergone filter processing which will be described is a white pattern, then it may be determined to be a carriage return portion.

Figure 80:
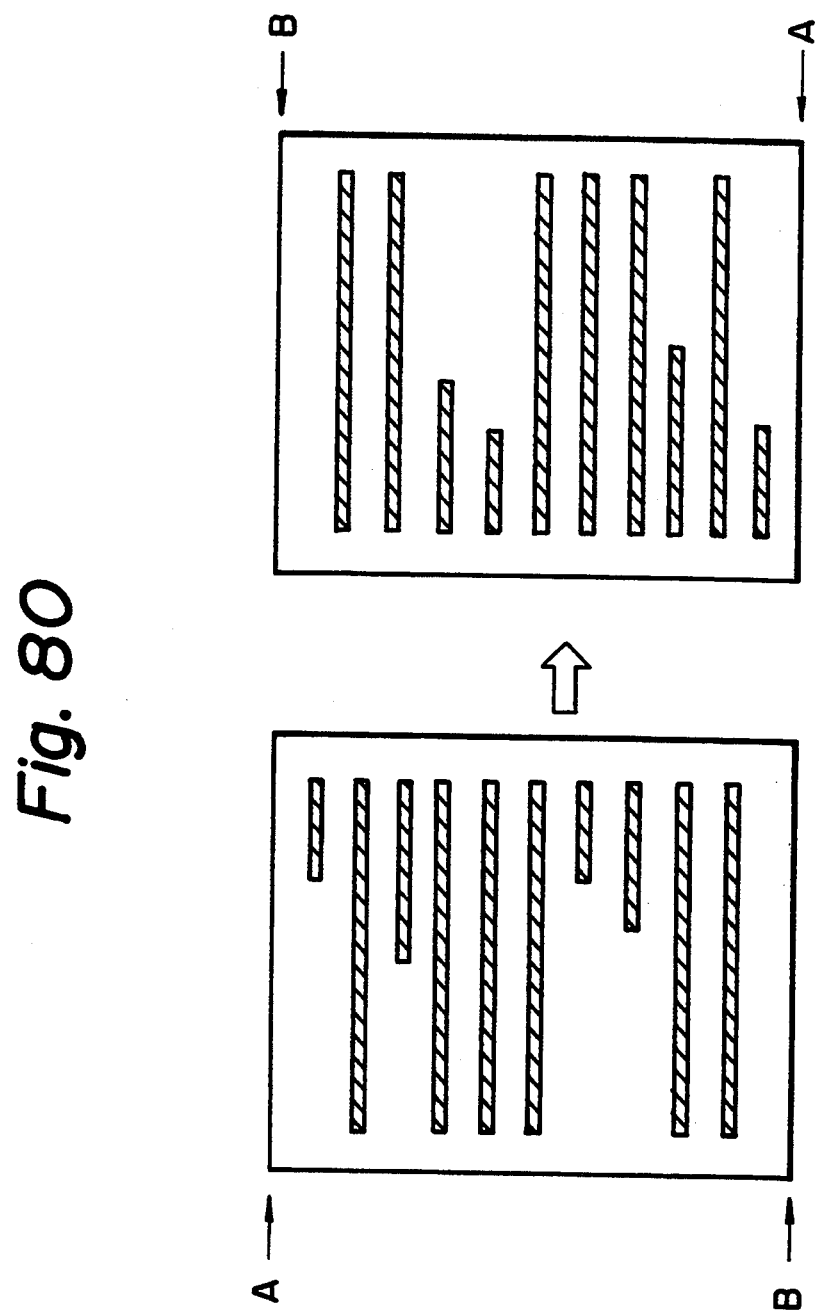
FIG. 80 shows how an image orientation is determined on the basis of separated lines.

To allow the layout to be identified with any one of a vertically written document, horizontally written document, a vertically long document and horizontally long document, it is necessary to rotate the image, i.e., to replace the main and subscanning directions in the memory on a pixel basis. With such image rotation (rotation of a filter in the following description), it is possible to perform an accurate decision with no regard to the writing direction and position of the document. To determine the length of a character line, it suffices to determine a position where a white pattern begins. Assuming character lines shown in FIG. 80, it can be determined that all the lines end at the right-hand side and, therefore, the image is upside down in the top-and-bottom direction. While FIG. 80 shows a sheet oriented for vertical writing, the decision principle using image rotation is also true with a sheet oriented for horizontal writing.

A specific decision procedure will be described hereinafter. To begin with, a method for extracting lines is as follows. Generally, a document is provided with a greater space between lines than between characters. At an image processing stage, nearby images are handled as a large mass of dots. Conventional mosaic manipulation resembles this method and defines, for example, a 200 dots×200 dots matrix as a large mass of dots (200×200 filter), determines a mean density of the dots or pixels constituting the matrix, and uses the mean density as the density of the large mass.

Figure 81:
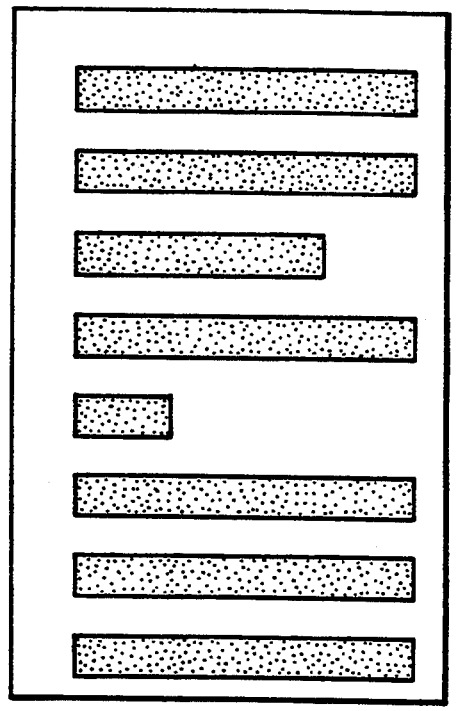
FIG. 81 shows how lines separated by mosaic processing are written to a bit map memory.

To extract a line, a filter of, for example, 50 dots×50 dots is used. Then, if 50 pixels×50 pixels surrounding a particular pixel include an image, the the pixel of interest is determined to be black; if otherwise, it is determined to be white. In this manner, a document image is filtered to be rendered in two levels. Usually, values generated by a scanner are read in several consecutive stages of tonality. Assuming 256 tone levels, a single pixel is rendered by eight bits (one byte). Then, assuming that "0" is white having the highest reflectance while "255 (OFFH)" is black whose reflection does not reach a sensor, then data rendered in two levels by the 50×50 filter is either "0" or "OFFH". FIG. 81 shows specific data produced by the above image processing and stored in a 1-page bit map memory.

Figure 82:
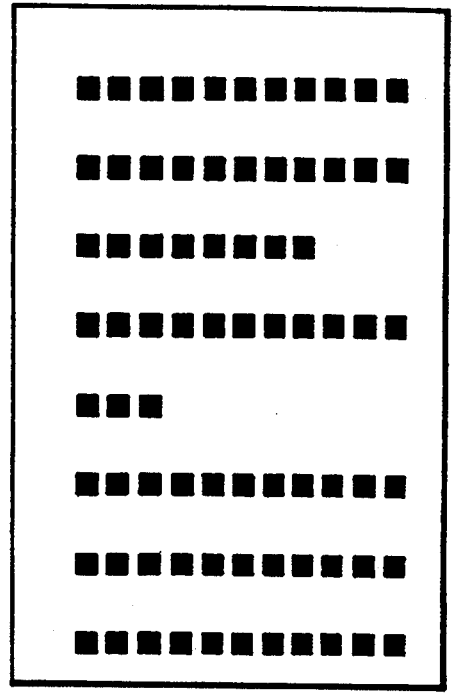
FIG. 82 is a view similar to FIG. 81, showing a case wherein the number of pixels of a filter is reduced.
Figure 83:
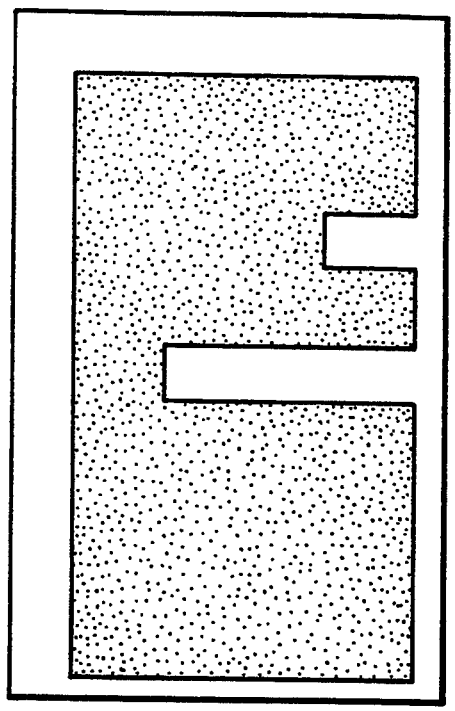
FIG. 83 is a view similar to FIG. 81, showing a case wherein the number of bits of a filter is increased.
Figure 84:
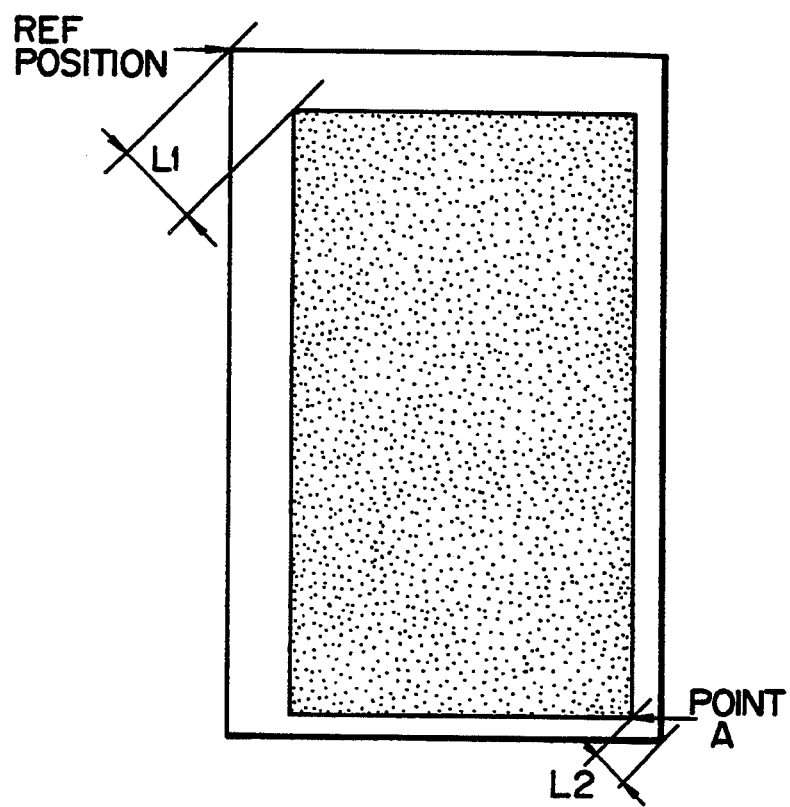
FIG. 84 is a view similar to FIG. 81, showing a case wherein the number of pixels of a filter is increased and a dot has a greater size than the carriage return width.

FIG. 81 shows lines extracted by the implementation described above. When the number of pixels of the filter is reduced, the influence of surrounding images is eliminated to allow characters to be separated in place of lines, as shown in FIG. 82. On the other hand, when the number of pixels of the filter is increased, even the space between lines cannot be recognized with the result that only the portions where characters do not exits on lines are determined white, as shown in FIG. 83. Further, assuming a document carrying characters over the entire area thereof, when the filter has a great number of pixels and the dot is greater than the carriage return width, the document is determined to be entirely black, as shown in FIG. 84. It follows that a filter smaller than the space between lines and greater than the space between characters is essential in extracting lines in a desirable manner.

While the above description has concentrated on a square filter, it is preferable to use a horizontally oblong filter when it comes to horizontal character lines from the accuracy standpoint. For example, assuming a resolution of 15 dots/mm, a 60 dots (horizontal)×30 dots (vertical) filter (FIG. 85) allows even a space of 2 mm between lines to be recognized. In this case, although the characters may be spaced apart by about 4 mm, they are contiguous and determined to exist on the same line. It may occur that even such a 60 dots×30 dots oblong filter cannot extract lines in an expected manner (as with Japanese textbooks which are vertically written). Then, use may be made of a 30 dots (horizontal)×60 dots (vertical) oblong filter.

A method of identifying the orientation of a document image will be described. Whether a document is vertically written or horizontally written can be determined by changing the number of dots in the vertical and horizontal directions, as stated above. However, whether or not the document is correctly positioned in the top-and-bottom direction cannot be determined by such an implementation. The decision as to the top-and-bottom orientation is made as follow.

Figure 85:
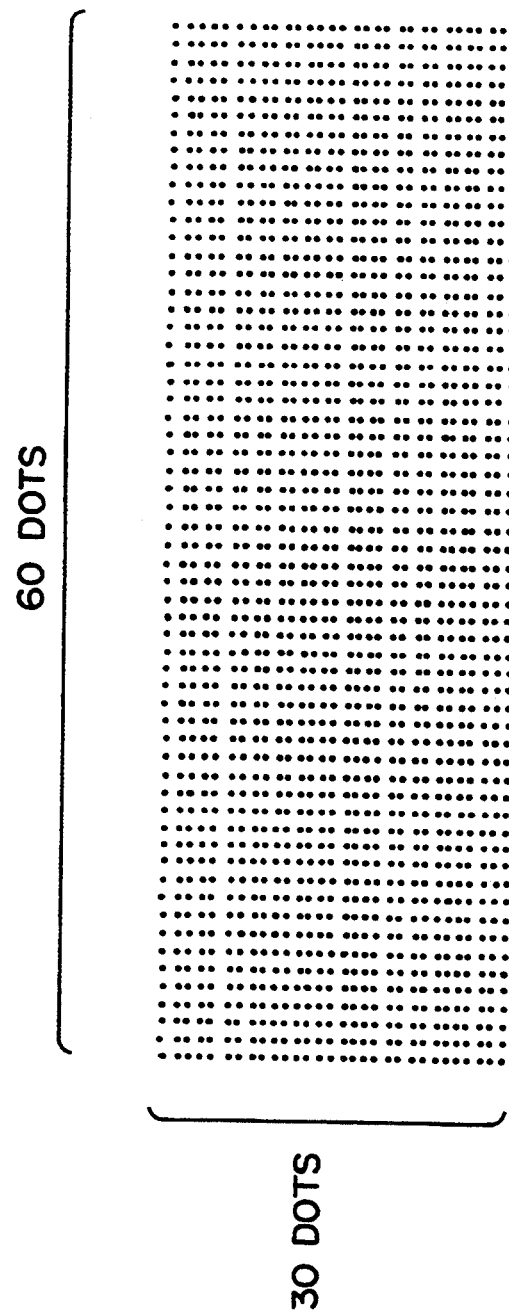
FIG. 85 shows a specific configuration of the filter.

When the horizontally long filter shown in FIG. 85 is used, whether or not the pixels of the consecutive Y axes at the address of the X axis (main scanning direction) are OFFH is determined. At this instant, it is not necessary to make such a decision on every bit of the Y axes, i.e., checking every fifteen bits will suffice on the assumption of the 60×30 filter. This is also true with the X axis; any desired pixels as counted from a point Xmin where an image on the X axis begins may be checked. Assume a horizontally written document in which a paragraph is indented by one character, and that use is made of the 60×30 filter. Then, whether the pixel is 0 or OFF may be determined every thirty dots of the dots (240 dots) which are about four times greater than the number of dots in the horizontal direction; regarding the end of a line, 240 dots may be checked from the pixel having the maximum value Xmax on the X axis in the document reference direction. Whether the end of the line is located at the Xmin side or the Xmax side can be determined on the basis of the dot data of Y axes at the Xmin and Xmax of the Y axis.

Figure 86:
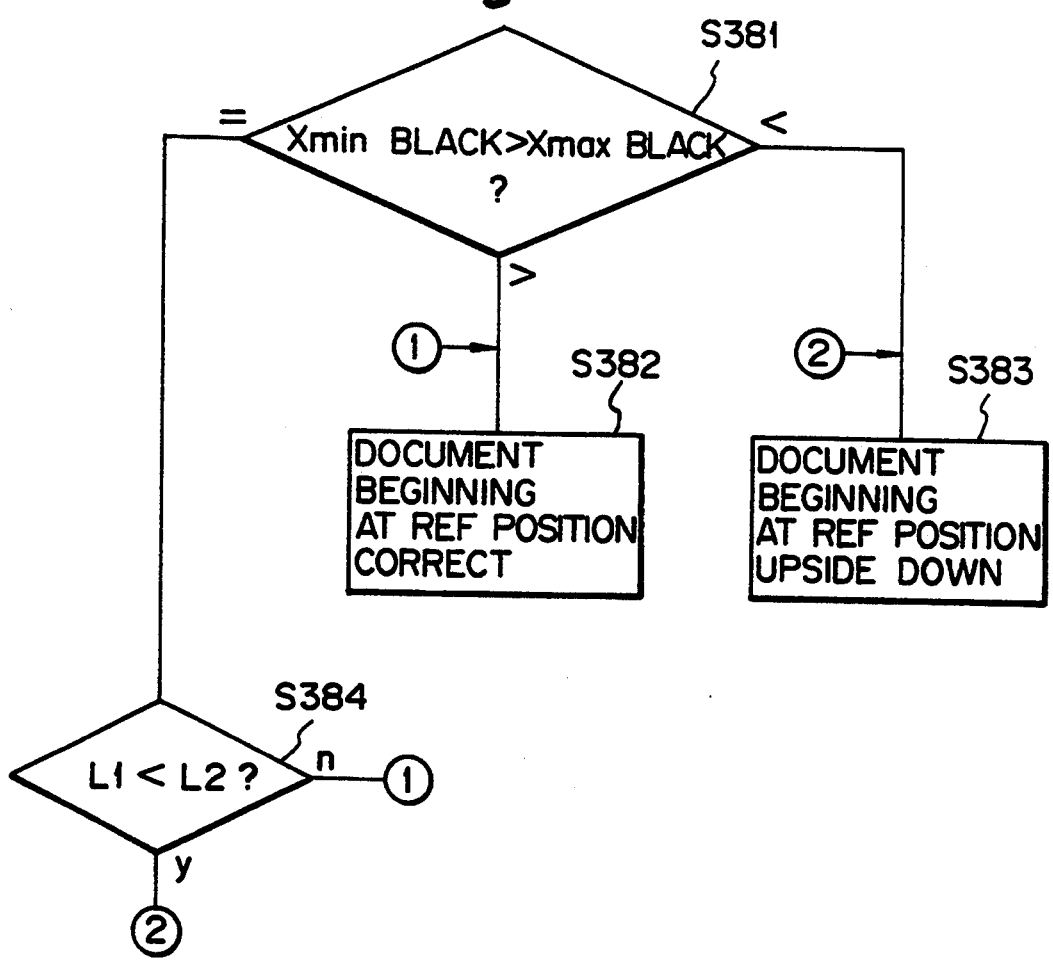
FIG. 86 is a flowchart showing a document top-and-bottom decision processing using addresses in the main scanning direction.

Specifically, as shown in FIG. 86, the number of pixels of black level (OFFH) detected at the Xmin side and the number of such pixels detected at the Xmax side are compared (S381). If the number detected at the Xmin side is greater than the number detected at the Xmax side, it is determined that the line begins at the Xmin side (S382). If the number at the Xmin side is greater than the number at the Xmax side, it is determined that the line begins at the Xmax side (S383), and that the document is upside down in the top-and-bottom direction. By such image processing, it is possible to distinguish a vertically written document and a horizontally written document as well as their positions in the top-and-bottom direction.

On the other hand, in vertically long documents, sentences are usually written in horizontal lines. When document size sensing means determines that a vertically long document is set in a vertically long position on the glass platen, priority is given to the horizontally long 60×30 filter so as to reduce the decision time. Conversely, when such a document is set in a horizontally long position, the filter will be rotated 90 degrees to turn out the 30×60 filter. Assume that the number of black pixels at the Xmin side and the number of black pixels at the Xmax side are equal as determined in the flowchart of FIG. 86, i.e., characters are density printed over the entire area of the document. Then. the side at which sentences begin cannot be determined. In such a case, the following technique is available.

As shown in FIG. 84, the address of the black pixel closest to the reference point of X and Y axes and the address of the black pixel closest to a point A diagonal to the reference point are detected, and then the distances L1 and L2 from the corners to the closest black pixels are determined. Usually, the distance between the point where sentences begin and the adjoining corner is greater than the distance between the point where they end and the adjoining corner. Hence, if the distance L1 is greater than or equal to the distance L2, it may be determined that the document is correctly positioned in the top-and-bottom direction; if otherwise, it may be determined that the document is upside down (S384, FIG. 86).

Figure 87:
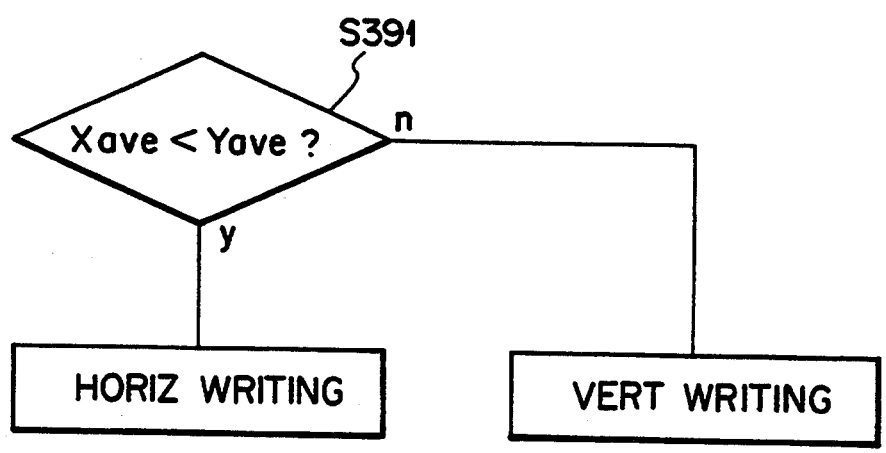
FIG. 87 is a flowchart showing a procedure for distinguishing horizontal writing and vertical writing on the basis of a mean value of the distances between the centers of gravity of a character sequence division in the X and Y axis directions.

The above schemes use the result of extraction of lines, i.e., the area which the character lines occupy. The same processing is practicable even when the filter is provided with a more minute configuration, as shown in FIG. 82 (area occupied by character frames). Since the space between lines is usually greater than the space between characters, whether the document is vertically written or horizontally written can be determined on the basis of the distance of a certain character frame and four character frames adjoining it. The distances between the character frame of interest and the surrounding character frames can be determined by determining the center of gravity of each frame by image processing and then measuring the distance between their centers of gravities. FIG. 87 shows a specific procedure for comparing a mean value Xave of the distances between the centers of gravity of character frames in the X axis direction and a mean value Yave of the distances between the centers of gravity of character frames in the Y direction, and then determining whether or not the document is vertically written or horizontally written. In FIG. 87, if Xave is smaller than Yave as determined in a step S391, the document is determined to be horizontally written; if otherwise, it is determined to be vertically written. Such processing combined with document sizes is capable of determining the top-and-bottom position of a document, the direction of writing (vertical or horizontal), and the direction of a document (vertically long or horizontally long), i.e., distinguishing sixteen different kinds of document images in total.

4.1.2 Detection of Blank Areas

Figure 88:
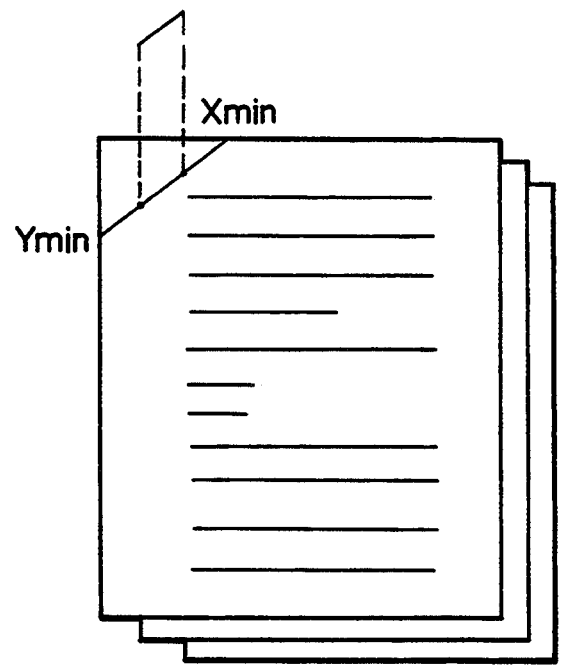
FIG. 88 shows a triangular pattern associated with one-point stapling.
Figure 89:
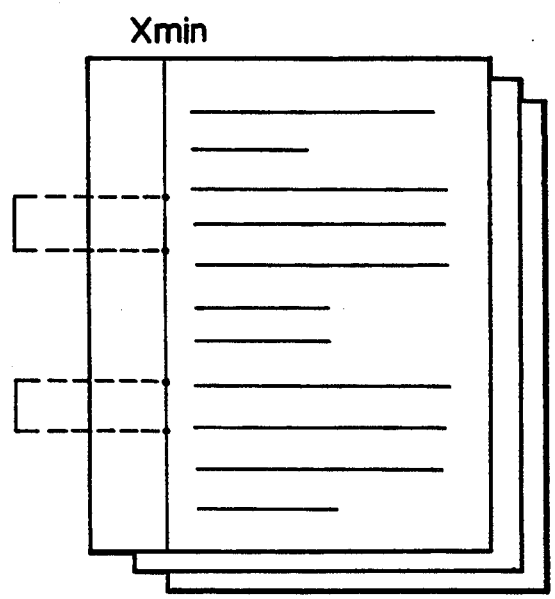
FIG. 89 shows a two-point stapling pattern.

Regarding the decision using a layout, whether or not an image exists at the stapling or punching position of sheets is another important consideration. Sheets are usually stapled at one point, i.e., one of four corners or at two or more points, i.e., one of four sides. A blank area common to the documents to be handled by one job can be determined by ANDing the blank areas of the individual documents. Specifically, when sheets are to be stapled at one point, a triangular pattern shown in FIG. 88 is prepared and has the dimensions X1 and Y of two sides determined by a blank area document by document. Then, Xmin and Ymin are calculated. Finally, whether or not the line connecting Xmin and Ymin is included in the stapling area is determined. When sheets are to be stapled or punched at two points, an oblong pattern shown in FIG. 89 is prepared and compared with the blank area of each document. The longer sides of the oblong have the same dimension (Y axis length Y) as the longitudinal dimension of the documents; X1 is indicative of the blank area of each document. By determining Xmin, it is possible to detect a blank area common to all the documents.

4.2.1 Orientation Based on Layout (Image Direction Data (Document Set Direction) and Image Output Size Data (Document Size))

4.2.2 Orientation Based on Corner Blank Data in Page Area of Output Image Data

The orientation of an image is identified by the decision on the layout (set direction and size of a document) or by detecting the corner blank area in the page area based on such a decision. The images are matched in orientation to produce copies matched in orientation. This will be described specifically hereinafter.

A document whose image orientation is determined is dealt with according to the procedure shown in FIG. 62. A warning will be displayed according to the procedure of FIG. 65. This embodiment is also effective when two-sided image formation (two-sided copy) is desired. With this procedure, it is possible to inform the operator of the presence of a document of different orientation to thereby regulate the copies in orientation while eliminating missing pages.

4.2.3 Orientation Matching Based on Layout Decision
4.2.4 Orientation Matching Based on Corner Blank Data in Page Area of Reference Output Image Data (Uniformization of Orientation)

An image orientation is detected by detecting the corner blank area of the page area of reference output image data which is based on the layout decision. Whether or not any of the resulting copies will be different in orientation from the reference document is determined for matching the orientation. When such a condition is detected, the copying operation is interrupted and a warning is displayed. Regarding the reference image, either of the following two images may be used:

(a) reference output image data being used as first output image data (start page); and (b) any desired page being used as output image data, depending on number of documents.

Figure 90:
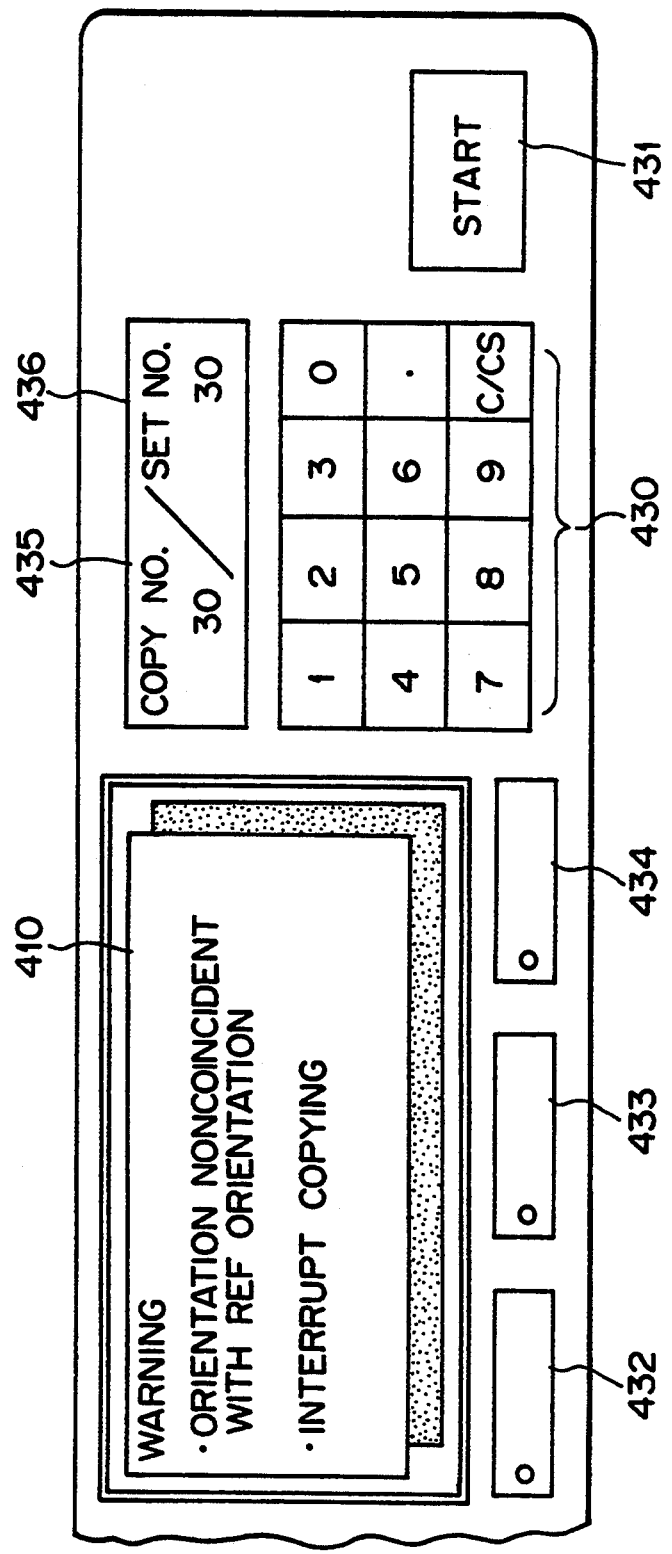
FIG. 90 is a plan view showing a specific condition of the operation and display section.

The word "any" means that the page may be set by the operator or may be written in a ROM and selected in matching relation to the number of pages. The document whose image orientation is determined is dealt with according to the procedure shown in FIG. 62. FIG. 90 shows a specific alert message to appear on the operation unit. The implementation described above is also applicable to two-sided image formation (two-sided copy) and comparable with the advantage withe the above item 4.2.1.

4.2.5 Matching Orientations of Vertical and Horizontal Documents Using Reference Image Data An image orientation is detected by detecting the corner blank area of the page area of reference output image data which is based on the layout decision. Whether or not any of the resulting copies will be different in orientation from the reference document is determined for matching the orientation. When such a condition is detected, the copying operation is interrupted and a warning is displayed, as will be described specifically hereinafter.

Figure 91:
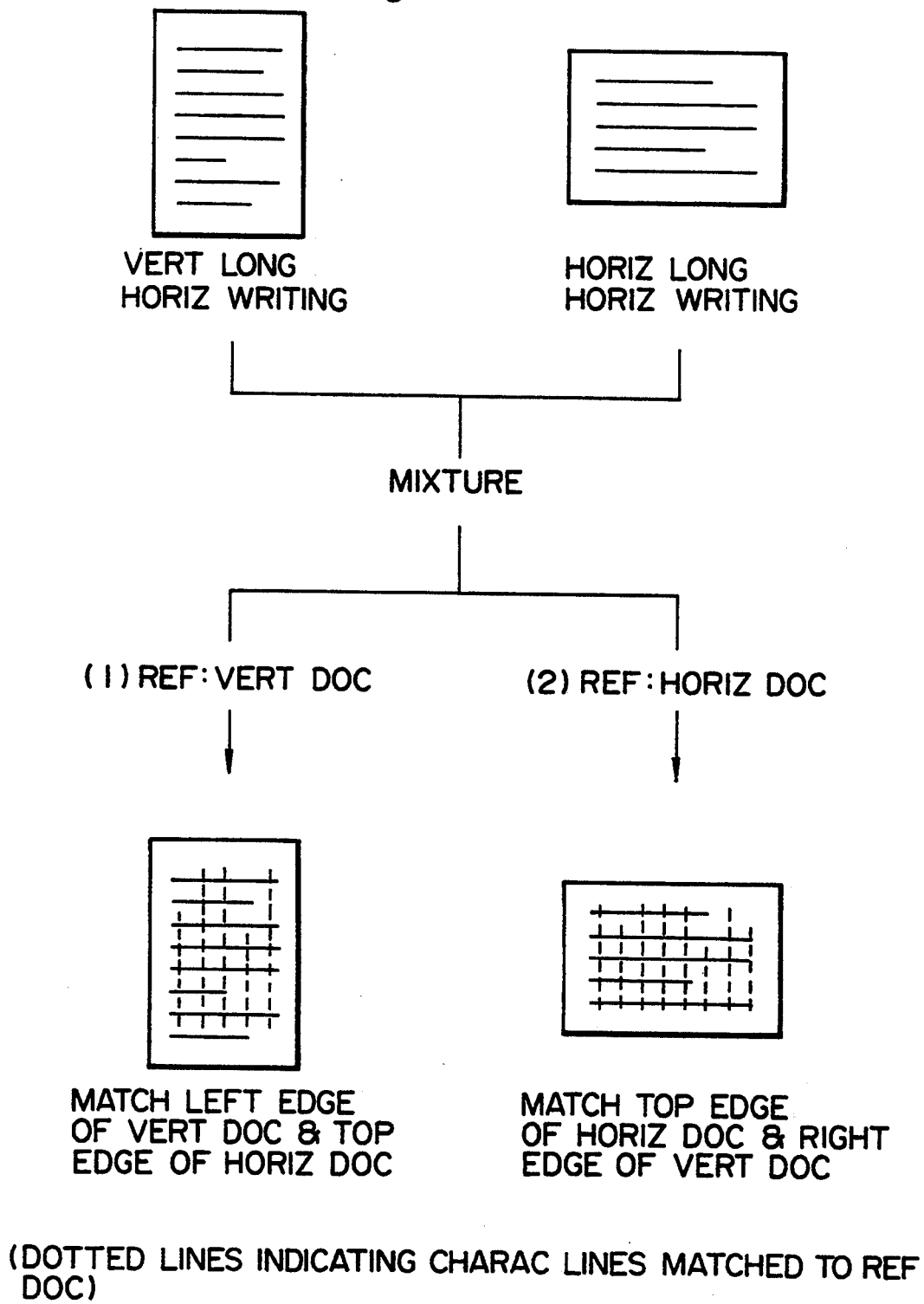
FIG. 91 shows the kinds of documents.

FIGS. 91 and 92 show four possible kinds of documents. i.e., a vertically long horizontally written document, a horizontally long horizontally written document, a vertically long vertically written document, and a horizontally long horizontally written document. It may occur that such four different kinds of documents are stacked together on the ADF. However, let a mixed stack of vertically written documents and horizontally written documents be excepted, since such a stack will not occur. Then, possible cases are:

(1) vertically long horizontally written documents and horizontally long horizontally documents are mixed; and (2) vertically long vertically written documents and horizontally long vertically written documents are mixed.

The four kinds of documents can each be identified, including the top-and-bottom orientation, by the layout decision. Regarding the mixture of vertically long and horizontally long documents, reference image data is determined and used to uniformize the image orientations of the individual documents. The reference image data may be selected by either of the following two methods (A) and (B).

(A) Using document corresponding to cover sheet: This method may be subdivided into the following two methods:

(a) using vertically long document if the cover sheet is a vertically long document; and b) using horizontally long document if the cover sheet is a horizontally long document.

Since the ADF (II), FIG. 1, is of the type stacking documents face up thereon and sequentially feeding them from the lowermost one, the image information corresponding to the cover sheet is identified last. Hence, after all the pages of the documents have been memorized, the image orientations of the documents are uniformized with the image data of the document corresponding to the cover sheet used as a reference. In another type of ADF which allows documents to be stacked face down and feeds them from the uppermost one, since the image data of a document corresponding to the cover sheet is identified first, the image orientations of the documents following the uppermost one will be matched to the latter. On the other hand, a recycling document handler (RDH) causes the first document to be copied first, feeds the second document while discharging the first document to the top of a stacker, and repeats such a procedure to complete one set of copies at a time. In an RDH of the type stacking documents face up and feeding the lowermost sheet first, the image data of the documents are identified by feeding them once without scanning, and the orientations are uniformized on the basis of the document corresponding to the cover sheet fed last. This is also true with an RDH of the type stacking documents face down and feeding the lowermost document first, except that the document fed first is used as a reference document.

(B) Using one higher in ratio than the other: This method may be subdivided into the following two methods:

(a) using vertically long documents if higher in ratio than horizontally long documents; and (b) using horizontally long documents if higher in ratio than vertically long documents.

Regarding an ADF, all the pages of the documents are memorized, the vertically long and horizontally long documents are counted independently of each other, and then a ratio is determined. In the case of an RDH, the vertically long and horizontally long documents are each counted while being fed without being scanned, and then a radio is determined.

(C) Manual selection: The operator selects either the vertically long documents or the horizontally long documents as a reference. The following two methods are available:

(a) in an SP mode, the operator selects either one of the two kinds of documents (for both or one of the horizontal writing and vertical writing); and (b) the operator selects one of the previously mentioned four possible kinds of documents (selectable each time).

How to match the documents to a reference document will be described.

(1) As shown in FIG. 9 1, assume that a vertically long horizontally written document and a horizontally long horizontally written document are stacked together. If the vertically long one is determined to be a reference, the horizontally long one has the upper edge thereof positioned at the left edge of the reference. If the horizontally long one is a reference, the vertically long one has the right edge thereof positioned at the upper edge of the reference.

(2) As shown in FIG. 92, assume that a vertically long vertically written document and a horizontally long vertically written document are stacked together. If the vertically long one is a reference, the horizontally long one has the upper edge thereof positioned at the right edge of the reference. If the horizontally long one is a reference, the vertically long one has the upper edge thereof positioned at the left edge of the reference.

As shown in FIGS. 93A-93D, to uniformize the orientations of images on recording sheets, the image data stored in the page memory are rotated 180 degrees. The rotation will be described specifically taking the abovementioned case wherein a vertically long horizontally written document and a horizontally long horizontally written document are stacked together as an example.

Figure 93A:
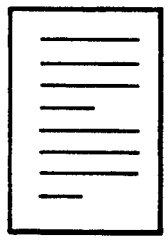
Figure 93C:

Assume that a vertically long horizontally written document shown in FIG. 93A is determined to be a reference. Then, the upper edge of the horizontally long document is positioned at the left edge of the reference document, as shown in FIG. 91. (1). As shown in FIG. 93B, if the vertically long horizontally written document is upside down in the top-and-bottom direction, the image is rotated 180 degrees. As shown in FIG. 93C, if the horizontally long horizontally written document is upside down, it can be directly matched to the reference document of FIG. 93A. However, when it is positioned as shown in FIG. 93D, it is rotated 180 degrees and then matched to the reference document of FIG. 93A. FIG. 94 shows the reference images and stapling or punching positions thereof.

Figure 95:
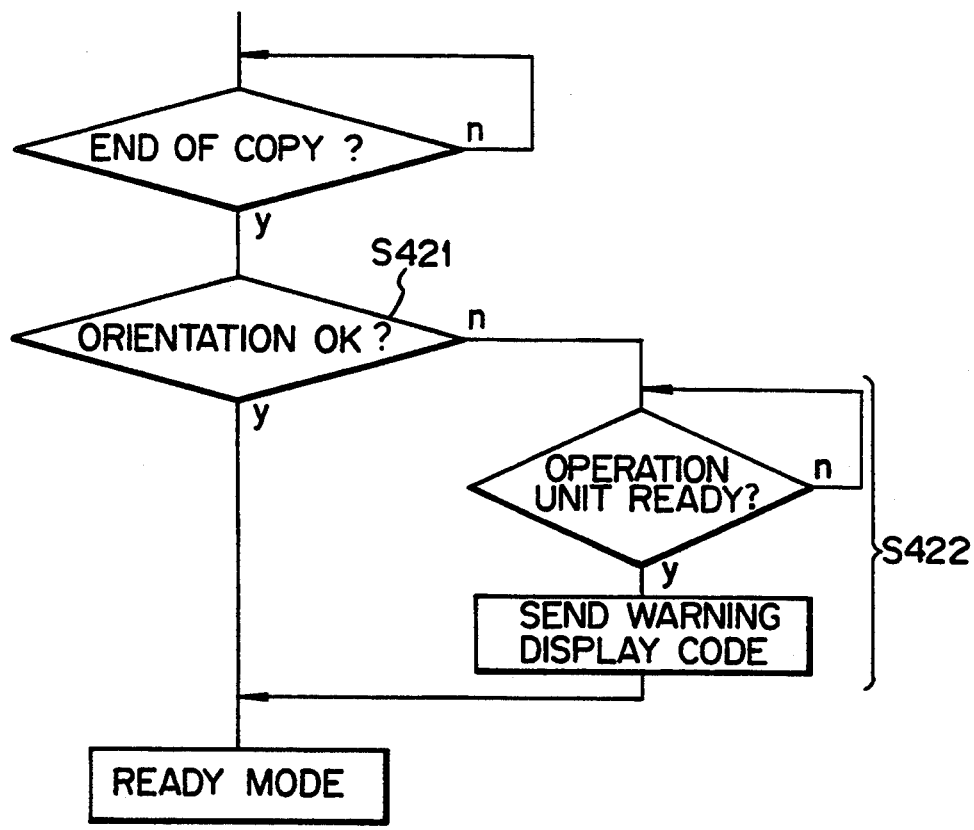
FIG. 95 is a flowchart showing a procedure for determining whether or not image orientations are coincident.

As shown in FIG. 95, after a copying operation, whether or not orientations are OK is determined (S421). If they are OK, the program enters into a ready mode; if otherwise, a warning is displayed (S422). If the operation unit is ready to receive a code, a warning display code is sent thereto to request the operator to acknowledge the condition.

Of course, the implementations described above are also applicable to two-sided image formation (two-sided copy).

Generally, when the operator punches, staples or otherwise binds copies without noticing the presence of copies of different orientations, such copies will be lost or will make make it difficult to turn over the pages while degrading the appearance. The embodiment checks the layout of each document and rearranges, if any of them is different in orientation, the image by, for example, image processing.

4.2.6 Recovery in Orientation NG Condition (Non-coincidence of Corner Blank Area)

Assume an image forming apparatus of the type detecting an image orientation of each document by detecting a blank area on the basis of layout decision, and determining whether or not a document different in image orientation from the first document is present. When such a document is present, one of the following procedures is effected:

(a) interrupting copying and displaying a warning;
(b) rotating image (in memory); and
(c) scanning document in reverse direction.

This informs the operator of the present of the document in question and/or rearranges the image orientation to thereby uniformize the resulting copies in orientation.

Specifically, interrupting the copying operation and displaying a warning occurs according to the procedure shown in FIG. 62. The warning is identical with the one shown in FIG. 63. The image rotation is executed in the same manner as in FIG. 42 and accompanied by the message shown in FIG. 43. Further, the reverse scanning is executed in the same manner as in FIG. 44 and accompanied by the message shown in FIG. 45.

Of course, the above procedures (a)-(c) are also applicable to two-sided image formation (two-sided copy).

4.2.7 Unidentifiable Document

Assume an image forming apparatus of the type detecting an image orientation of each document by detecting a blank area on the basis of layout decision, and determining whether or not a document different in image orientation from the first document is present. When the document to be the reference is unidentifiable in orientation, the following measures may be selectively taken:

(a) forming image in predetermined direction, and displaying warning;
(b) selecting next page or subsequent page as reference, and displaying warning; and
(c) interrupting image formation, and displaying warning.

This informs the operator of the identifiable document and the presence of a corresponding copy in the resulting set of copies. This will be described specifically hereinafter.

The procedure for forming an image in a predetermining direction and displaying a warning is identical with the procedure shown in FIG. 47 and accompanied by the message shown in FIG. 50.

Figure 96:
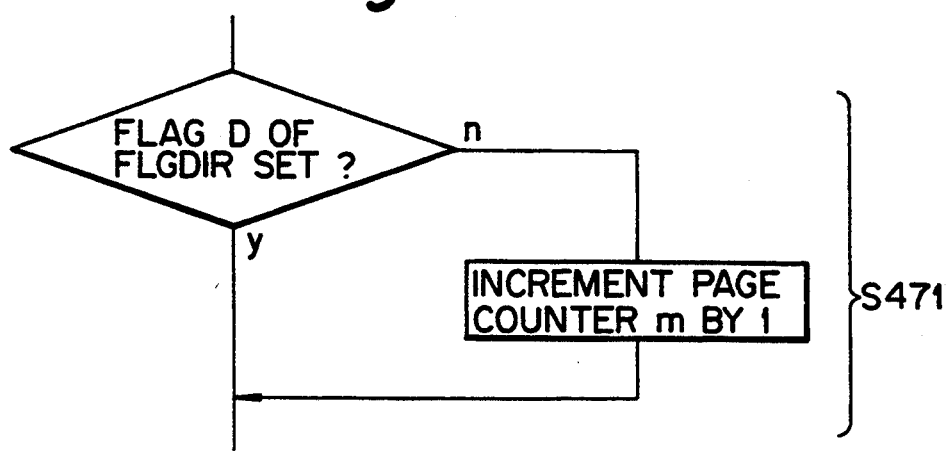
FIGS. 96 and 97 are flowcharts each showing a procedure for uniformizing image orientations using the subsequent page as a reference.
Figure 97:
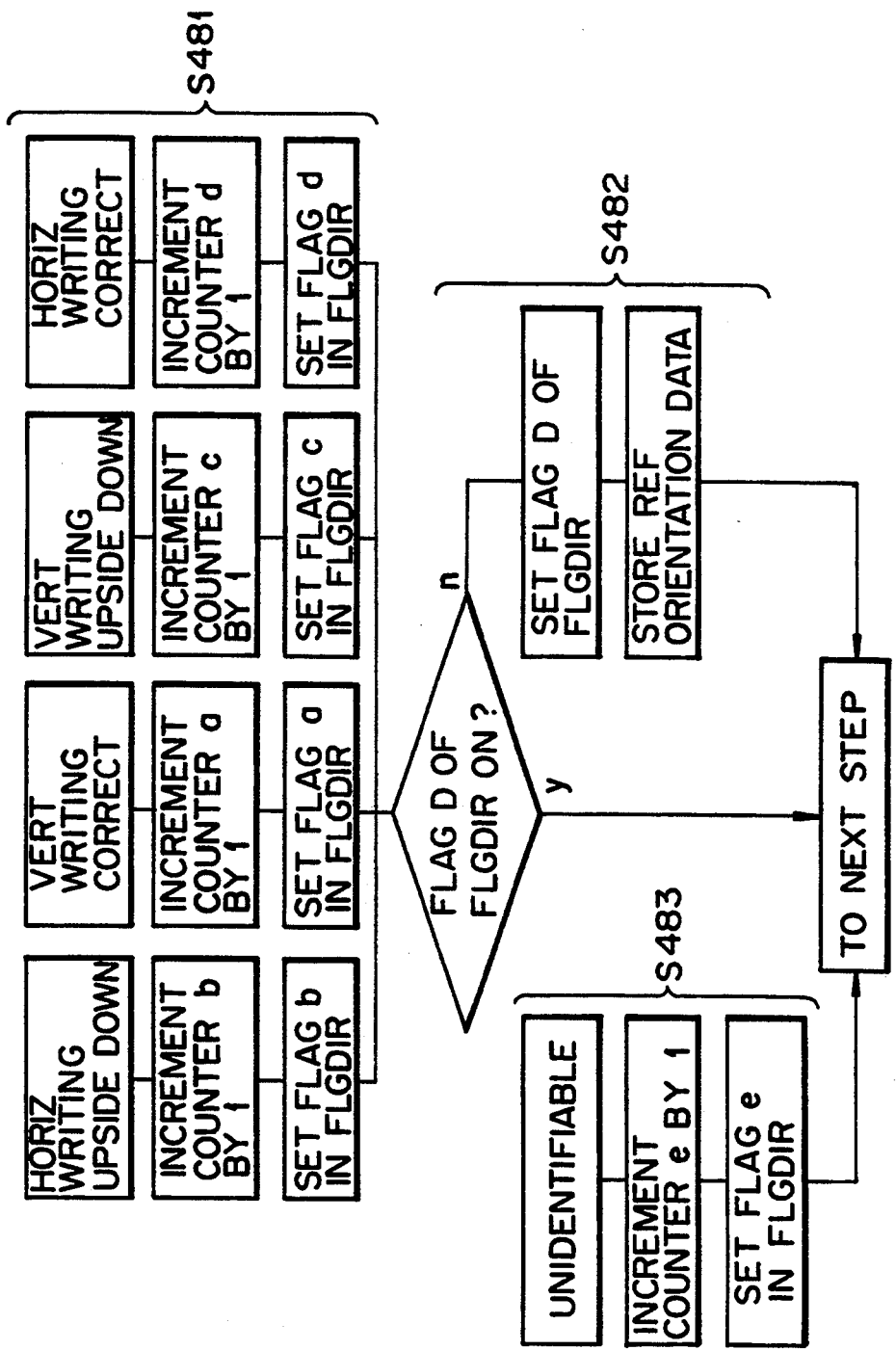

Referring to FIGS. 96 and 97, a procedure which uses the next page or subsequent page as a reference document will be described. As shown in FIG. 96, the page number of the reference document is determined (S471). A reference orientation data flag D of FLGDIR which will be described and a page counter m are cleared before the first document is scanned. When the first document is read, the page counter m is incremented by 1 since the flag D of the FLGDIR is reset. In FIG. 97, the image direction of each document is detected on the basis of the blank area determined by the layout decision, and then a corresponding counter is incremented. Specifically, counters a, b, c, d and e are respectively responsive to vertically written documents correctly positioned in the top-and-bottom direction, horizontally written documents upside down in the top-and-bottom direction, vertically written upside down documents, horizontally written correctly positioned documents, and documents unidentifiable in orientation. For a vertically written correctly positioned document, a flag a is set in the byte-by-byte memory FLGDIR; for a horizontally written upside down document, a flag b is set, for a vertically written upside down document, a flag c is set; and for a horizontally written upside down document, a flag d is set (S481). When the orientation of the document is identified, the program advances to a step S482. If the flag D of the FLGDIR is reset, the flag D is set in the memory FLGDIR as a reference orientation flag to thereby store reference orientation data. If the flag D is set (i.e. when reference direction data exists), the next step is executed. If the orientation is not identifiable, the flag e is set in the memory FLGDIR as an orientation flag (S483). FIG. 52 shows the bit arrangement of the memory FLGDIR in which a, b, c, d, e and D are respectively 01H, 02H, 04H, 08H, 10H and 20H.

After all the documents have been copied, a warning display code is sent to the CPU of the operation unit if the latter is ready to receive a code. The page number of the reference document stored in the page counter m is displayed at the same time. At this instant, the message shown in FIG. 53 appears.

Figure 98:
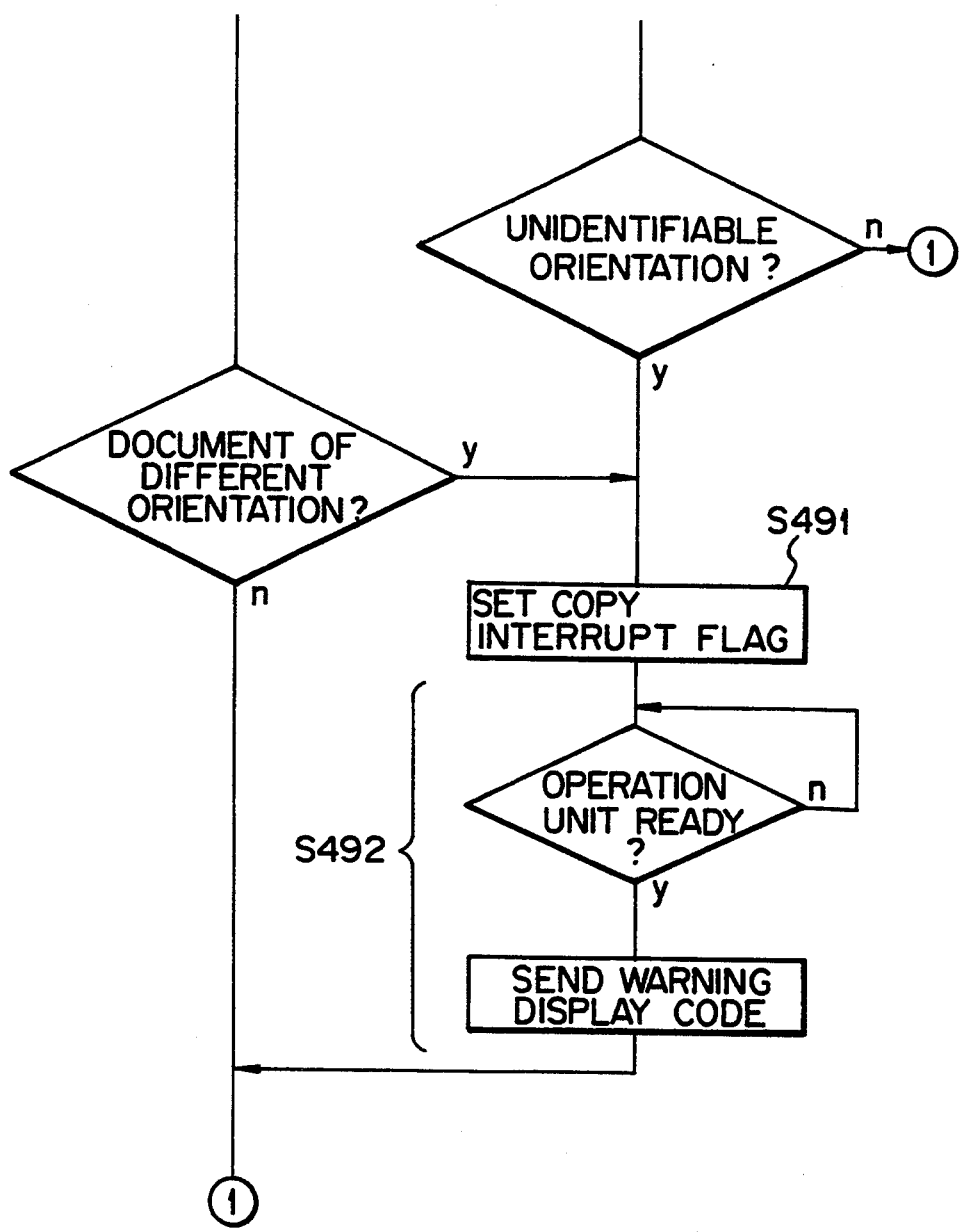
FIG. 98 is a flowchart showing a warning display procedure to be executed when documents of different orientations are stacked together or when an image orientation is unidentifiable.

FIG. 98 shows a procedure for interrupting the image formation and displaying a warning on the operation unit. If a document of orientation different from the reference document or a document whose orientation cannot be identified exists, the operation advances to a step S491 for setting a copy interruption request flag. In a step S492, if the operation unit is ready to receive a code, a warning display code is sent thereto to request the operator to acknowledge. At this instant, the message shown in FIG. 59 appears.

As stated above, by informing the operator of the inability to identify the image orientation, it is possible to eliminate missing pages. Further, finishing which follows copying is facilitated since the operator is informed of the number of unidentifiable documents and the document used as a reference. In addition, when documents of various orientations are stacked together or when any one of them cannot be identified in orientation, the copying operation is interrupted and a warning is displayed.

4.2.8 Blank Document

Assume an image forming apparatus of the type detecting an image orientation of each document by detecting a blank area on the basis of layout decision, and determining whether or not a document different in image orientation from the first document is present. When a document is determined blank, document turning means turns over the document. Then, the document is read again to determine the orientation thereof, as will be described hereinafter specifically.

In the ADF (II) shown in FIG. 1, assume that a signal representative of one whole document does not include image data at all. Then, it is determined that the document is upside down with respect to the front and rear thereof. The ADF does not discharge such a document and, instead, turns it over within the ADF to allow it to be read again by the scanner. If the resulting document data is also blank data, the document of interest is determined to be blank on both sides thereof and then discharged. At the same time, the image data associated with this document is discarded to prepare for the next document. If the image carried on the other side of the document turned over as mentioned above is of the same orientation as the previous ones, an ordinary image forming operation is effected on the basis of that image. If otherwise, the image formation is interrupted to urge the operator to check the document or to display a warning. Such an image will be rotated in the memory to uniformize the orientations.

The above procedure is identical with the procedure of FIGS. 60 and 61 except for the step 186. The interruption of copying and the display of a warning are the same as in the procedure of FIG. 6. Again, the message shown in FIG. 63 appears. The image rotation is effected in exactly the same manner as in FIG. 42 and accompanied by the message shown in FIG. 43. The reverse scanning is exerted in the same manner as in FIG. 44 and accompanied by the message shown in FIG. 45.

4.2.9 Orientation NG (Unable to Be Dealt with by Image Processing When Corner Blank Is Noncoincident)

Assume an image forming apparatus of the type determining the orientation of an image of each of multiple documents by detecting margins and determining, based on the orientations, whether or not any of the documents is different in orientation from the first document. Further, assume that this type of apparatus lacks a recovery function against a document different in orientation from the others, i.e., it cannot deal with such a document without the operator's action. Then, the presence of a document in question is reported to the operator by any one of the following specific procedures:

(A-a) When the desired number of sets to be sorted is greater than predetermined one (open to choice), the copying operation is interrupted while a warning is displayed to alert the operator. When a predetermined period of time expires without any operator's action, the copying operation is resumed.

(A-b) When the desired number of sets to be sorted is smaller than the predetermined one, a warning is displayed, but the copying operation is continued.

(B-a) When the human body sensor 225 is in an ON state, the copying operation is interrupted while a warning is displayed to alert the operator. When a predetermined period of time expires without any operator's action, the copying operation is resumed.

(B-b) When the sensor 225 is in an OFF state, a warning is displayed, but the copying operation is continued.

In this manner, when the operator does not take any action despite the warning, the operation is automatically resumed to reduce the dead time of the machine. The procedure taking account of the number of copies to be sorted is identical with the procedure shown in FIG. 64 and accompanied by messages shown in FIGS. 65 and 66. The procedure associated with the copier having the sensor 225 is the same as in FIG. 67 and accompanied by the message of FIG. 66.

This embodiment has the following advantages. Assume that when a document different in orientation from the reference document is detected while a copying operation using a sorter is under way. Then, if the desired number of sets to be sorted is small enough to rearrange after the copying operation, the copying operation is continued without interruption. After the copying operation, a warning informing the operator of such a situation is displayed to eliminate missing pages. When the desired number of sets to be sorted is too great to rearrange after the copying operation, the copying operation is interrupted and a warning is displayed. Even in this case, if a predetermined period of time expires without any operator's action, the operation is resumed to eliminate the wasteful dead time of the machine and the time wastefully occupied by the current job. The warning appearing after the copying operation automatically informs the operator of the presence of the orientation NG document (and a copy thereof) and urges him to see the orientations of the copies at the time of stapling, punching or similar binding.

In the case of the copier with the human body sensor 225, when the sensor 225 is in an OFF state (the operator is away from the copier), the copying operation is continued without interruption. After the copying operation, a warning appears on the operation unit to automatically urge the operator to see the orientations of the copies before binding them. When the sensor 225 is in an ON state, the copying operation is interrupted while a warning is displayed. Further, assume a predetermined period of time expires without any operator's action despite the interruption of operation and the warning. Then, the copying operation is automatically resumed to save time. At this instant, the warning appearing after the copying operation automatically informs the operator of the presence of the orientation NG document (and a copy thereof) and urges him to see the orientations of the copies at the time of binding.

4.3.1 Determining Stapling Position Based on Layout Decision (Set Position and Size of Document)

4.3.2 Determining Stapling Position Based on Corner Blank Data Derived from Layout Decision (Stapling Adequate Corner)

4.3.3 Stapling Detected Corner Blank Area

An image orientation is detected by detecting corner blank portions of individual documents on the basis of layout decision. Then, a stapling position is determined on the basis of the detected image data.

Figure 99:
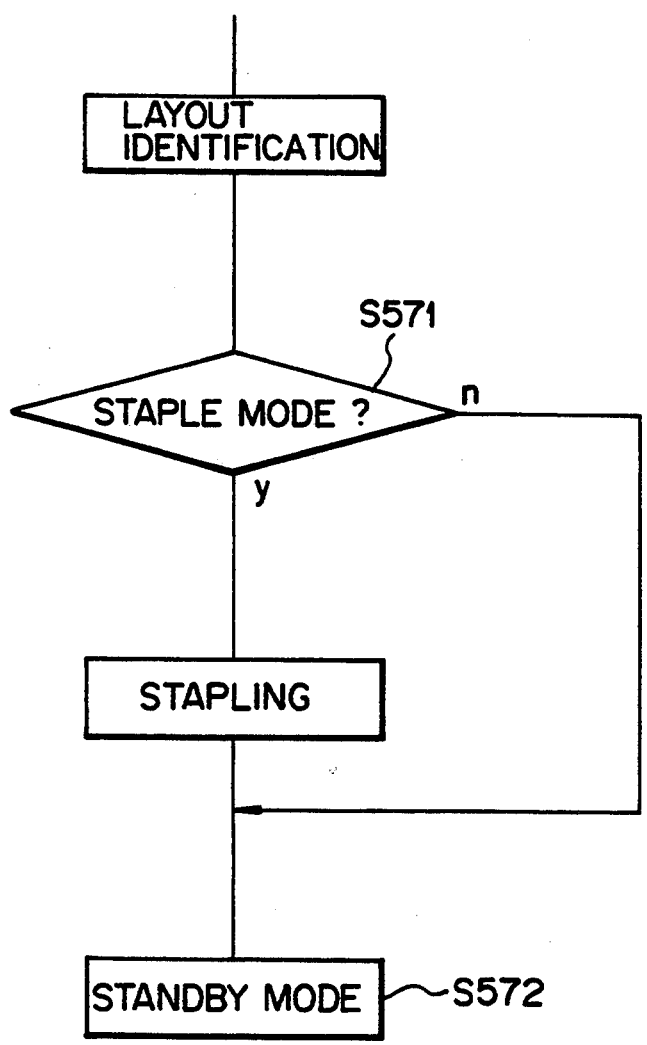
FIG. 99 is a flowchart showing staple processing based on the identification of a layout.

Specifically, a stapling position based on the layout decision may be implemented by either of the following methods:

(a) determining stapling position on the basis of layout decision and set position and size of document; and (b) determining stapling position on the basis of corner blank data of page range of output image data based on layout decision As shown in FIG. 99, one of the following two modes is selected (S571):

(a) standby mode: sent to operation unit for waiting next command to be entered by operator (b) staple mode: sent to stapling position changing mechanism as operation command In the staple mode, a staple mechanism is controlled by the operation command. After the stapling, the program advances to the standby mode (S572) and awaits the next command. Of course, this is also true with two-sided image format (two-sided copy). Since an image orientation is detected on the basis of the set position and size of the document derived from layout decision or on the basis of the corner blank data, defective stapling is eliminated.

4.3.4 Determining Stapling Position Based on Common Corner Blank portion Derived from Layout Decision A corner blank area common to all the images is detected by the layout decision to thereby determine an image orientation. A stapling position is determined on the basis of the detected image data. Again, As shown in FIG. 99, one of the following two modes is selected (S571):

(a) standby mode: sent to operation unit for waiting next command to be entered by operator (b) staple mode: sent to stapling position changing mechanism as operation command In the staple mode, a staple mechanism is controlled by the operation command. After the stapling, the program advances to the standby mode (S572) and awaits the next command. Of course, this is also true with two-sided image format (two-sided copy). Since a stapling position is determined by detecting a corner blank area common to all the images, defective stapling is eliminated.

4.3.5 Orientation Matching by Comparing Corner Blank Area and Reference Stapling Position After an image orientation has been detected by detecting corner blank portions common to the images on the basis of layout decision, the detected image data and a reference stapling position are compared. This is also true with two-sided image formation (two-sided copy). Such a procedure is also successful in preventing copies front being defectively stapled.

4.3.6 Recovery in Orientation NG Condition By Comparing Corner Blank Area and Reference Stapling Position Assume an image forming apparatus of the type detecting an image orientation by detecting corner blank portions common to the images on the basis of layout decision, and then determining a stapling position on the basis of the detected orientation data. When the detected image orientation data and the reference stapling position do not coincide, defective stapling is eliminated by:

(a) interrupting copying, and displaying warning;

(b) inhibiting stapling, but continuing copying;

(c) rotating image (in memory); or (d) scanning document in reverse direction.

Figure 100:
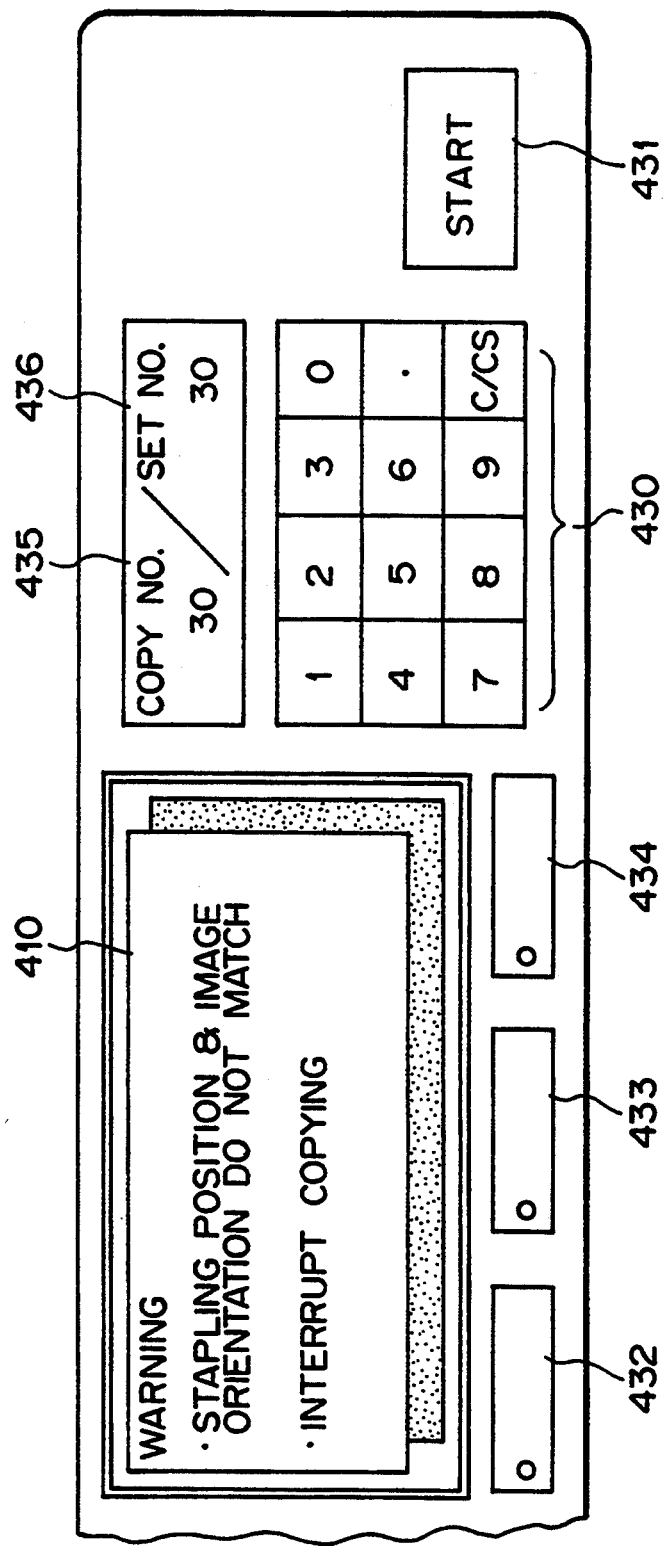
FIG. 100 is a plan view showing a specific condition of the operation and display section.

The procedure for interrupting copying while displaying a warning is the same as in FIG. 62 and accompanied by a specific message shown in FIG. 100. The procedure for inhibiting stapling while continuing copying is the same as in FIG. 69 and accompanied by the message shown in FIG. 63. The procedure for rotating the image is the same as in FIG. 42 and accompanied by the message of FIG. 43. Further, the reverse scanning is executed in the same manner as in FIG. 44 and accompanied by the message of FIG. 45. This is also true with two-sided image formation (two-sided copy).

As stated above, when the image orientation based on the blank data detected by layout decision does not coincide with the reference stapling position, any one of the above measures is taken to inform the operator of the presence of a document of different orientation and/or to execute a recovery procedure. This uniformizes the orientations of the copies while eliminating missing pages.

4.3.7 Presence of Image in Stapling Position Determined by Corner Blank Data Assume an image forming apparatus of the type detecting an image orientation by detecting corner blank portions common to the images on the basis of layout decision, and then determining a stapling position on the basis of the detected orientation data. When an image is present in the determined stapling position, any one of the following measures is taken:

(a) interrupting copying, and displaying warning;

(b) inhibiting stapling, but continuing copying;

(c) shifting or magnification changing (reducing) by image processing;

(d) changing stapling position; and (e) automatically cancelling staple mode (at the time of default)

These measures prevent staples from overlapping and damaging images. The procedure for interrupting copying and displaying a warning is the same as in FIG. 62. The procedure for inhibiting stapling while continuing copying is the same as in FIG. 71. The procedure for shifting or magnification changing by image processing is the same as in FIG. 72. The procedure for changing the stapling position is the same as in FIG. 73. The procedure for automatically cancelling the staple mode (at the time of default) is the same as in FIG. 71. A message identical with the one shown in FIG. 77 is displayed. This is also true with two-sided image formation (two-sided copy).

4.3.8 Uniformizing Mixture of Vertical and Horizontal Documents Based on Layout Decision and Determining Stapling Position An image orientation is determined on the basis of the layout decision of each document or by detecting a corner blank area of the page area of reference output image data based on the layout decision. Whether or not any one of the documents differs in orientation from the reference document is determined so as to uniformize the orientations. Then, a stapling position is determined. When a document different in orientation from the reference document is detected, the copying operation is interrupted while a warning is displayed to alert the operator to such an occurrence. This protects images from damage due to defective stapling. A specific procedure is the same as the procedure described with reference to FIGS. 91 and 92.

As shown in FIG. 94, four different reference stapling (or punching) positions may be contemplated, as follows:

(1) When a vertically long horizontally written document is a reference, the stapling position is the upper left corner in the case of one-point binding or the left edge in the case of multipoint binding;

(2) When a horizontally long horizontally written document is a reference, the stapling position is the upper right corner in the case of one-point binding or the right edge in the case of multipoint binding;

(3) When a vertically long vertically written document is a reference, the stapling point is the upper right corner in the case of one-point binding or the right edge in the case of multipoint binding; and (4) When a horizontally long vertically written document is a reference, the stapling point is the upper left corner in the case of one-point binding or at the heft edge in the case of multipoint binding.

Figure 101:
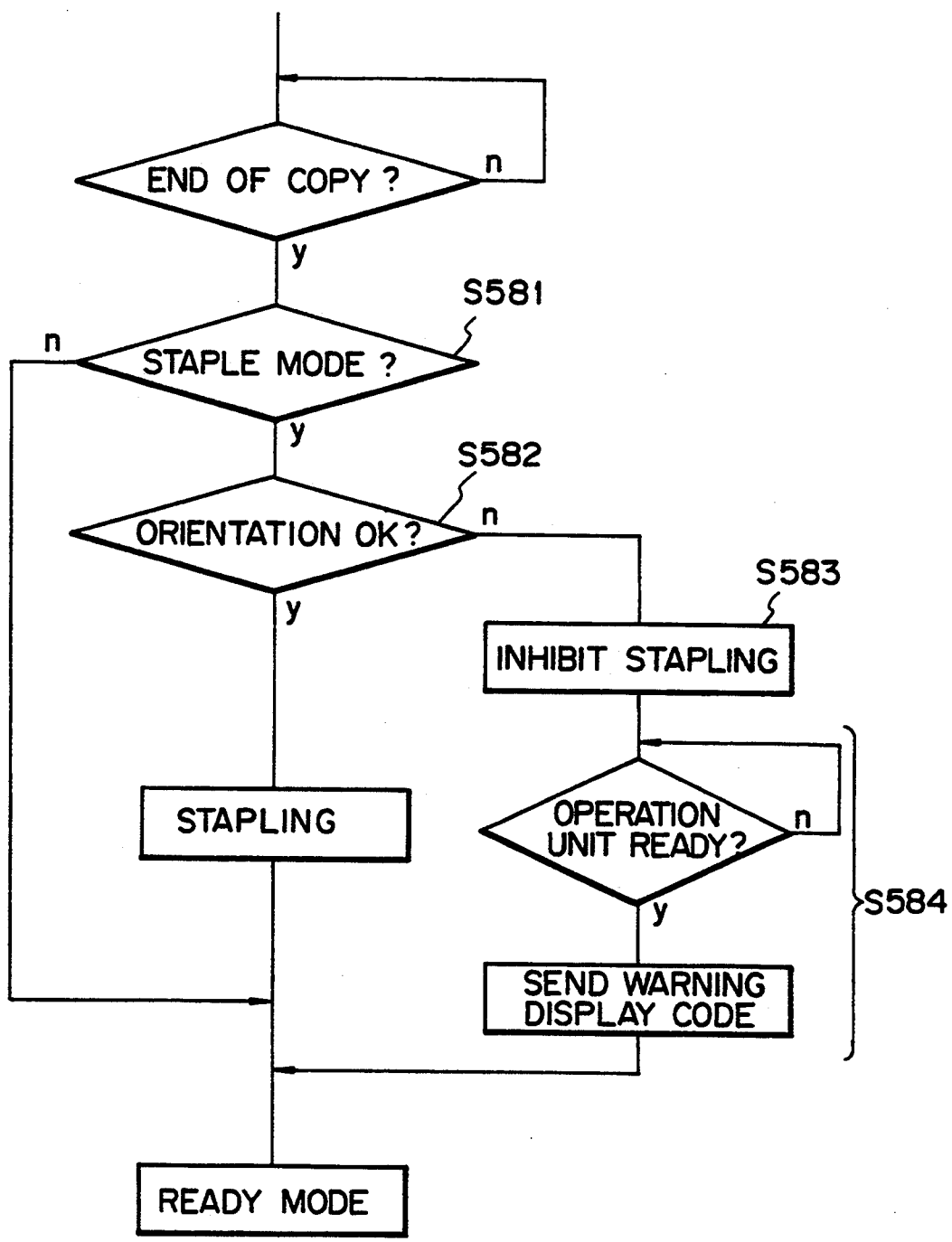
FIG. 101 is a flowchart showing a procedure associated with image coincidence and stapling.

The operation will be described specifically with reference to FIG. 101. As shown, after the copying operation, whether or not a staple mode is selected is determined (S581). If the answer is positive, whether or not the orientations of images match is determined (S582). If they match in orientation, the program operates a stapler and then enters into a ready mode. If the answer of the step S582 is negative, the program inhibits the stapler from operating (S583) and then executes a step S584. In the step S584, if the operation unit is ready to receive a code, a precaution display code is sent thereto to request the operator to acknowledge the condition. Such a procedure is also applicable to two-sided image formation (two-sided copy).

4.4.1 Selectively Skipping Orientation Identification

Assume an image forming apparatus of the type determining an image orientation by detecting a common corner blank area on the basis of layout decision and then determining a stapling position on the basis of the detected image data. In a usual image form mode (not including finishing), the apparatus skips the identification of an image orientation in order to prevent the copying efficiency from lowering, as will be described specifically hereinafter.

For the identification of an image orientation, image processing and other extra processing are needed and have to be executed every time a document is scanned. This is extremely time-consuming and undesirable from the efficiency standpoint when it comes to usual copying. In the light of this, in a usual copy mode, the orientation identification is skipped for promoting efficient copying. This processing is substantially identical with the processing described with reference to FIG. 75.

4.4.2 Stapling Position NG Based on Blank Data When Manual Staple Command Is Entered Assume an image forming apparatus of the type determining an image orientation by detecting a common corner blank area on the basis of layout decision and then determining a stapling position on the basis of the detected image data. Further, assume that when a manual staple command is entered after the sorting operation, a document of inadequate orientation is present or an image is present at the stapling position. Then, either of the following measures is taken:

(a) displaying warning; and b) inhibiting stapling.

This is successful in eliminating defective stapling which would damage the image. The above measure (a) is executed in the same manner as in FIG. 76 and displays the message shown in FIG. 74. The measure (b) is executed in the same manner as in FIG. 78 and displays the message shown in FIG. 79.

5. Identifying Image Orientation Based on Character Orientation

Regarding the top-and-bottom orientation of image data, an exclusive device detects it with an image memory. While the image memory is implemented as an image memory built in the unit (page memory or any desired area memory), it may be constituted by an image memory built in another unit. For example, use may be made of the SAF memory included in the facsimile unit, or a page memory necessary for image from the scanner to be compressed and expanded.

A technology available for determining the top-and-bottom orientation of an image will be described hereinafter.

Character recognition using the OCR technology is an accurate approach for the above purpose. Specifically, characters included in a document are extracted one by one, converted to patterns, and compared with character pattern data stored at a data base. To determine each character, use is often made of the neurofuzzy scheme. When the character patterns cannot be identified unless rotated 180 degrees, the document is determined to be positioned upside down in the top-and-bottom direction. The decision is made on several characters so as to promote accurate orientation identification.

A procedure for identifying the orientation of a character will be described. To begin with, a character is separated from any character line existing in the document read by the scanner. Assuming that a horizontally written document is a reference, a character separated from a vertically written document is rotated 90 degrees. In addition, a character may have been rotated, for example, 0 degree, 90 degrees, 180 degrees or 270 degrees due to the irregularity in the position of the document. To identify such rotated characters, some different methods have been proposed in the past. One of them is to rotate an input character image to various angular positions while extracting the characteristic thereof and comparing the characteristic with a dictionary listing regular angles. Another method is to prepare a plurality of dictionaries each matching a particular rotation angle and compare an input image with the dictionaries.

Figure 102:
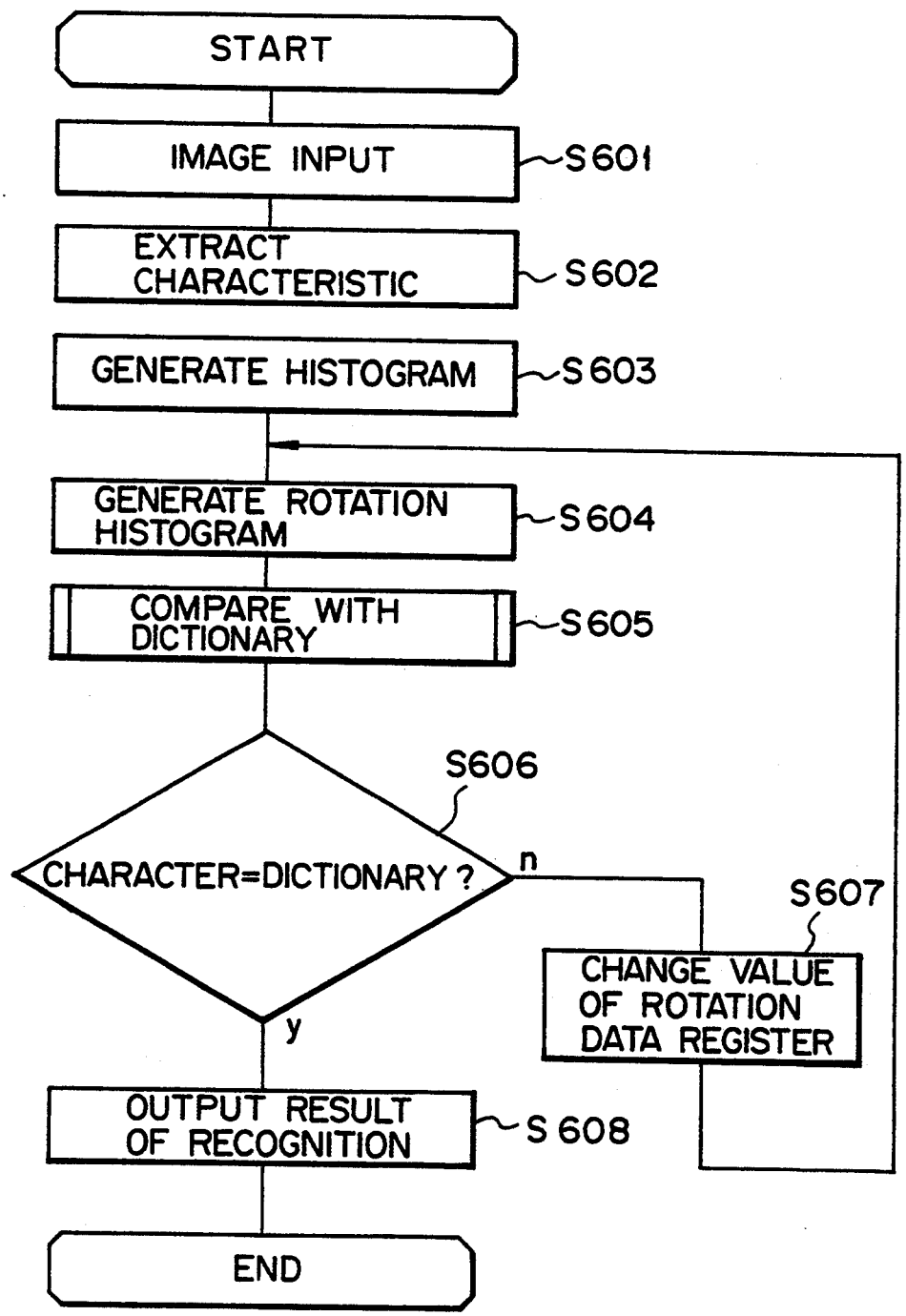
FIG. 102 is a flowchart showing a character recognition procedure.
Figures 103, 104:
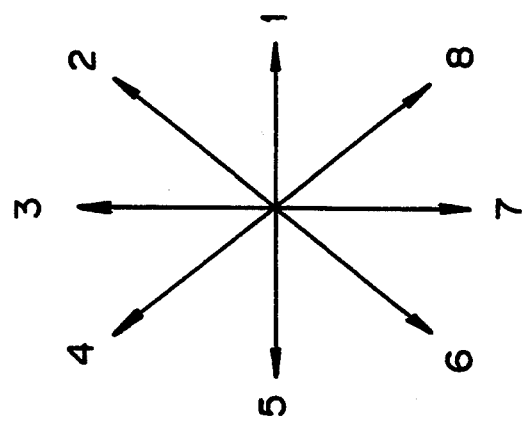
FIG. 103 shows direction codes to be assigned to the contour of an input character image.
FIG. 104 shows histograms each being associated with a particular direction code.

FIGS. 102-106D demonstrate a specific procedure for identifying the orientation of a character. Among them, FIG. 102 shows a general character recognition procedure. As shown, as a character image is inputted (S601), the characteristic of the character image is extracted (S602). Here, the characteristic is implemented as a contour, and character codes shown in FIG. 103 are added to the contour. Next, a histogram shown in FIG. 104 is generated on the basis of the direction codes added to the contour of the character image (S603), representing an amount of characteristic H. Subsequently, the histogram is rearranged in matching relation to the rotation angle of the input character to thereby generate a rotation histogram (step S604). The rotation histogram is compared with a dictionary (S605 and S606), and the result of recognition is outputted (S608). If the result of step S606 is noncoincidence, the value of a rotation control register is changed (S607), and then the histogram is rotated 90 degrees to generate another rotation histogram (S604). The new rotation histogram is compared with the dictionary (S605).

Figure 105:
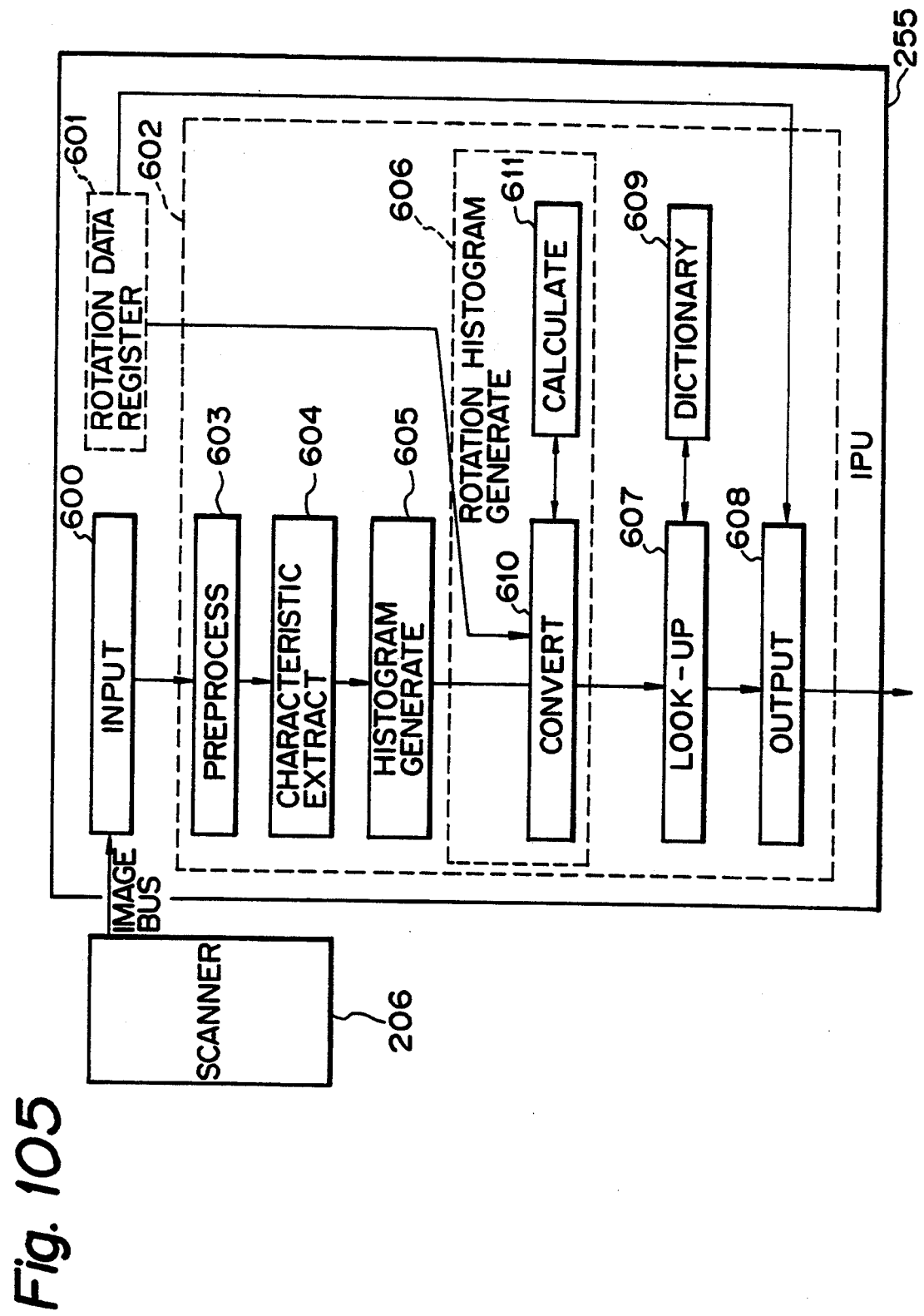
FIG. 105 is a block diagram schematically showing a device for character recognition.

FIG. 105 shows a specific hardware arrangement for implementing the above-described character recognition sequence. There are shown in the figure the scanner control circuit (scanner) 206, and the image processing unit (IPU) 255 included in the APL5 and provided with an image memory for storing an input image from the scanner 206. The IPU 255 identifies the orientation of a character. Specifically, the IPU 255 is made up of an input section 600 for handling image data, a rotation data register 601 for memorizing the degree of rotation of an original character image, and a recognizing section 602 for character recognition.

In the recognizing section 602, a preprocessing section 603 separates a character image out of bilevel image data of a document fed from the scanner 206, and normalizes it, e.g., removes noise from it. A character extracting section 604 extracts the characteristic of the normalized character image. A histogram generating section 605 generates the histogram of the extracted characteristic. A rotation histogram generating section 606 rearranges the histogram on the basis of the rotation angle stored in the rotation data register 601 to generate a rotation histogram. A look-up section 607 compares the rotation histogram with a dictionary 609 to determine a representative. An output section 608 outputs the result of recognition. The dictionary 609 stores nonrotated or standard histograms character by character. The rotation histogram generating section 606 is constituted by a converting section 610 and a calculating unit 611.

FIGS. 106A-106D each shows character codes added to a specific *kanji* (Chinese character) positioned in a particular angle. When the rotation angle is zero, the character appears as shown in FIG. 106A. When the character is read in the angle shown in FIG. 106B, the character extracting section 604 transforms it to direction codes. The histogram generating section 605 generates a histogram on the basis of the direction codes. At this instant, the rotation data register 601 stores 0 degree data, and the data of the rotation histogram generating section 606 is identical with the output data of the histogram generating section 605. The data of the section 606 is compared with the standard histogram dictionary 609. The result of comparison is "UNIDENTIFIABLE" since the character has been read in a 90 degrees rotated position. Then, the value of the rotation data register 601 is rewritten, and the data of the histogram generating section 605 is again converted to rotation histogram data on the basis of the value of the register 601. The new histogram data is again compared with the dictionary 609. Such a procedure is repeated until the look-up section 607 determines coincidence. When coincidence is not reached even after the rotation of 270 degrees, the character is determined to be unidentifiable and replaced with the next character. By such a sequence of steps, character orientation data is set in the rotation data register 601.

How to convert the values of the histogram generating section 605 to rotation histogram data by the data stored in the register 601 will be described. By comparing the nonrotated position of FIG. 106A and the 90 degrees rotated position of FIG. 106B, it will be seen that adding "6" to each direction code of FIG. 106B, i.e., replacing the direction code 1 with the direction code 7, replacing the direction code 2 with the direction code 8 and so forth make them identical with the direction codes of FIG. 106A. Here, when the sum exceeds "6", "8" will be subtracted from the sum and then the residual will be substituted for the direction code. Such a conversion is expressed as:

$$D = MOD(d+c-1)+1$$

where d is the direction code before conversion, c is a constant dependent on the rotation angle (0 if 0 degree, 6 if 90 degrees, 4 if 140 degrees, or 2 if 270 degrees), and D is the direction code after conversion.

Conventional document size sensing means may be combined with the above-described procedure, as follows. In Japan, for example, both of horizontal writing and vertical writing are used in daily transactions, and sheets are used in both of horizontally long and vertically long positions. With the combination of the above procedure and document size sensing means, it is possible to distinguish all of the possible combinations of the writing directions and sheet positions and to determine the top-and-bottom orientations of documents stacked on the scanner 206. FIG. 107 shows input factors for decision including document size, angular position of a separated block outputted for identification, character angular position determined by the previously stated character orientation identification, and phase difference between a character and a line. When the above combinations are applied to a document size of A4, the document may be positioned on the table of the scanner 206 either vertically, i.e., in any one of positions a-h shown in FIG. 108 or horizontally, i.e., in any one of positions i-p. Further, vertical writing, horizontal writing and upside-down position in the top-and-bottom direction are other possibilities. The table shown in FIG. 107 is used to distinguish such sixteen different kinds of conditions of a document and thereby selectively output the positions a-p.

5.1.1 Identifying Image Orientation In Output Image Data Page Based on Character Recognition The orientation of an image in an on output image data page based on character recognition is detected to uniformize the orientations of copies, as will be described specifically hereinafter.

The means and method for character recognition depend on the construction of a copying system, i.e.:

(a) Digital copier with an area memory: Prescanning is effected to automatically recognize a predetermined area or predetermined part of image data other than the background. Certain part of such an area is written to an area memory to extract and recognize a character;

(b) Digital copier with a page memory (full memory): A character is separated from a page read by scanning and recognized;

(c) Analog copier or digital copier lacking sufficient memory capacity: The copier is provided with reading means capable of reading only a predetermined range, and an ADF including an area memory and a CPU for recognition. While a document is fed, an image thereof is read to automatically recognize a predetermined area or an area of image data other than the background. A certain range of the area is written to the area memory for character recognition.

The document whose orientation has been determined is dealt with according to the procedure shown in FIG. 62. At this instant, the message shown in FIG. 65 appears. The embodiment is, of course, practicable even when two-sided image formation (two-sided copy) is desired.

As stated above, an image orientation is detected on the basis of character recognition (set position and size of a document). Whether or not an image printed on a copy will coincide in orientation with a reference image is determined on the basis of the determined orientation of each document. The presence of a document of inadequate orientation is reported to the operator to uniformize the orientations of the copies, thereby eliminating missing pages.

5.1.2 Image Orientation Matching Based on Reference Output Image Data and Using Character Recognition The orientation of an image is detected on the basis of the character recognition of each document. Whether or not a copy different in orientation from a reference image will occur is determined on the basis of the determined orientations of the documents. If such a copy will occur, the copying operation is interrupted while an alert message is displayed.

Regarding the reference image, either of the following two images may be used:

a) reference output image data used as first output image data (start page); and b) any desired page used as output image data, depending on number of documents.

The word "any" means that the page may be set by the operator or may be written in a ROM and selected in matching relation to the number of pages. The document whose image orientation has been determined is dealt with according to the procedure shown in FIG. 62. At this instant, the alert message shown in FIG. 90 appears on the operation unit. The implementation described above is also applicable to two-sided image formation (two-sided copy).

5.1.3 Distinction between Vertical and Horizontal Documents (Based on Document Size, Orientation Data, Character Orientation Data and Line Direction Data (All kinds))

The vertically long and horizontally long positions of a document as well as vertical writing and horizontal writing may be distinguished on the basis of the document size and orientation data from the document size sensing means and by detecting the orientation and line direction in the output image data page derived from character recognition.

Figure 108:
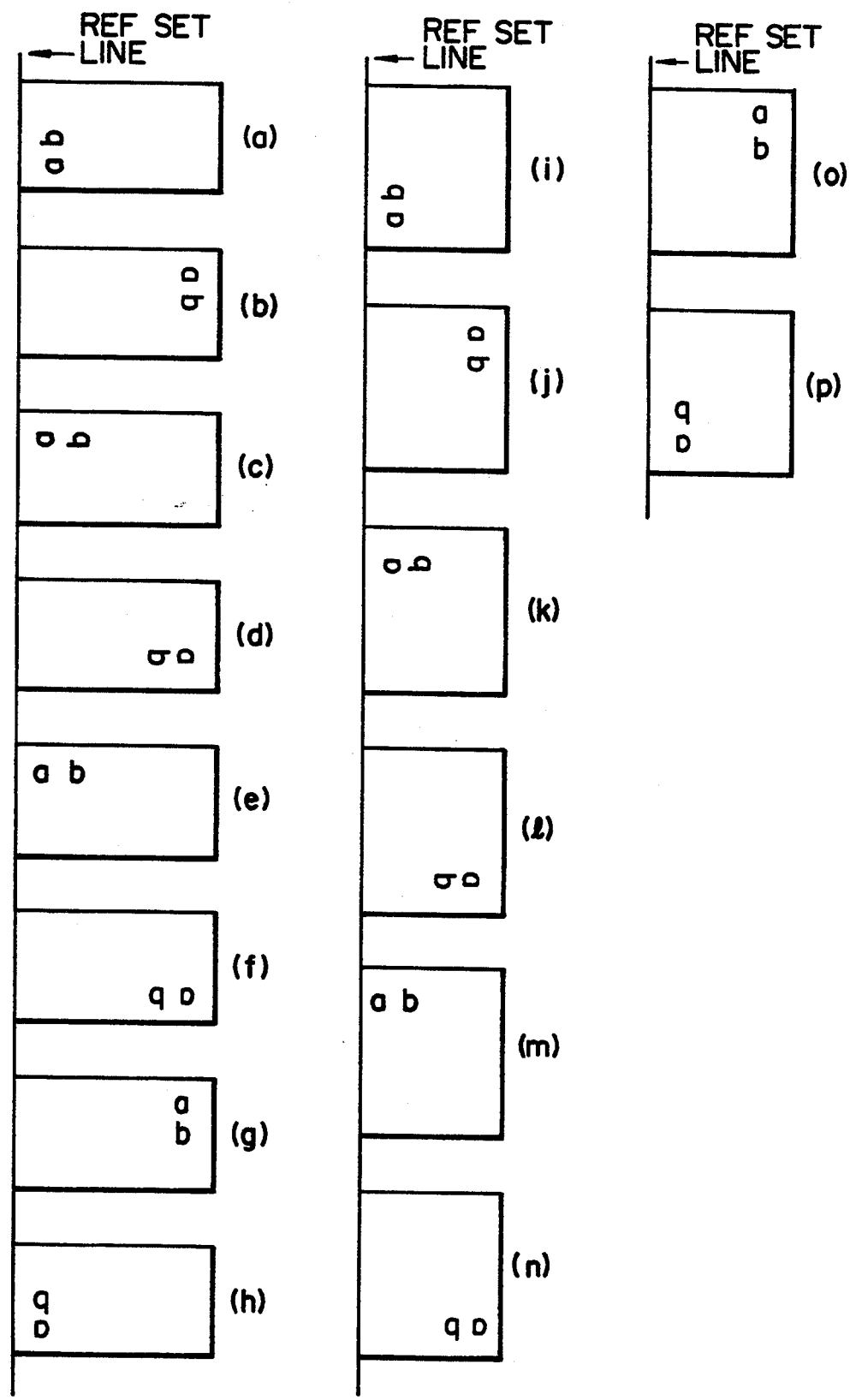
FIG. 108 shows various kinds of document positions.
Figure 109A:
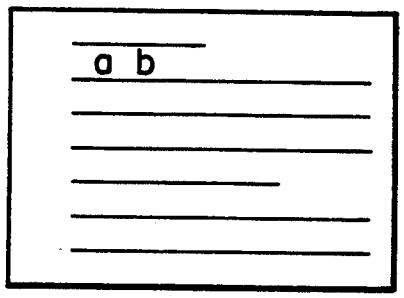
FIGS. 109A-109D show the kinds of horizontal writing and vertical writing of documents.
Figure 109B:
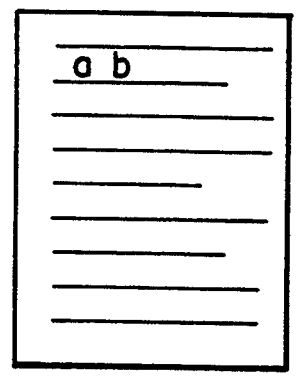
Figure 109C:
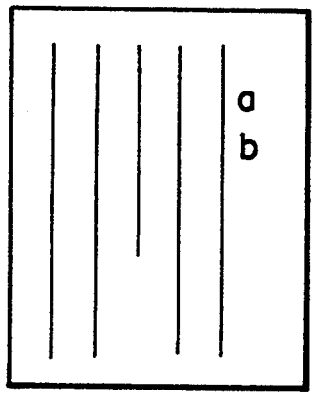
Figure 109D:
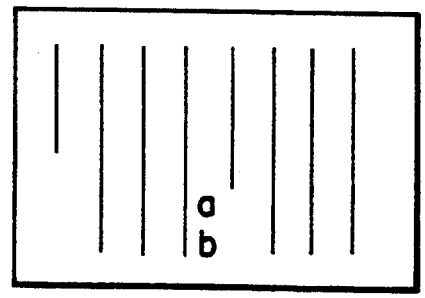

Specifically, as shown in FIGS. 107 and 108, even documents of identical size can be distinguished in sixteen ways a–p with respect to the set position, character orientation, and line direction. With character recognition alone, it is impossible to distinguish, for example, a and i, b and j, and c and k since only three parameters are available, i.e., character orientation, line direction, and phase difference between character and line. However, when document size data, i.e., two parameters are added to the reference data, the document size and document orientation can be identified. This allows even a and j and b and j to be distinguished from each other.

As stated above, by detecting the document size and orientation in addition to the character orientation and line direction, it is possible to identify not only the image orientation but also the vertically long/horizontally long document. This is successful in further enhancing accurate identification.

5.1.4 Matching Mixed Vertical and Horizontal Documents to Reference Image Data by Character Orientation Recognition FIGS. 109A–109D show four possible kinds of documents, i.e., a vertically long horizontally written document, a horizontally long horizontally written document, a vertically long vertically written document, and a horizontally long horizontally written document, respectively. It may occur that such four different kinds of documents are stacked together on the ADF. However, let a mixed stack of vertically written documents and horizontally written documents be excepted, since such a stack will not occur. Then, possible cases are:

(1) vertically long horizontally written documents and horizontally long horizontally documents are mixed; and (2) vertically long vertically written documents and horizontally long vertically written documents are mixed.

The four kinds of documents can each be identified, including the top-and-bottom orientation, by the character recognition. Regarding the mixture of vertically long and horizontally long documents, reference image data is determined and used to uniformize the image orientations of the individual documents. How to determine reference image data has been described earlier. The above principle is also true with a reference stapling (or punching) position.

5.1.5 Recovery in Image Orientation NG Condition (Noncoincident Character Orientation)

Assume an image forming apparatus of the type detecting an image orientation by character recognition document, and determining whether or not a copy different in orientation from the first document will occur. When a document in question is detected, any one of the following measures is taken:

(a) interrupting copying operation while displaying precaution;

(b) rotating image (in memory); and (c) scanning document in reverse direction.

This informs the operator of the presence of such a document and executes a recovery procedure against the image orientation NG condition. The above measure (a) is effected in the same manner as shown in FIG. 62 and accompanied by the message of FIG. 43. The measure (b) is effected in the same manner as in FIG. 42 and accompanied by the message of FIG. 63. Further, the measure (c) is effected in the same manner as in FIG. 44 and accompanied by the message of FIG. 45. These measures are also applicable to two-sided image formation (two-sided copy).

5.1.6 Orientation NG (Unable to Be Dealt with by Image Processing)

Assume an image forming apparatus of the type detecting an image orientation by character recognition document by document, and determining, based on the orientations, whether or not any of the documents is different in orientation from the first document. Further, assume that this type of apparatus lacks a recovery function against a document different in orientation from the first document, i.e., it cannot deal with such a document without the operator's action. Then, the presence of a document in question is reported to the operator by any one of the following specific procedures:

(A-a) When the desired number of sets to be sorted is greater than predetermined one, the copying operation is interrupted while a warning is displayed to alert the operator. When a predetermined period of time expires without any operator's action, the copying operation is resumed;

(A-b) When the desired number of sets to be sorted is smaller than the predetermined one, a warning is displayed, but the copying operation is continued;

(B-a) When the human body sensor 225 is in an ON state, the copying operation is interrupted while a warning is displayed to alert the operator. When a predetermined period of time expires without any operator's action, the copying operation is resumed; and (B-b) When the sensor 225 is in an OFF state, a warning is displayed, but the copying operation is continued.

Figure 110:
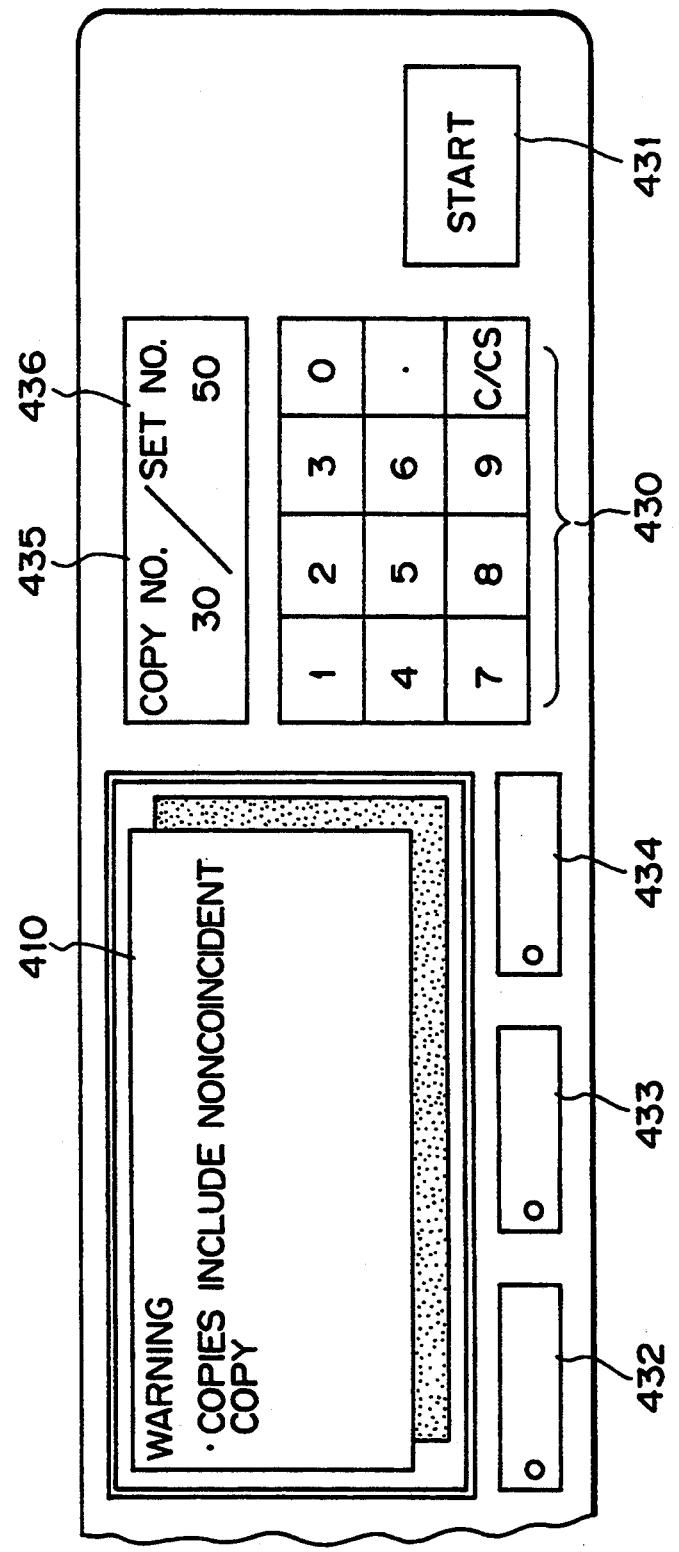
FIG. 110 is a plan view showing a specific condition of the operation and display section.

In this manner, when the operator does not take any action despite the warning, the operation is automatically resumed to reduce the dead time of the machine. The procedure taking account of the number of copies to be sorted is identical with the procedure shown in FIG. 90 and accompanied by a messages shown in FIG. 110. The procedure associated with the copier having the sensor 225 is the same as in FIG. 67 and accompanied by the message of FIG. 110.

This embodiment has the following advantages. Assume that when a document different in orientation from the reference document is detected while a copying operation using a sorter is under way. Then, if the desired number of sets to be sorted is small enough to rearrange after the copying operation, the copying operation is continued without interruption. After the copying operation, a warning informing the operator of such a situation is displayed to eliminate missing pages. When the desired number of sets to be sorted is too great to rearrange after the copying operation, the copying operation is interrupted and a warning is displayed. Even in this case, if a predetermined period of time expires without any operator's action, the operation is resumed to eliminate the wasteful dead time of the machine and the time wastefully occupied by the current job. The warning appearing after the copying operation automatically informs the operator of the presence of the orientation NG document (and a copy thereof) and urges him to see the orientations of the copies at the time of stapling, punching or similar binding.

In the case of the copier with the human body sensor 225, when the sensor 225 is in an OFF state (the operator is away from the copier), the copying operation is continued without interruption. After the copying operation, a warning appears on the operating section to automatically urge the operator to see the orientations of the copies before binding them. When the sensor 225 is in an ON state, the copying operation is interrupted while a warning is displayed. Further, assume a predetermined period of time expires without any operator's action despite the interruption of operation and the warning. Then, the copying operation is automatically resumed to save time. At this instant, the warning appearing after the copying operation automatically informs the operator of the presence of the orientation NG document (and a copy thereof) and urges him to see the orientations of the copies at the time of binding.

5.1.7 Blank Document

Assume an image forming apparatus of the type detecting an image orientation by character recognition document by document, and determining, based on the orientations, whether or not any of the documents is different in orientation from the first document. When a document is determined to be blank, document turning means turns it over. Then, the document is again read to determine the orientation of the image. The procedure is identical with the procedures shown in FIGS. 42, 44, 60, 61 and 62 and accompanied by the messages shown in FIGS. 43, 45 and 63. The difference is that in the steps S505 and S506 the document is read to identify the orientation of a character.

5.1.8 Unidentifiable Image Orientation
5.1.8.1 Forming Image In Predetermined Direction and Displaying Warning Assume an image forming apparatus of the type detecting an image orientation by character recognition document by document, and determining, based on the orientations, whether or not any of the documents is different in orientation from the first document. When an image orientation is determined to be unidentifiable, an image is formed in a predetermined direction while a warning is displayed on the operation unit. The warning informs the operator of the presence of such a document and the presence of a copy thereof.

Figure 111:
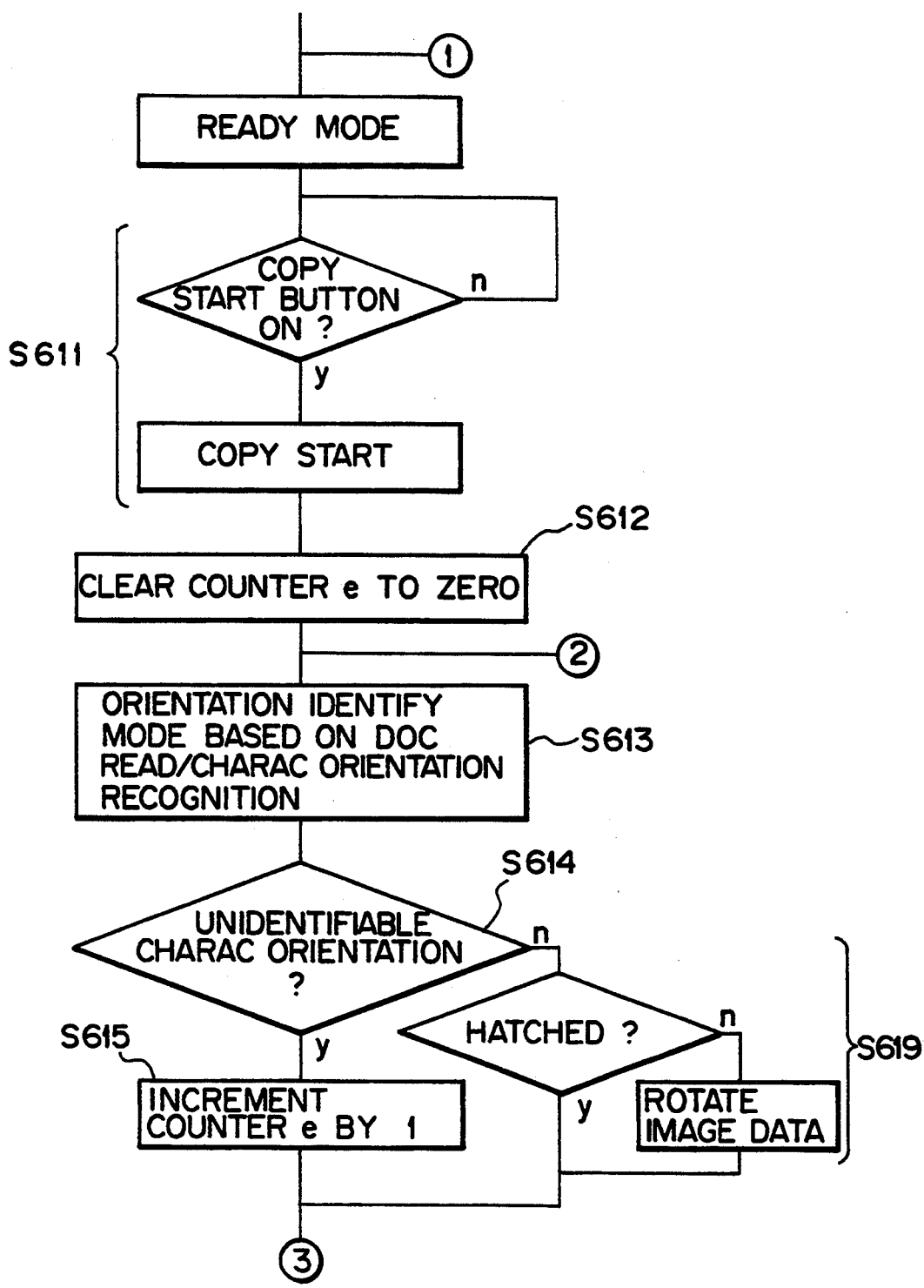
FIGS. 111 and 112 are flowcharts each showing a procedure for forming an image in a predetermined direction while displaying a warning.
Figure 112:
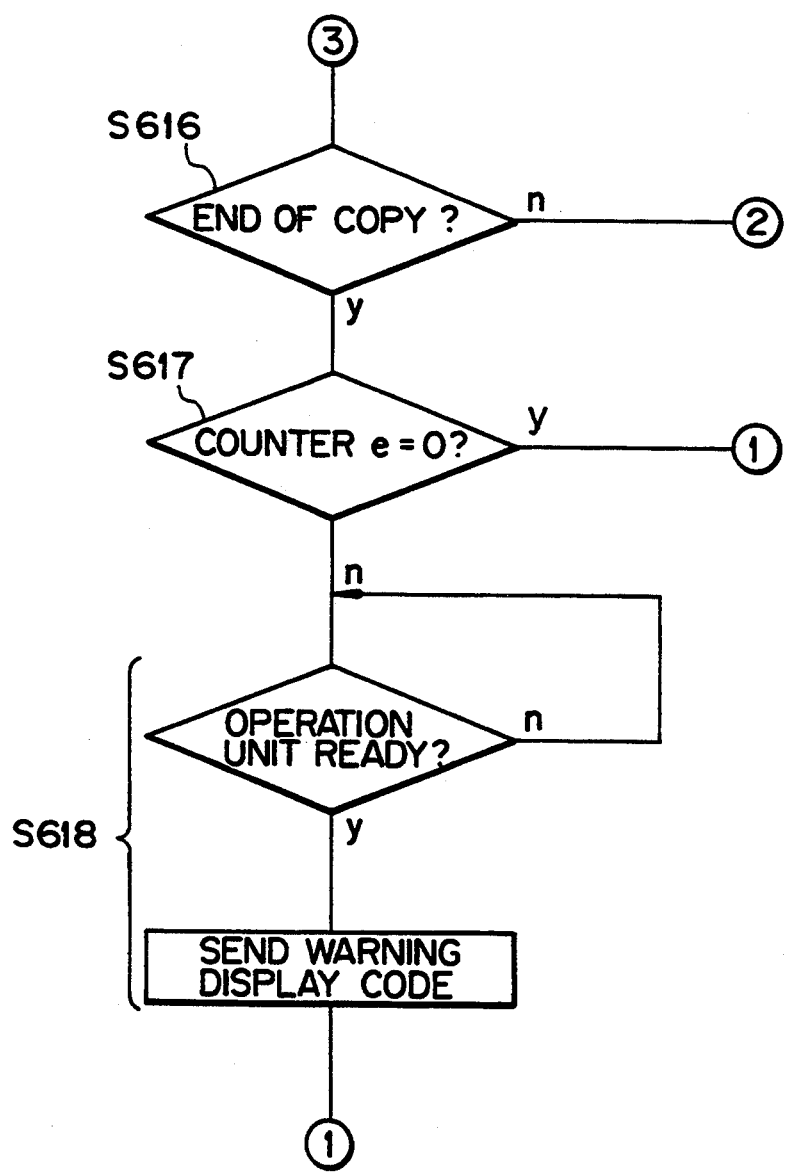

Specifically, as shown in FIGS. 111 and 112, when the copy start button provided on the copier is pressed (S611), a counter e is initialized to 0 (S612). The value of the counter e will be described specifically later. On the start of the copying operation, a document is read and the orientation of an image is determined in terms of the orientation of a character (S613). At the time of image orientation detection, whether or not the orientation of the character is unidentifiable is determined (S614). If the character is unidentifiable, the counter e is incremented by 1 (S615). The content of the counter e is indicative of the number of documents whose character orientations were unidentifiable. Specifically, after the counter e has been reset to 0 in the step 612, it is incremented by 1 every time a document with an unidentifiable character is found. Therefore, at the end of the copying operation, the counter e indicates the number of unidentifiable documents found. If the orientation of the character is identifiable as determined in the step S614, whether or not the orientation of the image is correct is determined. If the orientation is correct, the document is copied; if otherwise, the image data is rotated and then copied (S619). On the completion of the copying operation, whether or not the counter e is zero is determined (S617). If the answer of the step S617 is positive, the program enters into a ready mode for awaiting the next copy start. If the answer of the step S617 is negative and if the operation unit is ready to receive a code, a warning display code is sent thereto (S618) to request the operator to acknowledge the condition. A message to appear is the same as the message of FIG. 50. Informing the operator of the inability to identify an image information is successful in eliminating missing pages.

5.1.8.2 Forming Image in Identified Reference Image Orientation and Displaying Warning Assume an image forming apparatus of the type detecting the orientation of an image of each document by recognizing the orientation of a character by character recognizing means and determining, by using the resulting data as reference image orientation data, whether or not the orientation of the image of a document differs from that of the reference image orientation. When the image orientation of a page expected to be the reference is unidentifiable, the next page is determined to be the reference and used to uniformize the orientations of images. At this instant, a warning appears on the operation unit to show the operator the presence of such an unidentifiable document and a copy thereof.

Figure 113:
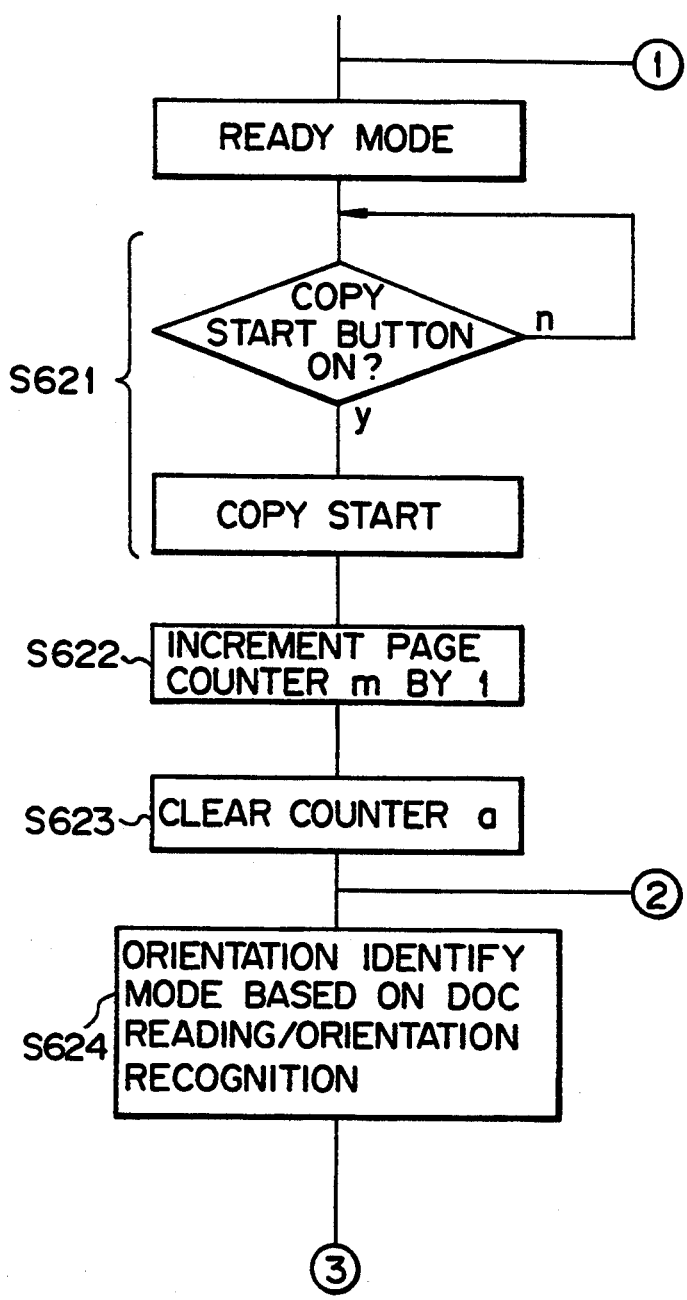
FIGS. 113-115 are flowcharts each showing a flowchart for matching an image orientation to an identified reference image data direction, forming an image, and displaying a warning.
Figure 114:
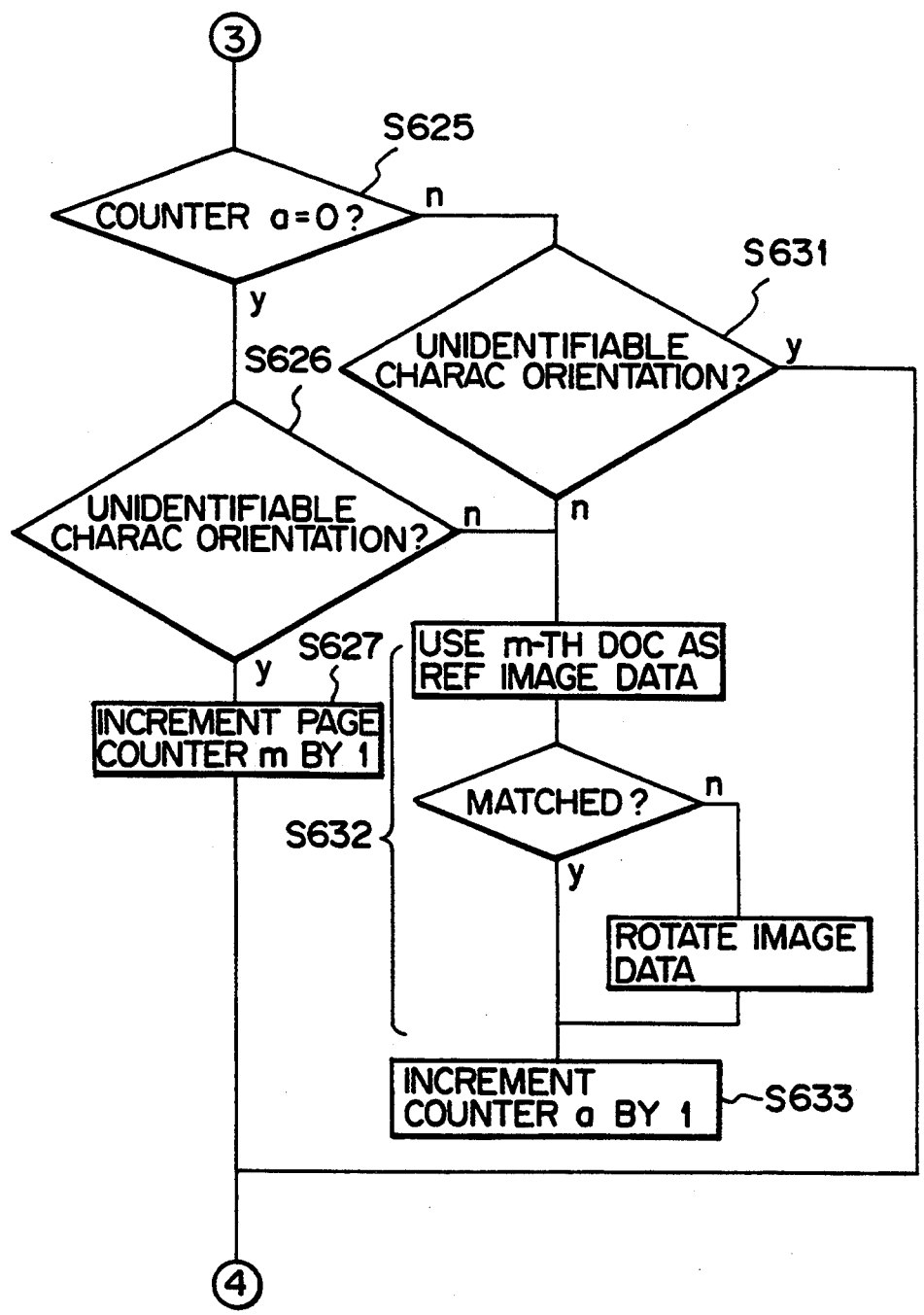
Figure 115:
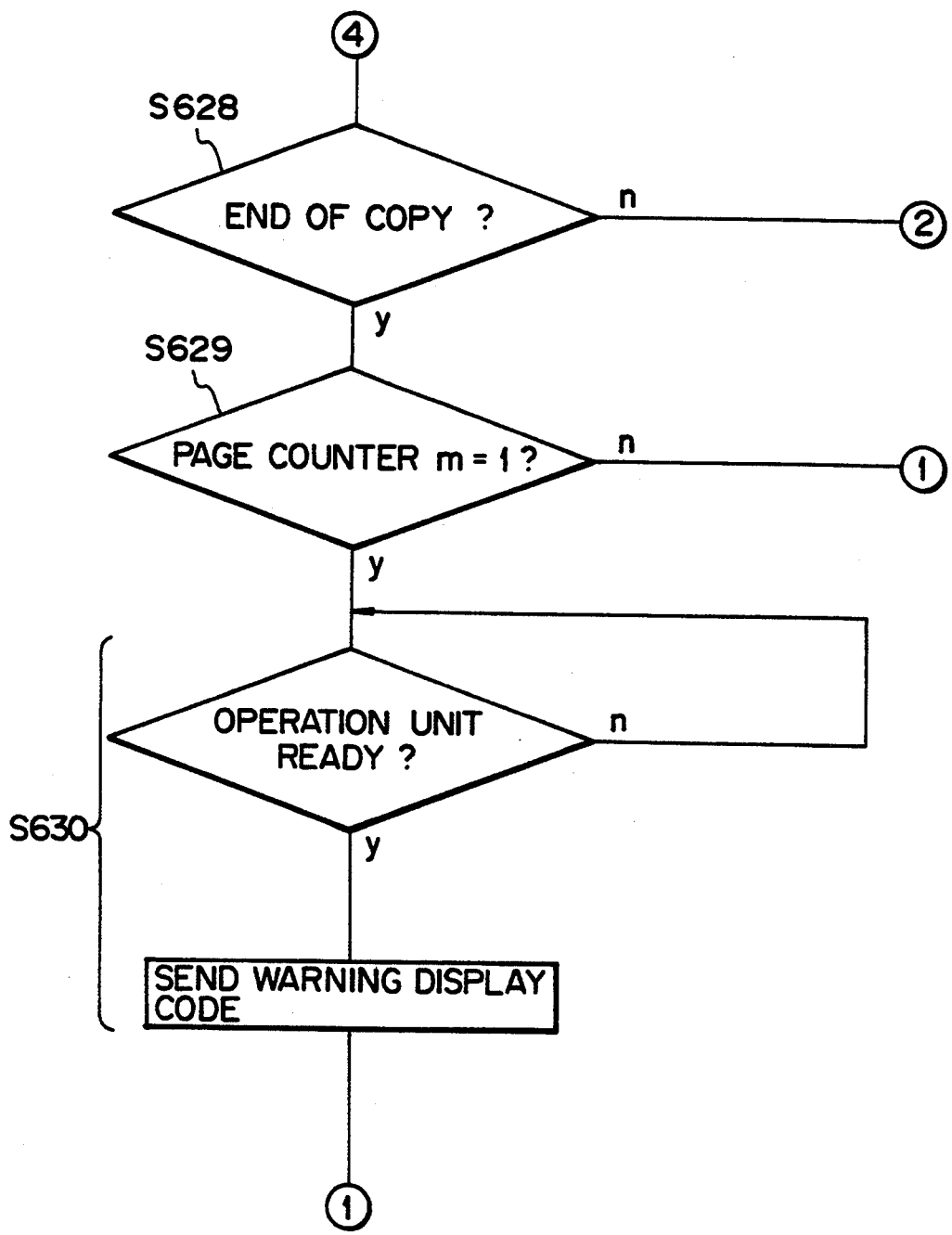

Specifically, assume an image forming apparatus having an ADF of the type stacking documents face down and feeding the lowermost document (corresponding to a cover sheet) first, and using image data of the lowermost sheet as reference image data. A reference will be made to FIGS. 113, 114 and 115 for describing a specific operation which such a type of apparatus performs when the image orientation of the first page, or reference page, cannot be identified. As shown, when the copy start button (start key 431) is pressed (S621), a page counter m is initialized to 1 (S622) while a counter a is initialized to 0 (S623). The functions of the page counter m and counter a will be described specifically later. On the start of a copying operation, a document is read and the orientation of an image is determined in terms of the orientation of a character (S624). The counter a indicates whether or not reference image data has been determined, i.e., it indicates that reference image data has not been determined when it is 0 or that the data has been determined when it is other than 0. The initial value of the counter a is 0 (S623). When reference image data is determined, the counter a is incremented by 1 at a time in a step 633. Whether or not the counter a is 0 is determined in a step S625. If the counter is 0, the program advances to a step S626; if otherwise, it advances to a step S631.

In the step S626, whether or not the orientation of a character is unidentifiable is determined. If the orientation is unidentifiable, the page counter m is incremented by 1 (S627), and the document is copied. The page counter m indicates up to which page the documents were unidentifiable. Specifically, the counter m is initialized to 1 in the step S622 and then incremented by 1 every time an unidentifiable document is found. If the orientation of a character is identifiable as determined in the step S626, the image data of the m-th document is used as reference image data. Thereafter, a document is copied if the image data thereof is identical in orientation with the reference image data or copied after image rotation if otherwise (S632). In a step S633, the counter a is incremented by 1. After the copying operation (S628), whether or not the page counter m is 1 is determined (S629). If the page counter m is 1, meaning that the image data of the document corresponding to the cover sheet is the reference, the program enters into a ready mode for awaiting the next copy start. If the page counter m is not 1 and if the operation unit is ready to receive a code, a warning display code is sent thereto to request the operator to acknowledge the condition (S630). Then, a message identical with the message of FIG. 53 appears on the operation unit. This informs the operator of the inability to identify the document to image thereby eliminate missing pages.

5.1.8.3 Interrupting Image Formation and Displaying Warning

Assume an image forming apparatus of the type detecting an image orientation by character recognition document by document, and determining, based on the orientations, whether or not any of the documents is different in orientation from the first document. When the orientation of an image is not identifiable, the copying operation is interrupted while a warning is displayed on the operation unit. This informs the operator of the presence of an unidentifiable document and a copy thereof and thereby urges him to change the position of the document in question.

Figure 116:
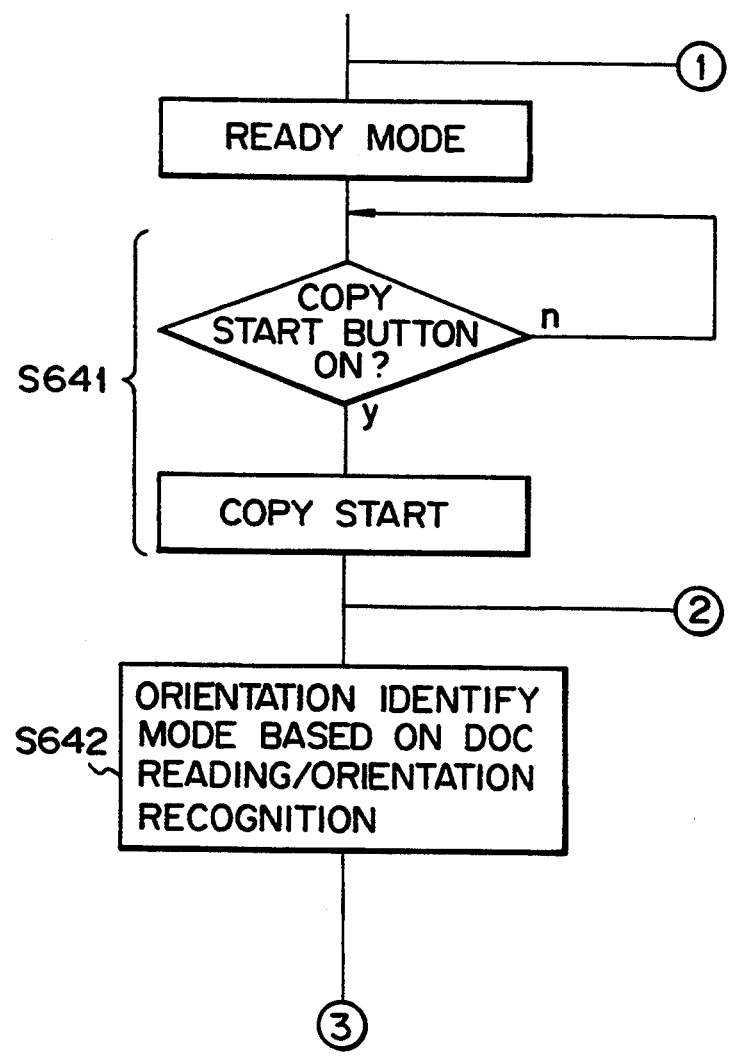
FIGS. 116 and 117 are flowcharts each showing an image interruption and warning display procedure to be executed when an image orientation is unidentifiable.
Figure 117:
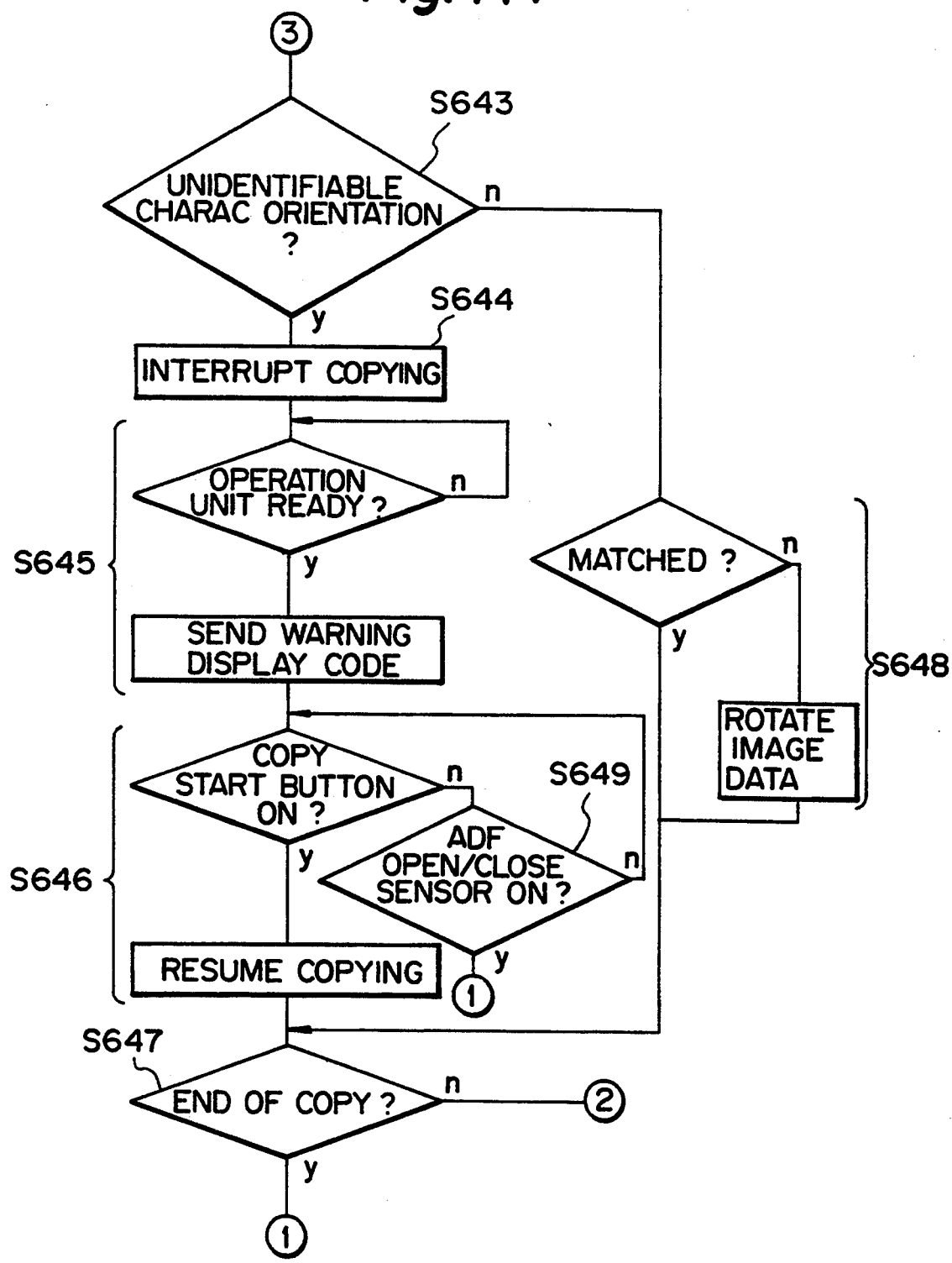
Figure 118:
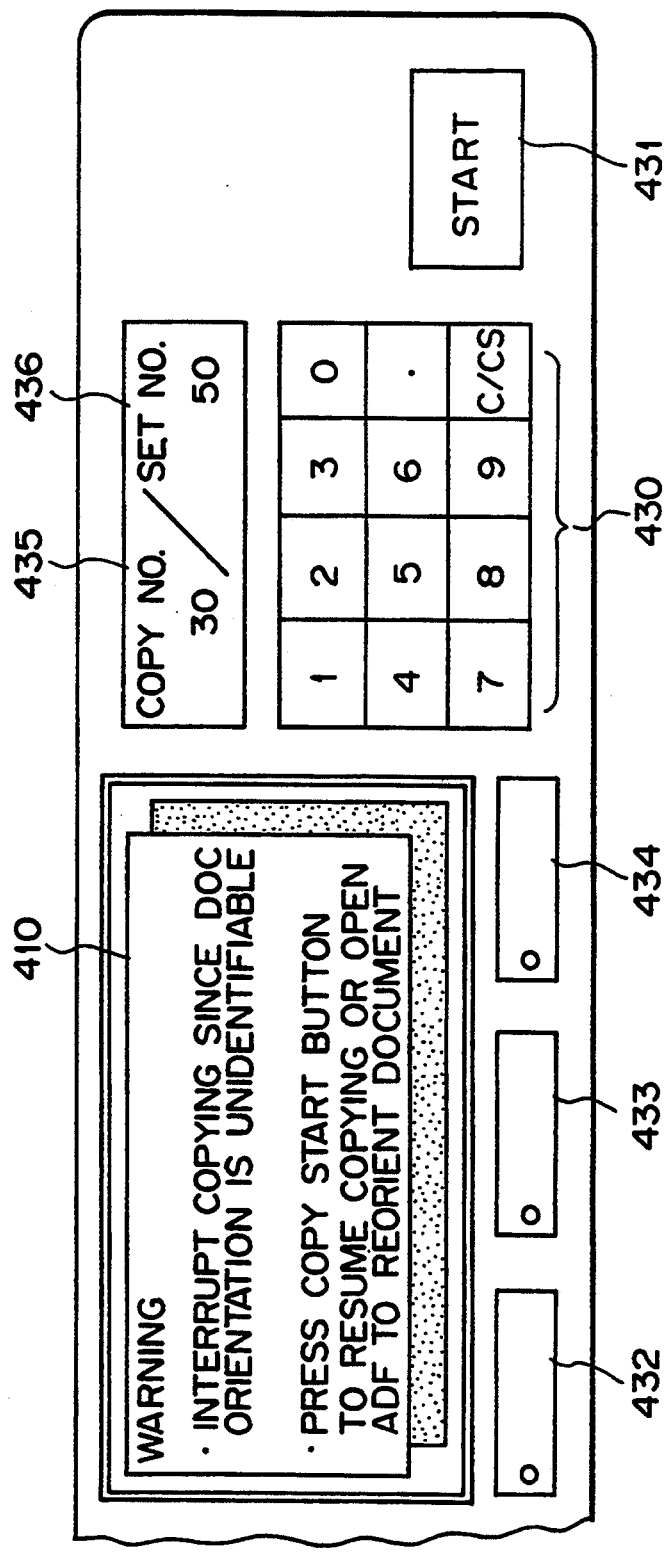

Specifically, as shown in FIGS. 116 and 117, when the copy start button is pressed (S641), a document is read while the orientation of an image thereof is identified by character recognition (S642). Whether or not the orientation of a character is unidentifiable is determined (S643). If the orientation is identifiable, whether or not the image is identical in orientation with the first image is determined and, if the answer is positive, the document is copied. If the image does not match the first image in orientation, it is copied after being rotated (S648). If the orientation of a character is unidentifiable as determined in the step S643, the copying operation is interrupted (S644). At the same time, if the operation unit is ready to receive a code, a warning display code is sent thereto to request the operator to acknowledge the condition (S645). At this instant, the message shown in FIG. 53 appears on the operation unit. As the operator acknowledged the above situation presses the copy start button again, the document held in a halt on the glass platen 9 due to the unidentifiable character orientation is copied (S646). If the operation unit is ready to receive a code, a warning display code is sent thereto. After the copying operation (S647), the program enters into a ready mode for awaiting the next copy start. After the display of the warning, S645, when the ADF is opened and then closed (y, S649), the program enters into a ready mode by determining that the document is removed from the glass platen 9. FIGS. 118 and 119 show specific messages to appear in the above condition.

As stated above, when documents are stacked in various directions and when a document whose orientation cannot be identified is found, the copying operation is interrupted while a warning is displayed. This matches the orientations of the copies to that of the first copy. Particularly, when the operator punches, staples or otherwise binds a set of copies by checking only the cover sheet and without noticing the document of different orientation, a copy of such a document will be included in the resulting set of copies and, therefore, miss or will make it difficult to turn over the pages and degrade the appearance. By contrast, the embodiment automatically informs the operator of the presence of the document in question and thereby requests the operator to check the document and reorient it.

5.2.1 Determining Stapling Position Based on Character Recognition

The image orientation of a document is determined by recognizing the orientation of a character and and that of a character train relative to the document sheet. Then, an optimal finishing position (sorter/stapler, finisher, etc.) matching the relation between the sheet and the character train is determined.

Specifically, when the orientation of a character and that of a character train of a document relative to a sheet is recognized by character recognition, the relation between the sheet and the character train as seen in the correct character direction (0 degrees) is limited to, among the sixteen combinations shown in FIG. 107, four shown in FIGS. 109A–109D. A particular stapling position is selected depending on the kind of desired finishing, as follows.

Figure 120A:
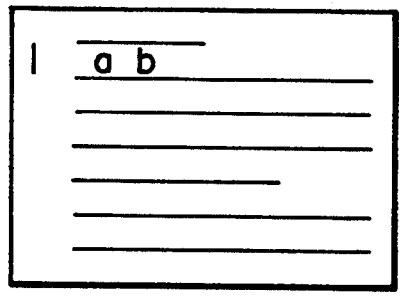
FIGS. 120A-120D show one-point stapling various patterns.
Figure 120B:
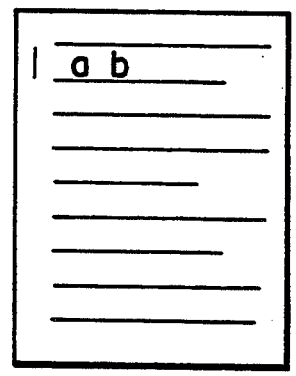
Figure 120C:
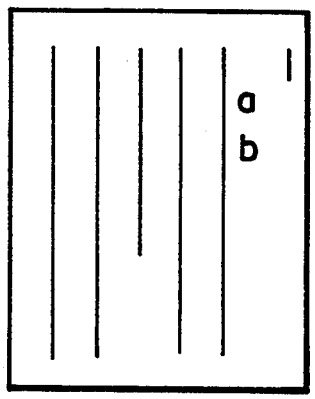
Figure 120D:
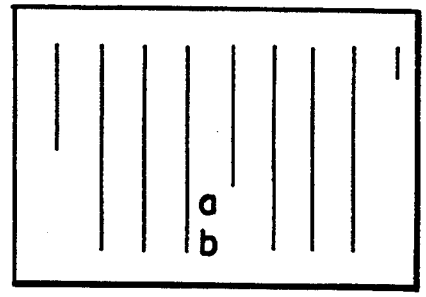

(i) One-point stapling: As shown in FIGS. 120A and 120B, the upper left corner i s stapled in the case of horizontal writing. As shown in FIGS. 120C and 120D, the upper right corner is stapled in the case of vertical writing.

Figure 121A:
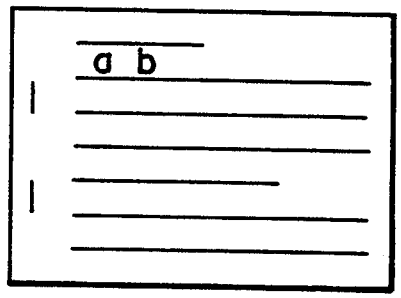
FIGS. 121A-121D show various two-point stapling patterns.
Figure 121B:
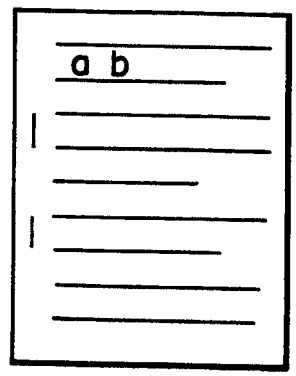
Figure 121C:
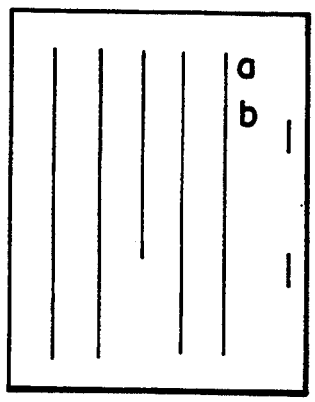
Figure 121D:
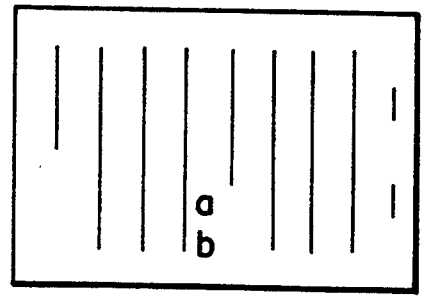

(ii) Two-point stapling or punching: As shown in FIGS. 121A and 121B, the left edge is stapled or punched in the case of horizontal writing. As shown in FIGS. 121C and 121D, the right edge is stapled or punched in the case of vertical writing.

The figures show stapling by way of example.

The means and method for character recognition depend on the construction of a copying system, i.e.:

(a) Digital copier with an area memory: Prescanning is effected to automatically recognize a predetermined area or predetermined part of image data other than the background. Certain part of such an area is written to an area memory to extract and recognize a character;

(b) Digital copier with a page memory (full memory): A character is separated from a page read by scanning and recognized:

(c) Analog copier or digital copier lacking sufficient memory capacity: The copier is provided with reading means capable of reading only a predetermined range, and an ADF including an area memory and a CPU for recognition. While a document is fed, an image thereof is read to automatically recognize a predetermined area or an area of image data other than the background. A certain range of the area is written to the area memory for character recognition.

Figure 122:
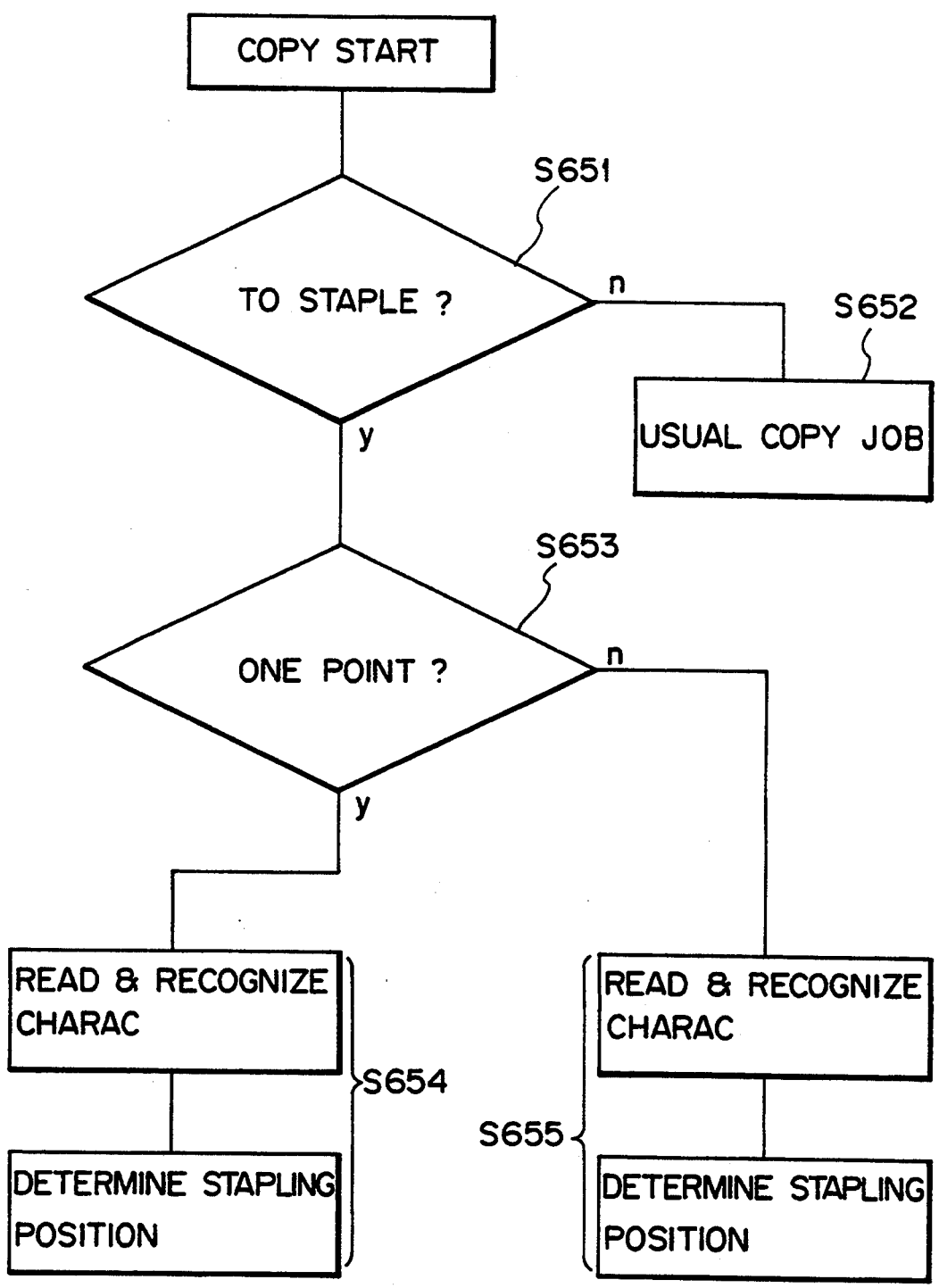
FIG. 122 is a flowchart showing a stapling position decision procedure.

FIG. 122 demonstrates an actual copying procedure. As shown, when the operator presses the copy start key, the control CPU determines whether or not a staple mode is selected (S651). If the answer of the step S651 is negative, a usual copying operation is performed (S652). If a staple mode is selected, whether or not one-point stapling should be effected is determined (S653). Then, the stapling position is determined as shown in any one of FIGS. 120A–120D and FIGS. 121A–121D depending on the answer of the step S653 (S654 or S655).

As stated above, since an optimum finishing position is automatically determined in matching relation to the orientation of a character and the direction of character train of a document to be read, the operator is free from confusion regarding the finishing work. Moreover, since the operator does not have to designate a finishing position each time, the operation is easy and rapid and, therefore, saves time.

Figure 123A:
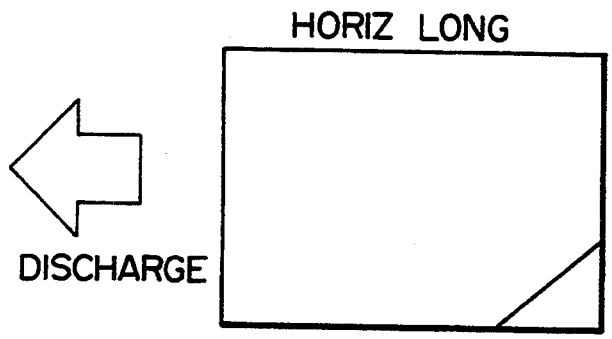
FIGS. 123A and 123B, 124A and 124B, and 125A and 125B each shows a relation between a sheet direction and a stapling position.
Figure 123B:
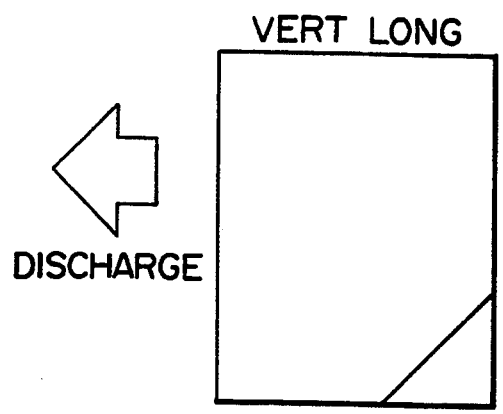
Figure 124A:
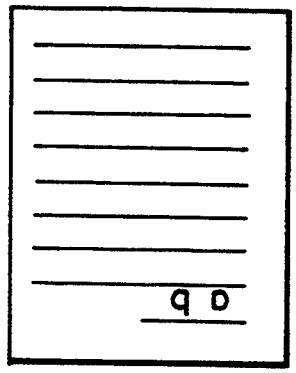
Figure 124B:
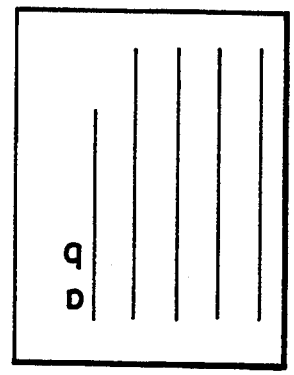
Figure 125A:
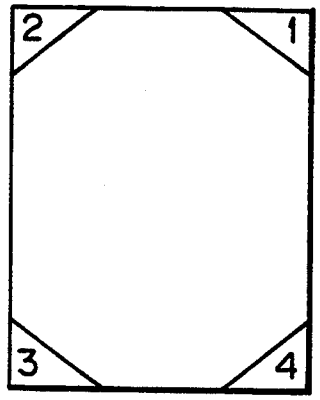
Figure 125B:
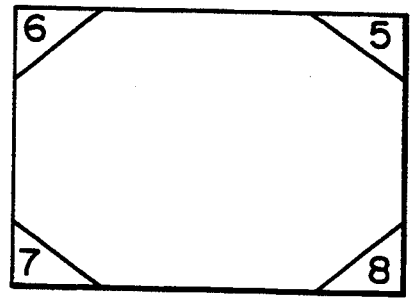

5.2.2 Comparison between Character Train Direction Data and Reference Stapling Position A sorter/stapler can act only on a single point at a predetermined corner while a finisher can act only on a line at one edge, as stated earlier. Hence, it has been likely that when the operator's input and the set position of documents are not correctly related, the resulting copies are finished at an unexpected position thereof due to the saving of hardware. In the light of this, the embodiment has not only the previously stated image orientation identifying means using the character recognition system, but also means for comparing a finishing position available with hardware and an optimal finishing position determined by the character train direction data, thereby matching the two positions. A sorter/stapler will staple sheets positioned as shown in FIG. 123A or 123B at a position indicated by an oblique line. At this instant, if the documents are vertically long and horizontally written as shown in FIG. 124A, they match the reference stapling position. However, when the documents are vertically long and vertically written as shown in FIG. 124B, they do not match the reference stapling position. In practice, the CPU may make the following specific decision:

(i) As shown in FIGS. 125A and 125B, numbers 1–8 are assigned to absolute stapling positions, assuming documents fed to the trays of the sorter;

(ii) Assuming that the stapling position resulted from character recognition is i, i is 4 in the position shown in FIG. 124A;

(iii) Assuming that the stapling position of the hardware is k, k is limited to 4 or 8 due to the limitations of the sorter/stapler and is 4 in the case of FIGS. 123A and 123B; and (iv) Comparing/and k, the CPU determines that the two stapling positions coincide if i is equal to k. In the case of FIG. 124B, since i is 3 and not equal to k, the CPU determines that the two stapling positions do not coincide.

Figure 126:
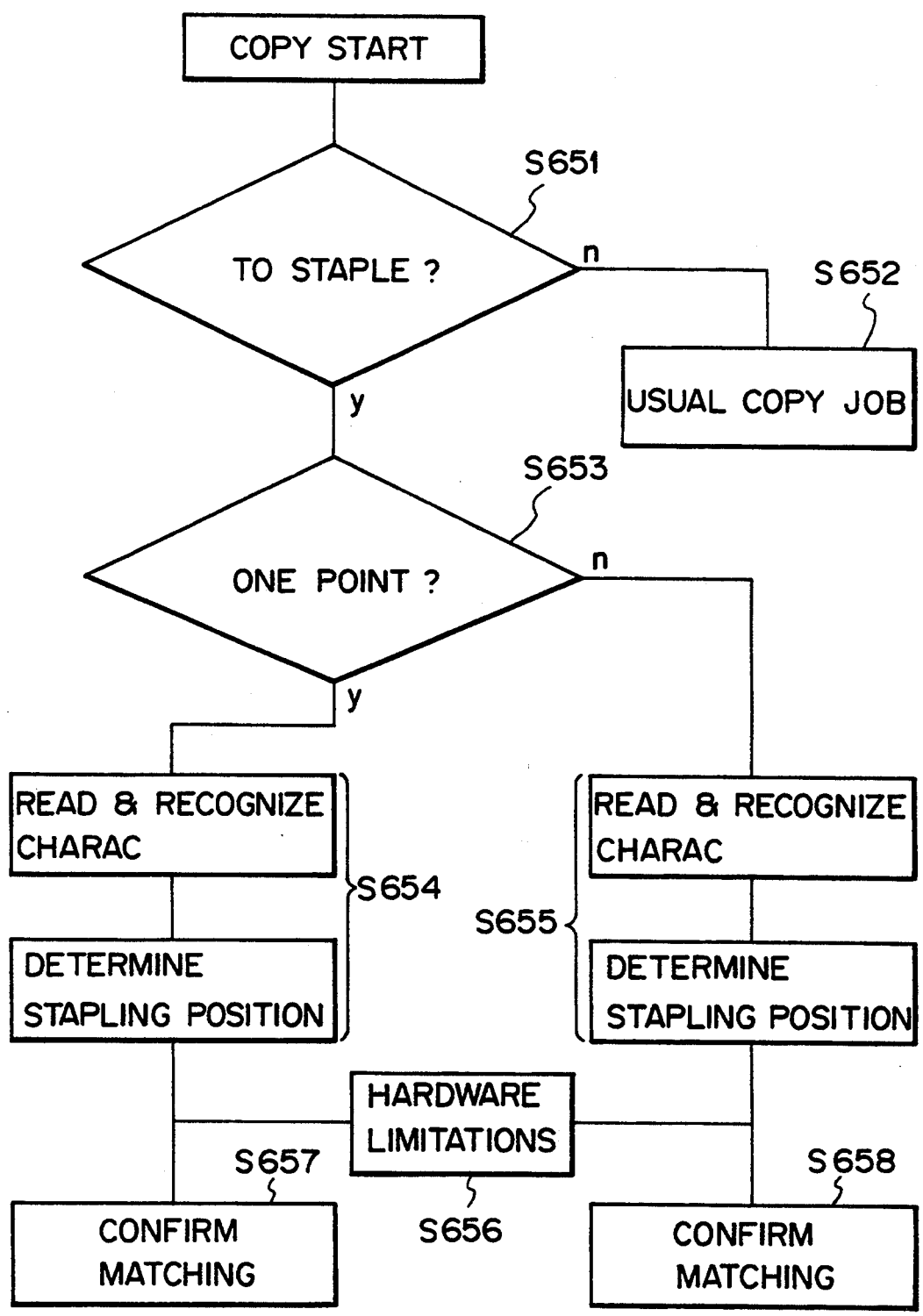
FIG. 126 is a flowchart showing a stapling position decision procedure.

FIG. 126 shows a specific copying procedure which is identical with the procedure of FIG. 122 from the step S651 to the step S655. A hardware limitation condition (S656) and match confirmation (S657 and S658) are added to the procedure of FIG. 122.

As stated above, the embodiment prevents a set of copies from being finished at an unexpected position while achieving the various advantages of the previously stated character recognition.

5.2.3 Identifying Image Orientations of Mixed Vertical and Horizontal Documents Based on Character Recognition Data Relative to Reference Image Data, and Confirming Match of Image Orientation by Comparing Image Orientations with Reference Stapler Position Data

5.2.4 Recovery in Character Train Direction Data and Reference Stapling Position NG Condition (a) Interrupting Image Formation and Displaying Warning The image orientation of a document is detected by character recognition on the basis of the orientation of a character and that of a character train relative to sheets. Whether or not an optimal finishing (stapling or punching) position determined by the relation between the document sheet and the character train and a finishing position available with the hardware match is determined. If they do not match, the copying operation is interrupted while an alert message is displayed to show that the optimal stapling position and the finishing position available with the copier do not match. Then, the operator is urged to change the set position of the document or to change the orientation of sheets.

Figure 127:
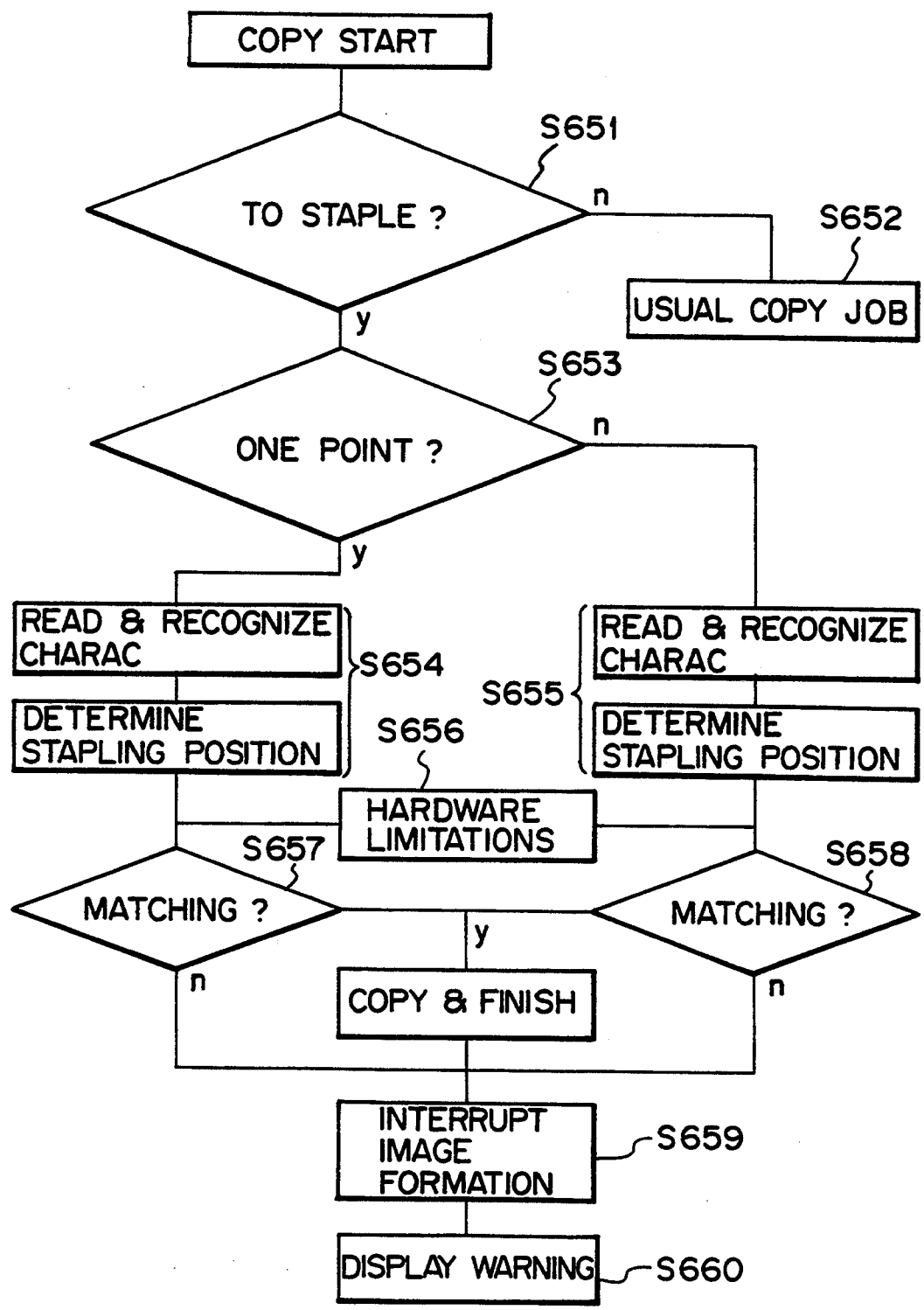
FIG. 127 is a flowchart showing a warning display procedure to be executed when character sequence direction data and a reference stapling position do not match.
Figure 128:
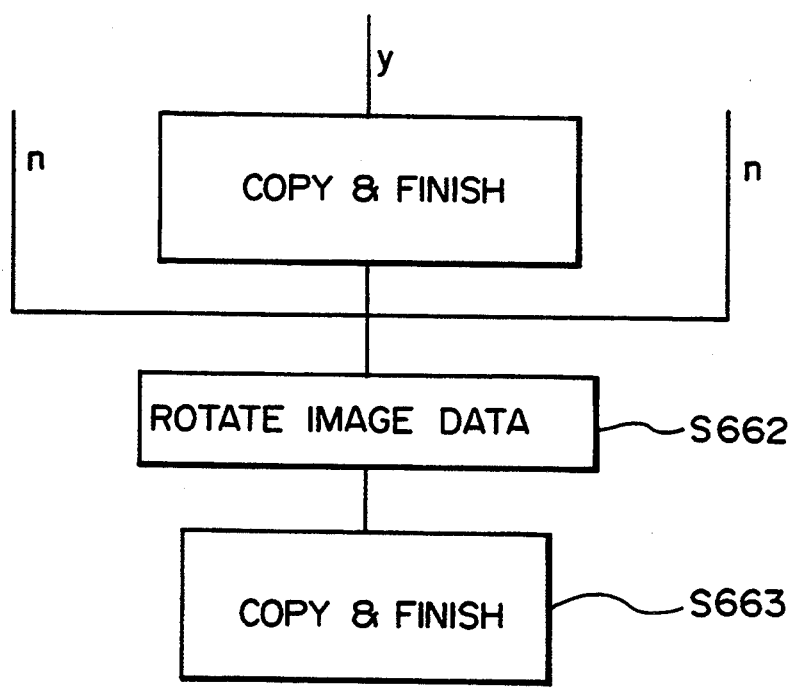
FIG. 128 is a flowchart showing an image rotation procedure to be executed when character sequence direction data and reference stapling position do not match.

Specifically, as shown in FIGS. 127 and 128, assume that the finishing position available with the hardware and the optimal position do not match. Then, the image forming operation is interrupted (S659) while an alert message, e.g., "UNABLE TO STAPLE CORRECTLY SEE SHEET OR DOCUMENT POSITION" (S660). Steps S651-658 are identical with those of FIGS. 122 and 126. When use is made of a document feeder (DF), it is also stopped in the above condition. At this time, the DF will be operated in a particular manner, as will be described layer.

As stated above, when the result of decision does not match the condition particular to the hardware, the embodiment interrupts the copying operation and informs the operator of the noncoincidence so as to urge him to change the set position of the document or the sheets. The embodiment, therefore, prevents a set of copies from being finished at an unexpected position while achieving the advantages of the previously described character recognition.

(b) Image Rotation

The image orientation of a document is detected by character recognition on the basis of the orientation of a character and that of a character train relative to sheets. Whether or not an optimal finishing (stapling or punching) position determined by the relation between the document sheet and the character train and a finishing position available with the hardware match is determined. If they do not match, image data stored in the frame memory is rotated to match the two positions to each other.

Specifically, assume a data copier with a page memory. Then, as shown in FIG. 127, image data can be written to a frame memory before the recognition of an image orientation. Assume that the finishing position available with the hardware and the optimal finishing position do not match. Then, as shown in FIG. 128, the image data in the memory is rotated by a necessary angle determined by the orientation data produced by the image orientation identifying means and the orientation data of the finisher (S662). Thereafter, a copying operation and a finishing operation are executed (S663).

As stated above, when the result of decision does not match the condition particular to the hardware, the embodiment rotates the image data toward the finishing direction. This allows a set of copies to be stapled at an optimal position without requiring the operator to change the set position of the document or that of the sheets.

(c) Reverse Document Scanning

The image orientation of a document is detected by character recognition on the basis of the orientation of a character and that of a character train relative to sheets. Whether or not an optimal finishing (stapling or punching) position determined by the relation between the document sheet and the character train and a finishing position available with the hardware match is determined. If they do not match, even when the copier lacks a frame memory, the optimal stapling position and the finishing position available with the finisher are automatically brought to coincidence under a particular condition which will be described. Then, a finishing operation is performed. If recovery within the copier is impossible, the copying operation is interrupted while a warning is displayed to show the operator that the two positions do not coincide. Then, the operator is urged to change the set position of the document or that of the sheets.

Figure 129:
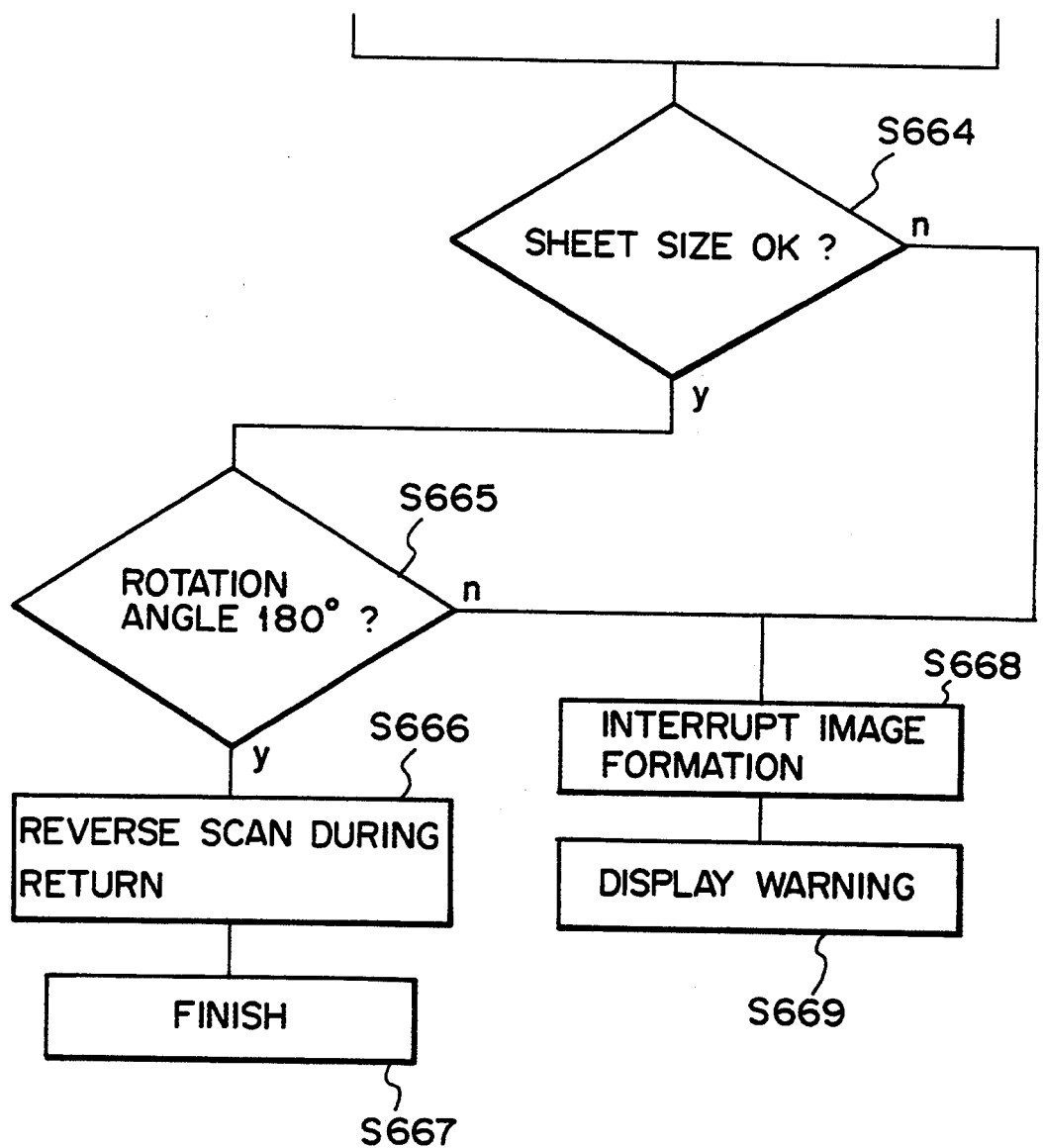
FIG. 129 is a flowchart showing an image reverse scan procedure to be executed when character sequence direction data and reference stapling position do not match.

Specifically, assume that the finishing position available with the hardware and the optimal position do not match, as shown in FIG. 127. A digital copier usually includes a line buffer accommodating some lines even though it may lack a page memory. As shown in FIG. 129, assume that the sheets are set in a correct position (y, S664), and that the reference staple position and the optimal finishing position are deviated 180 degrees from each other (y, S665). Then, the scanner does not read a document during the forward movement and reads it during the return movement while moving at a reading speed, thereby reversing an image in the main scanning direction (S666). As a result, the resulting copies are finished at an adequate position (S667). In the other conditions, the image forming operation is interrupted (S668), and an alert message, e.g., "UNABLE TO STAPLE CORRECTLY SEE SHEET OR DOCUMENT POSITION" is displayed (S669). At this time, the DF will be operated in a particular manner, as will be described layer.

As stated above, when the result of decision does not match the condition particular to the hardware and if the set position is deviated 180 degrees, which is predominant in daily transactions, the embodiment rotates image data toward the finishing direction in an apparent sense. This allows a set of copies to be stapled at an optimal position without requiring the operator to change the set position of a document or that of sheets.

5.3.1 Selectively Identifying Image Orientation Depending on Image Form Mode

Image processing or similar processing is indispensable in determining a character orientation and, therefore, image orientation by character recognition and then determining an image orientation based on the detected image data. Moreover, this processing has to be executed every time a document is scanned. This is extremely time-consuming and, in addition, inefficient when it comes to usual copying operation. Hence, in the event of usual copying operation, documents are copied bypassing the image orientation identification so as to promote efficient copying. A specific procedure is identical with the procedure shown in FIG. 75.

Figure 130:
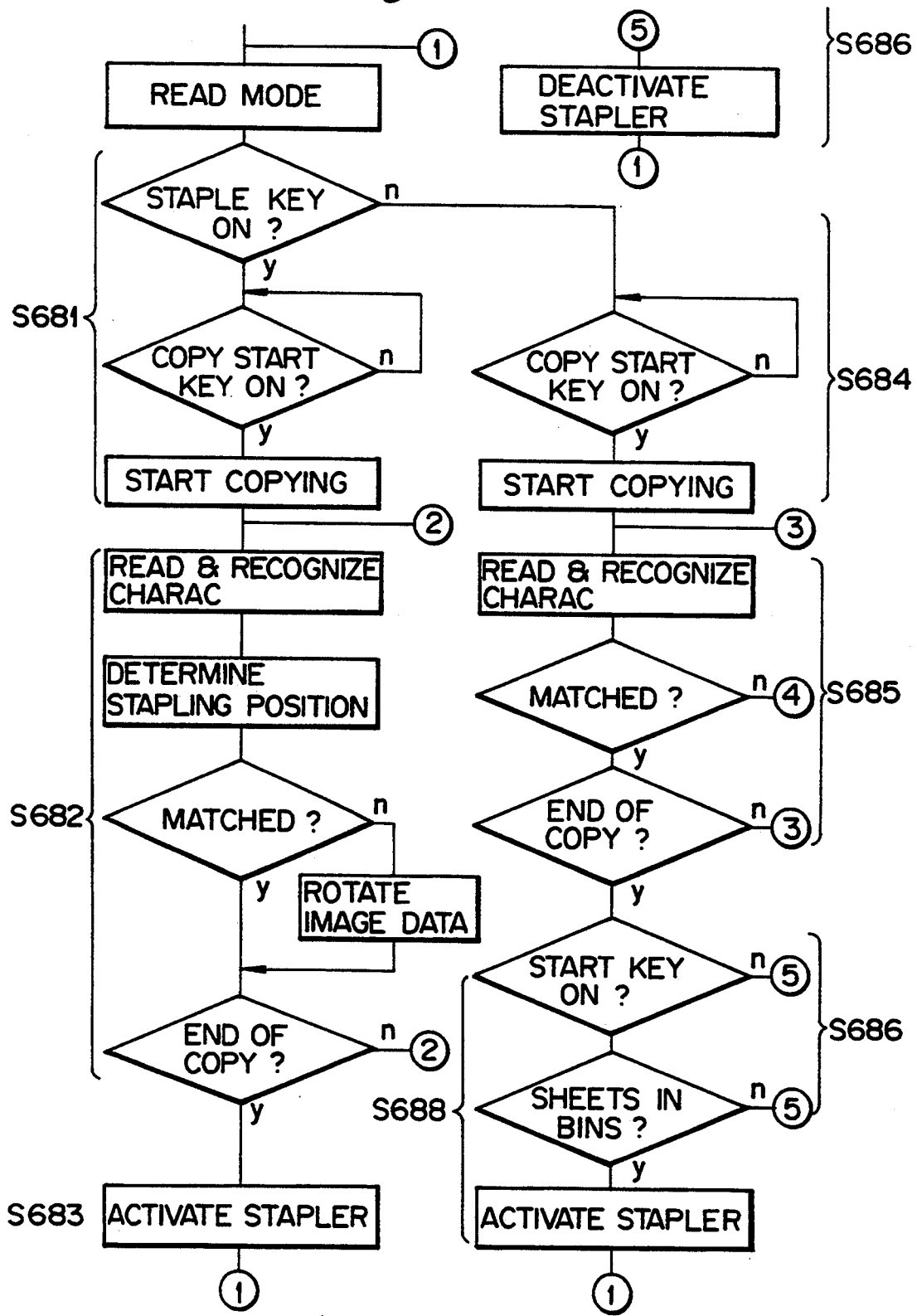
FIGS. 130 and 131 are flowcharts each showing a warning display procedure to be executed when a stapling position is not adequate when a manual staple command is entered.
Figure 131:
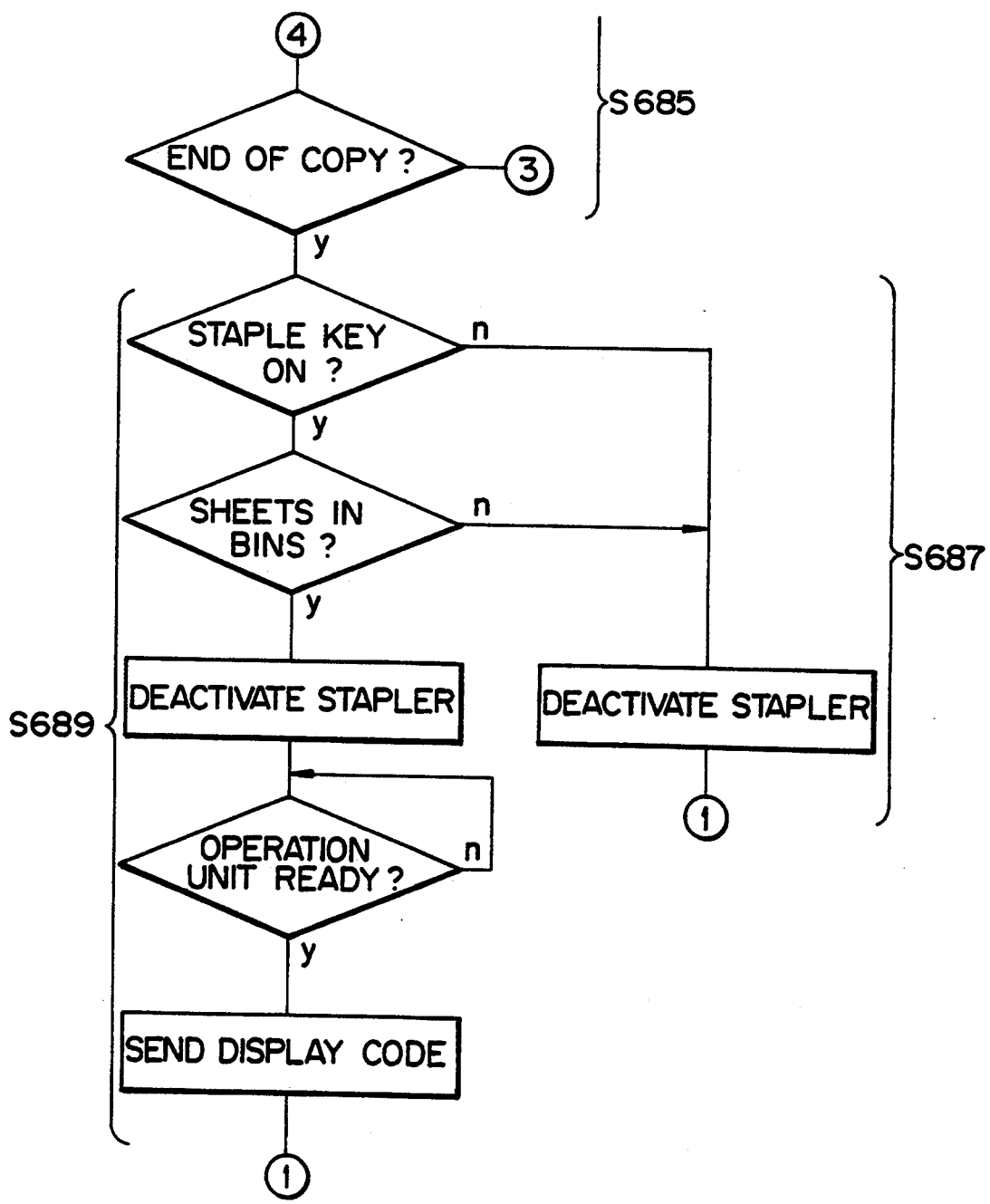

5.3.2 After Sorting, Stapling Position NG on the Basis of Character Orientation Data When Manual Staple Command Is Inputted 5.3.2.1 Displaying Warning FIGS. 130 and 131 show a specific procedure for displaying a warning. As shown, when the operator presses a staple key and then a copy start key (S681), the image orientation of each document is determined by character recognition. If a document of different orientation is found, the image data thereof is rotated and then copied (S682). After the copying operation, the program drives the stapler (S683) and then enters into a ready mode. Assume that the staple key is not pressed. Then, on the start of a copying operation (S684), the image orientation of each document is determined by character recognition and then copied in a correct orientation (S685). After the copying operation, if the staple key is not pressed, the program returns to the ready mode without driving the stapler. Further, even when the staple key is turned on after the copying operation, the stapler is not driven if copies are left in the bins. This is effected when the orientation is correct (S686) or when it is incorrect (S687). When the staple key is turned on after the copying operation (manual stapling), the program drives the stapler only if the orientation is correct and the bins are still loaded with copies (S688), and then returns to the ready mode. In the event of manual stapling, even when copies are left on the bins, the program does not drive the stapler if the orientation is incorrect, and displays a warning on the operation unit (S689).

5.3.2.2 Inhibiting Stapling

Figure 132:
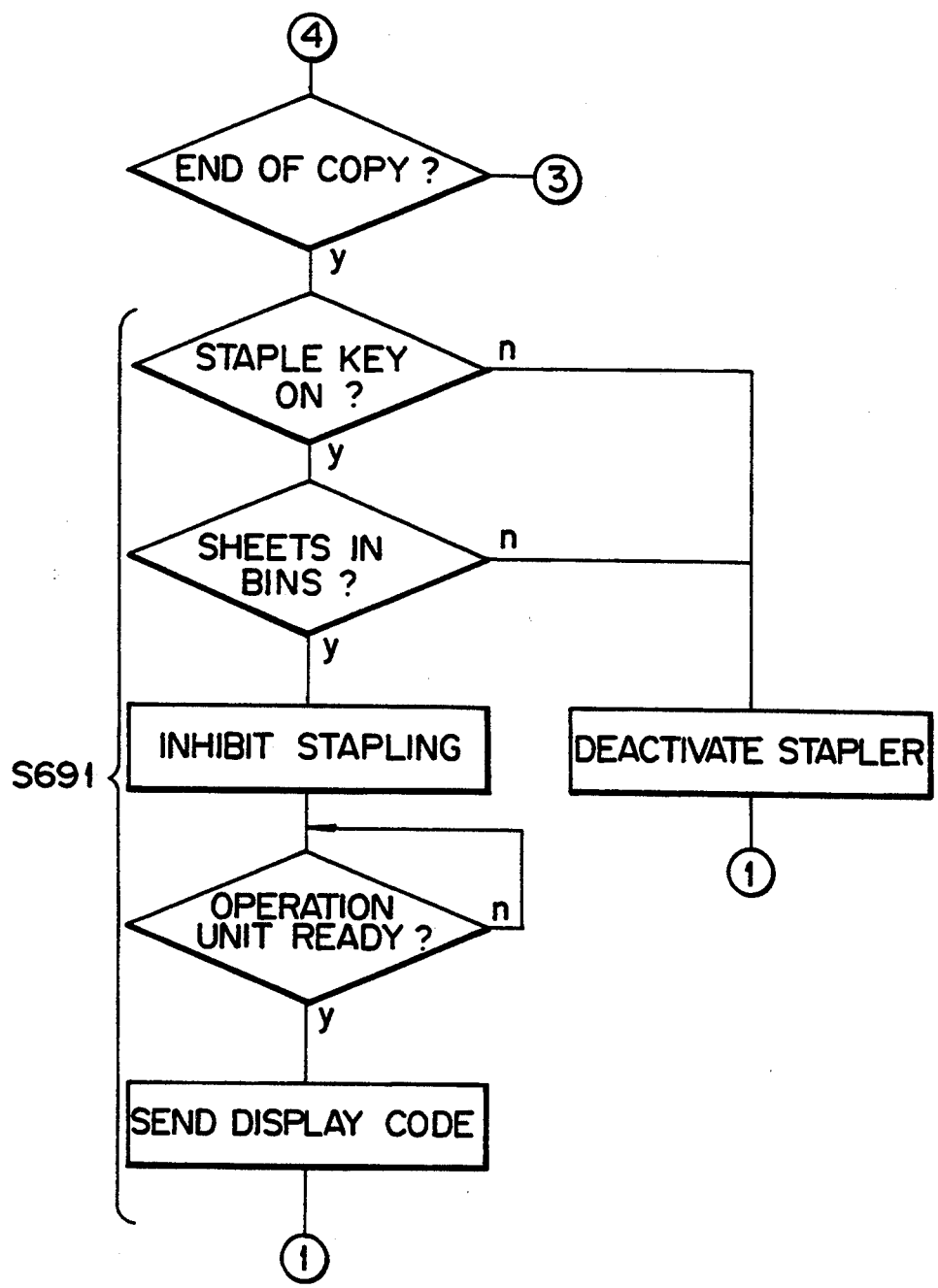
FIG. 132 is a flowchart showing a staple inhibition procedure to be executed when a stapling position is not adequate when a manual staple command is entered.
Figure 133:
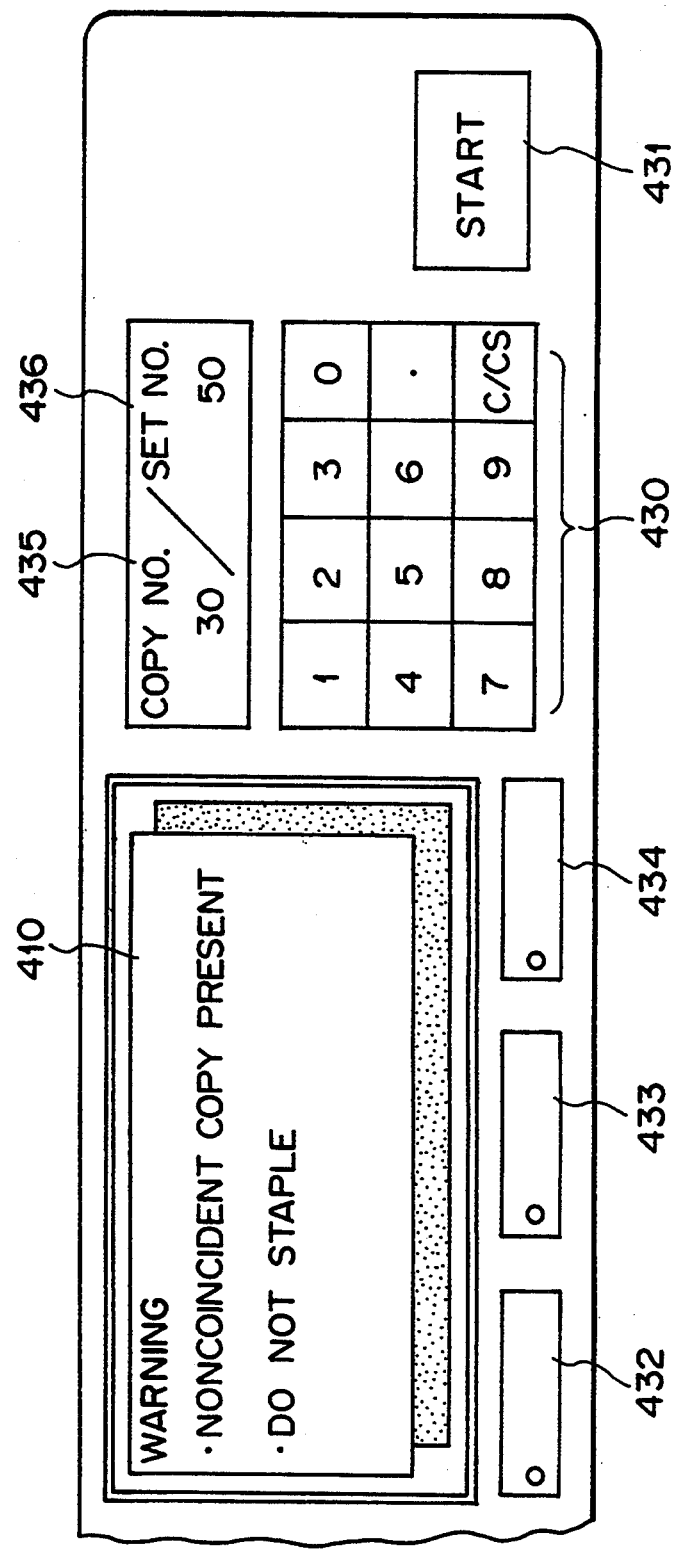
FIG. 133 is a plan view showing a specific condition of the operation and display section.

FIG. 132 shows a specific procedure for inhibiting the stapling operation. In the event of manual stapling, if the image orientation is incorrect, the program inhibits the stapler from operating even when copies are left in the bins, and displays a warning on the operation board (S691). A specific message to appear in this condition is shown in FIG. 133.

6. Identifying Image Orientation Based on Punch Holes or Staple Holes

Figure 134:
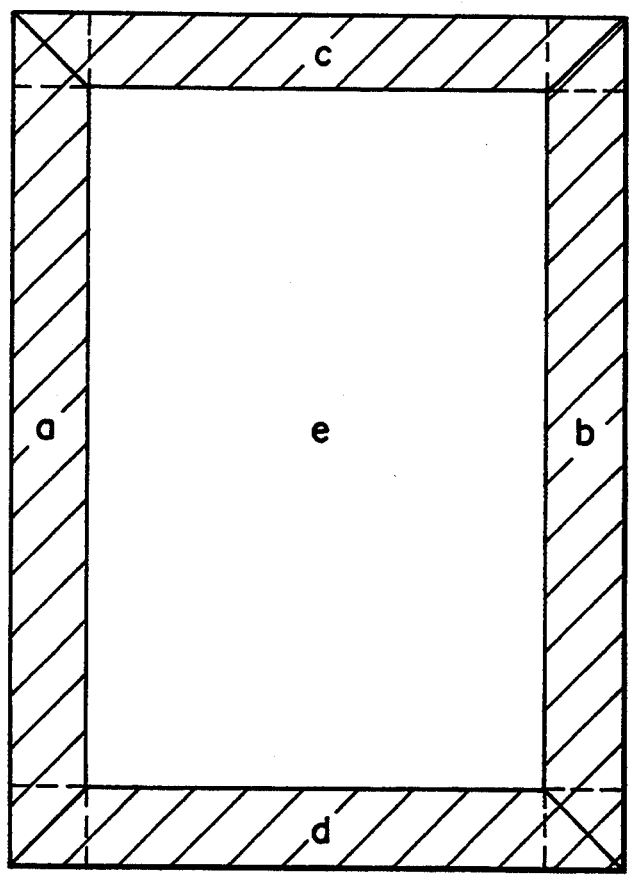

An image orientation can be determined by recognizing punch holes or staple holes existing in a binding position. To begin with, how to determine an image orientation on the basis of the pattern of punch holes will be described. A punch hole is a circular hole standardized to have a substantially constant diameter (generally 6 mm). By image recognition, two or more circular images each having a diameter of about 6 mm are detected. At this instant, it is not necessary to recognize all of the document image data. Punch holes are present in a range of about 20 mm as measured from the edge of a document. Hence, as shown in FIG. 134, the images to be recognized are assumed to lie in a range of 20 mm as measured from each of the four edges of a document. If punch images exist, two or more circular images surely exist in any one of areas a, b, c and d shown in FIG. 134. For example, when a single circular image having a diameter of 6 mm is found in the area a, it is not recognized as a punch hole. With such a method, it is possible to reduce the recognition and decision time while reducing the capacity required of an image memory.

Figure 135:
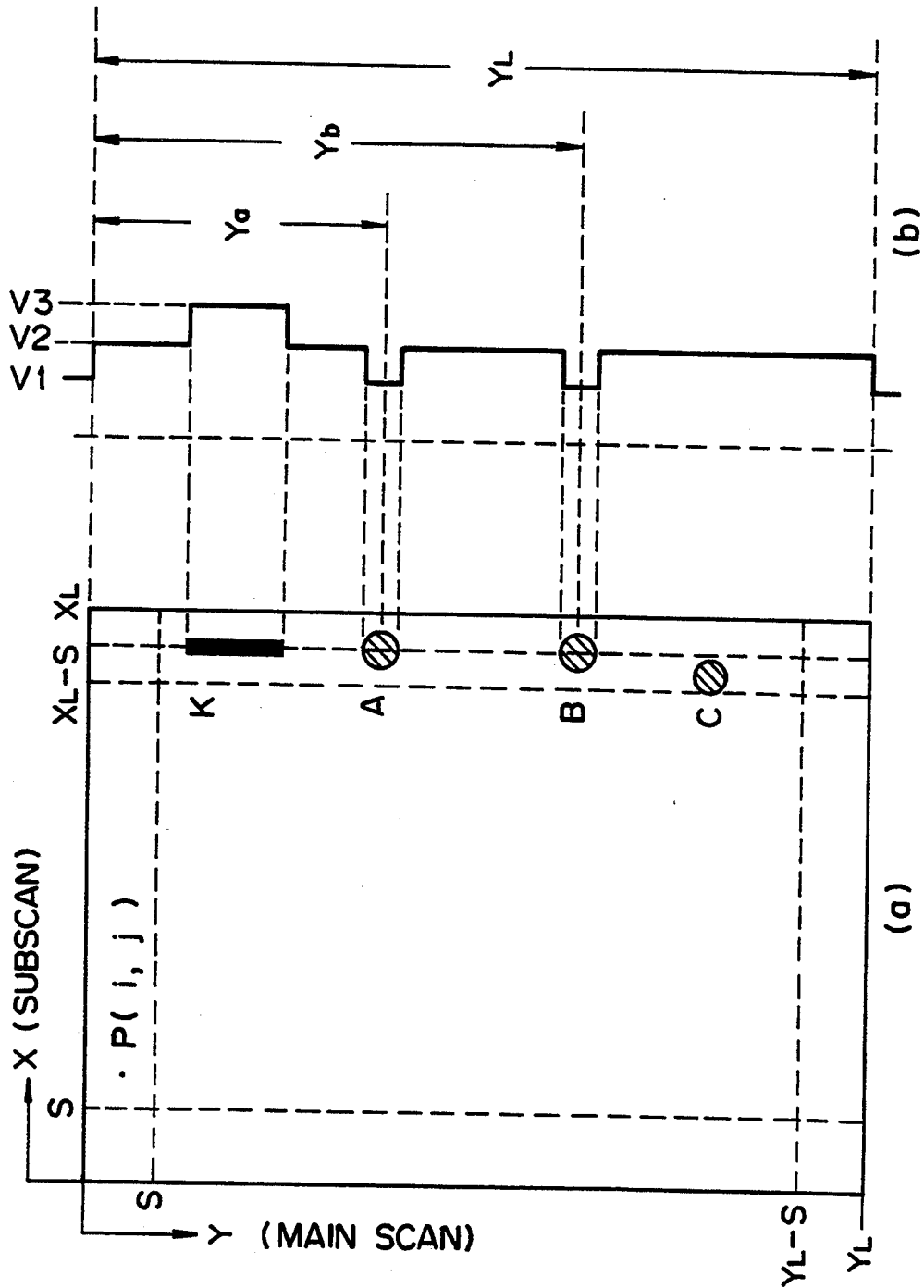
Figure 136A:
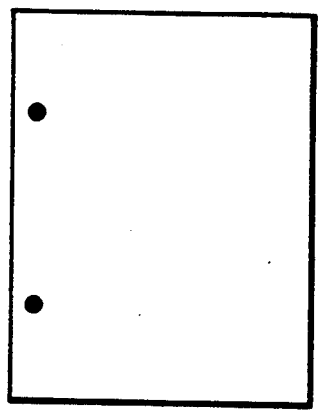
Figure 136B:
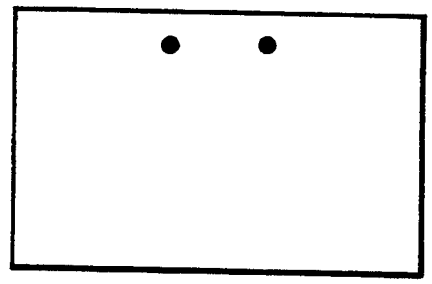

To further enhance the accuracy of decision, the following arithmetic operating means is used. As shown in FIG. 135, (a), the coordinates of the centers of circular holes A, B and C are determined to be A(Xa,Ya), B(Xb,Yb) and C(Xc,Yc) by way of example. The maximum image length is assumed to be XL and YL based on the document size while the main and subscanning directions of the scanner are assume to be Y and X, respectively. Then, at a time Xa, an output waveform shown in FIG. 135, (b), appears in the main scanning direction. Here, V1, V2 and V3 are respectively a level indicative of a punch hole, a level indicative of the white portion of the document, and a level indicative of the black portion of the same. The signal levels V1, V2 and V3 are clearly different and easy to discriminate. With such a waveform, it is possible to calculate the coordinates of the punch holes. Considering the previously stated image range, the X coordinate of the punch holes lies in the range of X mm to X-20 mm. If the X coordinate and the Y coordinate of the hole are substantially coincident, the hole can be determined as a punch hole. In the example shown in FIG. 135, the orientation of an image is determined on the basis of fixed information that Xa and Xb are formed in the left edge as shown in FIG. 136A or in the upper edge as shown in FIG. 136B.

Figure 139:
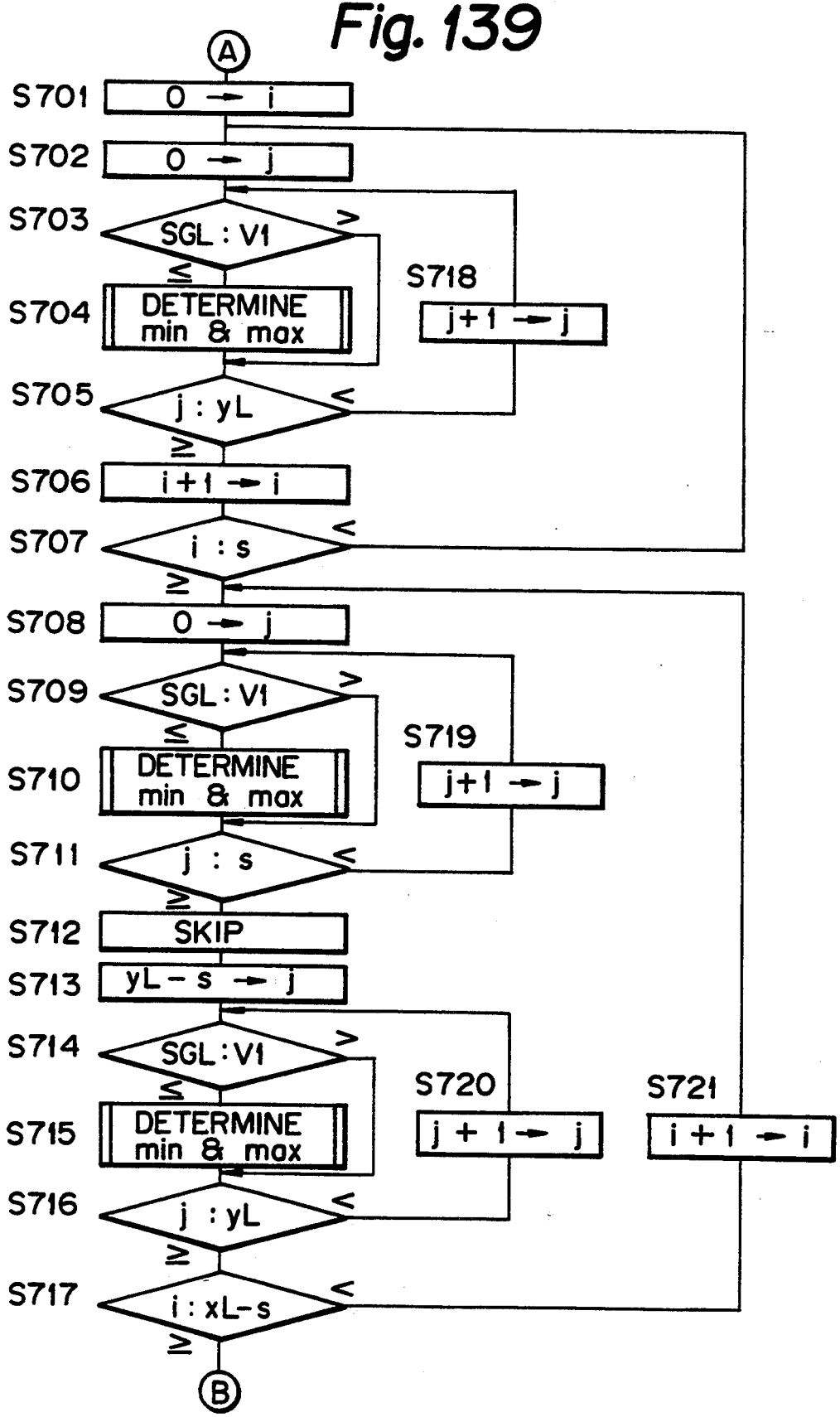
Figure 140:
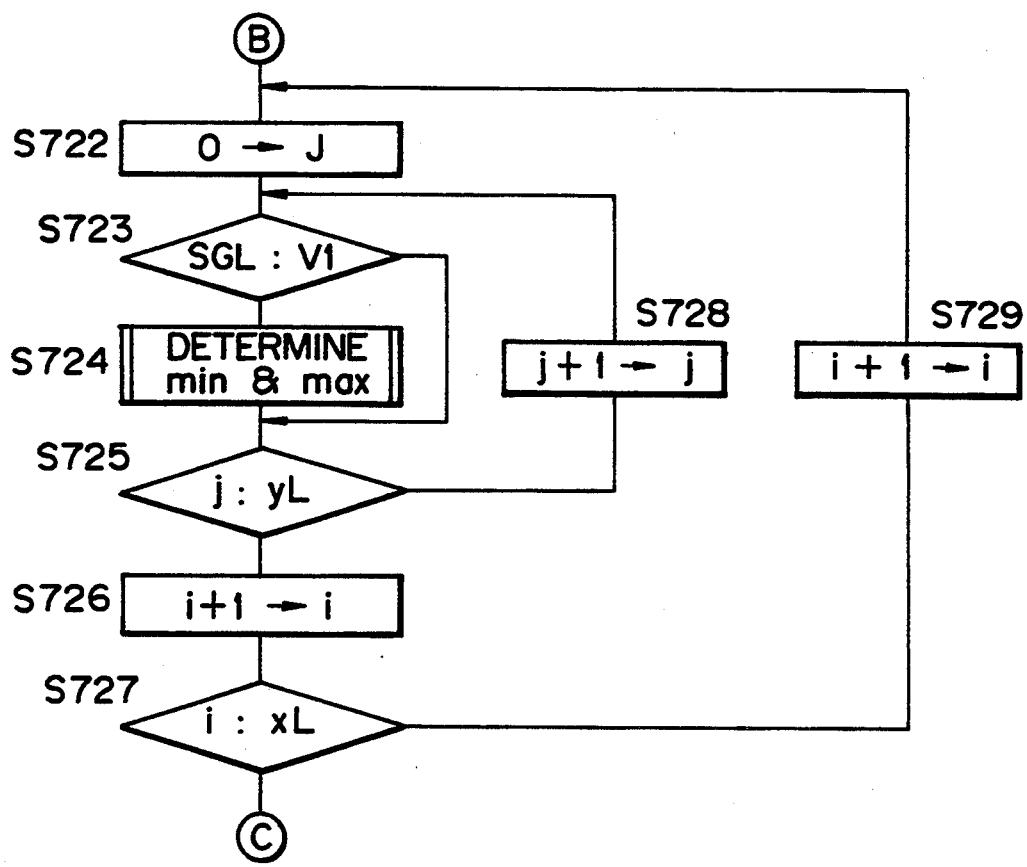

A specific punch hole detection procedure will be described with reference to FIGS. 139 and 140 as well as to FIG. 135. As shown, in steps 701 and 702, image coordinates P(k,j) is set at the upper left corner of a document. Whether or not the signal level SGL read by the CCD image sensor is the same as the punch hole level V1 shown in FIG. 135, (b), is determined (S703). If the answer of the step S703 is positive, the program executes a step S704 (MIN and MAX DECISION) which will be described and then a step S705; if otherwise, the program jumps to the step S705, skipping the step S704. Whether or not the Y coordinate has reached the edge of the document is determined in the step S705. If the answer of the step S705 is negative, the Y coordinate is incremented by 1 (S718). Then, the program returns to the step S703 and repeats such a sequence of steps until the Y coordinate j reaches y1. When the edge of the document is reached, the X coordinate is incremented by 1 (S706). Then, in a step S707, the above procedure is repeated until the X coordinate at the right boundary of the area a, FIG. 134, has been reached. Steps S708 to S711 pertain to the area c, FIG. 134. When the edge of the area c is reached (S711), the area d is scanned with the area e skipped (S713-S716). When the end of the Y coordinate is reached (S717), the X coordinate is incremented by 1 (S721). Then, the program returns to the step S708 and repeats the steps S708-S717 and S719-S721 to scan the areas c and d alternately. This is repeated until the X coordinate reaches the coordinate XL-s of the areas c and d. Steps S722-S729 indicate the scanning of the area b; the scanning ends when the coordinates reaches the lower right corner.

Figure 143:
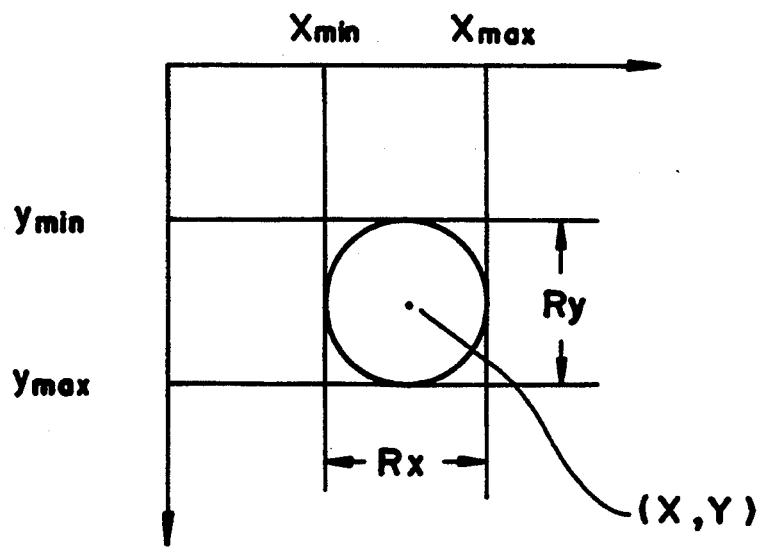

The steps S704, S710, S715 and S724 pertaining to (MIN and MAX DECISION) will be described specifically. In this routine, the maximum and minimum values of the X and Y coordinates of the periphery of a punch hole are determined. As shown in FIG. 143, since a punch hole is circular, once the maximum and minimum values of the periphery are determined, the center, radius and other information are easy to produce. When a plurality of punch holes are found, their maximum and minimum values in the continuous area are determined and written to a storage.

Figure 141:
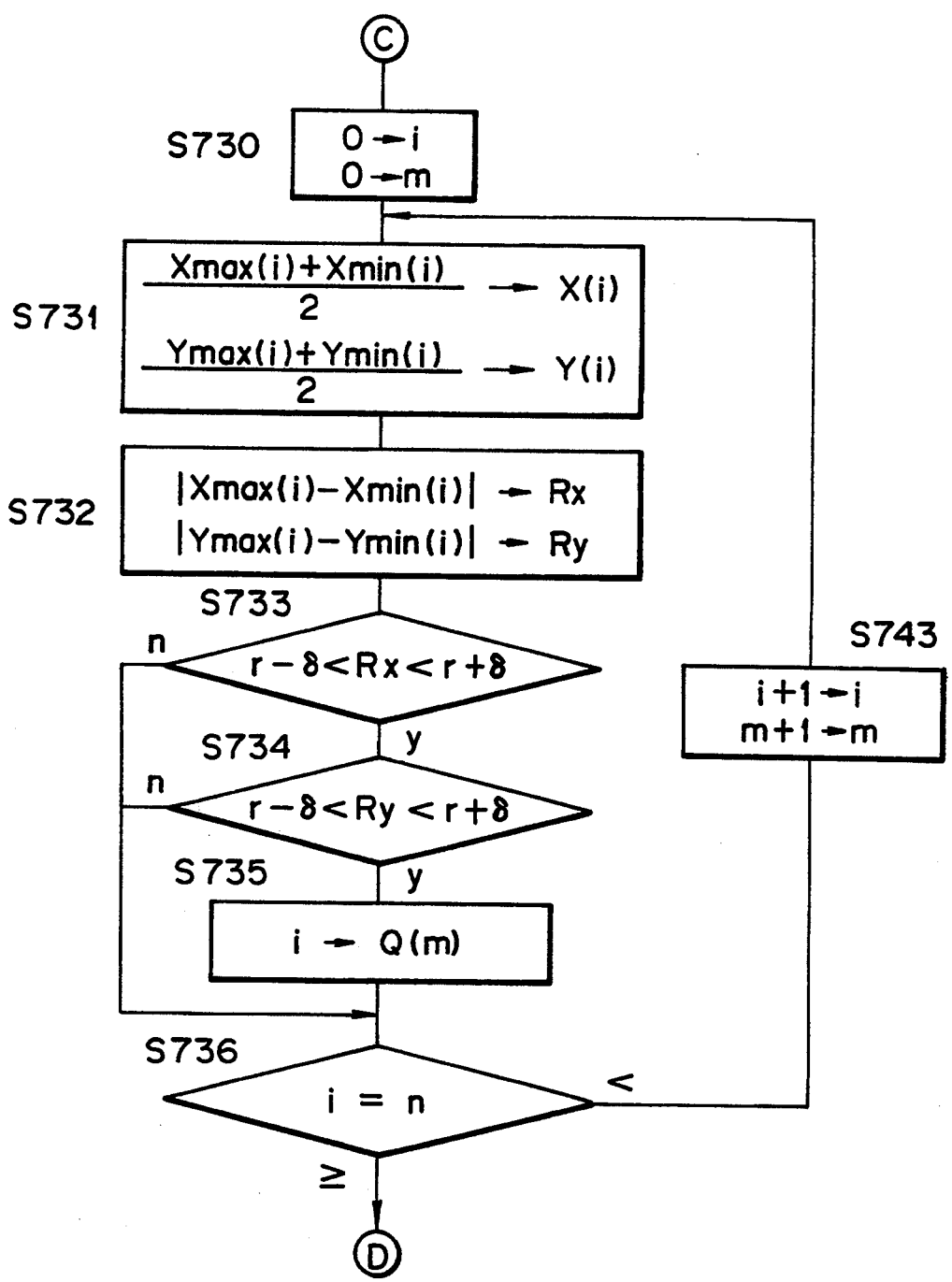
Figure 142:
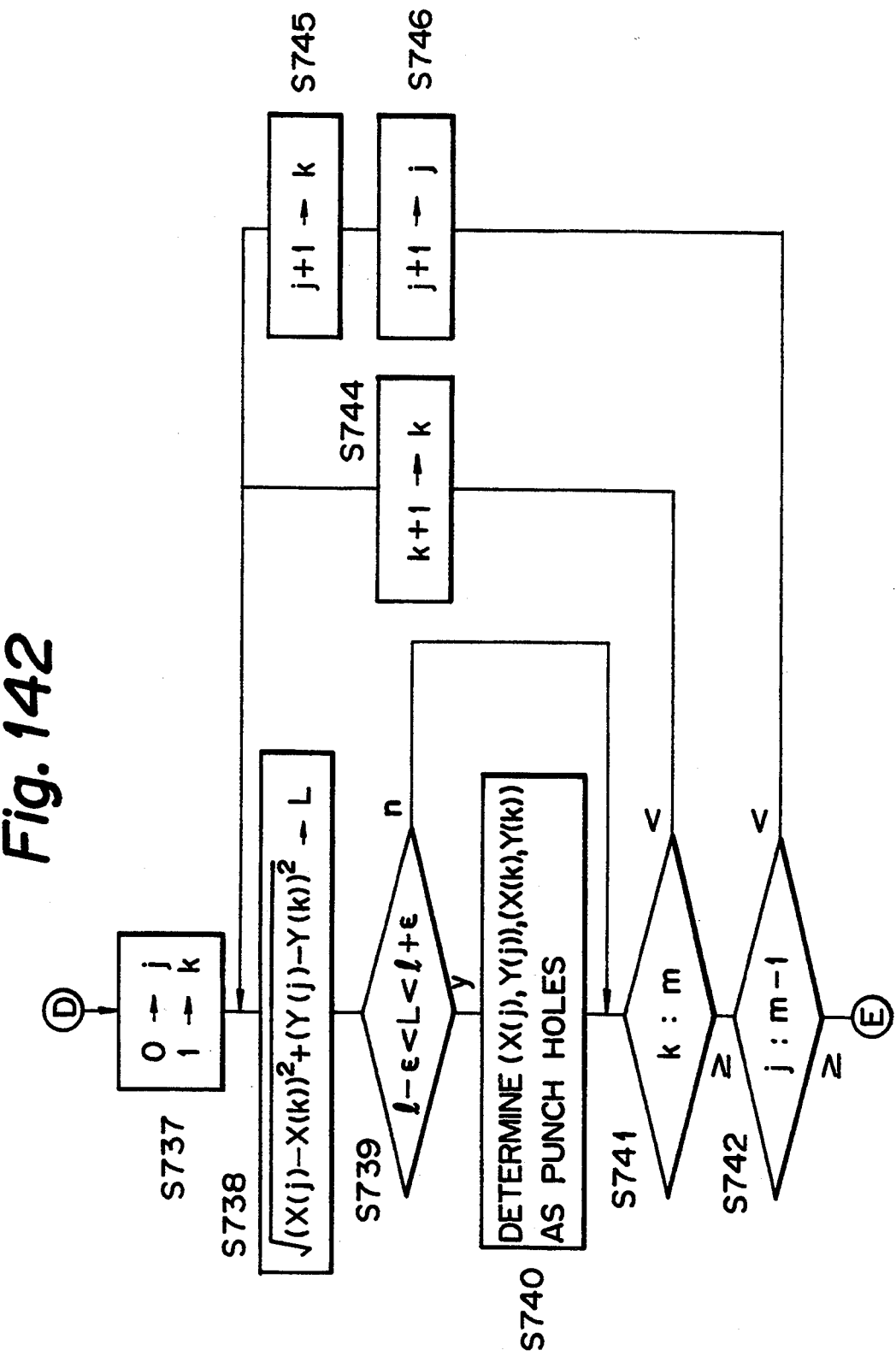

A reference will be made to FIGS. 141 and 142 also. Whether or not each area is a punch hole is determined on the basis of the maximum and minimum values of of the punch hole level area determined by the procedure of FIGS. 139 and 140. In steps S730-S736 and S743, the shape of the punch hole level area is determined while, in steps S737-S742 and S744-S746, the distance between two points is determined. Specifically, in the step S730, i is set at the head of a sequence memorizing the maximum and minimum values of the punch hole area level. When the punch hole area level has the shape thereof recognized as a punch hole shape, another sequence for memorizing the sequence is prepared and, to write in this sequence, the sequence variable m is initialized to 0. In the step S731, the center coordinates is determined, and in the step S732 the radius is determined. Here, Rx and Ry are respectively the radius derived from the X coordinate and the radius derived from the Y coordinate. In the steps S733 and S734, whether or not such radiuses are allowable as a punch hole is determined. In these steps, $\gamma$ and $\delta$ are respectively a reference radius and an allowable width of, for example, the read error. In the steps S734 and S735, if Rx and Ry lie in the range allowable as a punch hole, the values in that range are written in a sequence Q(m). In the step S736, whether or not any area is left undetermined is determined. If the answer of the step S736 is positive, the sequence position is advanced in the step S743. Then, the program returns to the step S731 and repeats the steps S731-736 and S743.

Subsequently, a routine for determining whether or not the distance between areas found is allowable regarding the punch hole shape is executed. A pointer is set at the sequence position storing the coordinates of the two areas to be compared (S737), and then the distance between their centers is determined to be L (S738). Whether or not the distance L is allowable is determined (S739). Here, l and ε are respectively the center value of the distance and the allowable width. If the decision of the step S739 is OK, such areas are determined to represent punch holes. If three or more areas to be checked exist, the steps S741-S746 are executed to repeat the decision. The above procedure may be summarized as follows:

(1) The scanner reads a document;
(2) The coordinates (x,y) indicative of the signal level V1 is determined;
(3) The maximum values xmax and ymax and the minimum values xmin and ymin of x and y are determined;
(4) The center coordinates A(Xa,Ya) and B(Xb,Yb) of the signal level V1 areas and radii Ra and Rb are determined by equations:

$$X0 = (xmax + xmin)/2$$

$$Y0 = (ymax + ymin)/2$$

$$R = (xmax - xmin) \text{ or } R = (ymax - ymin)$$

(5) Whether or not Ra and Rb each lies in the following range is determined:

$$\gamma - \delta < R < \gamma + \delta$$

(6) The distance L between the centers is determined:

$$L = \{(Xa - Xb)^2 + (Ya - Yb)^2\}^{\frac{1}{2}}$$

(7) Whether or not the distance L lies in the following range is determined:

$$1 - \epsilon < L < 1 + \epsilon$$

(8) If the above conditions (6) and (7) are satisfied, the areas are determined to represent punch holes.

In principle, the above procedure is practicable with no regard to the number and size of punch holes. Staple marks are determined in the same manner in order to identify the orientation of an image, as follows.

Figure 137:
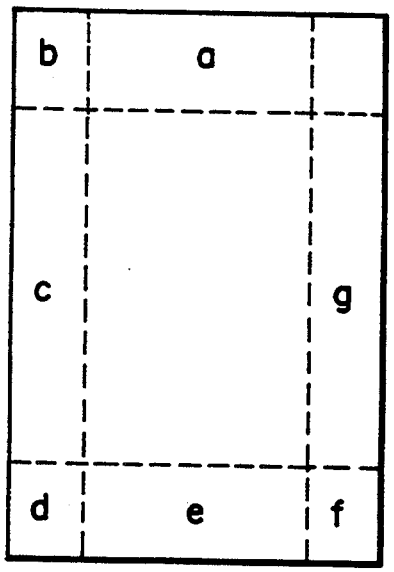
Figure 138A:
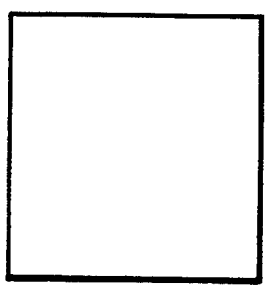
Figure 138B:
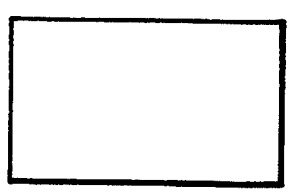
Figure 138C:
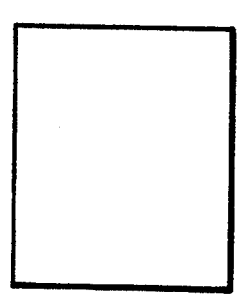

Staple holes are spaced apart by about 10 mm as standardized, and each has a diameter of about 1 mm or less. Since a staple is driven into the corner or the edge of a sheet, it suffices to search for a pattern within 20 mm as measured from each end of the document image, as has been the case with punch holes. The difference is that it is necessary to determine whether a staple has been driven into the corner or the edge of a sheet. As shown in FIG. 137, a document image is divided into four edge areas (a, c, e and g) and four corner areas (b, d, f and h). When a staple mark is located at a corner, once a single image whose diameter is 1 mm is detected, all that is required is to detect another 1 mm image within the radius of 10 mm. This is successful in reducing the recognition time. How to search for the pattern is the same as with the punch holes. The object to be searched for is two or more even number of holes. The result of decision is compared with the fixed information of decision means to determine the orientation of an image. FIGS. 138A-138C show the the fixed information. Specifically, when a staple mark is located at a corner, the image is determined to have the orientation shown in FIG. 138A or 138B relative to the staple mark. When a staple mark is located at an edge, the image is determined to have the orientation shown in FIG. 138C.

6.1.1 Identifying Image Orientation Based on Punch Holes

Figure 144A:
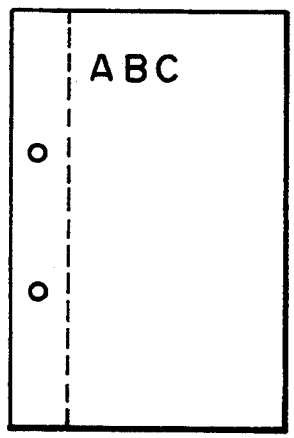
Figure 144B:
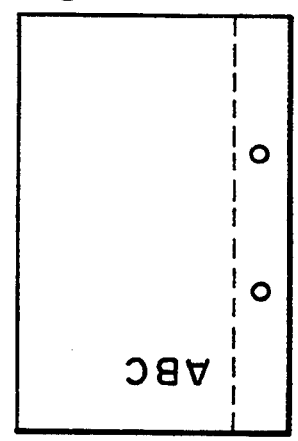
Figure 144C:
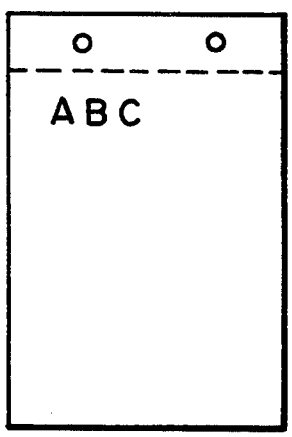
Figure 144D:
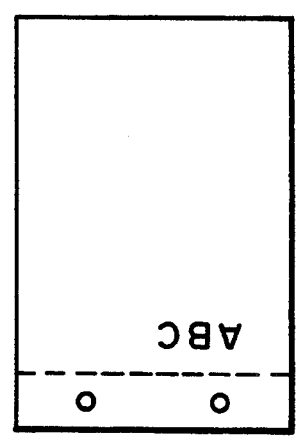
Figure 144E:
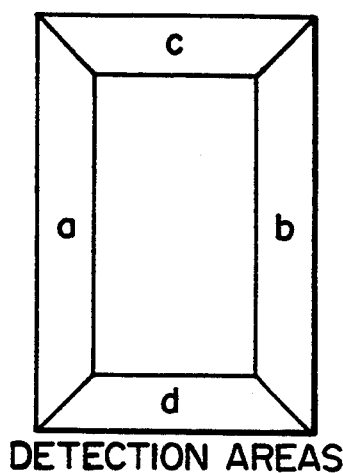
Figure 145:
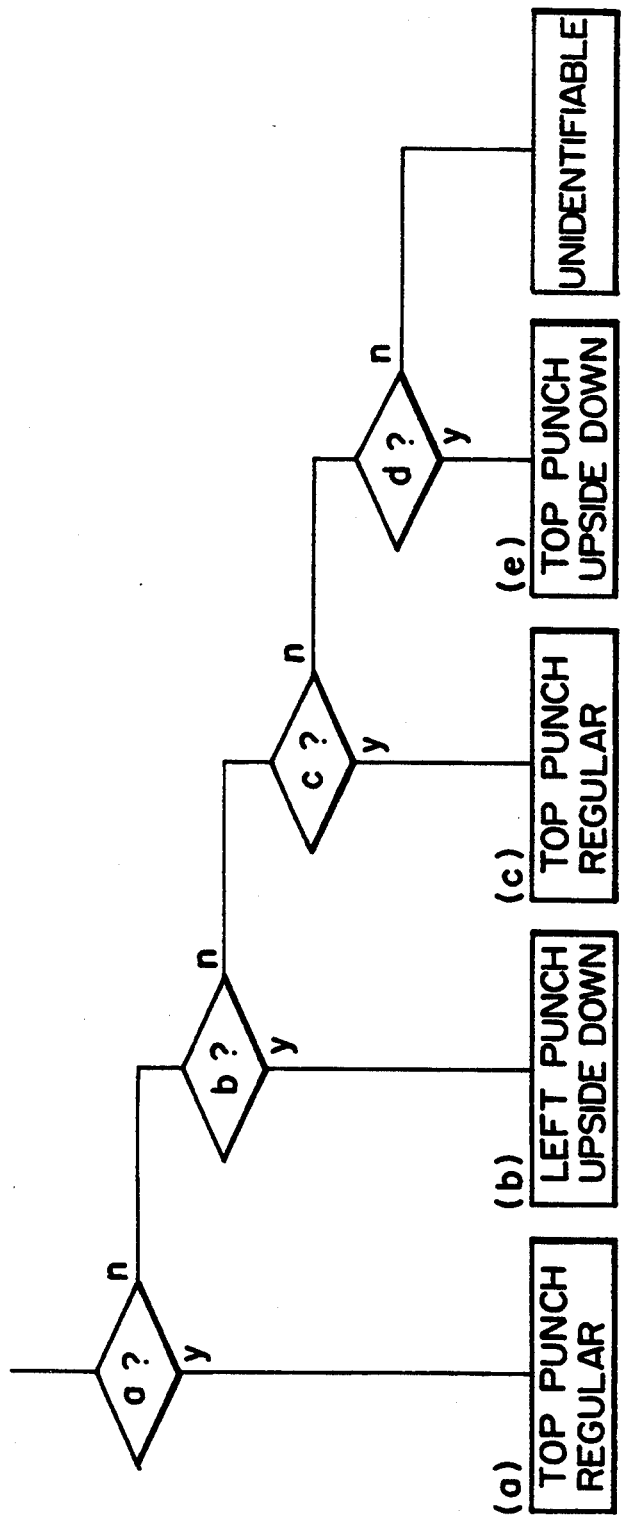

The orientation of an image is determined on the basis of data associated with punch holes formed in a document, as will be described by taking the previously described routine by way of example. Assuming vertically long horizontally written documents shown in FIGS. 144A-144E, punch holes are usually located at the left edge in FIG. 144A or at the upper edge in FIG. 144C. FIGS. 144B and 144D show the documents rotated 180 degrees from the positions shown in FIGS. 144A and 144C, respectively. Let the image conditions shown in FIGS. 144A, 144B, 144C and 144D be respectively referred to as (a) left punch regular, (b) left punch upside down, (c) top punch regular, and (d) top punch upside down for convenience sake. These four conditions can be distinguished by determining in which of areas a, b, c and d shown in FIG. 144E the punch holes exist. FIG. 145 demonstrates a specific processing sequence. With such a procedure, it is possible to detect the orientation of a formatted document image by a simple construction. In addition, when documents with punch holes are to be copied, image orientations can be determined on the basis of the punch holes.

6.1.2 Identifying Image Orientation Based on Staple Holes

Figure 147:
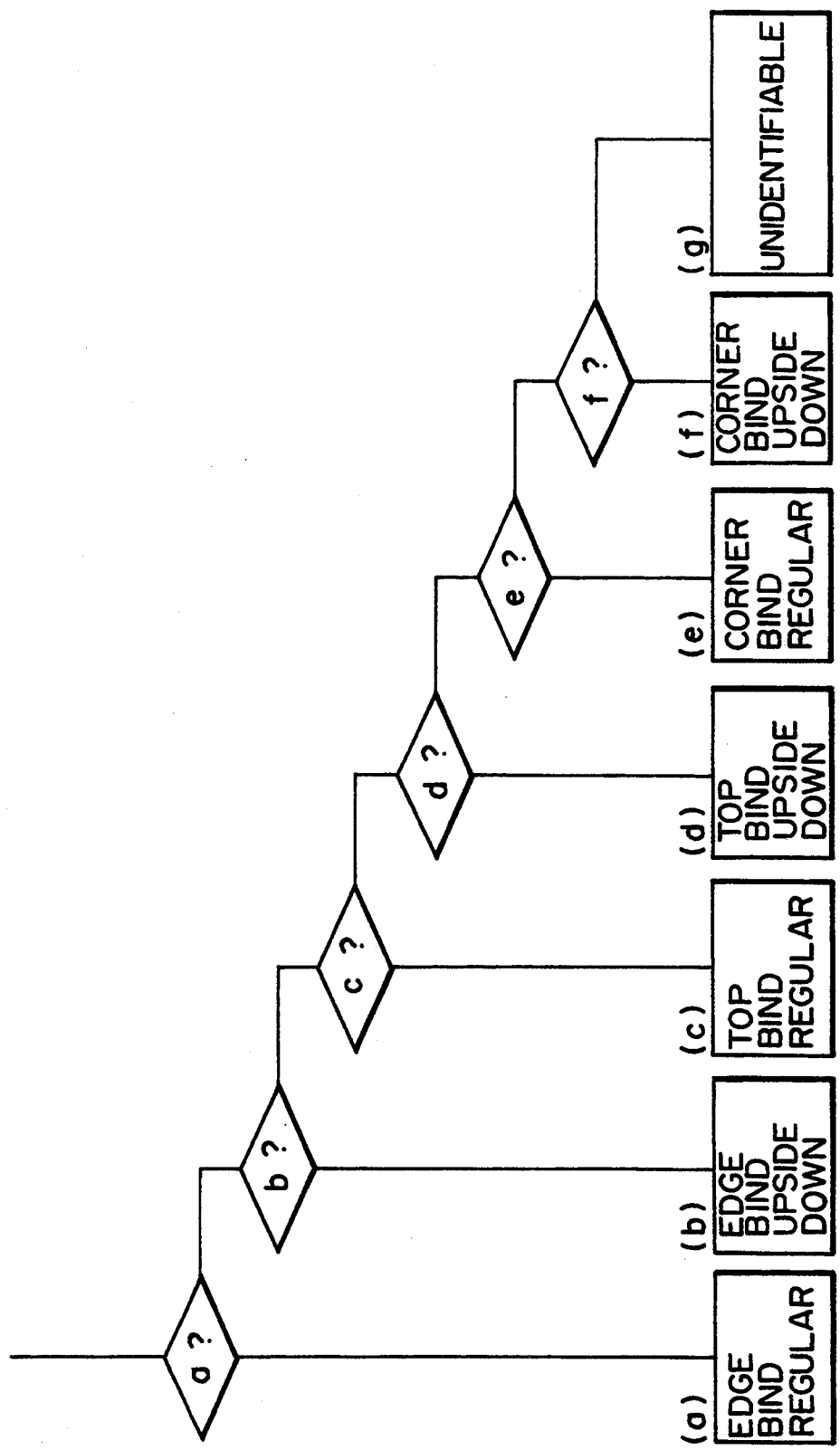

The orientation of an image is determined on the basis of data associated with staple holes formed in a document, as follows. Assuming vertically long horizontally written documents shown in FIGS. 146A-146G, they are usually stapled in any one of six different positions shown in FIGS. 146A-146F. FIGS. 146D-146F show the documents rotated 180 degrees from the positions shown in FIGS. 146A-146C, respectively. Let the image conditions shown in FIGS. 146A, 146B, 146C, 146D, 146E and 146F be respectively referred to as (a) edge staple regular, (b) edge staple upside down, (c) top staple regular, (d) top staple upside down, (e) corner staple regular, and (f) corner staple upside down for convenience. These six conditions can be distinguished by determining at which of the positions a-f of FIG. 146G a staple mark is located. A specific procedure for the distinction is shown in FIG. 147. With such a procedure, it is possible to detect the orientation of a formatted document image by a simple construction. In addition, when documents with staple holes are to be copied, image orientations can be determined on the basis of the staple holes.

6.1.3 Detecting Punch Holes or Staple Holes of Documents and Matching in Orientation to Reference Image Data When multiple documents are stacked together, the orientation of an image of each document is identified by detecting punch holes or staple holes. Whether or not a document different in orientation from a reference document exists in the copied documents is determined on the basis of the identified orientations.

The reference image may be either of the following two:
a) start page; and
b) any desired page depending on number of documents.

Figure 148:
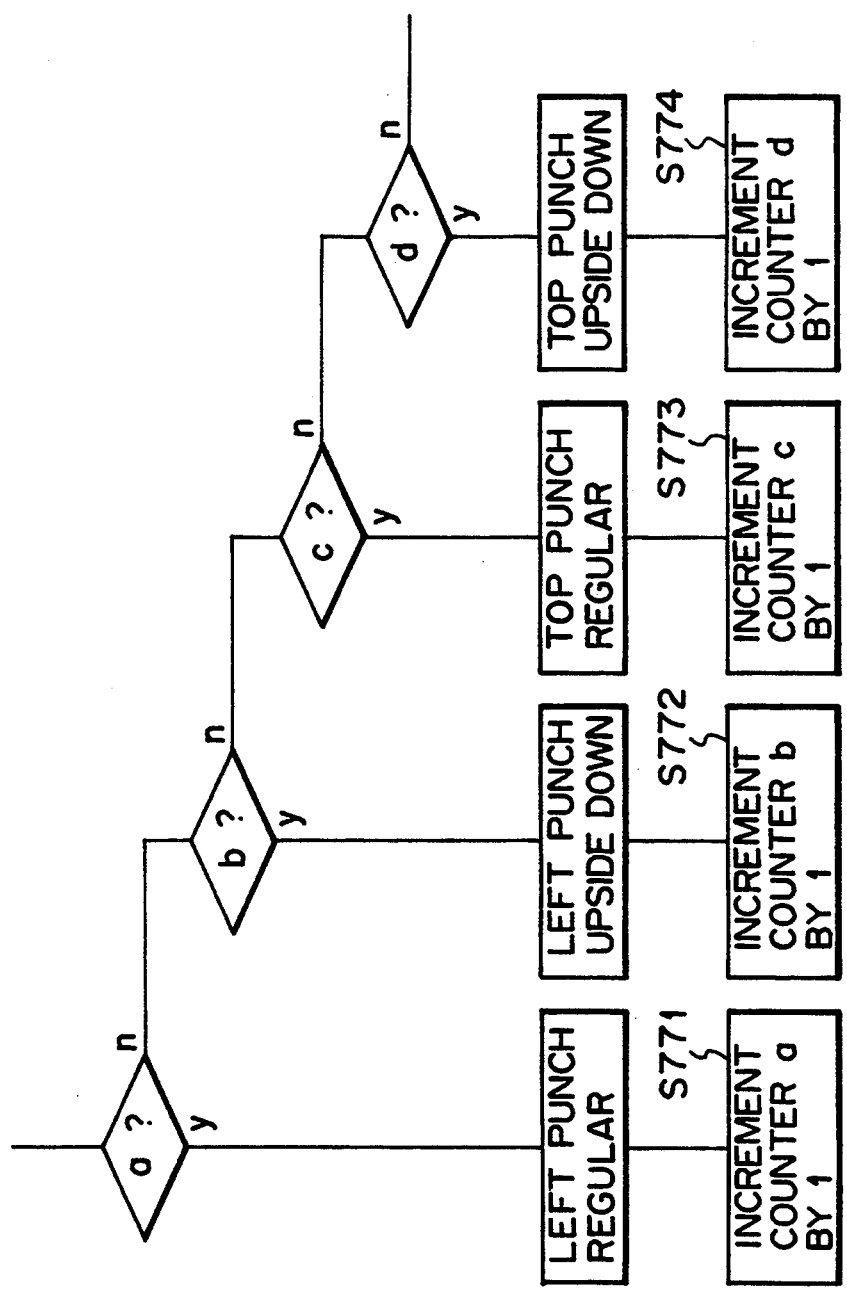

The word "any" means that the page is selected by the operator or written in a ROM beforehand. Based on the result of image data detection described in *Identifying Image Orientation Based on Punch Holes or Staple Holes*, any one of the document conditions is incremented one at a time for each document (see FIG. 148). Whether or not the multiple documents to be handled by one job include a document of different orientation is determined using a counter a responsive to left punch regular documents (S771), a counter b response to left punch upside down documents (S772), a counter c responsive to top punch regular documents (S773), and a counter d responsive to top punch upside down documents (S774) and according to the flowchart of FIG. 34.

As stated above, whether or not multiple documents include a document of different orientation can be determined on the basis of punch holes or staple marks.

6.1.4 Recovery in Image Orientation NG Condition 6.1.4.1 Only Warning after Image Formation When multiple documents are stacked together, the orientation of an image of each document is identified by detecting punch holes or staple holes. Whether or not a document different in orientation from a reference document exists in the copied documents is determined on the basis of the identified orientations. If such a document is present, a warning is displayed on the operation unit to inform the operator of the presence of the document in question and a copy thereof. Specifically, as shown in FIG. 35, when a document of different orientation is found by the processing of FIG. 34 and if the CPU of the operation unit is ready to receive a code, a display request code is sent thereto after the copying operation. As a result, there appears on the operation unit a suitable alert message, e.g., "DOCUMENT WITH INADEQUATE PUNCH HOLES OR UPSIDE DOWN EXISTS CHECK and REORIENT COPY". This message is similar to the message of FIG. 36 except for the replacement of vertical/horizontal writing with punch holes.

6.1.4.2 If Different Orientation Is Detected by Scanning, Interrupting Copying and Displaying Warning When multiple documents are stacked together, the orientation of an image of each document is identified by detecting punch holes or staple holes. Whether or not a document different in orientation from a reference document exists in the copied documents is determined on the basis of the identified orientations. If such a document is present, the copying operation is interrupted and a warning is displayed on the operation unit. This informs the operator of the presence of the document in question and urges him to rearrange the document.

Figure 149:
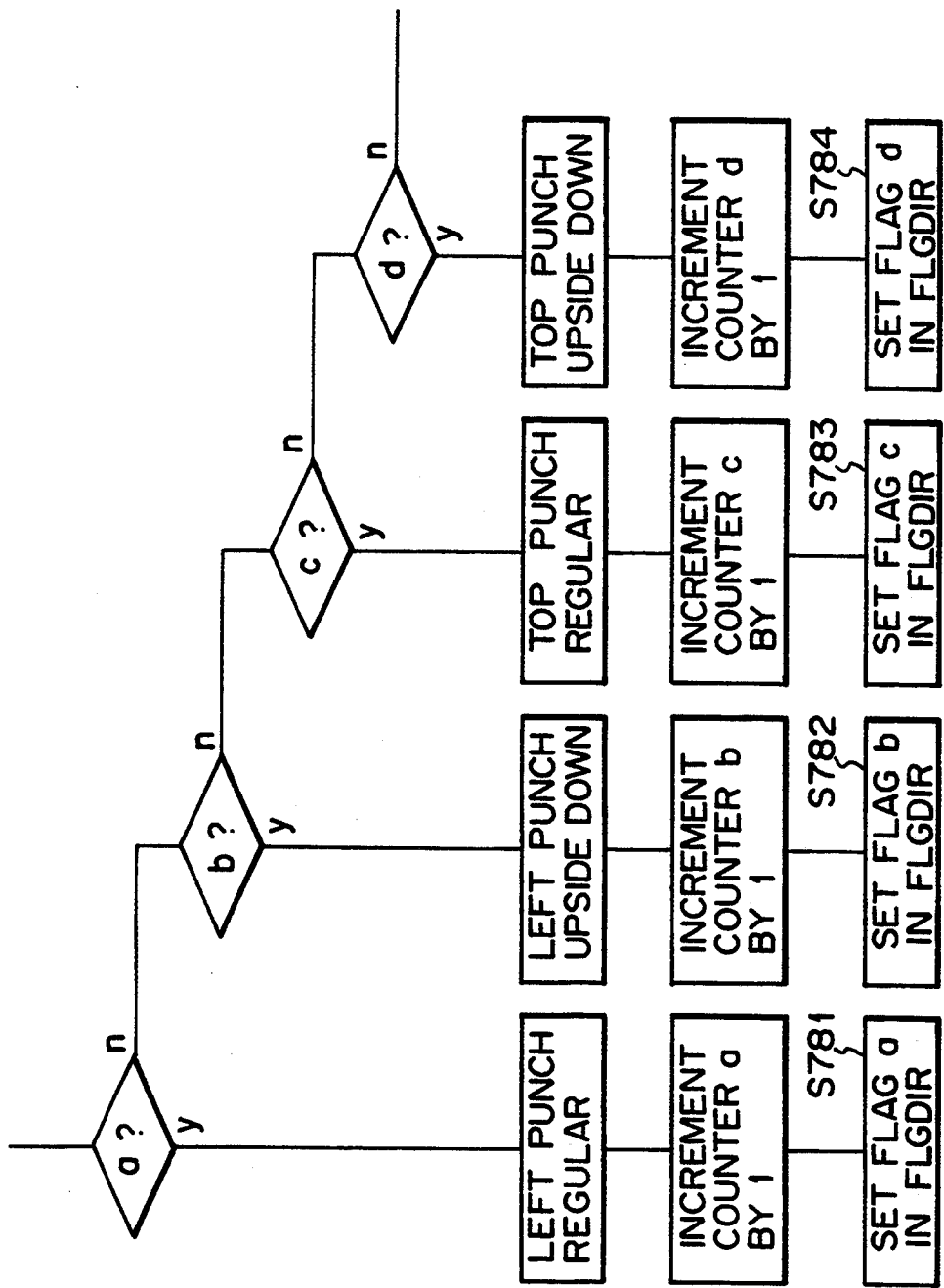

Specifically, as shown in FIG. 149, in the case of a left punch regular document, a flag a is set in a byte-by-byte memory FLGDIR as an orientation flag (S781); in the case of a left punch upside down document, a flag b is set (S782); in the case of a top punch regular document, a flag c is set (S783); and in the case of a top pump upside down document, a flag d is set (S784). The memory FLGDIR has the bit arrangement shown in FIG. 38. How to interrupt the copying operation and display the alert message is the same as in FIGS. 39 and 40. FIG. 150 shows a specific message to appear on the operation unit.

As stated above, the embodiment informs the operator of the presence of documents of different orientations while interrupting the copying operation. As a result, copies are matched in orientation to the first image.

6.1.4.3 Image Rotation and Reverse Document Scanning

Assume an image forming apparatus of the type identifying, when multiple documents are stacked together, the orientation of an image of each document by detecting punch holes or staple holes, and determining whether or not a document different in orientation from a reference document exists in the copied documents. When a document of different orientation is detected, recovery is effected by rotating the image (in the memory) or scanning the document in the reverse direction while a message is displayed on the operation unit to inform the operator of the presence of such a document. To rotate the image by image processing, the procedure shown in FIG. 42 is executed. The message is identical with the message shown in FIG. 43. For the reverse scanning, the procedure shown in FIG. 44 is executed and accompanied by the message shown in FIG. 45.

As described above, the image orientation of each document is determined on the basis of punch holes or staple holes. Whether or not the image orientation of each document matches the orientation of a reference document (first document) is determined on the basis of margin data. When a document of different orientation is detected, the image is rotated or the document is reversely scanned while an alert message is displayed to inform the presence of such a document.

6.1.5 Unidentifiable Image Orientation 6.1.5.1 Assume an image forming apparatus of the type identifying, when multiple documents are stacked together, the orientation of an image of each document by detecting punch holes or staple holes, and determining whether or not a document different in orientation from a reference document exists in the copied documents. When the image orientation of a certain document is unidentifiable, an image is formed in a predetermined direction while a warning is displayed on the operation unit. This informs the operator of the presence of an unidentifiable document and a copy thereof. Whether or not the multiple documents of one job include a document of different orientation and whether or not any document is unidentifiable are determined using a counter a responsive to left punch top regular documents, a counter b responsive to left punch upside down documents, a counter c responsive to top punch regular documents, and a counter d responsive to top punch upside down documents and according to the flowchart of FIGS. 48 and 49. In FIG. 47, when the image orientation is unidentifiable as determined in a step S791, FIG. 151, an image is formed in a predetermined orientation. After all the copies have been copied and if the operation unit 204 is ready to receive a code, a display request code is sent thereto to display a suitable alert message, e.g., "e UNIDENTIFIABLE DOCUMENTS EXIST CHECK and REARRANGE COPY", as in FIG. 50. Here, e is the content of the counter e.

6.1.5.2 Matching to Identified Predetermined Reference Image Data Orientation, Forming Image and Displaying Warning Assume an image forming apparatus of the type determining the image orientation of each document by detecting punch holes or staple holes and determining, by using the data as reference image orientation data, whether or not the image of each document matches in orientation with a reference image orientation to thereby uniformize the orientations. When the image orientation of a page expected to be the reference is unidentifiable, the next page is determined to be the reference. Then, the image orientation is matched to the reference. An alert message is displayed on the operation unit to inform the operator of the presence of the unidentifiable document and a copy thereof.

Specifically, as shown in FIG. 152, the page number of the reference document is determined (S801). A flag D of FLGDIR and a page counter m which will be described are cleared before the first document is scanned. When the first document is read, the page counter m is incremented by 1 since the flag D of FLGDIR is reset. The next step to the step immediately preceding a step S802 are the same as the steps shown in FIG. 151. In the case of a left punch regular document, a flag a is set in the byte-by-byte memory FLGDIR as an orientation flag; in the case of a left punch upside down document, a flag b is set; in the case of a top punch regular document, a flag c is set; and in the case of a top punch upside down document, a flag d is set. When the document orientation is identified, the program advances to the step S802. If the flag D of FLGDIR is reset, the flag D is set in the memory FLGDIR as a data flag so as to store the reference orientation data. If the flag D is set, meaning that reference orientation data has been stored, the program executes the next step.

The memory FLGDIR has the bit construction shown in FIG. 52. After all the documents have been copied, if the CPU of the operation unit is ready to receive a code, a warning display code is sent thereto. At the same time, since the page counter m indicates which page is the reference document, the page number of the reference page is also displayed. The resulting condition of the operation unit is the same as the condition shown in FIG. 55. This is also successful in eliminating missing pages.

6.1.5.3 Interrupting Image Formation and Displaying Warning

Assume an image forming apparatus of the type identifying, when multiple documents are stacked together, the orientation of an image of each document by detecting punch holes or staple holes, and determining whether or not a document different in orientation from a reference document exists in the copied documents. When a document whose image is unidentifiable is detected, the copying operation is interrupted while a warning is displayed on the operation unit to inform the operator of the presence of such a document and a copy thereof. This urges the operator to change the orientation of the document.

Specifically, as shown in FIG. 153, in the case of a left punch regular document, a flag a is set in the byte-by-byte memory FLGDIR as an orientation flag (S781); in the case of a left punch upside down document, a flag b is set (S782); in the case of a top punch regular document, a flag c is set (S783); and in the case of a top punch upside down document, a flag d is set (S784). Further, when the image orientation is not unidentifiable, a flag e is set as an orientation flag. The memory FLGDIR has the bit configuration shown in FIG. 55. How to interrupt the copying operation and display an alert message is the same as in FIGS. 56–58. A message to appear in this condition is the same as the message of FIG. 59.

As described above, on detecting a document of different orientation and a document whose orientation is unidentifiable, the embodiment interrupts the copying operation while informing the operator of the presence of such documents. The resulting copies match in orientation to the first image.

6.1.6 Blank Document

Assume an image forming apparatus of the type identifying, when multiple documents are stacked together, the orientation of an image of each document by detecting punch holes or staple holes, and determining whether or not a document different in orientation from a reference document exists in the copied documents. When a document is determined to be blank, it is turned over by document turning means and then read again. The orientation of an image is determined on the basis of the resulting image data.

In the reading operation of the ADF (II), FIG. 1, a document is determined to be turned over if image data other than the image data of the binding portion (punch holes or staple holes) is absent in a single document image signal or if image data is entirely absent. In this case, the document in question is turned over in the ADF without being discharged and then read by the scanner. If the resulting document data is again blank data, meaning that the document is blank on both sides thereof, the document is determined to be a demarcation sheet. Then, the image data is cancelled, the document is driven out, a blank sheet is driven as a recording sheet, and then the next document is read. If the image data representative of the other side of the document turned over is identical in orientation with the others, a usual image forming operation is performed with such image data. However, if the image data is different in orientation, the image formation is interrupted to request the operator to confirm or an alert message is displayed. The image is rotated in the memory to match the orientation.

The procedures described above are identical with those shown in FIGS. 42, 60, 61 and 62. However, in FIG. 60, punch hole detection will be executed in the step S186. Messages to appear on the operation unit are identical with those shown in FIGS. 43, 45 and 90.

The operation described above prevents a document upside down with respect to the front and rear from being copied and causing a copy thereof to be lost. In addition to the above operation, the embodiment may inform the operator of the presence of a document different in orientation from the reference document, interrupt the copying operation, rotate the image, or scan the document in the reverse direction.

6.1.7 Image Orientation NG (Unable to Be Dealt with by Image Processing)

Assume an image forming apparatus of the type detecting an image orientation by character recognition document by document, and determining, based on the orientations, whether or not any of the documents is different in orientation from the first document. Further, assume that this type of apparatus lacks a recovery function against a document different in orientation from the first document, i.e., it cannot deal with such a document without the operator's action. Then, the presence of a document in question is reported to the operator by any one of the following specific procedures:

(A-a) When the desired number of sets to be sorted is greater than predetermined one, the copying operation is interrupted while a warning is displayed to alert the operator. When a predetermined period of time expires without any operator's action, the copying operation is resumed.

(A-b) When the desired number of sets to be sorted is smaller than the predetermined one, a warning is displayed, but the copying operation is continued.

(B-a) When the human body sensor 225 is in an ON state, the copying operation is interrupted while a warning is displayed to alert the operator. When a predetermined period of time expires without any operator's action, the copying operation is resumed.

(B-b) When the sensor 225 is in an OFF state, a warning is displayed, but the copying operation is continued.

In this manner, when the operator does not take any action despite the warning, the operation is automatically resumed to reduce the dead time of the machine. The procedure taking account of the number of copies to be sorted is identical with the procedure shown in FIG. 64 and accompanied by a messages shown in FIG. 110. The procedure associated with the copier having the sensor 225 is the same as in FIG. 67 and accompanied by the messages of FIGS. 65 and 110.

This embodiment has the following advantages. Assume that when a document different in orientation from the reference document is detected while a copying operation using a sorter is under way. Then, if the desired number of sets to be sorted is small enough to rearrange after the copying operation, the copying operation is continued without interruption. After the copying operation, a warning informing the operator of such a situation is displayed to eliminate missing pages. When the desired number of sets to be sorted is too great to rearrange after the copying operation, the copying operation is interrupted and a warning is displayed. Even in this case, if a predetermined period of time expires without any operator's action, the operation is resumed to eliminate the wasteful dead time of the machine and the time wastefully occupied by the current job. The warning appearing after the copying operation automatically informs the operator of the presence of the orientation NG document (and a copy thereof) and urges him to see the orientations of the copies at the time of stapling, punching or similar binding.

In the case of the copier with the human body sensor 225, when the sensor 225 is in an OFF state (the operator is away from the copier), the copying operation is continued without interruption. After the copying operation, a warning appears on the operating section to automatically urge the operator to see the orientations of the copies before binding them. When the sensor 225 is in an ON state, the copying operation is interrupted while a warning is displayed. Further, assume a predetermined period of time expires without any operator's action despite the interruption of operation and the warning. Then, the copying operation is automatically resumed to save time. At this instant, the warning appearing after the copying operation automatically informs the operator of the presence of the orientation NG document (and a copy thereof) at the time of punching, stapling or similar binding and urges him to see the orientations of the copies.

6.2.1 Staple Control Based on Detected Punch Hole Data (Determining Stapling Position—Stapling)

When multiple documents are to be copied, it may be contemplated to detect the image orientation of each document by detecting punch holes, determine a stapling position on the basis of the detected image data, and then drive the stapler, as follows.

Regarding a stapling position, as shown in FIGS. 154A–154D, (a)–(d), staples are driven into the same edge as the edge where punch holes are detected. In FIGS. 154A–154D, (a')–(d') and (a")–(d") correspond to two-point stapling and one-point stapling, respectively. Staples should only be driven in the areas indicated by hatching in the figures. As shown in FIG. 155, whether or not a staple mode is selected is determined in a step S821. This step is followed by either of (a) a standby mode sent to the operation unit for awaiting the next input to be entered by the operator, and (b) a staple mode sent to a stapling position changing mechanism as an operation command signal. In the staple mode, a stapling mechanism is controlled in response to the operation signal. After the stapling operation, the program executes the standby mode (S822) and awaits the next command.

As stated above, by detecting an image orientation on the basis of punch holes and then determining a stapling position, defective stapling is prevented.

6.2.2 Staple Control Based on Detected Staple Hole Data (Determining Stapling Position—Stapling)

When multiple documents are to be copied, it may be contemplated to detect the image orientation of each document by detecting staple holes, determine a stapling position on the basis of the detected image data, and then drive the stapler, as follows.

Regarding a stapling position, as shown in FIGS. 156A–156D, (a)–(d), staples are driven into the same edge as the edge where punch holes are detected. In FIGS. 156A–156D, (a')–(d') and (a")—(d") correspond to two-point stapling and one-point stapling, respectively. Staples should only be driven in the areas indicated by hatching in the figures. As shown in FIG. 157, whether or not a staple mode is selected is determined in a step S831. This step is followed by either of (a) a standby mode sent to the operation unit for awaiting the next input to be entered by the operator, and (b) a staple mode sent to a stapling position changing mechanism as an operation command signal. In the staple mode, a stapling mechanism is controlled in response to the operation signal. After the stapling operation, the program executes the standby mode (S832) and awaits the next command.

As stated above, by detecting an image orientation on the basis of staple holes and then determining a stapling position, defective stapling is prevented.

6.2.3 Interrupting Stapling in Response to Inhibit Input

Assume an image forming apparatus of the type having a mode in which the orientation of an image of each document is determined on the basis of staple holes, and then a stapling position is determined on the basis of the detected image data to effect stapling. After a job has been completed on the basis of the detected staple hole data, whether or not to effect stapling is determined.

When an staple inhibit input is entered, the stapling operation is inhibited.

Specifically, as shown in FIG. 158, after staple holes have been detected (S841), a stack of documents are copied (S842). After one job, the program requests the operator to determine whether or not effect stapling (S843). As the operator presses a particular key for executing stapling, the program executes stapling, discharges the stapled stack (S844), and then enters into a standby mode (S845). When the operator presses another key for inhibiting stapling, the program immediately discharges the sheets and then enters into the standby mode.

As stated above, when the stapling operation is in the default mode, the operator is requested to determine whether or not to effect stapling. By accepting a staple inhibit input, it is possible to eliminate defective stapling.

6.2.4 Comparison between Character Train Direction Data and Reference Stapling Position A sorter/stapler can act only on a single point at a predetermined corner while a finisher can act only on a line at one edge, as stated earlier. Hence, it has been likely that when the operator's input and the set position of documents are not correctly related, the resulting copies are finished at an unexpected position thereof due to the saving of hardware. In the light of this, the embodiment has not only the previously stated image orientation identifying means using the character recognition system, but also means for comparing a finishing position available with hardware and an optimal finishing position determined by the character train direction data, thereby matching the two positions. A sorter/stapler will staple sheets positioned as shown in FIG. 159A or 159B at a position indicated by an oblique line. At this instant, if the documents are vertically long and horizontally written as shown in FIG. 159A, they match the reference stapling position. However, when the documents are vertically long and vertically written as shown in FIG. 159B, they do not match the reference stapling position. In practice, the CPU may make the following specific decision:

(i) As shown in FIG. 160, numbers 1–8 are assigned to absolute stapling positions, assuming documents fed to the trays of the sorter;

(ii) Assuming that the stapling position resulted from punch hole recognition is i, i is 2 in the position shown in FIG. 159B;

(iii) Assuming that the stapling position of the hardware is k, k is limited to 6–8 due to the limitations of the sorter/stapler and is 6, 7 or 8 in the case of FIGS. 159A and 159B; and (iv) Comparing/and k, the CPU determines that the two stapling positions coincide if i is equal to k. In the case of FIG. 159B, since i is 2 and not equal to k, the CPU determines that the two stapling positions do not coincide.

Regarding the copying operation, a procedure shown in FIG. 161 is executed. As shown, punch holes are recognized on the basis of whether or not one-point binding has been effected, and then a stapling position and an orientation are determined (S851 and S852).

As stated above, after punch holes have been detected, an optimal finishing position is automatically determined on the basis of the orientation of a character and that of a character train. This frees the operator from confusion regarding the finishing operation. Further, it is needless for the operator to designate a finishing operation each time, promoting easy and rapid operation. In addition, the embodiment prevents a set of copies from being finished at an unexpected position while achieving the various advantages of the previously stated character recognition.

6.2.5 Recovery in Image Orientation NG Condition by Comparing Image Orientation Derived from Punch Holes and Reference Stapling Position Data Assume an image forming apparatus of the type determining the orientation of an image of each document by detecting punch holes, and then determining a stapling position on the basis of the detected image orientation data. When the detected image orientation data does not coincide with a reference stapling position, defective stapling is eliminated by any one of the following measures:

a) Interrupting copying operation while displaying an alert message;

b) inhibiting stapling operation while continuing copying operation;

c) rotating image (in memory); and d) scanning image in reverse direction.

How to interrupt the copying operation and display an alert message is the same as in FIG. 62 and accompanied by the message shown in FIG. 100. The procedure for inhibiting stapling while continuing the copying operation is identical with the procedure of FIG. 69 and accompanied by the message of FIG. 63. To rotate the image (in the memory) by image processing, the procedure of FIG. 42 is executed and accompanied by the message of FIG. 43. Further, the reverse document scanning is executed in the same manner as in FIG. 44 and indicated using the message of FIG. 45.

As stated above, when the image orientation derived from the punch holes does not coincide with the reference stapling position, the copying operation is interrupted, the image is rotated, or the document is reversely scanned. At the same time, an alert message is displayed to inform the operator of the presence of a document of inadequate orientation. This is successful in producing copies in the same orientation.

6.2.6 Image Present at Punch Hole Position Determined by Punch Hole Detection Assume an image forming apparatus of the type determining the orientation of an image of each document by detecting punch holes, and then determining a punching position on the basis of the detected image data. When an image is present at the determined punch hole position, any one of the following measures is taken:

(a) interrupting copying operation while displaying alert message;

(b) inhibiting stapling while continuing image formation;

(c) shifting, magnification changing (reducing) or otherwise manipulating image by image processing; and (d) automatically cancelling staple mode (at the time of default).

This prevents staples from overlapping and, therefore, damaging the image.

Figure 70:
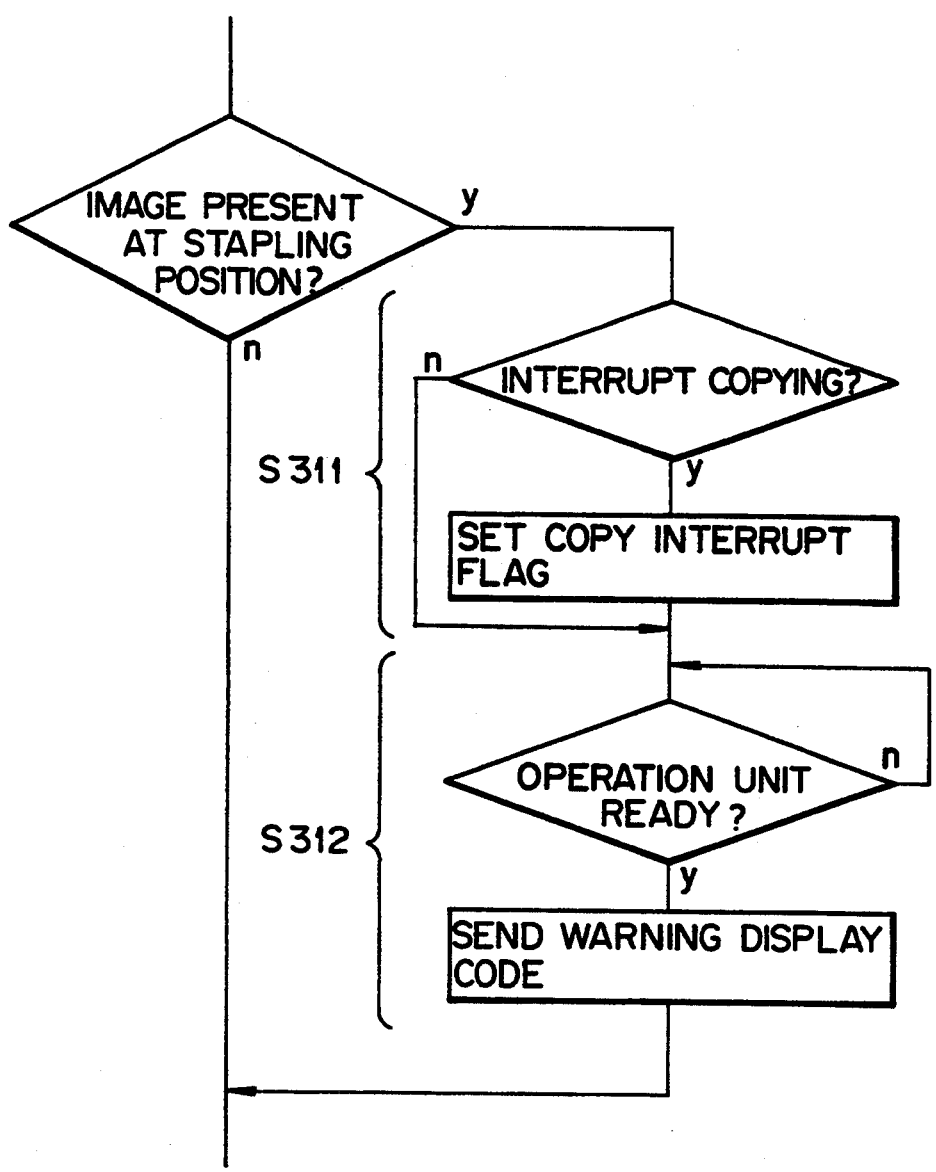
FIG. 70 is a flowchart showing a copy interruption and warning display procedure to be executed when an image is present at a determined stapling position.

How to interrupt the copying operation and display an alert message is the same as in FIG. 70. The procedure for shifting, magnification changing (reducing) or otherwise manipulating the image is identical with the procedure of FIG. 72. To change the stapling position, the procedure of FIG. 73 is executed. How to automatically cancel the staple mode (at the time of default) is shown in FIG. 71 and accompanied by the message of FIG. 77.

As stated above, when an image exists at the determined stapling position, staples are prevented from damaging images in the staple mode by any one of the above-described implementations.

6.3.1 Selectively Detecting Punch Holes or Staple Holes Depending on Image Form Mode In an image forming apparatus having means for identifying the orientation of an image by detecting punch holes or staple holes, the detection of punch holes or staple holes is effected in an image form mode including finishing, but it is not effected in a usual image form mode. For this purposed, the procedure shown in FIG. 75 is executed. Selectively detecting punch holes or staple holes depending on the image form mode as stated above is successful in saving time and promoting efficient copying.

6.3.2 Detecting Punch Holes of Document and Erasing Them on Sheet

When punch holes exist in documents, it is possible to detect them and erase them on corresponding sheets. No punch marks appear on the resulting copies.

Specifically, as shown in FIG. 162A, assume a document having an image area A and two punch holes B and C at the outside of the image area. In the event of image formation, part of image data written to the memory representative of the punch holes B and C is neglected at the time of image formation and not written on a photoconductive element. As shown in FIG. 162B, the resulting copy of the document does not have any punch mark and, therefore, renders the image thereof attractive. Alternatively, if an arrangement is so made as not to write the detected punch hole data in the memory, the time for writing such data in the memory as well as for decision is saved.

6.3.3 Detecting Staple Holes of Document and Erasing Them on Sheet

When staple holes exist in documents, it is possible to detect them and erase them on corresponding sheets. No staple marks appear on the resulting copies.

Specifically, as shown in FIG. 163A, assume a document having an image area A and two staple marks B and C. In the event of image formation, part of image data written to the memory representative of the staple marks B and C is neglected at the time of image formation and not written on a photoconductive element. As shown in FIG. 163B, the resulting copy of the document does not have any staple mark and, therefore, renders the image thereof attractive. Alternatively, if an arrangement is so made as not to write the detected punch hole data in the memory, the time for writing such data in the memory as well as for decision is saved.

6.3.4 Stapling Position NG Based on Various Data When Manual Staple Command Is Inputted Assume an image forming apparatus of the type determining the orientation of an image of each document by detecting punch holes or staple holes, and then determining a stapling position on the basis of the detected image data. Assume that after all the copies have been sorted, when the operator enters a manual staple command, image data is present at the designated stapling position. Then, either of the following measures is taken:

a) displaying warning on operation unit; and
b) inhibiting stapling.

This prevents staples from overlapping and damaging the image. The is warning displayed according to the procedure shown in FIG. 76 except that the step S371 should be omitted. A message to appear in this condition is identical with the message shown in FIG. 79.

7. Efficient Image Orientation Identification Using Blank Margin Layout and Character Recognition in Sequence When certain document image orientation identifying means is unable to identify an orientation, another such means is operated to determine an image orientation efficiency with a high character orientation recognition probability. In the embodiment, image orientation identifying means operable at a high speed is operated first, and then another image orientation identifying means operable at a lower speed is operated.

Specifically, as shown in FIG. 164, a procedure for determining an image orientation on the basis of margins is executed (S861). Whether or not an image orientation can be determined on the basis of margins is determined (S862). If the answer of the step S862 is negative, a procedure for determining a layout is executed (S863). If a layout cannot be determined as determined in the step S863, a procedure for recognizing a character orientation is executed (S865). If a character orientation cannot be recognized as determined in a step S865, it is determined that an image orientation cannot be identified. Such a procedure allows an image orientation to be identified accurately and rapidly.

In summary, it will be seen that the present invention provides an image forming apparatus having various unprecedented advantages, as enumerated below.

(1) When an image orientation cannot be be identified on the basis of predetermined image data, the next image data is selected as a reference for identification. This allows an image orientation to be surely identified, thereby enhancing reliability. Should the image orientation be unable to be identified, the apparatus would have to stop forming an image. A plurality of identifying means are sequentially operated in the decrementing order with respect to processing speed, minimizing the fall of productivity.

(2) In a usual image form mode in which sheets carrying images thereon are not finished, the sheets are simply driven out to accommodating means. In this mode, since a difference in orientation between the sheets is not critical, the procedure for identifying an image orientation is not executed. On the other hand, in an image form mode accompanied by finishing, an image orientation is identified since a difference in image orientation is critical. This allows an adequate measure to be taken when the sheets are different in orientation.

(3) An image orientation represented by image data is identified relative to a predetermined adequate binding position. When the image orientation does not match the adequate binding position, an adequate procedure is executed to avoid an undesirable result. For example, an alert message may be displayed, and the image forming operation may be interrupted to eliminate wasteful image formation.

Various modifications will become possible for those skilled in the art after receiving the teachings of the present disclosure without departing from the scope thereof.

What is claimed is:

1. A binding device identifying a binding position for binding sheets carrying images thereon, and performing a binding operation at the identified binding position, comprising:

detecting means for detecting the greatest blank portion of a page area of image data; and binding position identifying means for identifying the binding position on the sheets in response to output data of said detecting means.

2. A binding device identifying a binding position for binding sheets carrying images thereon, and performing a binding operation at the identified binding position, comprising:

layout identifying means for identifying a layout of image data;

determining means for determining an image data size and an image data set orientation; and binding position identifying means for identifying the binding position on the sheets in response to an output of said layout identifying means and an output of said determining means.

3. A binding device identifying a binding position for binding sheets carrying images thereon, and performing a binding operation at the identified binding position, comprising:

character orientation identifying means for identifying an orientation of a character heading a sentence in an image data page area; and binding position identifying means for identifying the binding position on the sheets in response to an output of said character orientation identifying means.

4. A binding device identifying a binding position for binding sheets carrying images thereon, and performing a binding operation at the identified binding position, comprising:

hole detecting means for detecting punch holes or staple holes existing in an image data page area; and binding position identifying means for identifying the binding position on the sheets in response to an output of said hole detecting means.

5. A binding device identifying a binding position for binding sheets carrying images thereon, and performing a binding operation at the identified binding position, comprising:

detecting means for detecting image data in an image data page area;

binding position identifying means for identifying the binding position on the sheets in response to an output of said detecting means;

decision means for determining whether or not data representative of the binding position determined by said binding position identifying means matches data representative of a predetermined reference binding position; and recovering means for, when said decision means determines that said data representative of the binding position does not match said data representative of a predetermined reference binding position, avoiding noncoincidence.

6. A device as claimed in claim 5, wherein said recovering means displays a warning.

7. A device as claimed in claim 5, wherein said recovering means inhibits a binding operation.

8. A binding device identifying a binding position for binding sheets carrying images thereon, and performing a binding operation at the identified binding position, comprising:

detecting means for detecting image data in an image data page area;

binding position identifying means for identifying the binding position on the sheets in response to an output of said detecting means;

confirming means for determining whether or not image data exists at the binding position identified by said binding position determining means; and recovering means for avoiding, when said confirming means determines that image data exists at the binding position, noncoincidence of said image data and said binding position.

9. A device as claimed claim 8, wherein said recovering means displays a warning.

10. A device as claimed in claim 8, wherein said recovering means interrupts a binding operation.

11. A device as claimed in claim 8, wherein said recovering means executes image processing for shifting the image data to an area outside of the binding position.

12. A device as claimed in claim 8, wherein said recovering means replaces the binding position with a binding position where the image data does not exist.

13. A method of binding sheets carrying images thereon by determining a binding position, comprising the steps of:

detecting predetermined image data existing in a page area;

determining a binding position on the sheets in response to the predetermined image data determined;

determining whether or not data representative of a predetermined reference binding position and data representative of the determined binding position are coincident; and avoiding when said data representative of the predetermined reference binding position and said data representative of the determined binding position are not coincident, noncoincidence.

14. A method as claimed in claim 13, further comprising the step of executing, when said data representative of the predetermined reference binding position and said data representative of the determined binding position are not coincident, display of a warning and interruption of an image forming operation with the image data.

15. A method as claimed in claim 13, further comprising the step of continuing, when said data representative of the predetermined reference binding position and said data representative of the determined binding position are not coincident, an image forming operation while inhibiting a binding operation.

16. A method as claimed in claim 13, further comprising the step of executing image rotation with the image data when said data representative of the predetermined reference binding position and said data representative of the determined binding position are not coincident.

17. A method as claimed in claim 13, further comprising the step of executing a reading operation for reading the image data in a reverse direction when said data representative of the predetermined reference binding position and said data representative of the determined binding position are not coincident.

18. A device for binding sheets carrying images thereon by determining a binding position, comprising:

detecting means for detecting predetermined image data in an image data page area;

determining means for determining a binding position in response to an output of said detecting means;

decision means for determining whether or not data representative of a predetermined reference binding position and data representative of the determined binding position are coincident; and recovering means for avoiding, when said data representative of the predetermined reference binding position and the data representative of the determined binding position are not coincident, noncoincidence.

* * * * *